US006301379B1

(12) United States Patent
Thompson et al.

(10) Patent No.: US 6,301,379 B1
(45) Date of Patent: Oct. 9, 2001

(54) ELECTRONIC CHECK PRESENTMENT SYSTEMS AND METHODS EMPLOYING VOLATILE MEMORY DATASTORE ACCESS TECHNIQUES

(75) Inventors: Mitchell D. Thompson, Dallas, TX (US); Jonathan C. Gilson, Roswell, GA (US); Stanley M. Josephson, Dallas, TX (US)

(73) Assignee: Carreker-Antinori, Inc., Dallas, TX (US)

( * ) Notice: Subject to any disclaimer, the term of this patent is extended or adjusted under 35 U.S.C. 154(b) by 0 days.

(21) Appl. No.: 08/807,090

(22) Filed: Feb. 27, 1997

(Under 37 CFR 1.47)

Related U.S. Application Data

(63) Continuation-in-part of application No. 08/587,936, filed on Jan. 17, 1996, now Pat. No. 5,689,579.

(51) Int. Cl.[7] .................................................. G06K 9/00

(52) U.S. Cl. ........................ 382/137; 235/379; 705/45; 902/38

(58) Field of Search .................................. 382/137, 135, 382/138, 139, 140, 309; 902/36–40; 235/379; 705/45, 16–17, 33, 35, 1; 364/705.02; 380/24; 711/100, 102–106; 713/200; 707/8–10, 200–204

(56) References Cited

U.S. PATENT DOCUMENTS 4,914,587 * 4/1990 Clouse .................................. 705/38
5,025,373 * 6/1991 Keyser, Jr. et al. .................. 380/24
5,043,866 * 8/1991 Myre, Jr. et al. .................... 707/202
5,093,787 * 3/1992 Simmons .............................. 705/33
5,233,547 * 8/1993 Kapp et al. ...................... 364/705.2
5,237,159 * 8/1993 Stephens et al. ...................... 705/30
5,333,303 * 7/1994 Mohan ............................ 364/285.2
5,337,263 * 8/1994 Patermaster ...................... 364/705.2
5,444,616 * 8/1995 Nair et al. ............................ 705/17
5,454,099 * 9/1995 Myers et al. ........................ 364/268
5,488,671 * 1/1996 Kern .................................... 382/138
5,677,955 * 10/1997 Doggett et al. ...................... 380/24
5,717,868 * 2/1998 James .................................... 705/35
5,778,425 * 7/1998 Shigeeda ............................ 711/122
5,963,648 * 10/1999 Rosen .................................. 235/379
5,982,891 * 11/1999 Ginter et al. ............................ 380/4

* cited by examiner

*Primary Examiner*—Jayanti K. Patel

(57) ABSTRACT

A subsystem and method, employed within an electronic check presentment ("ECP") system and executable on a computer system having volatile and nonvolatile memory and a processor coupled thereto. The subsystem and method establish and maintain a datastore for processing items within the ECP system. The subsystem includes: (1) a data space anchor module, executable in the processor, that causes the processor to allocate at least a portion of the volatile memory to contain at least a partial copy of the datastore and (2) a data space access module, associated with the data space anchor module and executable in the processor, that (a) causes the processor to use at least a portion of the nonvolatile memory that contains the datastore, the datastore including a log to track transactions performed on the at least partial copy, and (b) serves as a central point for applying transactions received from ECP application programs to the at least partial copy and modifying items in the datastore as a function of the transactions. In a related embodiment, such modification of items in the datastore may suitably include logging the transactions in the log.

27 Claims, 4 Drawing Sheets

ELECTRONIC CHECK PRESENTMENT SYSTEMS AND METHODS EMPLOYING VOLATILE MEMORY DATASTORE ACCESS TECHNIQUES

CROSS-REFERENCE TO RELATED APPLICATION

This application is a continuation in part application of U.S. Ser. No. 08/587,936 filed Jan. 17, 1996, now U.S. Pat. No. 5,689,579 to Stanley M. Josephson, for a "Rule-Based Circuit, Method and System for Performing Item Level Reconciliation".

TECHNICAL FIELD OF THE INVENTION

The present invention is directed, in general, to electronic check presentment and, more specifically, to electronic check presentment systems and methods wherein improved volatile memory datastore access techniques are employed to increase check presentment processing efficiency without risking corruption or loss of the datastore.

BACKGROUND OF THE INVENTION

Financial institutions ("FIs"), such as banks, have conventionally handled the transfer and presentment of negotiable instruments for payment in a manual, paper-based fashion. At specified times each day, "sending" FIs sorted all negotiable instruments presented to them by depositors and other correspondent FIs into bundles—each bundle containing the negotiable instruments for the particular FIs on which they are drawn.

The sorted bundles were then segregated into batches of negotiable instruments according to an assigned American Banking Association ("ABA") routing/transit number ("R/T") printed on the face of the negotiable instrument. These batches were then aggregated for shipment to the paying FI. A detailed listing and a cover letter (collectively, a "cash letter") were attached to each such shipment. The cash letters presented the dollar amount of all negotiable instruments within the batch and summarized its accumulated dollar amount—the summary often included the names of the paying and sending FIs, the preassigned R/T associated with each of the same, the number of negotiable instruments in the batch and the total dollar amount of all of the negotiable instruments in the batch.

When the paying FI received the cash letter, it verified its contents (i.e., negotiable instrument amounts balanced with the totals contained on the cover letter), a process commonly referred to as "reconciliation." If a balancing discrepancy existed (e.g., missing or extra negotiable instrument, amount or arithmetic error, etc.), the condition was documented and notification of the error was slated for the sending bank. Other conventional check processing and posting functions, commonly referred to as "Demand Deposit Accounting" ("DDA"), were then performed to determine whether any of the accounts on which the negotiable instruments were drawn were restricted (e.g., closed, dormant, stop payment, account holder deceased, etc.). If a particular account was not restricted, the paying FI determined whether there was enough money in the account (i.e., sufficient funds) to cover payment of a negotiable instrument drawn thereon. The paying FI, in response to these determinations, either accepted or rejected payment of the negotiable instrument, slating the reconciled negotiable instrument for return. The paying FI notified the sending FI of any balancing discrepancies, any negotiable instruments to be returned unpaid, or the like. The return to the sending FI was again accomplished by physical transportation of the negotiable instruments.

It became apparent as negotiable instrument volume (particularly, check volume) increased that conventional negotiable instrument processing methods required automation. To facilitate this automation, the ABA introduced a method of printing information on each negotiable instrument, commonly referred to as Magnetic Ink Character Reconciliation ("MICR"). The MICR method, which today uses a font known as "E13B," is used to properly route and process each received negotiable instrument. The contents of the MICR line are specified in various American National Standards Institute ("ANSI") publications.

Typically, there are six MICR fields defined: (1) dollar amount, (2) account number, (3) R/T number, (4) process control or serial number, (5) auxiliary on-us or serial number, and (6) external process code. The incorporation of MICR information on negotiable instruments improved the clearing process in terms of speed and flexibility—the cash letter process was automated, although the reconciliation process remained manual.

Automation also introduced reconciliation discrepancies such as (1) differences in processing equipment and software used by the various FIs, (2) a lack of quality control standards for MICR printing, and (3) exceptions caused by environmental conditions. To address some of these problems, and to further speed the clearing process, processing systems and, later, processing system networks (collectively, "processing environments") were integrated therein allowing extracted MICR information to be used to create electronic payment transactions that are communicated between sending FIs and paying FIs.

Today, the electronic clearing process includes electronic check presentment ("ECP"), electronic data exchange ("EDE"), automated clearing houses ("ACH"), branch item capture ("BIC") and check truncation. Each of these exemplary electronic sub-processes rely on the ability for one or more FIs to extract MICR information or other data from negotiable instruments, to convert the data to an electronic transaction, to apply the electronic transaction to an account for debiting purposes and, subsequently, to match the paper negotiable instrument to the electronic transaction for reconciliation purposes.

The types of processing environments employed in an FI's ECP process typically vary in functionality. For example, the circuitry used to read the information contained within a given MICR line varies with the type of equipment and the techniques used to recognize the magnetic and/or optical representation of the individual MICR symbols and numbers. To convert the paper negotiable instrument MICR information to an electronic item, the MICR information is typically scanned and formatted to conform to one of several standard electronic transaction formats. The electronic item is then grouped with other electronic items, similar to the cash letter process described hereinabove, and transmitted via data transmission means, possibly through intermediary FIs, such as Federal Reserve Banks ("FRBs"), to a paying FI. The paper negotiable instrument follows thereafter, usually traversing each of the same FIs through which the electronic item passed. Each FI matches the received paper negotiable instrument with the previously processed electronic transaction for reconciliation. Reconciliation verifies that the electronic item was received, that there was a corresponding paper negotiable instrument and that the MICR contents of the paper negotiable instrument were correctly extracted and processed.

The matching process is often unduly complicated by factors such as variability in the placement of the contents of the MICR line information from FI to FI, the condition and quality of the paper instrument (e.g., torn, folded, dog-eared, etc.), the condition of the scanning equipment from FI to FI, etc. In point of fact, the paper instrument and the corresponding electronic item often include the same information, but due to variability caused by one or more of the foregoing factors, the paper instrument is incorrectly identified as a mismatch causing the electronic item to be incorrectly processed. This introduces an unnecessary, and often significant, latency into the check clearing process. Conventional procedures for matching an electronic item with a corresponding paper instrument fail to rationalize the contents of the MICR line as scanned by each FI. These procedures also fail to provide an accurate method of comparing and determining match criteria of a negotiable instrument's MICR line as read and captured by one FI's equipment and subsequently read and captured by another FI's equipment.

To address these deficiencies, the invention described in U.S. Pat. No. 5,687,579 ("'579 Patent"), for the "Rule-Based Circuit, Method and System for Preforming Item Level Reconciliation," which is incorporated herein by reference for all purposes, introduced systems and methods for reducing the amount of labor intensive, manual processes needed to perform reconciliation of electronically generated financial transactions. The '579 Patent provided a reconciling circuit, and method of operation, in electronic processing of negotiable instrument's, for reconciling first and second databases, wherein the first database contained first item data arranged in records and fields, and the second database contained second item data arranged in records and fields. The records of the first database are compared with the records of the second database, and a designation is placed on mismatching ones of the records of the first and second databases. At least one field mismatch tolerance rule is also provided that indicates, by field, an allowed extent of mismatch. The field mismatch tolerance rule is applied to the fields of the mismatching ones of the records of the first and second databases and the designation is removed when the fields of the mismatching ones of the records of the first and second databases fall within the field mismatch tolerance rule.

The systems and methods of the '579 Patent measure the criticality of certain fields within a check's MICR line, as well as the MICR line fields themselves, for determining the quality of the captured data from a negotiable instrument's MICR line, for assigning variable confidence level factors to the results of the physical, or paper, negotiable instrument and electronic item comparison, and for determining the overall accuracy of the physical to electronic match.

Comparison of records or items of multiple databases can substantially occupy, and even monopolize, the resources of the processing environments supporting ECP of one or more FIs. To take a step back, databases are generally associated with a database manager ("DBM"), which is a program, that performs a range of tasks on the databases (the range varying based on the intended use of the database and the sophistication of the DBM). A fundamental problem with DBMs is their cost, which is often quantified in terms of processing overhead. For example, programs not only must share processing environment resources with the DBM, but they must also interact with the DBM to access the database, often waiting in line for other programs to complete their transaction.

Conventional DBMs tend to have very complicated schemes and restrictive structures that constrain the expressiveness of state-of-the-art application and system tools. Traditionally, ECP databases have been stored in non-volatile (e.g., disk) memory, while DBMs and software applications have resided, at least in pertinent part, in volatile (e.g., main) memory. Due largely to the sheer number of negotiable instruments presented today, ECP applications require high performance access to data with response time requirements on the order of tens of milliseconds, or less. Traditional non-volatile (disk) memory databases are largely incapable of meeting such high performance needs, often due to the latency of accessing data that is non-volatile memory-resident.

Therefore, what is needed in the art is a transparent and non-intrusive manner of enabling ECP applications to access select data of a database, within the aforementioned time requirements, and allowing the efficient and timely processing of large numbers of negotiable instruments.

SUMMARY OF THE INVENTION

To address the above-discussed deficiencies of the prior art, it is a primary object of the present invention to enable, in a substantially transparent and non-intrusive manner, ECP applications to process select data of a database, within the aforementioned time requirements, and to efficiently and timely process large numbers (high volume) of negotiable instruments.

In the attainment of the above primary object, the present invention provides a subsystem and method, employed within an electronic check presentment ("ECP") system and executable on a computer system having volatile and non-volatile memory and a processor coupled thereto. The subsystem and method establish and maintain a datastore for processing items within the ECP system. The subsystem includes: (1) a data space anchor module, executable in the processor, that causes the processor to allocate at least a portion of the volatile memory to contain at least a partial copy of the datastore and (2) a data space access module, associated with the data space anchor module and executable in the processor, that (a) causes the processor to use at least a portion of the nonvolatile memory to contain the datastore, the datastore including a log to track transactions performed on the at least partial copy, and (b) serves as a central point for applying transactions received from ECP application programs to the at least partial copy and modifying items in the datastore as a function of the transactions. In a related embodiment, such modification of items in the datastore may suitably include logging the transactions in the log.

A "datastore," as the term is used herein, may mean any database, data bank, data repository or like collection of data files (defined broadly to include any combination of data or records) arranged, for example, for ease and speed of search and retrieval. According to an advantageous embodiment, the term datastore includes both a control file and the log, the control file including a "checkpointed" version of the at least partial copy of the datastore in volatile memory. The term "checkpoint," and derivatives thereof, are well-known terms of art used to describe, in the context of main memory databases, the process of copying or "backing-up" at least a portion of a datastore stored in volatile (main) memory. For purposes of this patent document, the term "or," as used herein, is inclusive, meaning and/or; and the term "include," and derivatives thereof, as used herein, mean inclusion without limitation.

It should be noted that a "module," as referred to herein, is most advantageously software-based, although in alternate embodiments, any module may be suitably implemented, at least in part, in firmware or hardware, or some appropriate combination of two or more of the three. In the context of software, the term "module" may be construed broadly to include not only conventional meanings such as program, sub-program, procedure, sub-procedure, object, task, routine, subroutine, function, sub-function, algorithm, instruction set and the like, but also sequences of instructions.

It is apparent from the above that the present invention introduces an efficient way to process items (such as deposits and checks) in an ECP system. The present invention creates at least a partial copy of the datastore in volatile (typically fast) memory. This allows the at least partial copy of the datastore to be searched and updated quickly, without having to resort to communicating with a mass storage unit (such as a hard disk drive) and incurring the delays inherent therein.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings wherein like numbers represent like objects, and in which.

DETAILED DESCRIPTION

Figure 1:
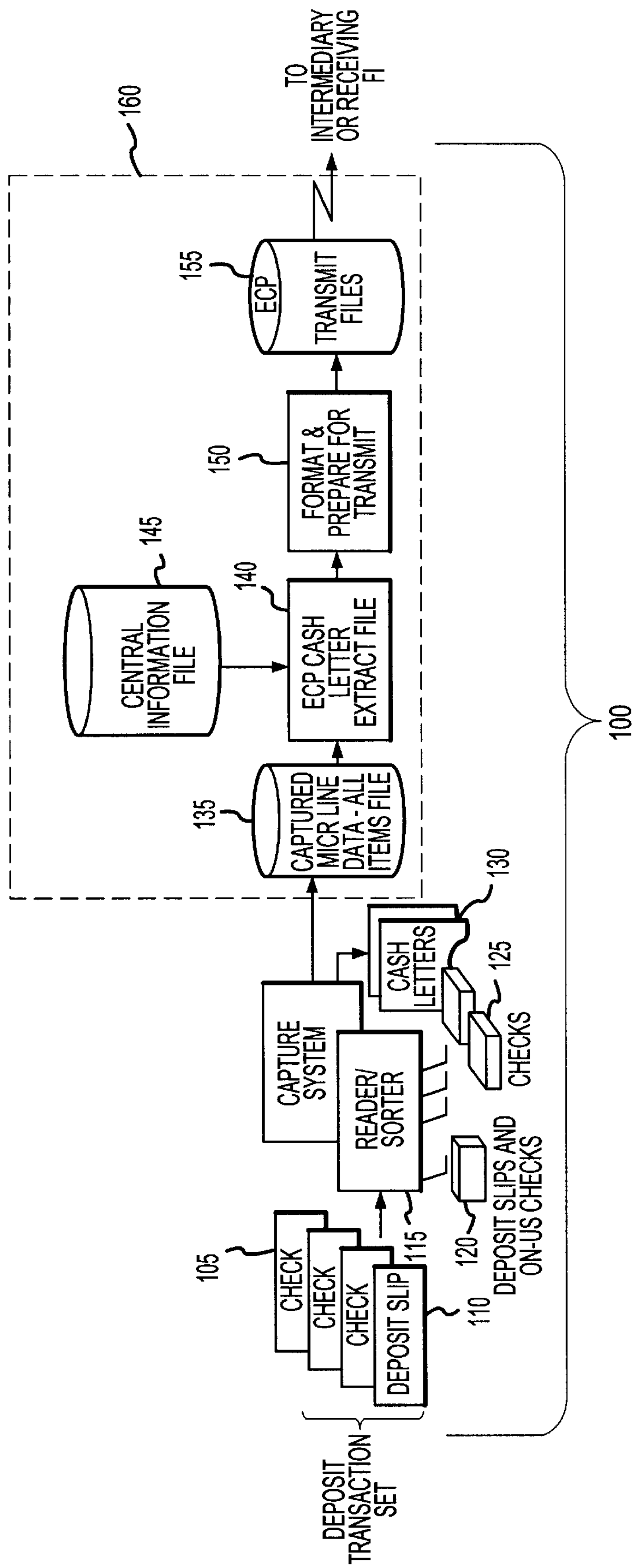
FIG. 1 illustrates a schematic block representation of exemplary MICR capturing and processing processes, illustratively performed at a sending financial institution, in which captured negotiable instruments, such as paper checks, deposit slips, etc., are captured and processed.

Turning initially to FIG. 1, illustrated is a schematic block representation of exemplary MICR capturing and processing processes (generally designated 100), that may be suitably and illustratively performed at a sending FI, in which captured negotiable instruments (e.g., paper checks, deposit slips, etc.) are captured and processed. Exemplary subsystems that may be suitably associated therewith include one or more INTERNATIONAL BUSINESS MACHINES® ("IBM®") 3890 readers/sorters and IBM® Check Processing Control System, UNISYS® DP 1800 readers/sorters and UNISYS® Item Processing System, or the like. The phrase "associated with," and derivatives thereof, as used herein, may mean to include within, interconnect with, contain, be contained within, connect to or with, couple to or with, be communicable with, juxtapose, cooperate with, interleave, be a property of, be bound to or with, have, have a property of, or the like.

Exemplary processes 100 create both paper and electronic cash letters (introduced hereinabove). The electronic cash letters are grouped into ECP files that are transmitted through data transmission means to either an intermediary, such as a Federal Reserve Bank, an Electronic Clearing House, a data center, etc., or to the receiving or paying FI. The actual paper cash letters are physically transported, typically through each of the intermediaries, if any, which the ECP file passed, to the receiving FI.

More particularly, during the course of daily operations of an FI (e.g., a commercial bank), deposited negotiable instruments 105 are received from a variety of sources and transactions (e.g., over-the-counter, drive-in depositories, automated teller machines, regular mail, lock-boxes, etc.). Deposited negotiable instruments 105 are accompanied by a deposit slip 110 that reflects information associated with the depositor (e.g., depositor's FI account number, sum of amounts of accompanying negotiable instruments, etc.). Typically, many of deposited negotiable instruments 105 are drawn on other FIs, but may also include checks drawn on the depositor's FI. The latter items are commonly referred to as "on-us" deposited checks.

In conventional data capture systems, negotiable instruments, as well as deposit slips, may be suitably preconditioned for processing and read through scanner/reader/sorter machines 115 (e.g., optical, mechanical, electrical or other like data capturing systems or machines, etc.), with groups of other negotiable instruments and deposit slips, all preferably being processed in transaction sets. During the data capture process, the deposit portion of a given transaction set is read, validated and select information associated with the MICR line is extracted and stored, most preferably in a fast access datastore, such as a database.

The physical documents (e.g., negotiable instruments, deposit slips, etc.) may be suitably microfilmed, have a unique item sequence number ("ISN") assigned, be directed to a designated pocket of the reader/sorter as either "on us" (e.g., items drawn on the FI performing the capture and sorting operations) or "transit" (e.g., items drawn on all other FIs). Transit negotiable instruments 125 are most preferably directed (segregated) to multiple pockets corresponding to specific FIs upon which the negotiable instruments are drawn (i.e., the paying FI), to correspondents of the paying FI or to specific Federal Reserve districts or cities according to predefined tables commonly referred to as "sort patterns." According to the illustrated embodiment, segregated negotiable instruments are wrapped with a process system generated detail list and cash letter covering report 130 for each group of negotiable instruments, each group being dispatched to the other FIs for further processing.

The MICR line information that has been extracted from the negotiable instrument is used to prepare electronic files for early data transmission to the other FIs, in advance of the physical groups of negotiable instruments set forth hereinabove, that are to be dispatched at a later time. Thus, during the high speed capture process, the datastore may suitably be created on a host process system that contains the data extracted from each item's MICR line. This datastore may suitably be referred to as an "all items file" 135. All items file 135 may advantageously contain ones of the following data for each item processed, namely:

1. from a deposit slip:
   a. depositor's account number;
   b. deposit amount;
   c. deposit process control;
   d. deposit auxiliary on-us;
   e. deposit item sequence number; and
   f. deposit out-of-balance indicator; and
2. from a check:
   a. account number;
   b. check amount;
   c. check process control;
   d. check auxiliary on-us or check number;
   e. check item sequence number;
   f. check R/T;
   g. external process control code; and
   h. eligibility/disposition code.

The illustrated embodiment may suitably employ all items file 135 as a datastore from which eligible detail items, corresponding to a physical negotiable instrument, are extracted in an extraction process 140 to provide an early determination of whether an item is drawn on an FI that is capable of receiving an ECP file. This determination may be made as a result of a comparison of the negotiable instrument's R/T to a file of eligible R/Ts contained on a central information file 145.

Exemplary extraction process 140 generates an extract file 150 of items eligible for ECP processing that is formatted and prepared for transmission to generate a transmission file 155. Transmission file 155 contains data from only those negotiable instruments eligible for further processing that have preferably been formatted into a suitable standard format. Transmission file 155 is transmitted via electronic means to an applicable receiving or intermediary FI.

Figure 2:
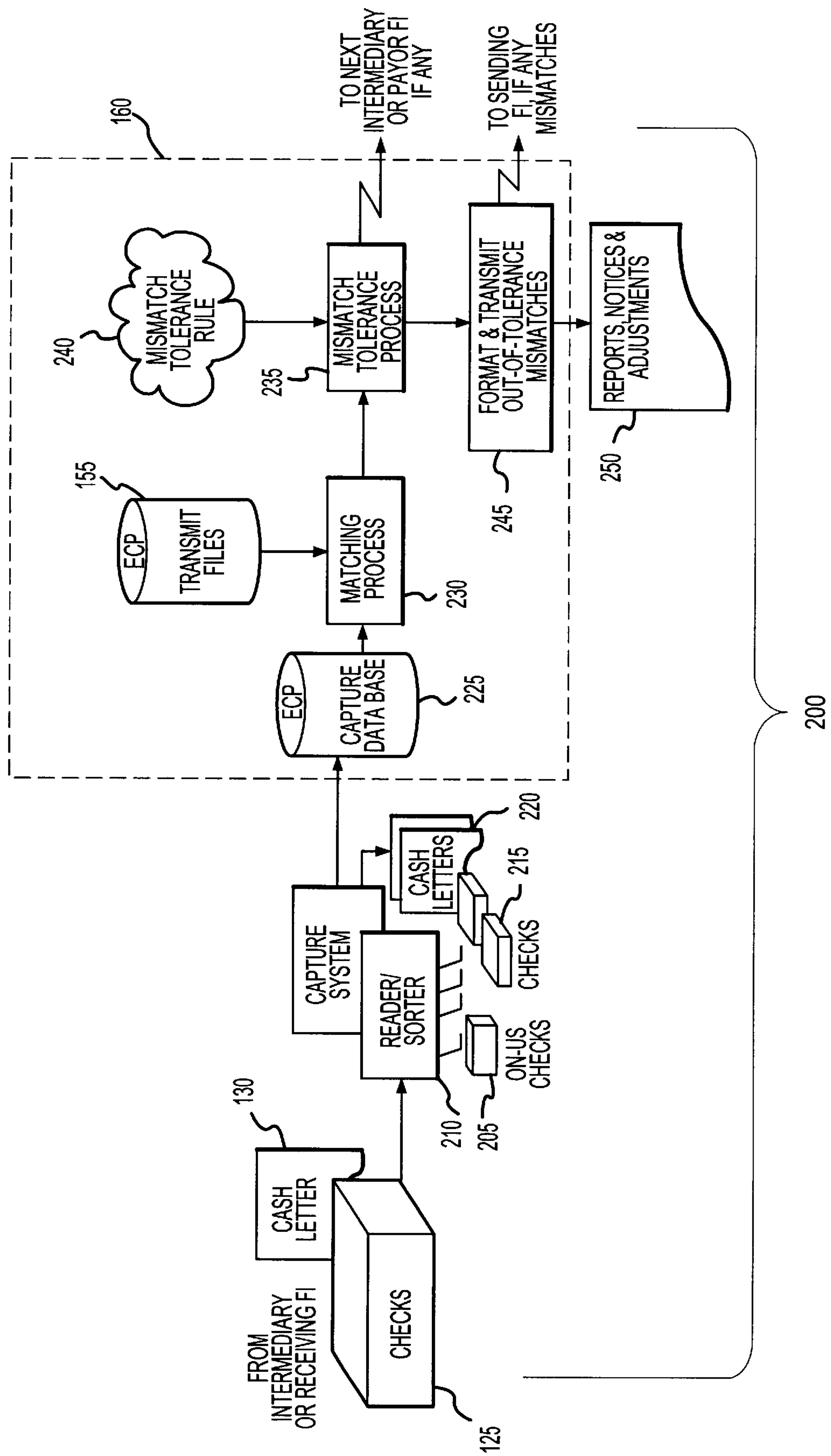
FIG. 2 illustrates a schematic block representation of exemplary MICR cash letter capturing and processing processes, illustratively performed at a receiving financial institution where captured cash letter data related to a previously transmitted electronic check presentment file is used to determine mismatches.

Turning now to FIG. 2, illustrated is a schematic block representation of exemplary MICR cash letter capturing and processing processes (generally designated 200), that may be suitably and illustratively performed at a receiving FI where captured cash letter data related to previously transmitted ECP file 155 is compared to determine mismatches. Any resulting mismatches may be suitably compared with one or more mismatch tolerance rules to determine whether the mismatches are within tolerance. An advantageous embodiment of the same is described in the '579 Patent, which has previously been incorporated herein by reference.

According to an advantageous embodiment of the present invention, the illustrated mismatch detection process is performed, at least in part, in main (volatile) memory to enable, in a substantially transparent and non-intrusive manner, the present ECP application to process select data of database 155, within certain time requirements, and to efficiently and timely process large numbers (high volume) of negotiable instruments.

The present invention provides a subsystem and method, which may be employed within the ECP application, that are executable on a computer system having volatile and non-volatile memory and a processor coupled thereto. The phrase "computer system," as used herein, is construed broadly to include any suitably arranged processing environment whether the same is hardware-, firmware- or software-based, or some suitable combination of two or more of the same. Thus, "computer system" may refer not only to a single computer, but also a plurality of computers that are suitably associated, such as a computer network.

Figure 3:
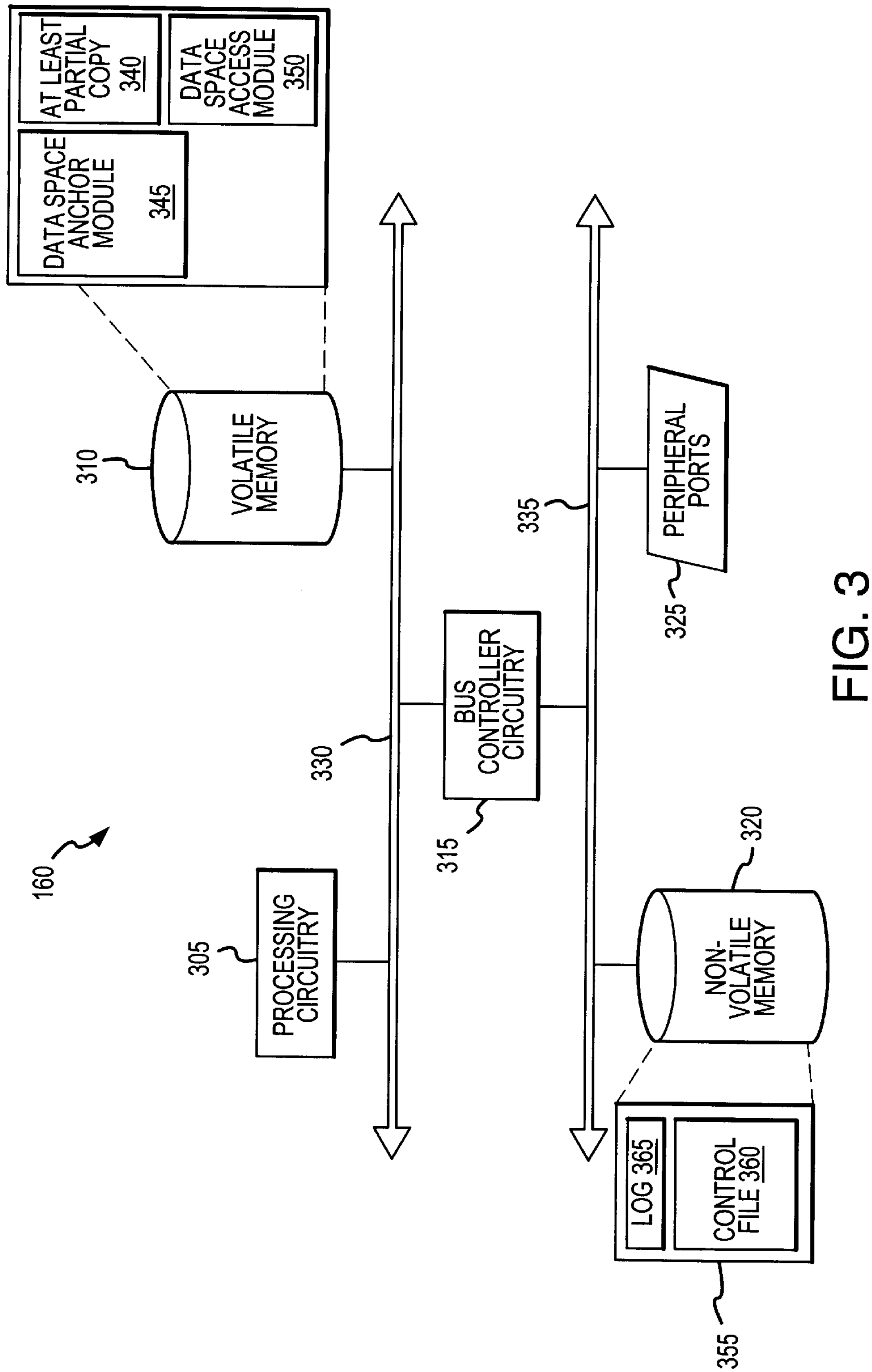
FIG. 3 illustrates a high-level schematic block representation of an exemplary computer system that may be used to implement the principles of the present invention to provide a subsystem to establish and maintain at least a partial copy of a datastore in a volatile memory for processing items within an electronic check presentment system, such as that illustrated in FIGS. 1 and 2.
Figure 4:
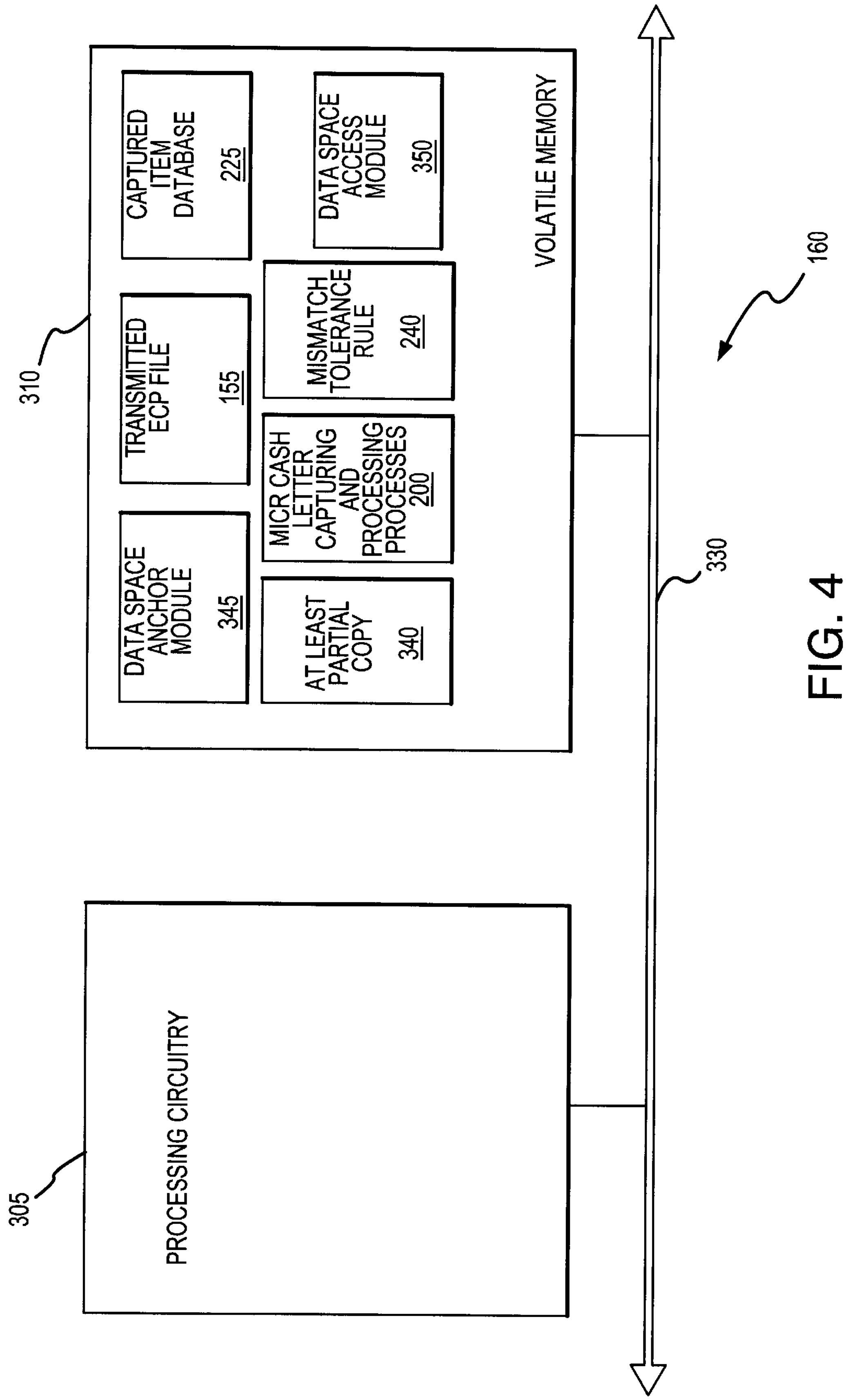
FIG. 4 illustrates a schematic block representation of an exemplary memory configuration according to an advantageous embodiment of the present invention.

The subsystem and method establish and maintain at least one datastore, such as database 155, for processing items within the ECP process. The subsystem, which is described in greater detail with reference to FIGS. 3 and 4, is assumed to include each of data space anchor and data space access modules.

The data space anchor module, which is executable in the processor, causes the processor to allocate at least a portion of the volatile memory to contain at least a partial copy of the datastore that is stored in non-volatile memory. The data space access module, which is associated with the data space anchor module and also executable in the processor, causes the processor to use at least a portion of the nonvolatile memory to contain the datastore. According to the exemplary embodiment, the datastore includes both a control file and a log to track transactions performed on the at least partial copy in volatile memory. The data space access module also serves as a central point for applying transactions received from ECP application programs to the at least partial copy and modifying items in the datastore as a function of the transactions. In a related embodiment, such modification of items in the datastore may suitably include logging the transactions in the log.

The use of the "main memory" data store introduces an efficient way to process items (such as deposits and checks) in an ECP system. This embodiment creates at least a partial copy of the datastore in volatile (typically fast) memory to thereby allow the at least partial copy of the datastore to be searched and updated quickly, without having to resort to communicating with non-volatile memory and incurring the delays inherent therein.

The data space anchor module is therefore responsible for establishing the copy of the datastore and ensuring the existence of an environment such that the datastore can be shared by multiple tasks, possibly executing in the same processor or group of processors. According to the illustrated embodiment, the data space anchor module may establish an "empty" data space for a "cold" start of the copy of the data store, or may recreate the copy of the data store to a "last" valid state (the state of the copy when the data store was in at the last valid checkpoint), this is known as a "warm" start. The warm start may use the control file and the log to rebuild the copy of the data store. Once the copy of the data store is established, either by a cold or a warm start, the data space anchor module is not recalled.

The data space access module performs functions, most of which are with respect to the copy of the data store, in response to one or more application programs. The data space access module is solely responsible for checkpointing, as well as the logging process (logging committed transactions, such as when at least a portion of a particular application task completes).

To return to the illustrated mismatch detection process, after the ECP process has completed processing at the receiving FI and suitably passed to a "next" FI, if any, the receiving FI receives a physical cash letter (i.e., the segregated checks 125 wrapped within the processing system generated detail list and cash letter 130). The set of checks 125 associated with cash letter 130, are preconditioned for processing, if necessary, and are read through a scanner/reader/sorter machines 210 (e.g., optical, mechanical, electrical or other like data capturing systems or machines, etc.). During the data capture process 210, the negotiable instruments are again read and validated, and information contained on the MICR line is extracted and stored into a captured item database 225. The physical documents may be suitably microfilmed, a unique item sequence number ("ISN") be assigned or the documents be directed to a designated pocket of the reader/sorter as either "on us" for those negotiable instruments drawn on the receiving FI or as "transit" for those negotiable instruments drawn on all other FIs. If processing is performed by the receiving FI, all negotiable instruments may be suitably considered as "on-us."

Transit items may again be directed to multiple pockets corresponding to the specific FI on which a particular negotiable instrument was drawn (i.e., the paying FI), to a correspondent of the paying FI or to specific Federal Reserve districts or cities according to sort patterns. The segregated negotiable instruments 215 are wrapped with a processing system generated detail list and cash letter covering report 220 for each group of negotiable instruments. The groups (i.e., cash letters) are dispatched to the other FIs for further processing.

Captured item database 225 preferably includes one or more of the following fields for each negotiable instrument processed, namely:

a. account number;

b. check amount;

c. check process control;

d. check auxiliary on-us or check number;

e. check item sequence number;

f. check R/T; and g. external process control.

The receiving FI performs a matching process 230, whereby an electronic comparison is suitably made between ones of the records associated with extract file database 155 and ones of the records associated with captured item database 225. Extract file database 155 items that do not match corresponding items of captured item database 225 are suitably identified as "mismatched" by placing a designation on mismatching ones of the records, or in alternate embodiments on mismatching ones of the fields, of at least one of databases 155 and 225.

The receiving FI electronically performs a mismatch tolerance process 235, whereby a set (one or more) of field mismatch tolerance rules 240 is applied to select fields of the mismatching ones of the records of at least one of extract file database 155 and captured item database 225. The set of field mismatch tolerance rules 240 indicates, by file, record, field, or the like, various types of an allowed extent of mismatch of the mismatching ones of the records of databases 155 and 225. In an exemplary embodiment, the set of field mismatch tolerance rules may suitably include at least one of a rule concerning: (1) an allowed number of character deviations within the mismatching fields, (2) an allowed substitution of characters in the mismatching fields, (3) a pattern of adjoining records of extract file database 155 and captured item database 225. The specifics of various advantageous embodiments of illustrated mismatching tolerance process 235 are described in detail in the '579 Patent and further discussion of the same is unnecessary.

Upon completion of mismatch tolerance process 235, extract file database 155 or captured item database 225 may be suitably traversed to create a report of any mismatched items 245. The mismatched items are used to generate a report or other files 245 adapted to interface to other systems, such as of the sending FI, for example to generate an adjustment notification in the event of a large dollar mismatch. This report 250 may simply take the form of the mismatched items in a properly formatted file or another appropriate form, such as an interactive database or real-time alert. The report may be printed on paper or may be embodied in machine-readable form 250. It should be understood that while the illustrated embodiment was presented with respect to a sending FI and at least one intermediary or receiving FI, the above-described matching process may be associated with any one or more FIs.

In a preferred embodiment of the present invention, ones of the above-described transactions relate to a reconciliation of ones of the items. Therefore, the present invention may advantageously be used in an item-level reconciliation process, wherein individual items are matched to one another. Item-level reconciliation is a coming technology in banking, allowing a more finer resolution of discrepancies between electronic and paper forms of the same item.

Turning now to FIG. 3, illustrated is a high-level schematic block representation of an exemplary computer system (generally designated 160) that may be used to implement the principles of the present invention to provide a subsystem, employed within an ECP system such as that set forth in FIGS. 1 and 2, to establish and maintain a datastore in a volatile memory associated with computer system 160 for processing items within the ECP system.

Since the present invention is not limited to application in any particular processing environment, FIG. 3 is illustrative only. Exemplary computer system 160 illustratively includes processing circuitry 305 (e.g., at least one conventional processor), conventional volatile memory (e.g., random access memory) 310, bus controller circuitry 315, conventional nonvolatile memory (e.g., a hard disk drive) 320 and a set of peripheral ports 325. Computer system 160 further includes a host bus 330 and an input/output ("I/O") bus 335. Exemplary host bus 330 is suitably operative to associate processing circuitry 305, volatile memory 310 and bus controller circuitry 315, while exemplary I/O bus 335 is suitably operative to associate bus controller circuitry 315, non-volatile memory 320 and peripheral port set 325. Exemplary peripheral port set 325 may suitably couple I/O bus 335 to any one or more of a plurality of conventional peripheral devices (e.g., printer) or other computer systems for communication therewith. One or more serial or parallel ports may be suitably associated with peripheral port set 325. It should be noted that while the present embodiment shows a dual bus configuration, this is illustrative only—computer system 160 may be associated with any suitable single bus configuration or, alternatively, any suitable greater than two bus configuration.

Exemplary volatile memory 310 illustratively includes at least a partial copy 340 of a datastore (stored in non-volatile memory 320), an exemplary data space anchor module 345 and an exemplary data space access module 350. Storage of datastore 340 in volatile memory 310 enables the direct revision thereof by processes (e.g., ECP processes of FIGS. 1 and 2) executing in processing circuitry 305. Exemplary non-volatile memory 320 illustratively includes an exemplary datastore 355 that includes an exemplary control file 360 and a transaction log 365. Although exemplary datastore 355 is illustratively stored on non-volatile memory 320, in alternate embodiments, datastore 355, at least in part, may be suitably stored in volatile memory—the important aspect of such an embodiment is that datastore 355 be stored in a location that is separate from partial copy 340 of datastore 355 itself, such that if partial copy 340 becomes corrupt or is lost, datastore 355 will remain true (e.g., accurate, correct, etc.).

Exemplary bus controller circuitry 315 provides a suitable means by which host bus 330 and I/O bus 335 may be associated, thereby providing a path and management for communication therebetween. Each of the illustrated buses 330 and 335 requires a drive current to carry signals thereon. The illustrative circuitry accordingly operates in conjunction with a conventional system controller (not shown) that supplies the required drive current. Additionally, exemplary modules 345, 350, as well as any other ECP or related processes or application programs that may be suitably stored in memories 310, 320, are most preferably executable by processing circuitry 305 in association with a suitable operating system (not shown). In a preferred embodiment, the operating system is an IBM MVS® operating system, which is known. An exemplary source code embodiment implementing the principles of the present invention is attached hereto as APPENDIX A and an exemplary "copybook" that maps a control area for use by the source code embodiment is attached hereto as APPENDIX B; the contents of both appendices are incorporated herein by reference for all purposes.

Initially, exemplary data space anchor module 345 is stored, at least in pertinent part, in volatile memory 310, preferably in conventional object code format. Processing circuitry 305 is operative to selectively retrieve and execute data space anchor module 345 which causes processing circuitry 305 to allocate at least a portion of volatile memory 310 to contain at least partial copy 340 of datastore 355 (and, according to the illustrated embodiment, a complete copy of datastore 355). According to one embodiment, datastore 355 exists in perpetuity, and an instance of at least partial copy 340 is derived therefrom.

During normal ECP processing, at least partial copy 340 is revised (e.g., modified, changed, altered, etc.) through the processing of many transactions. These transactions must be recorded to datastore 355 to ensure, among other things, the data integrity of copy 340 (datastore 355 is used to create, as well as recreate (restore) copy 340 in volatile memory 310). According to the illustrated embodiment, processing circuitry 305 uses control file 360 and log 365 to track such transactions performed on copy 340.

Exemplary data space access module 350 is also illustratively stored, at least in pertinent part, in volatile memory 310 in conventional object code format. Processing circuitry 305 is likewise operative to selectively retrieve and execute data space access module 350, which serves as a central point for processing the transactions from ECP processes and sub-processes (collectively, application programs). Upon execution, data space access module 350 causes processor 305 to use at least a portion of nonvolatile memory 320 to contain datastore 355, that includes log 365 to track transactions performed on copy 340. Data space access module 355 also serves as a central point for applying transactions received from ECP application programs to copy 340 and modifying items in datastore 355 as a function of the transactions. In a related embodiment, such modification of items in datastore 355 may suitably include logging the transactions in the log.

During modification, data space access module 350 locks portions of copy 340 as a function of targets of the transactions. Most advantageously, items are locked to allow a single application program to process the item, exclusive of other application programs. According to the exemplary embodiment, such locking may be suitably taken advantage of in an environment in which more than one application program is interacting with data space access module 350.

In an advantageous embodiment, the above-described process of checkpointing may be suitably performed in response to a predetermined condition, such as an expiration of a predetermined period of time (for instance, daily or hourly). Alternatively, the checkpointing process may be performed upon the occurrence of a predetermined number of transactions (for instance, every 10,000 transactions) or may be updated aperiodically (such as before termination of data space anchor module 345).

In the event of a "crash" of copy 340, data space anchor module 345 is executable to reconstruct copy 340 from control file 360 and log 365. Those skilled in the art are familiar with reconstruction of corrupted or lost data spaces from control files and logs. As set forth hereinabove, the present invention may advantageously apply otherwise conventional reconstruction processes to the novel data space. Thus, if a "critical" error occurs, such as during an application, then at least partial copy 340 may be suitably rebuilt via the warm start described hereinabove and the applications that were active at the time of the error may be restarted—in other words, any updates to copy 340 that have not been committed may be lost.

According to a most preferred embodiment, copy 340 includes a statistics area that contains data pertaining to parameters thereof. The statistics area allows at least one of data space anchor module 345 and data space access module 350 to understand characteristics of copy 340 and the data space, such as size, configuration, density, utilization, etc., to thereby allow exemplary modules 345, 350 to work with copy 340 and the data space.

It is apparent from the forgoing, that the present invention introduces an efficient way to process items (such as deposits and checks) in an ECP system. The present invention creates at least a partial copy of datastore 355 from control file 360 and log 365 in volatile memory 310, which allows copy 340 to be searched and updated quickly, without having to resort to communicating with a mass storage unit (such as nonvolatile memory 320) and incurring the delays inherent therein.

Turning now to FIG. 4, illustrated is a schematic block representation of an exemplary memory configuration (again, generally designated 160) according to an advantageous embodiment of the present invention. Exemplary volatile memory 310 again illustratively includes at least partial copy 340, data space anchor module 345 and data space access module 350, as well as MICR cash letter capturing and processing processes 200, transmitted ECP file 155, captured item database 225 and a set (at least one) of mismatch tolerance rules 240.

Recall that data space access module 355 serves as a central point for conveying the transactions from ECP application programs, such as MICR cash letter capturing and processing processes 200, to database access module 350. Upon execution, data space access module 350 is operative to modify items in copy 340 of datastore 355, to log the transactions in log 365 and to update datastore 355 (particularly control file 360). Thus, the transactions relate to a reconciliation of ones of the items—may therefore advantageously be used in an item-level reconciliation process (FIG. 2), wherein individual items are matched to one another to allow a much finer resolution of discrepancies between electronic and paper forms of the same item. According to an advantageous embodiment, copy 340, and hence the items stored therein, is sequentially accessible, as data space anchor module 350 creates a linked list of items within the data space. In alternate embodiments, items within copy 340 may also be randomly accessed using techniques common to the industry. Exemplary copy 340 may also not be structured as a database, with pointers that allow items to be randomly accessed. Rather, copy 340 may contain a linked list, wherein insertions are made by vectoring to a location at the end of the list, adding new items and vectoring back to the insertion point. Linked lists may be exceedingly fast when only a few additions are required to be made to a large body of items, a condition which occurs most often in item-level reconciliation.

According to the exemplary embodiment, MICR cash letter capturing and processing processes 200 are selectively retrievable by and executable in processing circuitry 305 to perform item-level reconciliation with respect to the items in datastore 340. Although the present invention is particularly adept at performing item-level reconciliation, those skilled in the art will perceive other uses for the present invention in the environment of ECP.

Those skilled in the art will understand that alternate embodiments of the present invention may be suitably replaced by or combined with multi, parallel and distributed processing environments or configurations, as well as alternate hardware- and firmware-based embodiments that include, for example, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like—to form the various types of modules, circuitry, controllers and systems described and claimed herein.

Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993); conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992); and conventional banking and ECP principles are more fully discussed in *Principles of Banking*, by Paul A. Carrubba, American Banker's Association (5th ed. 1994) and *Essentials of Cash Management*, by D. J. Masson and D. A. Wikoff, Treasury Management Association (1995). Each of the foregoing publications is incorporated herein by reference for all purposes.

From the above, it is apparent that the present invention provides a subsystem and method, employed within an ECP system and executable on a computer system having volatile and nonvolatile memory and a processor coupled thereto. The subsystem and method establish and maintain a datastore for processing items within the ECP system. The subsystem includes: (1) a data space anchor module, executable in the processor, that causes the processor to allocate at least a portion of the volatile memory to contain at least a partial copy of the datastore and (2) a data space access module, associated with the data space anchor module and executable in the processor, that (a) causes the processor to use at least a portion of the nonvolatile memory that contains the datastore, the datastore including a log to track transactions performed on the at least partial copy, and (b) serves as a central point for applying transactions received from ECP application programs to the at least partial copy and modifying items in the datastore as a function of the transactions. In a related embodiment, such modification of items in the datastore may suitably include logging the transactions in the log.

Although the present invention and its advantages have been described in detail, those skilled in the art should understand that they can make various changes, substitutions and alterations herein without departing from the spirit and scope of the invention in its broadest form.

ATTY. DOCKET NO.: CRKR-0009 PATENT

APPENDIX A

ATTY. DOCKET NO.: CRKR-0009 PATENT

```
DSAM7700 START
DSAM7700 AMODE 31
DSAM7700 RMODE ANY
************* START OF SPECIFICATIONS ****************************
*                                                                *
*                                                                *
* MODULE NAME - DSAM7700  WAREHOUSE ANCHOR PROGRAM               *
*                                                                *
*                                                                *
*                                                                *
*                                                                *
*                                                                *
*                                                                *
*                                                                *
*        THIS PROGRAM CONTAINS PROPRIETARY AND TRADE SECRET      *
*        INFORMATION BELONGING TO J.D. CARREKER AND ASSOCIATES   *
*        INCORPORATED (JDCA).  THE PROGRAM IS FURNISHED ONLY FOR *
*        USE BY LICENSEES OF JDCA SOFTWARE PRODUCTS AND THEIR    *
*        DESIGNATED AGENTS OR EMPLOYEES RESPONSIBLE FOR INSTALLATION *
*        OR OPERATION OF THE PRODUCTS.  ANY OTHER USE, DUPLICATION, *
*        OR DISSEMINATION WITHOUT THE WRITTEN CONSENT OF JDCA IS *
*        NOT AUTHORIZED.                                         *
*                                                                *
*                                                                *
* FUNCTION -                                                     *
*                                                                *
*       THIS MODULES FUNCTION IS TO BUILD AND MAINTAIN A PUBLIC DATA *
*       SPACE FOR USE AS A WAREHOUSE BY THE DSAM7710 PROGRAM.    *
*                                                                *
*                                                                *
*       REGISTER USAGE -                                         *
*                                                                *
*             R0  - LINKAGE, WORK                                *
*             R1  - LINKAGE, WORK                                *
*             R2  - WORK                                         *
*             R3  - WORK                                         *
*             R4  - WORK                                         *
*             R5  - WORK                                         *
*             R6  - DATA SPACE BASE REGISTER                     *
*             R7  - WORK                                         *
*             R8  - WORK                                         *
*             R9  - SUBROUTINE LINKAGE, WORK                     *
*             R10 - CODE BASE REGISTER                           *
*             R11 - WORK IN ANCHOR ROUTINE                       *
*             R12 - WORK AREA BASE REGISTER                      *
*             R13 - SAVE AREA ADDRESS                            *
*             R14 - LINKAGE, WORK                                *
*             R15 - LINKAGE, WORK                                *
*                                                                *
*                                                                *
* MODULE TYPE - CSECT                                            *
*                                                                *
*       PROCESSOR - ASSEMBLER H                                  *
*                                                                *
*       AUTHORIZED, NON-SWAPPABLE                                *
*                                                                *
*                                                                *
* EXTERNAL REFERENCES -                                          *
*                                                                *
*       NONE                                                     *
*                                                                *
*                                                                *
*                                                                *
*                                                                *
* MAINTENANCE LOG:                                               *
*                                                                *
```

DSAM7700 1-10-97 10:19a

```
*  PTF #  DATE   DESCRIPTION                                     *
*  ------ ------ ------------------------------------------      *
*                                                                *
*                                                                *
*                                                                *
*                                                                *
*                                                                *
*                                                                *
*                                                                *
*                                                                *
*                                                                *
*                                                                *
*                                                                *
******************************************************************

         LR    R10,R15                 GET ENTRY ADDRESS
         USING DSAM7700,R10            ESTABLISH ADDRESSABILITY
         USING SAVEAREA,R12            ESTABLISH ADDRESSABILITY
         USING WHSDSCT,R6              ESTABLISH ADDRESSABILITY
         L     R2,ASAVAREA             GET SAVEAREA ADDRESS
         ST    R2,8(R13)               STORE MY SAVE AREA ADDRESS
         ST    R13,4(R2)               STORE CALLERS SAVE AREA ADDRESS
         LR    R13,R2                  POINT TO MY SAVE AREA
         LR    R12,R13                 SET UP WORK AREA BASE REGISTER
         XC    RETCODE,RETCODE         SET RETCODE TO ZERO
         JDCSUBM INIT                  GO PERFORM INITIALIZATION
         B     RETURN                  ERROR...QUIT NOW
         JDCSUBM WAIT                  GO WAIT FOR COMMAND INPUT
RETURN   DS    0H
         JDCSUBM CLOS                  GO CLOSE DOWN
         L     R15,RETCODE             GET RETURN CODE
         L     R13,4(R13)              RESTORE CALLERS SAVEAREA ADDR
         RETURN (14,12),,RC=(15)       RETURN TO CALLER
         EJECT
         PUSH  USING
ESTAEXIT DS    0H
         LR    R10,R15                 GET ENTRY ADDRESS IN BASE REG
         USING ESTAEXIT,R10            ESTABLISH ADDRESSABILITY
         L     R12,ASAVAREA            GET WORK AREA BASE REG
         LA    R13,ESTAREGS            POINT TO ESTAE REG SAVE AREA
         ST    R14,ESTAERET            SAVE ESTAE EXIT RETURN ADDRESS
         ICM   R9,15,ANKEP             GET ANCHOR PGM EP
         BZ    ESTAEDON                ZERO...QUIT
         XC    0(L'ANKEYE,R9),0(R9)    ELSE CLEAR THE EYE CATCHER
         USING SDWA,R1                 ESTABLISH SDWA ADDRESSABILITY
         ICM   R2,7,SDWACMPC           GET THE ABEND CODE
         SRL   R2,12                   SHIFT OUT THE USER COMP CODE
         CLM   R2,1,=X'22'             IS THIS A CANCEL ABEND CODE ?
         BNE   ESTAEDON                NO...SO SKIP WTO
         JDCSETPM ,                    SET TO PRIMARY MODE
         WTO   'DSAM7700-011: CANCEL REQUEST ACCEPTED'
ESTAEDON DS    0H
         CLI   ENQFLAG,C'Y'            DID WE GET ENQUEUE
         BNE   ESTAEDEQ                NO...DON'T DEQUEUE
         DEQ   (MAJNAME,MINNAME,8,SYSTEMS) RELEASE THE RESOURCE
ESTAEDEQ DS    0H
         L     R14,ESTAERET            SET RETURN ADDRESS
         LA    R15,0                   SET UP TO PERCOLATE
         BR    R14                     AND EXIT
         SPACE 3
ASAVAREA DC    A(SAVEAREA)
         POP   USING
         EJECT
INIT     JDCRTNM
         L     R1,0(R1)                GET START PARM ADDRESS
         CLC   =H'0',0(R1)             GOT ANY START PARM ?
         BE    INIT0090                NO...SO SKIP IT
```

ATTY. DOCKET NO.: CRKR-0009 PATENT

```
         CLC   =H'4',0(R1)              PARM FOUR BYTES LONG ?            01330000
         BNE   INIT0080                 NO...SEND ERROR MESSAGE           01340000
         CLC   =C'CKPT',2(R1)           CHECKPOINT REQUEST ?              01350000
         BNE   INIT0030                 NO...GO CHECK IF COLD             01360000
         OI    SWITCH,CKPT              YES..SET SWITCH                   01370000
         B     INIT0090                 AND CONTINUE                      01380000
INIT0030 DS    0H                                                         01390000
         CLC   =C'COLD',2(R1)           COLD START REQUEST ?              01400000
         BNE   INIT0040                 NO...SEND ERROR MESSAGE           01410000
         OI    SWITCH,COLD              YES..SET SWITCH                   01420000
         B     INIT0090                 AND CONTINUE                      01430000
INIT0040 DS    0H                                                         01440000
         CLC   =C'LOGS',2(R1)           LOG SHORT REQUEST ?               01450000
         BNE   INIT0080                 NO...SEND ERROR MESSAGE           01460000
         OI    SWITCH,LOGS              YES..SET SWITCH                   01470000
         B     INIT0090                 AND CONTINUE                      01480000
INIT0080 DS    0H                                                         01490000
         WTO   'DSAM7700-004: INVALID START PARAMETER'                    01500000
         B     INITZ                    AND TAKE ERROR EXIT               01510000
INIT0090 DS    0H                                                         01520000
         LAE   R15,0                    SET R15 AND AR15 TO 0             01530000
         CPYA  AR0,AR15                 INIT ALL ACCESS REGISTERS         01540000
         CPYA  AR1,AR15                 *                                 01550000
         CPYA  AR2,AR15                 *                                 01560000
         CPYA  AR3,AR15                 *                                 01570000
         CPYA  AR4,AR15                 *                                 01580000
         CPYA  AR5,AR15                 *                                 01590000
         CPYA  AR6,AR15                 *                                 01600000
         CPYA  AR7,AR15                 *                                 01610000
         CPYA  AR8,AR15                 *                                 01620000
         CPYA  AR9,AR15                 *                                 01630000
         CPYA  AR10,AR15                *                                 01640000
         CPYA  AR11,AR15                *                                 01650000
         CPYA  AR12,AR15                *                                 01660000
         CPYA  AR13,AR15                *                                 01670000
         CPYA  AR14,AR15                *                                 01680000
         JDCALLOM FUNC=INFO,DDNAME=DSAM7750,WORK=MISCWORK,               X01690000
               RETMBR=RETMBRNM,ERROR=DUBL                                 01700000
         BZ    INIT0093                 NO ERROR...CONTINUE               01710000
         MVI   DUBL+4,X'0F'             SET SIGN BYTE X'0F'               01720000
         UNPK  MISCWORK(9),DUBL(5)      UNPACK RETURN CODE                01730000
         TR    MISCWORK(8),HEXTABLE     CONVERT IT TO DISPLAY HEX         01740000
         MVC   INITERCD,MISCWORK        MOVE IT TO MESSAGE                01750000
         SPACE 3                                                          01760000
INITWTO1 WTO 'DSAM7700-097: INVALID DSAM7750 DD/MBR;RC=12345678'          01770000
         ORG   INITWTO1+8                                                 01780000
INITMSG1 DS    0CL49                                                      01790000
         DS    CL41                                                       01800000
INITERCD DS    CL8                                                        01810000
         ORG   ,                                                          01820000
         SPACE 3                                                          01830000
         B     INITZ                    AND TAKE ERROR EXIT               01840000
INIT0093 DS    0H                                                         01850000
         LOAD  EPLOC=DSAM7750           GET NAMES OF EVERYTHING           01860000
         LR    R1,R0                    GET THE ADDRESS                   01870000
         MVC   DSPNAME(LEN7750),0(R1)   MOVE TO FIELDS IN THIS PGM        01880000
         MVC   MINNAME,DSPNAME          DATA SPACE NAME FOR ENQ           01890000
         DELETE EPLOC=DSAM7750          AND GET RID OF TABLE              01900000
         OC    SKLENO(SKLENGTH),SKLENO  USING SUB-KEY MODE?        U20027 01901000
         BZ    INITNOSK                 NO                         U20027 01902000
         LA    R0,16                    SUB-KEY USES 16 FOR RSVD   U20027 01903000
         STH   R0,RSVDLTH               SAVE RSVD AREA LENGTH      U20027 01904000
INITNOSK DS    0H                                                  U20027 01905000
*                                                                         01910000
*  PERFORM A CONDITIONAL ENQUEUE ON THE DATA SPACE NAME; A                01920000
*  FAILURE MEANS ANOTHER DSAM7700 HAS CREATED THE DATA SPACE              01930000
```

DSAM7700 1-10-97 10:19a

```
*                                                                         01940000
         ENQ   (MAJNAME,MINNAME,E,8,SYSTEMS),RET=USE                      01950000
         LTR   R15,R15                  DID WE GET ENQUEUE ?              01960000
         BZ    INIT0096                 YES..CONTINUE                     01970000
         WTO 'DSAM7700-002: UNABLE TO GAIN ACCESS TO DATA SPACE'          01980000
         B     INITZ                    TAKE ERROR EXIT                   01990000
INIT0096 DS    0H                                                         02000000
         MVI   ENQFLAG,C'Y'             INDICATE WE GOT ENQUEUE           02010000
         XR    R2,R2                    CLEAR WORK REG FOR MULTIPLY       02020000
         L     R3,MAXRECS               GET RECORD COUNT                  02030000
         L     R4,RECLEN                GET SIZE OF EACH RECORD           02040000
         MR    R2,R4                    GET DETAIL AREA SIZE              02050000
         ST    R3,DETLSIZE              AND SAVE IT FOR LATER             02060000
         L     R15,MAXRECS              GET DATA RECORD COUNT             02070000
         XR    R14,R14                  CLEAR WORK REG FOR MULTIPLY       02080000
         M     R14,IDRATIO              MULTIPLY BY RATIO                 02090000
         SLL   R15,2                    MULTIPLY BY FOUR FOR INDEX SIZE   02100000
         AR    R3,R15                   ADD TO TOTAL SIZE                 02110000
         A     R3,=A(WHSDSCTL)          ADD IN SIZE OF CONTROL AREA       02120000
         L     R4,FCLSIZE               GET FAILED COMMIT LIST COUNT      02130000
         SLL   R4,2                     MULTIPLY BY 4                     02140000
         AR    R3,R4                    ADD TO WORK SIZE                  02150000
         L     R4,NUMTOTS               GET NUMBER OF TOTALS FIELDS       02160000
         SLL   R4,3                     MULTIPLY BY 8                     02170000
         ST    R4,TOTSSIZE              SAVE IT FOR LATER                 02180000
         AR    R3,R4                    ADD TO WORK SIZE                  02190000
         A     R3,=A(STATDSCL)          ADD IN SIZE OF STATS AREA         02200000
         LA    R3,3(R3)                 ADD IN 3 FOR DETAIL F/W ALIGN     02210000
         LA    R3,4095(R3)              FORCE BLOCK COUNT TO ROUND UP     02220000
         SRL   R3,12                    DIVIDE BY 4096 FOR BLOCK COUNT    02230000
         ST    R3,DSPBLCKS              STORE BLOCK COUNT                 02240000
         MODESET MODE=SUP               SET TO SUPERVISOR STATE           02250000
         L     R15,DSPSERV              INSURE 31 BIT MODE         U20027 02252000
         BSM   0,R15                    SET 31 BIT MODE            U20027 02254000
DSPSERV  DC    A(*+4+X'80000000')                                  U20027 02256000
         DSPSERV CREATE,                CREATE A DATA SPACE              X02260000
               STOKEN=DSPSTOKN,         PUT STOKEN HERE                  X02270000
               NAME=DSPNAME,            USE THIS NAME                    X02280000
               ORIGIN=DSPORIGN,         PLACE ORIGIN ADDRESS HERE        X02290000
               SCOPE=COMMON,            MAKE THIS A COMMAN DATA SPACE    X02300000
               BLOCKS=(DSPBLCKS,DSPBLCKS)  THIS MAX AND INITIAL           02310000
         ST    R15,RETCODE              SAVE THE RETURN CODE              02320000
         ST    R0,REASCODE              SAVE THE REASON CODE              02330000
         MODESET MODE=PROB              SET TO PROBLEM PROGRAM STATE      02340000
         L     R15,RETCODE              RESTORE DSPSERV RETURN CODE       02350000
         LTR   R15,R15                  DID CREATE GO OK ?                02360000
         BZ    INIT0100                 YES..CONTINUE                     02370000
         WTO   'DSAM7700-001: UNABLE TO CREATE DATA SPACE'                02380000
         B     INITZ                    TAKE ERROR EXIT                   02390000
INIT0100 DS    0H                                                         02400000
         OI    SWITCH,DSPCREAT          INDICATE DATA SPACE CREATE OK     02410000
         MODESET MODE=SUP               SET TO SUPERVISOR STATE           02420000
         ALESERV ADD,                   ADD TO PASN-AL                   X02430000
               STOKEN=DSPSTOKN,         USE THIS TOKEN                   X02440000
               ALET=DSPALET,            PUT ALET HERE                    X02450000
               AL=PASN                  PUT THIS ON THE PASN-AL           02460000
         ST    R15,RETCODE              SAVE THE RETURN CODE              02470000
         ST    R0,REASCODE              SAVE THE REASON CODE              02480000
         MODESET MODE=PROB              SET TO PROBLEM PROGRAM STATE      02490000
         L     R15,RETCODE              RESTORE ALESERV RETURN CODE       02500000
         LTR   R15,R15                  DID ADD GO OK ?                   02510000
         BZ    INIT0150                 YES..CONTINUE                     02520000
         WTO   'DSAM7700-002: UNABLE TO GAIN ACCESS TO DATA SPACE'        02530000
         B     INITZ                    TAKE ERROR EXIT                   02540000
INIT0150 DS    0H                                                         02550000
         JDCALLOM FUNC=INFO,DDNAME=LOGDDN,WORK=MISCWORK,RETDSN=RETDSN,   X02560000
```

Page 2

ATTY. DOCKET NO.: CRKR-0009 PATENT

```
         ERROR*DUBL
         BZ    INIT0170                    NO ERROR...CONTINUE
         WTO   'DSAM7700-003: ERROR EXTRACTING LOG FILE DATA SET NAME'
         B     INITZ                       AND TAKE ERROR EXIT
INIT0170 DS    OH
         JDCALLOM FUNC*UNALL,DDNAME*LOGDDN,WORK*MISCWORK FLUSH OLD DD
         JDCSETAM ,                        SET TO ACCESS REGISTER MODE
         LAM   AR6,AR6,DSPALET             LOAD THE ALET INTO REGISTER
         L     R6,DSPORIGN                 GET START ADDR OF DATA SPACE
         L     R3,DSPBLCKS                 GET COUNT OF DATA SPACE BLOCKS
         SLL   R3,12                       MULTIPLY BY 4096
         L     R4,MAXMVCL                  SET MAXIMUM MVCL LENGTH
         SR    R3,R4                       SUBTRACT MAX POSSIBLE FROM REQ.
         BNP   INIT0300                    IF LENGTH NEG OR 0, GO COMPLETE
INIT0200 DS    OH
         LR    R7,R4                       GET LENGTH TO MOVE
         LA    R15,0                       SET SOURCE LEN AND PADDING BYTE
         MVCL  R6,R14                      AND INITIALIZE THIS CHUNK
         SR    R3,R4                       SUBTRACT LENGTH MOVED FROM REQ.
         BP    INIT0200                    AND GO ROUND AGAIN
INIT0300 DS    OH
         AR    R3,R4                       ADD LAST SUBTRACT BACK IN
         LR    R7,R3                       SET DESTINATION LENGTH
         MVCL  R6,R14                      AND INITIALIZE LAST CHUNK
         L     R3,FCLSIZE                  GET SIZE OF FAILED COMMIT LIST
         SLL   R3,2                        MULTIPLY BY 4
         LA    R3,WHSDSCTL(R3)             AND GET SIZE FOR CONTROL REC
         STH   R3,DCBBLKSI-IHADCB+CNTLFILE  STORE BLKSIZE IN DCB
         STH   R3,DCBBLKSI-IHADCB+CNTLFIL2  STORE BLKSIZE IN DCB
         STH   R3,DCBBLKSI-IHADCB+QSAMFILE  STORE BLKSIZE IN DCB
         STH   R3,DCBBLKSI-IHADCB+QSAMFIL2  STORE BLKSIZE IN DCB
         STH   R3,DCBLRECL-IHADCB+QSAMFILE  STORE LRECL IN DCB
         STH   R3,DCBLRECL-IHADCB+QSAMFIL2  STORE LRECL IN DCB
         C     R3,RECLEN                   LARGE ENOUGH FOR DETAIL RECS ?
         BNL   INIT0320                    YES..USE AS IS
         L     R3,RECLEN                   NO...GET DETAIL RECORD LENGTH
INIT0320 DS    OH
         JDCSETPM ,                        SET TO PRIMARY MODE.
         JDCAM24M ,                        SET TO AMODE 24
         GETMAIN RC,LV=(R3),SP=2,LOC=BELOW  GETMAIN I/O AREA
         LTR   R15,R15                     ALL OK ?
         BZ    INIT0340                    YES..CONTINUE
         WTO   'DSAM7700-010: I/O AREA GETMAIN FAILURE'
         B     INITZ
INIT0340 DS    OH
         ST    R1,IOAREA                   YES..SAVE IOAREA ADDR
         ST    R3,IOAREALN                 AND AREA LENGTH
         LR    R2,R1                       GET ADDR IN WORK REG
         LA    R15,0                       SET MVCL SOURCE LEN AND PAD BYTE
         MVCL  R2,R14                      AND INITALIZE I/O AREA
         TM    SWITCH,CKPT+COLD            CHECKPOINT OR COLD START ?
         BZ    INIT0350                    NO...GO READ CONTROL FILE
         OPEN  (QSAMFILE,(OUTPUT))         YES..OPEN FILE FOR OUTPUT
         L     R2,IOAREA                   GET I/O AREA ADDRESS
         PUT   QSAMFILE,(R2)               WRITE AN EMPTY RECORD
         CLOSE QSAMFILE                    AND CLOSE THE FILE
         CLI   DUPLEX,C'Y'                 DUPLEXING CONTROL FILE ?
         BNE   INIT0350                    NO...SKIP DUPLEX FILE INIT
         OPEN  (QSAMFIL2,(OUTPUT))         YES..OPEN FILE FOR OUTPUT
         L     R2,IOAREA                   GET I/O AREA ADDRESS
         PUT   QSAMFIL2,(R2)               WRITE AN EMPTY RECORD
         CLOSE QSAMFIL2                    AND CLOSE THE FILE
INIT0350 DS    OH
         OPEN  (CNTLFILE,(UPDAT))          OPEN FILE FOR UPDATE
         CLI   DUPLEX,C'Y'                 DUPLEXING CONTROL FILE ?
         BNE   INIT0370                    NO...SKIP DUPLEX FILE INIT
```

DSAM7700 1-10-97 10:19a

```
         OPEN  (CNTLFIL2,(UPDAT))          YES..OPEN DUPLEX FILE FOR UPDATE
INIT0370 DS    OH
         JDCAM31M ,                        SET TO AMODE 31
         JDCSUBM RCNTL                     GO READ THE CONTROL RECORD
         L     R6,DSPORIGN                 GET START ADDR OF DATA SPACE
         XC    WHSLKPRM,WHSLKPRM           CLEAR ALL LOCKS
         XC    WHSLKCMT,WHSLKCMT           *
         XC    WHSLKEXC,WHSLKEXC           *
         XC    WHSLKPND,WHSLKPND           *
         MVC   WHSLKJOB,SPACES             *    OWNER'S PROGRAM NAME
         MVC   WHSLKTIM,SPACES             *    LOCK TIME
         MVC   WHSLKSTP,SPACES             *    STEP INFO
         XC    WHSLKADD,WHSLKADD           *
         XC    WHSATCNT,WHSATCNT           *
         XC    WHSWTCNT,WHSWTCNT           *
         MVC   WHSEYE,DSPEYE               INITIALIZE CONTROL FIELDS
         MVC   WHSRECNT,MAXRECS            *
         MVC   WHSRECLN,RECLEN             *
         MVC   WHSKYPOS,KEYPOS             *
         MVC   WHSSDEL,SDELAY              *
         MVC   WHSKDEL,KDELAY              *
         MVC   WHSDFUPD,DFLTUPD            *
         MVC   WHSKYLEN,KEYLEN             *
         MVC   WHSALET,DSPALET             *
         MVC   WHSLDSN,LOGDSN              *
         L     R2,FCLSIZE                  GET SIZE OF FAILED COMMIT LIST
         ST    R2,WHSFCSIZ                 STORE IN CONTROL AREA
         SLL   R2,2                        MULTIPLY BY 4
         LA    R2,WHSDSCTL(R2,R6)          POINT PAST FAILED COMMIT LIST
         ST    R2,WHSSTATA                 AND SAVE STATS ADDRESS
         MVC   WHSSTATL,=A(STATDSCL)       STORE SIZE OF STATS AREA
         A     R2,=A(STATDSCL)             POINT TO END OF STATS
         ST    R2,WHSTOTSA                 STORE TOTALS AREA ADDRESS
         MVC   WHSTOTSL,TOTSSIZE           STORE TOTALS SIZE IN DATA SPACE
         A     R2,TOTSSIZE                 GET ADDR OF END OF TOTALS
         LA    R2,3(R2)                    ENSURE F/W ALIGNMENT
         SRL   R2,2                        *
         SLL   R2,2                        *
         ST    R2,WHSNDXA                  AND STORE ADDR OF INDEX AREA
         L     R15,MAXRECS                 GET DATA RECORD COUNT
         XR    R14,R14                     CLEAR WORK REG FOR MULTIPLY
         M     R14,IDRATIO                 MULTIPLY BY RATIO
         SLL   R15,2                       MULTIPLY BY FOUR FOR INDEX SIZE
         ST    R15,WHSNDXL                 SAVE SIZE OF INDEX
         AR    R2,R15                      POINT TO DETAIL AREA
         ST    R2,WHSDETA                  AND STORE ADDR OF DETAIL AREA
         ST    R2,WHSNEXTD                 SAVE AS NEXT AVAIL SLOT ADDR
         L     R6,WHSTOTSA                 POINT TO TOTALS AREA
         L     R2,NUMTOTS                  GET COUNT OF TOTALS
INIT0400 DS    OH
         ZAP   0(TOTSLEN,R6),=P'0'         SET FIELD TO ZERO
         LA    R6,8(R6)                    POINT TO NEXT ENTRY
         BCT   R2,INIT0400                 AND GO ROUND TILL DONE
         JDCSETPM ,                        SET TO PRIMARY MODE
         L     R3,DSPBLCKS                 GET COUNT OF DATA SPACE BLOCKS
         SLL   R3,12                       MULTIPLY BY 4096
         A     R3,DSPORIGN                 ADD START ADDR OF DATA SPACE
         ST    R3,DSPOETND                 AND SAVE THE END ADDRESS
         TM    SWITCH,COLD                 COLD START ?
         BO    INIT0500                    YES..SKIP RELOAD FROM LOG
         JDCSUBM LOAD                      GO LOAD THE WAREHOUSE FROM LOG
         B     INITZ                       ERROR...TAKE ERROR EXIT
INIT0500 DS    OH
         JDCSUBM WCNTL                     GO WRITE THE CONTROL RECORD
         ESTAEX ESTAEXIT,TERM=YES          ESTABLISH ESTAE EXIT
         JDCSUBM ANCHR                     GO CREATE AN ANCHOR FOR THE ALET
```

Page 3

```
         B     INITZ                    ERROR...TAKE ERROR EXIT
         B     INITY                    ALL DONE...RETURN TO CALLER
         EJECT
ANCHR    JDCRTNM
***********************************************************************
*    FUNCTION:                                                        *
*       TO PROVIDE A PLACE IN MEMORY FROM WHICH THE ACCESS PROGRAM    *
*       CAN RETRIEVE THE ALET FOR THE DATA SPACE.                     *
*       UPON ENTRY,  AN ATTEMPT IS MADE TO LOAD THE ANCHOR CONTROL    *
*       PROGRAM.  IF THIS LOAD IS SUCCESSFUL, THE ALET IN THE CONTROL *
*       PROGRAM IS MODIFIED TO REFLECT THE NEW ALET FOR THE DATA SPACE.*
*       IF THE LOAD IS UNSUCCESSFUL, THE FOLLOWING PROCESS OCCURS:    *
*                                                                     *
*        GET STORAGE FOR A CONTROL BLOCK AND ANCHOR IT IN AN LPAQ CDE. *
*    LOGIC:                                                           *
*        1)  SEARCH CDE'S ON LPAQ FOR CONTROL BLOCK CDE.              *
*        2)  IF FOUND; VERIFY THAT EYECATCHER IS FIRST 4 BYTES.       *
*        3)  IF CDE DOES NOT EXIST; GET SQA FOR CDE AND EXTENT LIST.  *
*            BUILD CDE AND EXTENT LIST.                               *
*        4)  GET CSA FOR CONTROL BLOCK.                               *
*        5)  GET THE LOCAL AND CMS LOCKS TO SERIALIZE LPAQ.           *
*        6)  PUT ADDRESS OF CONTROL BLOCK IN CDE AND EXTENT LIST.     *
*        7)  IF CDE IS CREATED; CHAIN IT ONTO THE LPAQ.               *
*        8)  RELEASE ALL LOCKS.                                       *
*    INPUTS:                                                          *
*        R1 - PARMLIST MAPPED BY ANKPRM MACRO.                        *
*    OUTPUTS:                                                         *
*        ADDRESS OF THE CONTROL BLOCK IN ANKEP                        *
*        R15- RETURN CODE:                                            *
*             0 = NEW CONTROL BLOCK HAS BEEN BUILT AND ANCHORED.      *
*             4 = CONTROL BLOCK ALREADY EXISTS AND IS ANCHORED.       *
*             8 = GETMAIN FAILED FOR CDE AND EXTENT LIST.             *
*            12 = GETMAIN FAILED FOR CONTROL BLOCK.                   *
***********************************************************************
         JDCSETPM ,                     SET TO PRIMARY MODE
         LOAD  EPLOC=ANKNAME,ERRET=ANCHR05  LOAD THE ANCHOR PROGRAM
         ST    R0,ANKEP                 SAVE THE ADDRESS OF THE ANCHOR
         LR    R1,R0                    GET THE ADDRESS IN R1
         MVC   0(L'ANKEYE,R1),ANKEYE    PUT THE EYE CATCHER IN CNTL BLK
         MVC   L'ANKEYE(L'DSPALET,R1),DSPALET   PUT ALET INTO CNTL BLK
         MVC   L'ANKEYE+L'DSPALET(L'DSPORIGN,R1),DSPORIGN  STORE ORIGIN
         B     ANCHRY                   AND RETURN TO CALLER
ANCHR05  DS    0H
         USING CVT,R3                   COMMUNICATIONS VECTOR TABLE
         USING CDENTRY,R4               CONTENTS DIRECTORY ENTRY
         USING XTLST,R7                 EXTENT LIST
***********************************************************************
*        INVOKE IBM'S IEAQCDSR SERVICE TO SCAN FOR OUR CDE ON LPAQ.   *
*           INPUTS TO IEAQCDSR SERVICE:                               *
*             R8 - HEAD OF LPAQ IN CVT                                *
*             R9 - ADDRESS OF 8 BYTE FIELD WITH NAME OF CDE TO FIND   *
*           OUTPUTS:                                                  *
*             IF CDE FOUND;                                           *
*                INSTRUCTION AFTER BALR GETS CONTROL                  *
*                CDE ADDRESS IS IN R11                                *
*             IF CDE NOT FOUND;                                       *
*                INSTRUCTION 4 BYTES AFTER BALR GETS CONTROL          *
***********************************************************************
         L     R3,CVTPTR                A(CVT) => R3
         LA    R9,ANKNAME               A(CONTROL BLOCK NAME) => R9
         L     R8,CVTQLPAQ              HEAD OF LPAQ => R8
         L     R15,CVTQCDSR             A(LPAQ SCAN ROUTINE)
         BALR  R14,R15                  INVOKE LPAQ SCAN ROUTINE
         B     ANCHR20                  CDE FOUND; PROCESS CDE
         B     ANCHR10                  NOT FOUND; GET STORAGE FOR CDE
***********************************************************************
```

DSAM7700 1-10-97 10:19a

```
*        GET STORAGE FOR LPAQ CDE AND INITIALIZE CDE                  *
***********************************************************************
ANCHR10  DS    0H
         MODESET MODE=SUP,KEY=ZERO      GET A SUPERVISOR / KEY 0 PSW
         LA    R0,LCDE+LXTNT            LENGTH OF CDE + EXTENT LIST
         GETMAIN RC,                    GET SQA STORAGE FOR CDE AND XL  X
               LV=(R0),                 LENGTH                          X
               SP=245,                  SUBPOOL                         X
               LOC=BELOW
         LTR   R15,R15                  GETMAIN OK ?
         BNZ   ANCHRZ                   NO...TAKE ERROR EXIT
         LR    R4,R1                    ADDRESS OF CDE => R4
         XC    0(LCDE+LXTNT,R4),0(R4)   INITIALIZE STORAGE TO X'00'
***********************************************************************
*     INITIALIZE CDE
***********************************************************************
         LA    R7,LCDE(R4)              A(EXTENT LIST)
         ST    R7,CDXLMJP               PUT A(EXTENT LIST) INTO CDE
         MVC   CDNAME,ANKNAME           PUT CONTROL BLOCK NAME IN CDE
         OI    CDATTR,CDNIP+CDREN+CDSER+CDNLR  .. SET
         OI    CDATTR2,CDXLE                   .. CDE FLAGS
***********************************************************************
*      INITIALIZE XTENT LIST
***********************************************************************
         LA    R5,16                    .. LENGTH OF EXTENT LIST ENTRY
         ST    R5,XTLLNTH               .. INTO EXTENT LIST
         LA    R5,1                        .. RELOCATION FACTORS
         ST    R5,XTLNRFAC                 .. INTO EXTENT LIST
         MVI   XTLMSBLA,128
         MODESET MODE=PROB,KEY=NZERO    GET A PROBLEM STATE PSW
         OI    SWITCH,NOCDE             SET SWITCH THERE IS NO CDE
         B     ANCHR30                  BRANCH TO OBTAIN CSA FOR BLOCK
***********************************************************************
*        IF CDE FOUND, CHECK STORAGE IT POINTS TO FOR EYECATCHER      *
***********************************************************************
ANCHR20  DS    0H
         LR    R4,R11                   A( CDE ) FROM CVTQCDSR ROUTINE
         L     R5,CDENTPT               ENTRY POINT FROM CDE => R5
         CLC   0(L'ANKEYE,R5),ANKEYE    IS EYCATCHER FIRST BYTES?
         BNE   ANCHR30                  NO...AQUIRE STORAGE FOR BLOCK
         ST    R5,ANKEP                 YES..PUT ADDRESS IN PARMLIST
         B     ANCHRY                   EXIT; CONTROL BLOCK EXISTS
***********************************************************************
*        GET STORAGE FOR CONTROL BLOCK AND INITIALIZE STORAGE         *
***********************************************************************
ANCHR30  DS    0H
         XR    R15,R15                  SET REGISTER TO X'00'
         LA    R15,ANKSUBPL             SET SUBPOOL
         L     R0,ANKLEN                LENGTH OF ANCHORED DATA AREA
         GETMAIN RC,                    GET STORAGE FOR CONTROL BLOCK   X
               LV=(0),                                                  X
               SP=(15),                                                 X
               LOC=(ANY,ANY)
         LTR   R15,R15                  GETMAIN OK ?
         BNZ   ANCHRZ                   NO...TAKE ERROR EXIT
         ST    R1,DUBL                  SAVE ADDRESS OF CONTROL BLOCK
         LR    R14,R1                   .. INITIALIZE
         LR    R15,R0                   .. AQUIRED STORAGE
         XR    R9,R9                    .. TO
         MVCL  R14,R8                   .. X'00'
         MVC   0(L'ANKEYE,R1),ANKEYE    PUT EYECATCHER IN CONTROL BLOCK
         MVC   L'ANKEYE(L'DSPALET,R1),DSPALET   PUT ALET INTO CNTL BLK
         MVC   L'ANKEYE+L'DSPALET(L'DSPORIGN,R1),DSPORIGN  STORE ORIGIN
         MODESET MODE=SUP,KEY=ZERO      GET A SUPERVISOR STATE PSW
***********************************************************************
*     GET THE LOCAL LOCK
```

Page 4

ATTY. DOCKET NO.: CRKR-0009 PATENT

```
*********************************************************************** 05210000
         SETLOCK OBTAIN,              .. HOLDING                       X05220000
               MODE=UNCOND,           .. THE LOCAL LOCK                X05230000
               TYPE=LOCAL,            .. IS REQUIRED BEFORE            X05240000
               REGS=USE,              .. GETTING THE CMS LOCK          X05250000
               RELATED=REQUIRED                                      .  05260000
*********************************************************************** 05270000
*     GET CMS LOCK                                                      05280000
*********************************************************************** 05290000
         SETLOCK OBTAIN,                                               X05300000
               MODE=UNCOND,           .. GET                           X05310000
               TYPE=CMS,              .. THE CMS LOCK                  X05320000
               REGS=USE,              .. TO SERIALIZE                  X05330000
               RELATED=REQUIRED       .. LPAQ                           05340000
         TM    SWITCH,NOCDE           WAS CDE ABSENT ?                  05350000
         BNO   ANCHR40                NO...DO NOT CHAIN IN              05360000
*********************************************************************** 05370000
*   CHAIN CDE ONTO LPAQ                                                 05380000
*********************************************************************** 05390000
         L     R8,CVTQLPAQ            HEAD OF LPAQ => R8                05400000
         L     R5,CDCHAIN-CDENTRY(R8) CHAIN FIELD IN FIRST CDE          05410000
         ST    R4,CDCHAIN-CDENTRY(R8) A(NEW CDE) INTO CHAIN OF 1ST CDE  05420000
         ST    R5,CDCHAIN             A(NEXT CDE) INTO NEW CHAIN        05430000
ANCHR40  DS    0H                                                       05440000
*********************************************************************** 05450000
*     PUT CONTROL BLOCK ADDRESS AND                                     05460000
*     LENGTH INTO CDE AND EXTENT LIST                                   05470000
*********************************************************************** 05480000
         L     R7,CDXLMJP             A(XTENT LIST)                     05490000
         L     R1,DUBL                SAVE ADDRESS OF CONTROL BLOCK     05500000
         ST    R1,XTLMSBAD            PUT A(BLOCK) IN EXTENT LIST       05510000
         O     R1,=A(X'80000000')     MAKE ENTRYPOINT ADDRESS 31 BIT    05520000
         ST    R1,CDENTPT             PUT A(CONTROL BLOCK) INTO CDE     05530000
         ST    R1,ANKEP               PUT ADDRESS IN PARMLIST           05540000
         L     R1,ANKLEN              LENGTH OF CONTROL BLOCK           05550000
         STCM  R1,B'0111',XTLMSBLN    PUT IN EXTENT LIST              . 05560000
*********************************************************************** 05570000
*     RELEASE ALL LOCKS                                                 05580000
*********************************************************************** 05590000
         SETLOCK RELEASE,             .. RELEASE                       X05600000
               TYPE=ALL,              .. LOCAL                         X05610000
               REGS=USE,              .. AND CMS                       X05620000
               RELATED=REQUIRED       .. LOCKS                          05630000
         MODESET MODE=PROB,KEY=NZERO                                    05640000
         JDCSETAM ,                   SET TO ACCESS REGISTER MODE       05650000
         B     ANCHRY                                                   05660000
         DROP  R3,R4,R7                                                 05670000
         EJECT                                                          05680000
LOAD     JDCRTNM                                                        05690000
         JDCSETPM ,                   SET TO PRIMARY MODE               05700000
         JDCALLOM FUNC=UNALL,DDNAME=LOGDDN,WORK=MISCWORK FLUSH OLD DD   05710000
         JDCALLOM DDNAME=LOGDDN,STATUS=SHR,DSN=LOGDSN,CLOSE=FREE,      X05720000
               WORK=MISCWORK,ERROR=DUBL                                 05730000
         BNZ   LOAD9300                                                 05740000
         MVC   DCBDDNAM-IHADCB+LOGFILE,LOGDDN  SET DDNAME IN DCB        05750000
         OPEN  LOGFILE                OPEN THE LOG FILE INPUT           05760000
         TM    DCBOFLGS-IHADCB+LOGFILE,DCBOFOPN  FILE OPEN OK ?         05770000
         BNO   LOAD9500               NO...QUIT                         05780000
         JDCSETAM ,                   SET TO ACCESS REGISTER MODE       05790000
         L     R6,DSPORIGN            GET CONTROL AREA ADDRESS          05800000
         L     R8,WHSLRCNT            GET COUNT OF RECS ON LOG FILE     05810000
         LA    R7,0                   SET CURRENT OFFSET IN DSP         05820000
LOAD1000 DS    0H                                                       05830000
         TM    SWITCH,LOGS+CKPT       SHORT LOG OR CKPT REQ ?           05840000
         BNZ   LOAD1100               YES, IGNORE REC COUNT             05850000
         LTR   R8,R8                  ANY RECS LEFT ?                   05860000
```

DSAM7700 1-10-97 10:19a

```
         BZ    LOAD5000               NO...EOF...GO CLOSE UP            05870000
LOAD1100 DS    0H                                                       05880000
         JDCSETPM ,                   SET TO PRIMARY MODE               05890000
         JDCAM24M ,                   SET TO AMODE 24                   05900000
         L     R2,IOAREA              GET ADDRESS OF I/O AREA           05910000
         GET   LOGFILE,(R2)           READ A LOG RECORD                 05920000
         JDCAM31M ,                   SET TO AMODE 31                   05930000
         JDCSETAM ,                   SET TO ACCESS REGISTER MODE       05940000
         JDCSUBM CKFCL                GO CHECK FCL                      05950000
         B     LOAD1000               ON FCL...DROP RECORD              05960000
         BCTR  R8,R0                  NOT ON FCL...DECREMENT COUNTER    05970000
         CLC   =C'TOTS',4(R2)         IS THIS A TOTALS RECORD ?         05980000
         BNE   LOAD2000               NO...GO LOAD IT UP                05990000
         L     R6,DSPORIGN            YES..GET CONTROL AREA ADDRESS     06000000
         L     R6,WHSTOTSA            GET THE TOTALS AREA ADDRESS       06010000
         A     R6,8(R2)               ADD OFFSET INTO TOTALS AREA       06020000
         L     R3,12(R2)              GET LENGTH OF TOTALS REC          06030000
         BCTR  R3,R0                  DECREMENT IT FOR EXECUTE          06040000
         LA    R2,16(R2)              POINT TO THE ACTUAL TOTALS DATA   06050000
         EX    R3,LOAD1599            AND MOVE IT TO DATA SPACE         06060000
         B     LOAD1000               AND GO GET THE NEXT RECORD        06070000
LOAD1599 MVC   0(0,R6),0(R2)          EXECUTED INSTRUCTION              06080000
LOAD2000 DS    0H                                                       06090000
         CLC   KDELETED,0(R2)         DELETED RECORD ?                  06100000
         BE    LOAD1000               YES..DROP IT                      06110000
         A     R2,KEYPOS              ADD OFSET TO KEY                  06120000
         L     R15,MAXRECS            GET DATA RECORD COUNT             06130000
         XR    R14,R14                CLEAR WORK REG FOR MULTIPLY       06140000
         M     R14,IDRATIO            MULTIPLY BY RATIO                 06150000
         ST    R15,DUBL               AND SAVE THE INDEX SIZE           06160000
         JDCSETPM ,                   SET PRIMARY MODE                  06170000
         CALL  DSAM7720,((R2),KEYLEN,DUBL,RECSLOT),VL                   06180000
         JDCSETAM ,                   SET ACCESS REGISTER MODE          06190000
         CPYA  AR5,AR6                SET DATA SPACE INDEX BASE         06200000
         L     R5,RECSLOT             GET RETURNED RECORD SLOT          06210000
         SLL   R5,2                   MULIPLY BY INDEX SIZE             06220000
         L     R6,DSPORIGN            GET CONTROL AREA ADDRESS          06230000
         A     R5,WHSNDXA             POINT TO SLOT IN INDEX            06240000
LOAD2500 DS    0H                                                       06250000
         L     R6,0(,R5)              GET THE RECORD ADDRESS            06260000
         LTR   R6,R6                  EMPTY SLOT ?                      06270000
         BNZ   LOAD2600               NO...GO FIND END OF CHAIN         06280000
         L     R6,DSPORIGN            GET CONTROL DSECT ADDR            06290000
         L     R6,WHSDETA             GET THE DETAIL AREA ADDRESS       06300000
         AR    R6,R7                  POINT TO NEXT AVAILABLE SLOT      06310000
         A     R7,RECLEN              INCREMENT NEXT SLOT POINTER       06320000
         C     R6,DSPDETND            AT END OF DATA ?                  06330000
         BNL   LOAD9100               YES..WAREHOUSE FULL               06340000
         ST    R6,0(,R5)              NO...STORE REC ADDR IN INDEX      06350000
         XC    0(16,R6),0(R6)    CLEAR LOCK, FWD/BACK CHAIN, SK  U20027 06360000
         ST    R5,8(,R6)              STORE INDEX ADDR IN BACK CHAIN    06370000
         B     LOAD2550               SKIP FIRST TIME                   06380000
LOAD2530 DS    0H                                                U20027 06382000
         SH    R6,SKPOSO(R1)          BACK OFF THE SUBKEY OFFSETU20027 06384000
         B     LOAD2550               REPLACE                    U20027 06386000
LOAD2540 DS    0H                                                       06390000
         S     R6,KEYPOS              POINT AT START OF RECORD          06400000
LOAD2550 DS    0H                                                       06410000
         L     R2,IOAREA              GET ADDRESS OF CALLERS RECORD     06420000
         AH    R2,=H'12'              GO OVER RSVD AREA          U20027 06425000
         L     R3,RECLEN              GET THE RECORD LENGTH             06430000
         SH    R3,=H'12'              REMOVE RSVD AREA LENGTH    U20027 06436000
         LR    R14,R6                 ADDRESS THE DATA SPACE     U20027 06442000
         AH    R14,=H'12'             SKIP OVER RESERVRD AREA    U20027 06448000
         LR    R15,R3                 LTH OF DS RECORD           U20027 06454000
         CPYA  AR14,AR6               SET THE ACCESS REGISTER    U20027 06460000
```

Page 5

```
         MVCL  R14,R2                MOVE IT TO DATA SPACE     U20027 06466000
         CPYA  AR14,AR15             RESET ACCESS REG          U20027 06472000
         B     LOAD1000              GET NEXT ONE              U20027 06478000
         SPACE 3                                                      06490000
LOAD2599 CLC   0(0,R3),0(R6)         EXECUTED INSTRUCTION             06500000
LOAD2600 DS    0H                                                     06510000
         A     R6,KEYPOS             ADD OFSET TO KEY                 06520000
         L     R2,KEYLEN             GET THE KEY LENGTH               06530000
         BCTR  R2,R0                 DECREMENT FOR EXECUTE            06540000
         L     R3,IOAREA             GET ADDRESS OF CALLERS RECORD    06550000
         A     R3,KEYPOS             ADD OFSET TO KEY                 06560000
         EX    R2,LOAD2599           ARE THE KEYS EQUAL ?             06570000
         BE    LOAD3000              YES..GO CHECK OUT SUB-KEYSU20027 06580000
         S     R6,KEYPOS             POINT TO START OF RECORD         06590000
         SPACE                                                        06600000
LOAD2630 DS    0H                                              U20027 06605000
         LR    R1,R6                 SAVE CURRENT RECORD POINTER      06610000
         ICM   R6,15,4(R6)           LOAD FORWARD CHAIN POINTER       06620000
         BNZ   LOAD2600              AND GO ROUND AGAIN               06630000
         L     R6,DSPORIGN           GET CONTROL DSECT ADDR           06640000
         L     R6,WHSDETA            GET THE DETAIL AREA ADDRESS      06650000
         AR    R6,R7                 POINT TO NEXT AVAILABLE SLOT     06660000
         C     R6,DSPDETND           AT END OF DATA ?                 06670000
         BNL   LOAD9100              YES..WAREHOUSE FULL              06680000
         A     R7,RECLEN             INCREMENT NEXT SLOT POINTER      06690000
         LR    R3,R6                 SAVE NEW RECORD POINTER          06700000
         LR    R6,R1                 GET CURRENT RECORD POINTER       06710000
         ST    R3,4(,R6)             SAVE FORWARD CHAIN POINTER       06720000
         LR    R6,R3                 GET NEW RECORD POINTER           06730000
         XC    0(16,R6),0(R6)        CLEAR LOCK, CHAINS        U20027 06740000
         ST    R1,8(,R6)             SAVE BACK CHAIN POINTER          06750000
         L     R2,IOAREA             GET ADDRESS OF CALLERS RECORD    06760000
         AH    R2,=H'12'             GO OVER RSVD AREA         U20027 06765000
         L     R3,RECLEN             GET THE RECORD LENGTH            06770000
         SH    R3,=H'12'             SUB LEN OF LOCK AND CHAIN PTRS   06780000
         LR    R14,R6                ADDRESS THE DSP           U20027 06781000
         AH    R14,=H'12'            LTH OF RSVD AREA          U20027 06782000
         LR    R15,R3                RECORD LTH - 12           U20027 06783000
         CPYA  AR14,AR6              SET THE ACCESS REGISTER   U20027 06784000
         MVCL  R14,R2                MOVE IT TO DATA SPACE     U20027 06785000
         CPYA  AR14,AR15             RESET ACCESS REG          U20027 06786000
         B     LOAD1000              AND GO GET NEXT           U20027 06787000
         SPACE 3                                               U20027 06788000
LOAD3000 DS    0H        ROUTINE TO CHECK SUB-KEYS WHEN PRIMARY U20027 06789000
*                        KEY WAS EQUAL                         U20027 06790000
         CLI   RSVDLTH+1,12          PRIMARY/SUB-KEY MODE?     U20027 06791000
         BE    LOAD2540              PRIMARY, WE ARE FINISHED  U20027 06792000
         L     R2,IOAREA             ADDRESS THE INPUT RECORD  U20027 06793000
         CLI   12(R2),0              IS THERE A SUB KEY?       U20027 06794000
         BNE   LOAD2540              NO THIS IS AN UPDATE TO   U20027 06795000
*                                       THE PRIMARY            U20027 06796000
         S     R6,KEYPOS             BACK UP TO START OF RECORDU20027 06797000
         SLR   R1,R1                 CLEAR INDEX REGISTER      U20027 06798000
         IC    R1,12(R2)             SUBKEY ID IS INDEX        U20027 06799000
         BCTR  R1,0                  MAKE IT RELATIVE          U20027 06800000
         SLL   R1,2                  TIMES 4 TO ADDRESS SUBKEY U20027 06801000
         AH    R6,SKPOSO(R1)         ADD SK OFFSET             U20027 06802000
         LH    R2,SKLENO(R1)         SUBKEY LENGTH             U20027 06803000
         BCTR  R2,0                  LESS 1 FOR THE CLC        U20027 06804000
         EX    R2,LOAD2599           SAME SUB-KEY?             U20027 06805000
         BE    LOAD2530              YES, REPLACE THE RECORD   U20027 06806000
         SH    R6,SKPOSO(R1)         BACK UP TO BEGINNING AGAINU20027 06807000
         B     LOAD2630              CHASE THE CHAIN           U20027 06808000
         SPACE 3                                                      06820000
LOAD5000 DS    0H                                                     06830000
* EOF                                                                 06840000
```

DSAM7700 1-10-97 10:19a

```
         CPYA  AR5,AR15              RESET SECOND DATA SPACE BASE     06850000
         L     R6,DSPORIGN           GET CONTROL AREA ADDRESS         06860000
         A     R7,WHSDETA            ADD DETAIL START ADDR TO OFFSET  06870000
         ST    R7,WHSNEXTD           SAVE NEXT AVAILABLE SLOT POINTER 06880000
         JDCSETPM ,                  SET PRIMARY MODE                 06890000
         CLOSE LOGFILE               CLOSE THE LOG FILE               06900000
         JDCSETAM ,                  SET ACCESS REGISTER MODE         06910000
         B     LOADY                 NO ERRORS...NORMAL RETURN        06920000
LOAD9000 DS    0H                                                     06930000
         JDCSETPM ,                  SET TO PRIMARY MODE              06940000
         WTO   'DSAM7700-007: PREMATURE EOF ON LOG FILE'              06950000
         TM    SWITCH,LOGS           SHORT LOG EXPECTED               06960000
         BNO   LOADZ                 NO, ERROR EXIT                   06970000
         JDCSETAM ,                  SET ACCESS REGISTER MODE         06980000
         JDCAM31M ,                  SET TO AMODE 31                  06990000
         B     LOAD5000              YES, ...PERFORM EOF              07000000
LOAD9100 DS    0H                                                     07010000
         JDCSETPM ,                  SET TO PRIMARY MODE              07020000
         WTO   'DSAM7700-008: DATA SPACE FULL'                        07030000
         B     LOADZ                 ERROR EXIT                       07040000
LOAD9300 DS    0H                                                     07050000
         JDCSETPM ,                  SET TO PRIMARY MODE              07060000
         MVI   DUBL+4,X'0F'          SET SIGN BYTE X'0F'              07070000
         UNPK  MISCWORK(9),DUBL(5)   UNPACK RETURN CODE               07080000
         TR    MISCWORK(8),HEXTABLE  CONVERT IT TO DISPLAY HEX        07090000
         MVC   ALLOCRC(8),MISCWORK   MOVE IT TO MESSAGE               07100000
ALLOCRC  EQU   *+8+45                                                 07110000
         WTO   'DSAM7700-005: ERROR ALLOCATING LOG FILE - RC=XXXXXXXX' 07120000
         B     LOADZ                 ERROR EXIT                       07130000
LOAD9500 DS    0H                                                     07140000
         JDCSETPM ,                  SET TO PRIMARY MODE              07150000
         WTO   'DSAM7700-006: ERROR OPENING LOG FILE'                 07160000
         B     LOADZ                 ERROR EXIT                       07170000
         EJECT                                                        07180000
CKFCL    JDCRTNM                                                      07190000
         L     R14,FCLSIZE           GET COUNT OF FCL ENTRIES         07200000
         L     R6,DSPORIGN           GET CONTROL AREA ADDRESS         07210000
         LA    R6,WHSFCLST           POINT TO FAILED COMMIT LSIT      07220000
CKFCL100 DS    0H                                                     07230000
         CLC   0(4,R2),0(R6)         COMMIT CNTL NUM IN FCL ?         07240000
         BE    CKFCLZ                YES...DROP RECORD                07250000
         OC    0(4,R6),0(R6)         AT END OF LIST ?                 07260000
         BZ    CKFCLY                YES...NOT IN FCL...RETURN        07270000
         BCT   R14,CKFCL100          AND GO ROUND TILL DONE           07280000
         B     CKFCLY                NO ERRORS...NORMAL RETURN        07290000
         EJECT                                                        07300000
WAIT     JDCRTNM                                                      07310000
         JDCSETPM ,                  SET PRIMARY MODE                 07320000
         WTO   'DSAM7700-012: DATA SPACE READY'                       07330000
         LA    R9,DUBL               GET ADDR FOR COMMUNICATIONS AREA 07340000
         EXTRACT (R9),FIELDS=COMM    EXTRACT THE COMM AREA            07350000
         L     R9,DUBL               GET ADDRESS OF THE AREA          07360000
         USING COM,R9                ESTABLISH DSECT ADDRESSABILITY   07370000
         QEDIT ORIGIN=COMCIBPT,CIBCTR=0   SET MODIFY LIMIT TO 0       07380000
         L     R1,COMECBPT        GET ADDRESS OF THE COMMUNICATION ECB 07390000
         ST    R1,STOPECB            PUT ADDR OF MODIFY ECB IN LIST   07400000
         DROP  R9                                                     07410000
         MVC   SLEEPTIM,SLEEPINI     SET UP INITIAL SLEEP TIME        07420000
WAIT1000 DS    0H                                                     07430000
         JDCSETPM ,                  SET TO PRIMARY MODE              07440000
         STIMER REAL,TIMERXIT,DINTVL=SLEEPTIM  SET UP THE STIMER      07450000
         MVI   STIMRECB,0            CLEAR THE TIMER ECB              07460000
         WAIT  ECBLIST=ECBS          WAIT FOR A STOP OR TIMER         07470000
         L     R1,STOPECB            GET THE STOP ECB ADDRESS         07480000
         TM    0(R1),X'40'           STOP ECB BEEN POSTED ?           07490000
         BO    WAIT4000              YES..GO CLOSE DOWN               07500000
```

Page 6

ATTY. DOCKET NO.: CRKR-0009 PATENT

```
         MODESET MODE=SUP                SET TO SUPERVISOR STATE
         JDCSETAM ,                      SET ACCESS REGISTER MODE
         L     R6,DSPORIGN               GET CONTROL AREA ADDRESS
         L     R2,WHSDETA                GET POINTER TO START OF DETAIL
         LA    R2,4095(R2)               ROUND IT UP TO PAGE ALIGNMENT
         SRL   R2,12                     "
         SLL   R2,12                     "
         ST    R2,DUBL                   STORE THE START ADDR
         S     R2,DSPORIGN               SUBTRACT THE START ADDRESS
         SRL   R2,12                     GET COUNT OF BLOCKS TO KEEP
         L     R7,DSPBLCKS               GET TOTAL NUMBER OF BLOCKS
         SR    R7,R2                     SUBTRACT OUT BLOCKS TO KEEP
         ST    R7,DUBL+4                 STORE THE BLOCK COUNT
         DSPSERV OUT,                    PAGE OUT THIS AREA            X
               STOKEN=DSPSTOKN,          USE THIS STOKEN               X
               START=DUBL,               FREE FROM THIS ADDRESS        X
               BLOCKS=DUBL+4             FOR THIS NUMBER OF BLOCKS
         JDCSETPM ,                      SET TO PRIMARY MODE
         MODESET MODE=PROB               SET TO PROBLEM PROGRAM STATE
         JDCSETAM ,                      SET ACCESS REGISTER MODE
         L     R6,DSPORIGN               GET CONTROL AREA ADDRESS
         OC    WHSATCNT,WHSATCNT         ANY TASKS ACTIVE ?
         BZ    WAIT1500                  NO...SET TO LONG SLEEP TIME
         MVC   SLEEPTIM,SLEEPSHT         SET UP SHORT SLEEP TIME
         B     WAIT1000                  AND GO WAIT AGAIN
WAIT1500 DS    0H
         MVC   SLEEPTIM,SLEEPLNG         SET UP LONG SLEEP TIME
         B     WAIT1000                  AND GO WAIT AGAIN
         SPACE 3
WAIT4000 DS    0H
         TTIMER CANCEL
         WTO   'DSAM7700-011: SHUTDOWN REQUEST ACCEPTED'
         JDCSETAM ,                      SET ACCESS REGISTER MODE
         L     R6,DSPORIGN
         JDCSUBM LCKCNTL                 GO LOCK THE CONTROL AREA
         OC    WHSATCNT,WHSATCNT         ANY TASKS ACTIVE ?
         BZ    WAIT6000                  NO...GO CLOSE DOWN
         JDCSETPM ,                      SET TO PRIMARY MODE
         WTO   'DSAM7700-009:  WAITING FOR ACTIVE TASKS TO QUIESCE'
         JDCSETAM ,                      SET ACCESS REGISTER MODE
         XC    WHSLKPRM,WHSLKPRM         RELEASE CONTROL AREA LOCK
WAIT5000 DS    0H
         JDCSETPM ,                      SET TO PRIMARY MODE -
         STIMER WAIT,DINTVL=LOCKWAIT     WAIT A WHILE
         JDCSETAM ,                      SET TO ACCESS REGISTER MODE
         JDCSUBM LCKCNTL                 GO LOCK THE CONTROL AREA
         OC    WHSATCNT,WHSATCNT         ANY TASKS ACTIVE ?
         BZ    WAIT6000                  NO...GO CLOSE DOWN
         XC    WHSLKPRM,WHSLKPRM         YES..RELEASE CONTROL AREA LOCK
         B     WAIT5000                  AND GO TRY AGAIN
WAIT6000 DS    0H
         JDCSETPM ,                      SET TO PRIMARY MODE
         JDCAM24M ,                      SET TO AMODE 24
         CALL  DSAM7740                  GO PRINT STATS REPORT
         JDCAM31M ,                      SET TO AMODE 24
         JDCSETAM ,                      SET TO ACCESS REGISTER MODE
         L     R9,ANKEP                  GET ANCHOR PGM EP
         XC    0(L'ANKEYE,R9),0(R9)      CLEAR THE EYE CATCHER
         XC    WHSEYE,WHSEYE             KILL THE EYE CATCHER
         XC    WHSLKPRM,WHSLKPRM         RELEASE CONTROL AREA LOCK
         JDCSETPM ,                      SET TO PRIMARY MODE
         B     WAITZ                     RETURN TO CALLER
         EJECT
CLOS     JDCRTNM
         JDCSETPM ,                      SET PRIMARY MODE
         TM    DCBOFLGS-IHADCB+CNTLFILE,DCBOFOPN  FILE OPEN ?
```

```
         BNO   CLOS0100                  NO...TRY NEXT
         CLOSE CNTLFILE                  YES..SO CLOSE IT
CLOS0100 DS    0H
         TM    DCBOFLGS-IHADCB+CNTLFIL2,DCBOFOPN  FILE OPEN ?
         BNO   CLOS0200                  NO...TRY NEXT
         CLOSE CNTLFIL2                  YES..SO CLOSE IT
CLOS0200 DS    0H
         TM    DCBOFLGS-IHADCB+LOGFILE,DCBOFOPN  FILE OPEN ?
         BNO   CLOS0300                  NO...TRY NEXT
         CLOSE LOGFILE                   YES..SO CLOSE IT
         FREEPOOL LOGFILE                AND FREE THE BUFFERS
CLOS0300 DS    0H
         CLI   ENQFLAG,C'Y'              DID WE GET ENQUEUE
         BNE   CLOS0400                  NO...DON'T DEQUEUE
         DEQ   (MAJNAME,MINNAME,8,SYSTEMS) RELEASE THE RESOURCE
CLOS0400 DS    0H
         WTO   'DSAM7700-013: SHUTDOWN COMPLETE'
         B     CLOSZ                     RETURN TO CALLER
         EJECT
RCNTL    JDCRTNM
         L     R9,IOAREA                 GET ADDR OF I/O AREA
         JDCAM24M ,                      SET TO AMODE 24
         JDCSETPM ,                      SET TO AR MODE PRIMARY
         READ  WORKDECB,DI,CNTLFILE,(R9),'S',0,DUBL,,MF=E
         CHECK WORKDECB
         JDCSETAM ,                      SET TO ACCESS REGISTER MODE
         JDCAM31M ,                      SET TO AMODE 31
         XC    DUBL,DUBL                 SET RECORD NUMBER TO ZERO
         L     R6,DSPORIGN               GET START ADDR OF CONTROL AREA
         L     R7,WHSFCSIZ               GET SIZE OF FAILED COMMIT LIST
         SLL   R7,2                      MULTIPLY BY 4 - SIZE OF EACH F/W
         LA    R7,WHSDSCTL(R7)           ADD IN SIZE OF CONTROL AREA
         L     R2,IOAREA                 GET ADDR OF I/O AREA
         LR    R3,R7                     GET LENGTH TO MOVE
         MVCL  R6,R2                     AND MOVE CONTROL AREA TO WORK
         B     RCNTLZ                    RETURN TO CALLER
         EJECT
WCNTL    JDCRTNM
         JDCSETAM ,                      SET TO ACCESS REGISTER MODE
         JDCAM31M ,                      SET TO AMODE 31
         XC    DUBL,DUBL                 SET RECORD NUMBER TO ZERO
         L     R6,DSPORIGN               GET START ADDR OF CONTROL AREA
         L     R7,WHSFCSIZ               GET SIZE OF FAILED COMMIT LIST
         SLL   R7,2                      MULTIPLY BY 4 - SIZE OF EACH F/W
         LA    R7,WHSDSCTL(R7)           ADD IN SIZE OF CONTROL AREA
         L     R2,IOAREA                 GET ADDR OF I/O AREA
         LR    R3,R7                     GET LENGTH TO MOVE
         MVCL  R2,R6                     AND MOVE CONTROL AREA TO WORK
         L     R9,IOAREA                 GET ADDR OF I/O AREA
         JDCAM24M ,                      SET TO AMODE 24
         JDCSETPM ,                      SET TO AR MODE PRIMARY
         WRITE WORKDECB,DI,CNTLFILE,(R9),'S',0,DUBL,,MF=E
         CLI   DUPLEX,C'Y'               DUPLEXING CONTROL FILE ?
         BNE   WCNTL3                    NO...FORGET IT
         WRITE WORKDEC2,DI,CNTLFIL2,(R9),'S',0,DUBL,,MF=E
WCNTL3   DS    0H
         CHECK WORKDECB
         CLI   DUPLEX,C'Y'               DUPLEXING CONTROL FILE ?
         BNE   WCNTL6                    NO...FORGET IT
         CHECK WORKDEC2
WCNTL6   DS    0H
         JDCSETAM ,                      SET TO ACCESS REGISTER MODE
         JDCAM31M ,                      SET TO AMODE 31
         B     WCNTLZ                    RETURN TO CALLER
         EJECT
LCKCNTL  JDCRTNM
```

ATTY. DOCKET NO.: CRKR-0009 PATENT

```
LCKCNTL5 DS    OH                                            08830000
         LA    R2,D                 SET COMPARE VALUE               08840000
         L     R3,KLOCKED           SET LOCK VALUE                  08850000
         L     R6,DSPORIGN          GET CONTROL AREA ADDRESS        08860000
         CS    R2,R3,WHSLKPRM       TRY TO GET LOCK ON CONTROL AREA 08870000
         BE    LCKCNTL1             GOT IT...RETURN TO CALLER       08880000
         JDCSETPM ,                 SET TO PRIMARY MODE             08890000
         STIMER WAIT,DINTVL=ONETENTH ELSE WAIT 1/10TH OF A SECOND   08900000
         JDCSETAM ,                 SET TO ACCESS REGISTER MODE     08910000
         B     LCKCNTL5             AND KEEP TRYING TO GET LOCK     08920000
         EJECT                                                      08930000
TIMERXIT DS    OH                                                   08940000
         SAVE  (14,12)              SAVE REGISTERS                  08950000
         LR    R10,R15                                              08960000
         USING TIMERXIT,R10         ESTABLISH ADDRESSABILITY        08970000
         L     R2,ECBADDR           GET THE ECB ADDRESS             08980000
         POST  (R2)                 POST THE ECB                    08990000
         RETURN (14,12)             RESTORE REGISTERS               09000000
ECBADDR  DC    A(STIMRECB)                                          09010000
         EJECT                                                      09020000
SAVEAREA DS    9D                   PROGRAM SAVE AREA               09030000
ESTAREGS DS    9D                   ESTAE SAVE AREA                 09040000
DUBL     DS    D                    MISC WORK AREA                  09050000
ESTAERET DS    F                    ESTAE RETURN ADDRESS            09060000
RETCODE  DS    F                    PROGRAM RETURN CODE             09070000
REASCODE DS    F                    MACRO FAILURE REASON CODE       09080000
DETLSIZE DS    F                    WAREHOUSE DETAIL AREA SIZE      09090000
TOTSSIZE DS    F                    WAREHOUSE TOTALS AREA SIZE      09100000
DSPBLCKS DS    F                    DATA SPACE 4K BLOCK COUNT       09110000
DSPORIGN DS    F                    START ADDRESS OF DATA SPACE     09120000
DSPSTOKN DS    D                    STOKEN RETURNED FROM DSPSERV    09130000
DSPALET  DS    F                    ALET FOR CREATED DATA SPACE     09140000
DSPDETND DS    F                    END OF DATA SPACE               09150000
IOAREA   DS    A                    ADDRESS OF GETMAINED I/O AREA   09160000
IOAREALN DS    F                    LENGTH OF I/O AREA              09170000
RECSLOT  DS    F                    SLOT NUMBER FOR INDEX           09180000
RECADDR  DS    A                    ADDRESS OF DATA RECORD          09190000
KLOCKED  DC    F'-1'                LENGTH OF I/O AREA              09200000
KDELETED DC    C'DELE'              RECORD DELETED FLAG             09210000
MAXMVCL  DC    F'16777215'          MAXIMUM MVCL LENGTH             09220000
RETDSN   DS    OCL50                                                09230000
         DS    CL6                                                  09240000
LOGDSN   DC    CL44' '                                              09250000
LOGDDN   DC    CL8'DSALOG'                                          09260000
ONETENTH DC    CL8'00000010'        WAIT FOR CONTROL AREA LOCK      09270000
LOCKWAIT DC    CL8'00001000'        WAIT FOR EXCLUSIVE WAREHOUSE LCK 09280000
SLEEPINI DC    CL8'00000100'        SLEEP FIRST TIME WHEN COMING UP 09290000
SLEEPLNG DC    CL8'00010000'        SLEEP WHEN NO TASKS ACTIVE      09300000
SLEEPSHT DC    CL8'00000500'        SLEEP WHEN TASKS ARE ACTIVE     09310000
SLEEPTIM DS    CL8                  SLEEP TIME                      09320000
MAJNAME  DC    CL8'DSAM7700'        ENQ MAJOR NAME                  09330000
MINNAME  DC    CL8'DSPNAME '        ENQ MINOR NAME                  09340000
ENQFLAG  DC    CL8'N'               ENQ FLAG FOR DEQ                09350000
RETMBRNM DS    OCL14                TEXT UNIT WORK AREA             09360000
         DS    CL6                  TEXT UNIT KEY ETC.              09370000
DSAM7750 DC    CL8'DSAM7750'        CONTROL TABLE NAME              09380000
SPACES   DC    CL16' '                                              09390000
SWITCH   DC    X'00'                STATUS FLAGS                    09400000
DSPCREAT EQU   X'80'                DATA SPACE CREATED              09410000
NOCDE    EQU   X'40'                NO CDE FOUND IN CDE CHAIN       09420000
CKPT     EQU   X'20'                CHECKPOINT START REQUESTED      09430000
COLD     EQU   X'10'                COLD START REQUESTED            09440000
LOGS     EQU   X'08'                LOG SHORT INDICATED             09450000
*        EQU   X'04'                                                09460000
*        EQU   X'02'                                                09470000
*        EQU   X'01'                                                09480000
```

DSAM7700 1-10-97 10:19a

```
         SPACE 3                                                    09490000
ANKLEN   DC    F'16'                CONTROL BLOCK LENGTH            09500000
ANKEP    DS    A                    ENTRY POINT OF CONTROL BLOCK    09510000
ECBS     DS    0D                   ECB LIST                        09520000
STOPECB  DS    A                    ADDR MODIFY/STOP ECB            09530000
         DC    AL1(128)                                             09540000
         DC    AL3(STIMRECB)        ADDRESS OF STIMER ECB           09550000
STIMRECB DC    A(0)                 STIMER ECB                      09560000
         SPACE 3                                                    09570000
HEXTABLE EQU   *-X'F0'                                              09580000
         DC    C'0123456789ABCDEF'                                  09590000
RSVDLTH  DC    H'12'          RESERVED AREA LENGTH           U20027 09595000
         SPACE 3                                                    09600000
         EJECT                                                      09610000
         COPY  DSAM500L                                             09620000
         SPACE 3                                                    09630000
         EJECT                                                      09640000
         JDCSAVM                                                    09650000
         EJECT                                                      09660000
LOGFILE  DCB   DSORG=PS,                                           X09670000
               DDNAME=DSALOG,                                      X09680000
               RECFM=FB,                                           X09690000
               EODAD=LOAD9000,                                     X09700000
               MACRF=GM                                             09710000
         EJECT                                                      09720000
DSAMFILE DCB   DSORG=PS,                                           X09730000
               DDNAME=DSACNTL,                                     X09740000
               RECFM=F,                                            X09750000
               MACRF=PM                                             09760000
         EJECT                                                      09770000
DSAMFIL2 DCB   DSORG=PS,                                           X09780000
               DDNAME=DSACNTLD,                                    X09790000
               RECFM=F,                                            X09800000
               MACRF=PM                                             09810000
         EJECT                                                      09820000
CNTLFILE DCB   DSORG=DA,                                           X09830000
               DDNAME=DSACNTL,                                     X09840000
               RECFM=F,                                            X09850000
               MACRF=(RIC,WIC),                                    X09860000
               OPTCD=R                                              09870000
         EJECT                                                      09880000
CNTLFIL2 DCB   DSORG=DA,                                           X09890000
               DDNAME=DSACNTLD,                                    X09900000
               RECFM=F,                                            X09910000
               MACRF=(RIC,WIC),                                    X09920000
               OPTCD=R                                              09930000
         EJECT                                                      09940000
         WRITE WORKDECB,DI,0,0,'S',0,0,,MF=L                        09950000
         EJECT                                                      09960000
         WRITE WORKDEC2,DI,0,0,'S',0,0,,MF=L                        09970000
         EJECT                                                      09980000
MISCWORK DS    CL200                                                09990000
         EJECT                                                      10000000
         COPY  DSAM300L                                             10010000
         EJECT                                                      10020000
         COPY  DSAM400L                                             10030000
         EJECT                                                      10040000
COM      DSECT                                                      10050000
         IEZCOM   ,                 COM AREA                        10060000
         EJECT                                                      10070000
CIB      DSECT                                                      10080000
         IEZCIB   ,                 CIB                             10090000
         EJECT                                                      10100000
         IHACDE                     MAP CDE                         10110000
LCDE     EQU   *-CDENTRY            LENGTH OF CDE                   10120000
         EJECT                                                      10130000
```

Page 8

ATTY. DOCKET NO.: CRKR-0009 PATENT

```
         IHASDWA VRAMAP=NO                                          10140000
         EJECT                                                      10150000
         DCBD  DSORG=PS               MAP DCB                       10160000
         EJECT                                                      10170000
         IHAXTLST                     MAP EXTENT LIST               10180000
LXTNT    EQU   *-XTLST                LENGTH OF EXTENT LIST         10190000
         EJECT                                                      10200000
         CVT    DSECT=YES,LIST=YES    MAP CVT                       10210000
         EJECT                                                      10220000
         IHAPSA DSECT=YES,LIST=YES    MAP PSA FOR SETLOCK           10230000
         EJECT                                                      10240000
ANKSUBPL EQU   228                    DEFAULT SUBPOOL FOR ANCHOR PGM 10250000
TOTSLEN  EQU   8                                                    10260000
R0       EQU   0                                                    10270000
R1       EQU   1                                                    10280000
R2       EQU   2                                                    10290000
R3       EQU   3                                                    10300000
R4       EQU   4                                                    10310000
R5       EQU   5                                                    10320000
R6       EQU   6                                                    10330000
R7       EQU   7                                                    10340000
R8       EQU   8                                                    10350000
R9       EQU   9                                                    10360000
R10      EQU   10                                                   10370000
R11      EQU   11                                                   10380000
R12      EQU   12                                                   10390000
R13      EQU   13                                                   10400000
R14      EQU   14                                                   10410000
R15      EQU   15                                                   10420000
AR0      EQU   0                                                    10430000
AR1      EQU   1                                                    10440000
AR2      EQU   2                                                    10450000
AR3      EQU   3                                                    10460000
AR4      EQU   4                                                    10470000
AR5      EQU   5                                                    10480000
AR6      EQU   6                                                    10490000
AR7      EQU   7                                                    10500000
AR8      EQU   8                                                    10510000
AR9      EQU   9                                                    10520000
AR10     EQU   10                                                   10530000
AR11     EQU   11                                                   10540000
AR12     EQU   12                                                   10550000
AR13     EQU   13                                                   10560000
AR14     EQU   14                                                   10570000
AR15     EQU   15                                                   10580000
         EJECT                                                      10590000
         END                                                        10600000
```

DSAM7700 1-10-97 10:19a

Page 9

08807090.022797

ATTY. DOCKET NO.: CRKR-0009 PATENT

```
DSAM7710 START                                                          00010000
DSAM7710 AMODE 31                                                       00020000
DSAM7710 RMODE 24                                                       00030000
         LCLC  &CPCS   ...IS CPCS INSTALLED?                     U20027 00032000
&CPCS    SETC  'YES'      ...YES IT IS                           U20027 00034000
&CPCS    SETC  'NO'       ...NO IT IS NOT                        U20027 00036000
************** START OF SPECIFICATIONS ******************************** 00040000
*                                                                     * 00050000
*                                                                     * 00060000
* MODULE NAME - DSAM7710  WAREHOUSE ACCESS ROUTINE                    * 00070000
*                                                                     * 00080000
*                                                                     * 00090000
*                                                                     * 00100000
*                                                                     * 00110000
*                                                                     * 00120000
*                                                                     * 00130000
*                                                                     * 00140000
*         THIS PROGRAM CONTAINS PROPRIETARY AND TRADE SECRET          * 00150000
*         INFORMATION BELONGING TO J.D. CARREKER AND ASSOCIATES       * 00160000
*         INCORPORATED (JDCA).  THE PROGRAM IS FURNISHED ONLY FOR     * 00170000
*         USE BY LICENSEES OF JDCA SOFTWARE PRODUCTS AND THEIR        * 00180000
*         DESIGNATED AGENTS OR EMPLOYEES RESPONSIBLE FOR INSTALLATION * 00190000
*         OR OPERATION OF THE PRODUCTS.  ANY OTHER USE, DUPLICATION,  * 00200000
*         OR DISSEMINATION WITHOUT THE WRITTEN CONSENT OF JDCA IS     * 00210000
*         NOT AUTHORIZED.                                             * 00220000
*                                                                     * 00230000
*                                                                     * 00240000
*                                                                     * 00250000
*                                                                     * 00260000
* FUNCTION -                                                          * 00270000
*                                                                     * 00280000
*        THIS MODULE PROVIDES ALL ACCESS TO THE COMMON DATA SPACE     * 00290000
*        CREATED BY DSAM7700 FROM ALL APPLICATION PROGRAMS.           * 00300000
*                                                                     * 00310000
*                                                                     * 00320000
*        REGISTER USAGE -                                             * 00330000
*                                                                     * 00340000
*              R0  - LINKAGE, WORK                                    * 00350000
*              R1  - LINKAGE, WORK                                    * 00360000
*              R2  - WORK                                             * 00370000
*              R3  - WORK                                             * 00380000
*              R4  - WORK                                             * 00390000
*              R5  - WORK                                             * 00400000
*              R6  - DATA SPACE BASE REGISTER                         * 00410000
*              R7  - WORK                                             * 00420000
*              R8  - WORK                                             * 00430000
*              R9  - SUBROUTINE LINKAGE, WORK                         * 00440000
*              R10 - CODE BASE REGISTER                               * 00450000
*              R11 - WORK AREA BASE REGISTER                          * 00460000
*              R12 - SECOND WORK AREA BASE REGISTER                   * 00470000
*              R13 - SAVE AREA ADDRESS                                * 00480000
*              R14 - LINKAGE, WORK                                    * 00490000
*              R15 - LINKAGE, WORK                                    * 00500000
*                                                                     * 00510000
*                                                                     * 00520000
* MODULE TYPE - CSECT                                                 * 00530000
*                                                                     * 00540000
*        PROCESSOR - ASSEMBLER H                                      * 00550000
*                                                                     * 00560000
*                                                                     * 00570000
* EXTERNAL REFERENCES -                                               * 00580000
*                                                                     * 00590000
*        DSAM7720 - KEY RANDOMIZATION ROUTINE                    U20024 00600000
*                                                                     * 00610000
*                                                                     * 00620000
*                                                                     * 00630000
```

DSAM7710 1-10-97 10:21a

```
* MAINTENANCE LOG:                                                    * 00640000
*                                                                     * 00650000
*   PTF #   DATE    DESCRIPTION                                       * 00660000
*   ------  ------  --------------------------------------------      * 00670000
*   U20024  112095  FIX TO HANDLE LOCKS AFTER FATAL INIT ERROR   U20024 00680000
*                                                                     * 00690000
*                                                                     * 00700000
*                                                                     * 00710000
*                                                                     * 00720000
*                                                                     * 00730000
*                                                                U20024 00735000
*********************************************************************** 00740000
                                                                        00750000
         LR    R10,R15                  GET ENTRY ADDRESS               00760000
         USING DSAM7710,R10             ESTABLISH ADDRESSABILITY        00770000
         USING SAVEAREA,R11,R12         ESTABLISH ADDRESSABILITY        00780000
         USING WHSDSCT,R6               ESTABLISH ADDRESSABILITY        00790000
         L     R2,ASAVAREA              GET SAVEAREA ADDRESS            00800000
         ST    R2,8(R13)                STORE MY SAVE AREA ADDRESS      00810000
         ST    R13,4(R2)                STORE CALLERS SAVE AREA ADDRESS 00820000
         LR    R13,R2                   POINT TO MY SAVE AREA           00830000
         LM    R11,R12,ASAVAREA         GET WORK AREA BASE REGISTERS    00840000
         LA    R12,2048(R13)            SET UP SECOND WORK AREA BASE    00850000
         LA    R12,2048(R12)            SET UP SECOND WORK AREA BASE    00860000
         L     R9,AMAIN001              LOAD ADDR OF NEXT INSTRUCTION   00870000
         BSM   0,R9                     AND SET TO AMODE 31             00880000
AMAIN001 DC    A(MAIN0001+X'80000000')                                  00890000
MAIN0001 DS    0H                                                       00900000
         JDCSUBM START                  GO PERFORM ENTRY CODE           00910000
         B     RETURN                   ERROR...QUIT NOW                00920000
         CLI   DSAMFUNC,C'I'            INITIALIZE REQUEST ?            00930000
         BNE   MAIN0100                 NO...GO TRY NEXT                00940000
         JDCSUBM INIT                   GO PERFORM INITIALIZATION       00950000
         B     RETURN                   AND RETURN TO CALLER            00960000
MAIN0100 DS    0H                                                       00970000
         CLI   DSAMFUNC,C'R'            READ REQUEST ?                  00980000
         BNE   MAIN0200                 NO...GO TRY NEXT                00990000
         JDCSUBM READ                   GO PERFORM READ                 01000000
         B     RETURN                   AND RETURN TO CALLER            01010000
MAIN0200 DS    0H                                                       01020000
         CLI   DSAMFUNC,C'W'            WRITE REQUEST ?                 01030000
         BNE   MAIN0300                 NO...GO TRY NEXT                01040000
         JDCSUBM WRIT                   GO PERFORM WRITE                01050000
         B     RETURN                   AND RETURN TO CALLER            01060000
MAIN0300 DS    0H                                                       01070000
         CLI   DSAMFUNC,C'D'            DELETE REQUEST ?                01080000
         BNE   MAIN0400                 NO...GO TRY NEXT                01090000
         JDCSUBM DEL                    GO PERFORM DELETE               01100000
         B     RETURN                   AND RETURN TO CALLER            01110000
MAIN0400 DS    0H                                                       01120000
         CLI   DSAMFUNC,C'C'            CLOSE REQUEST ?                 01130000
         BNE   MAIN0500                 NO...GO TRY NEXT                01140000
         JDCSUBM CLOS                   GO PERFORM CLOSE                01150000
         CLI   LOCKSW,C'Y'              DID WE PLACE EXCL LOCK?         01160000
         BNE   RETURN                   NO...RETURN TO CALLER           01170000
         JDCSETPM ,                     SET PRIMARY MODE                01180000
         JDCSUBM UNLKMSG                YES..ISSUE UNLOCK MSG           01190000
         B     RETURN                   AND RETURN TO CALLER            01200000
MAIN0500 DS    0H                                                       01210000
         CLI   DSAMFUNC,C'S'            STATS REQUEST ?                 01220000
         BNE   MAIN0600                 NO...GO TRY NEXT         U20027 01230000
         JDCSUBM STAT                   GO PERFORM CLOSE                01240000
         B     RETURN                   AND RETURN TO CALLER            01250000
MAIN0600 DS    0H                                                       01260000
         MVC   REASCODE,RCINVPRM        SET REASON CODE TO INVALID PARMS 01270000
         B     RETURN                                                   01280000
```

Page 1

ATTY. DOCKET NO.: CRKR-0009 PATENT

```
RETURN   DS    OH                                                 01290000
         JDCSUBM EXIT                GO CLOSE DOWN                01300000
         L     R15,DSAMRETC          GET RETURN CODE              01310000
         L     R13,4(R13)            RESTORE CALLERS SAVEAREA ADDR 01320000
*        RETURN (14,12),,RC*(15)     RETURN TO CALLER             01330000
         L     R14,12(R13)           RESTORE RETURN ADDRESS       01340000
         LM    R0,R12,20(R13)        RETORE REST OF CALLERS REGS  01350000
         BSM   0,R14                 AND RETURN TO CALLER         01360000
ASAVAREA DC    A(SAVEAREA,SAVEAREA+4096)                          01370000
         EJECT                                                    01380000
START    JDCRTNM                                                  01390000
         MVC   CPARMS,0(R1)           GET CALLERS PARMS           01400000
         L     R2,CPARM1             GET ADDR OF FIRST PARM       01410000
         MVC   DSAMFUNC(DSAMDSCL),0(R2) GET M100L PARM LIST IN WORK 01420000
         MVC   REASCODE,RCOK         SET REASON CODE TO NO ERROR  01430000
         CLC   DSAMSKID,=CL2'  '     IS SUB-KEY ID = BLANK?  U20027 01432000
         BNE   START010              NO - LEAVE IT ALONE     U20027 01434000
         XC    DSAMSKID,DSAMSKID     SUB KEY ID 0 IS PRIMARY U20027 01436000
START010 DS    OH                                            U20027 01438000
         JDCSUBM INITAR              GO INITIALIZE AR REGISTERS   01440000
         B     STARTY                AND RETURN TO CALLER         01450000
         EJECT                                                    01460000
INIT     JDCRTNM                                                  01470000
         NI    SWITCH,255-NOLOG-OPENIN TURN OFF NO LOGGING FLAG   01480000
         MVC   ERR99RC,ERR99RCA      INIT TO INVALID OPEN MODE    01490000
         CLI   DSAMOPMD,DSAMOPUP     VALID PARM ?                 01500000
         BE    INIT1010              YES..CONTINUE                01510000
         CLI   DSAMOPMD,DSAMOPIN     VALID PARM ?                 01520000
         BNE   INIT9000              NO...QUIT                    01530000
         OI    SWITCH,NOLOG+OPENIN   YES..SO SET NO LOGGING SWITCH 01540000
INIT1010 DS    OH                                                 01550000
         MVC   ERR99RC,ERR99RCB      INIT TO INVALID LOCK ID      01560000
         CLI   DSAMLOCK,DSAMYES      VALID PARM ?                 01570000
         BE    INIT1020              YES..CONTINUE                01580000
         CLI   DSAMLOCK,DSAMNO       VALID PARM ?                 01590000
         BNE   INIT9000              NO...QUIT                    01600000
INIT1020 DS    OH                                                 01610000
         MVC   ERR99RC,ERR99RCD      INIT TO INVALID WAIT SW      01620000
         CLI   DSAMWAIT,DSAMYES      VALID PARM ?                 01630000
         BE    INIT1030              YES..CONTINUE                01640000
         CLI   DSAMWAIT,DSAMNO       VALID PARM ?                 01650000
         BNE   INIT9000              NO...QUIT                    01660000
INIT1030 DS    OH                                                 01670000
         CLC   DSAMICNT,=F'-1'       NO LOGGING SET ?             01680000
         BNE   INIT1040              NO...LEAVE SWITCH ALONE      01690000
         MVC   ERR99RC,ERR99RCR      INIT TO INVALID LOCK SW      01700000
         CLI   DSAMLOCK,DSAMYES      REQUIRES EXCLUSIVE LOCK...OK ? 01710000
         BNE   INIT9000              NO...INVALID PARMS           01720000
         OI    SWITCH,NOLOG          YES..SO SET SWITCH           01730000
INIT1040 DS    OH                                                 01740000
         MVC   DSAM7750,=CL8'DSAM7750' IF MORE THAN 1        U20027 01744990
         JDCALLOM FUNC=INFO,DDNAME=DSAM7750,WORK=MISCWORK,         X01750000
               RETMBR=RETMBRNM,ERROR=DUBL                          01760000
         BNZ   INIT9400              IF ERROR...CAN'T CONTINUE    01770000
         LOAD  EPLOC=DSAM7750        GET NAMES OF EVERYTHING      01780000
         LR    R1,R0                 GET THE ADDRESS              01790000
         MVC   DSPNAME(LEN7750),0(R1) MOVE TO FIELDS IN THIS PGM  01800000
         DELETE EPLOC=DSAM7750       AND GET RID OF IT            01810000
         LOAD  EPLOC=ANKNAME,ERRET=INIT1200  SEE IF ANCHOR PRESENT 01820000
         ST    R0,ANKEP              SAVE THE ANCHOR PROGRAM ADDRESS 01830000
         LR    R1,R0                 GET ADDR OF ANCHOR PROGRAM   01840000
         CLC   0(L'ANKEYE,R1),ANKEYE VALID EYE CATCHER ?          01850000
         BE    INIT1500              YES..CONTINUE                01860000
INIT1200 DS    OH                                                 01870000
         MVC   REASCODE,RCNOTAVL     NO...ANCHOR NOT THERE...EXIT 01880000
         B     INITZ                 AND RETURN TO CALLER         01890000
```

DSAM7710 1-10-97 10:21a

```
INIT1500 DS    OH                                                 01900000
         MVC   DSPALET,L'ANKEYE(R1)    ELSE GET THE ALET          01910000
         MVC   DSPORIGN,L'ANKEYE+L'DSPALET(R1)  AND THE ORIGIN    01920000
         JDCSETAM ,                  SET ACCESS REGISTER MODE     01930000
         MVC   ERR99RC,ERR99RCH      INIT TO INIT DONE            01940000
         TM    SWITCH,INITDONE       INIT ALREADY DONE ?          01950000
         BO    INIT9000              YES..INVALID PARMS           01960000
         OI    SWITCH,INITDONE       INDICATE INIT DONE - TEMPORARILY 01970000
         JDCSUBM TESTDS              GO VALIDATE WAREHOUSE        01980000
         B     INITZ                 NOT THERE...QUIT             01990000
         B     INIT2000              NOT INITIALIZED...CONTINUE   02000000
*                                    IT'S THERE...CONTINUE        02010000
INIT2000 DS    OH                                                 02020000
         MVC   REASCODE,RCOK         SET REASON CODE TO NO ERROR  02030000
         MVC   DSPDFUPD,WHSDFUPD     * SAVE WAREHOUSE FIELDS IN PGM 02040000
         MVC   DSPNDXA,WHSNDXA       *                            02050000
         MVC   DSPNDXL,WHSNDXL       *                            02060000
         MVC   DSPDETA,WHSDETA       *                            02070000
         MVC   DSPRECNT,WHSRECNT     *                            02080000
         MVC   DSPNEXTD,WHSNEXTD     *                            02090000
         MVC   DSPRECLN,WHSRECLN     *                            02100000
         L     R3,DSPRECNT           *                            02110000
         XR    R2,R2                 *                            02120000
         M     R2,DSPRECLN           *                            02130000
         A     R3,DSPDETA            *                            02140000
         ST    R3,DSPDETND           *                            02150000
         MVC   DSPKYPOS,WHSKYPOS     *                            02160000
         MVC   DSPKYLEN,WHSKYLEN     *                            02170000
         MVC   DSPSTATA,WHSSTATA     *                            02180000
         MVC   DSPSTATL,WHSSTATL     *                            02190000
         MVC   DSPTOTSA,WHSTOTSA     *                            02200000
         MVC   DSPTOTSL,WHSTOTSL     *                            02210000
         MVC   DSPFCSIZ,WHSFCSIZ     *                            02220000
         MVC   LOGDSN,WHSLDSN        *                            02230000
         XC    DSPSDEL,DSPSDEL       *                            02240000
         MVO   DSPSDEL(7),WHSSDEL    *                            02250000
         XC    DSPKDEL,DSPKDEL       *                            02260000
         MVO   DSPKDEL(7),WHSKDEL    *                            02270000
         L     R15,DSPRECNT          GET DATA RECORD COUNT        02280000
         XR    R14,R14               CLEAR WORK REG FOR MULTIPLY  02290000
         M     R14,IDRATIO           MULT BY INDEX / DATA RATIO   02300000
         ST    R15,INDEXCNT          AND SAVE IT IN WORK          02310000
         XC    WRKGSRC(WRKLEN),WRKGSRC INITIALIZE STATS WORK FIELDS 02320000
         XC    APTCBAD,APTCBAD       CLEAR APTCB ADDRESS          02330000
         XC    TOTSAD,TOTSAD         CLEAR THE TOTALS ADDRESS     02340000
         TM    CPARM1,X'80'          ONLY ONE PARM ?              02350000
         BO    INIT2500              YES..FORGET OTHER PARMS      02360000
         TM    CPARM2,X'80'          SO MAYBE WE ONLY GOT TWO ?   02370000
         BNO   INIT2200              NO...MUST HAVE ALL THREE     02380000
         L     R2,CPARM2             YES..GET SECOND PARM         02390000
         CLC   TOTALEYE,0(R2)        IS THIS A TOTALS AREA ?      02400000
         BNE   INIT2100              NO...MUST BE AN APTCB        02410000
         MVC   TOTSAD,CPARM2         YES..GET THE TOTALS ADDRESS  02420000
         B     INIT2500              AND CONTINUE                 02430000
INIT2100 DS    OH                                                 02440000
         MVC   APTCBAD,CPARM2        GET THE APTCB ADDRESS        02450000
         B     INIT2500              AND CONTINUE                 02460000
INIT2200 DS    OH                                                 02470000
         MVC   ERR99RC,ERR99RCN      INIT TO INVALID TOTALS       02480000
         L     R2,CPARM2             GET SECOND PARM              02490000
         CLC   TOTALEYE,0(R2)        IS THIS A TOTALS AREA ?      02500000
         BNE   INIT9000              NO...INVALID PARMS           02510000
         MVC   TOTSAD,CPARM2         GET THE TOTALS ADDRESS       02520000
         MVC   APTCBAD,CPARM3        GET THE APTCB ADDRESS        02530000
INIT2500 DS    OH                                                 02540000
         OC    APTCBAD,APTCBAD       DO WE HAVE AN APTCB?    U20027 02541000
```

Page 2

ATTY. DOCKET NO.: CRKR-0009 PATENT

```
         BZ    INIT2510                NO...CONTINUE                 U20027 02542000
         L     R1,APTCBAD              LET'S CHECK IT OUT            U20027 02543000
         CLC   0(7,R1),=C'NOAPTCB'     BATCH CALL?                   U20027 02544000
         BNE   INIT2510                NO...MUST BE CPCS             U20027 02545000
         XC    APTCBAD,APTCBAD         DON'T USE CPCS STUFF          U20027 02546000
INIT2510 DS    0H                                                    U20027 02547000
         OC    DSAMLKID,DSAMLKID       DID CALLER PASS A LOCK ID ?          02550000
         BNZ   INIT2550                YES..GO USE IT                       02560000
         JDCSETPM ,                  SET TO PRIMARY MODE                    02570000
         ENQ   (MAJNAME,MINNAME,E,8,SYSTEMS) THIS IS MY 1/100TH SECOND      02580000
         TIME  DEC                     GET TIME                             02590000
         ST    R0,DSAMLKID             STORE LOCK ID FOR CALLER             02600000
         STIMER WAIT,DINTVL=ONEHUNDR   WAIT 1/100TH OF A SECOND             02610000
         DEQ   (MAJNAME,MINNAME,8,SYSTEMS) AND RELEASE IT                   02620000
         JDCSETAM ,                    SET TO ACCESS REGISTER MODE          02630000
INIT2550 DS    0H                                                           02640000
         XC    BISADDR,BISADDR         CLEAR BEFORE IMAGE STACK ADDR        02650000
         ESTAEX ESTAEXIT,TERM=YES      ESTABLISH ESTAE EXIT                 02660000
         LTR   R15,R15                 ALL OK ?                             02670000
         BNZ   INIT9300                NO...QUIT NOW                        02680000
         L     R6,DSPORIGN             POINT TO WAREHOUSE CONTROL AREA      02690000
         MVC   ADD2LOCK,=F'1'          SET UP TO INCREMENT PENDING LOCK     02700000
         NI    SWITCH,255-WTMSGSNT     TURN OFF WAIT MESSAGE SENT FLAG      02710000
         JDCSUBM LCKCNTL               GO LOCK THE CONTROL AREA             02720000
         MVI   NEWLOCK,C'Y'            INIT NEW LOCK SWITCH                 02730000
         CLI   DSAMLOCK,DSAMYES        EXCLUSIVE LOCK REQUESTED ?           02740000
         BNE   INIT5000                NO...GO GET SHARED LOCK              02750000
INIT3000 DS    0H                                                           02760000
         OC    WHSLKEXC,WHSLKEXC       IS THERE AN EXCLUSIVE LOCK HELD?     02770000
         BZ    INIT3050                NO...GO CHECK FOR SHARED LOCKS       02780000
         MVC   LOCKMSGT,=C'EXCL'       EXCLUSIVE LOCK IS HELD               02790000
         MVC   CURRLOCK,WHSLKEXC       EXCLUSIVE LOCK ID                    02800000
         CLC   WHSLKEXC,DSAMLKID       IS IT OUR LOCK ?                     02810000
         BNE   INIT4000                NO...GO CHECK FOR WAIT               02820000
         MVI   LOCKSW,C'Y'             INDICATE WE LOCKED IT                02830000
         MVI   LOCKSW2,C'Y'            INDICATE SUBSEQUENT LOCK  U20024     02835000
         MVC   CURRLOCK,DSAMLKID       ENSURE OUR ID IN MSG                 02840000
         XC    WHSLKPRM,WHSLKPRM       YES..RELEASE CNTL AREA LK            02850000
         MVI   WHCNTLSW,MYUNLOCK       CLEAR THE PGM LOCK SWITCH            02860000
         JDCSUBM LKDATA                   GO SAVE LOCK INFO                 02870000
         JDCSETPM ,                    SET PRIMARY MODE                     02880000
         JDCSUBM LKMSG                    GO DISPLAY LOCK IDS               02890000
         JDCSETAM ,                    SET ACCESS REGISTER MODE             02900000
         B     INIT3200                ..LOCKS DONE...CONTINUE              02910000
INIT3050 DS    0H                                                           02920000
         MVC   LOCKMSGT,=C'SHRD'       SHARED LOCK                          02930000
         MVC   CURRLOCK,WHSATCNT       SHARED LOCK IS ACTIVE CNT            02940000
         OC    WHSATCNT,WHSATCNT       ANY SHARED LOCKS ?                   02950000
         BNZ   INIT4000                YES..GO CHECK FOR WAIT REQUESTED     02960000
         MVC   WHSLKEXC,DSAMLKID       MOVE LOCK ID TO CONTROL AREA         02970000
         MVC   LOCKMSGT,=C'EXCL'       EXCLUSIVE LOCK IS GOTTEN             02980000
         MVI   LOCKSW,C'Y'             INDICATE WE LOCKED IT                02990000
         MVC   CURRLOCK,DSAMLKID       ENSURE OUR ID IN MSG                 03000000
         JDCSUBM LKDATA                   GO SAVE LOCK INFO                 03010000
         JDCSETPM ,                    SET PRIMARY MODE                     03020000
         JDCSUBM LKMSG                    GO DISPLAY LOCK IDS               03030000
         JDCSETAM ,                    SET ACCESS REGISTER MODE             03040000
         OC    ADD2LOCK,ADD2LOCK       DID WE ADD TO PENDING LOCK COUNT     03050000
         BNZ   INIT3200                NO...SO DONT DECREMENT NOW           03060000
         L     R2,WHSLKPND             YES..GET PENDING EXC LOCK COUNT      03070000
         BCTR  R2,R0                   DECREMENT                            03080000
         ST    R2,WHSLKPND             STORE NEW PENDING EXC LOCK COUNT     03090000
         NI    SWITCH,255-LCKPEND      TURN OFF LCK PENDING FLAG            03100000
INIT3200 DS    0H                                                           03110000
         L     R1,WHSATCNT             GET ACTIVE TASK COUNT                03120000
         LA    R1,1(R1)                INCREMENT IT                         03130000
```

DSAM7710 1-10-97 10:21a

```
         ST    R1,WHSATCNT             SAVE NEW ACTIVE TASK COUNT           03140000
         OI    SWITCH,ACTCNT           SET ACTIVE TASK SWITCH               03150000
         XC    WHSLKPRM,WHSLKPRM       RELEASE CONTROL AREA LOCK            03160000
         MVI   WHCNTLSW,MYUNLOCK       CLEAR THE PGM LOCK SWITCH            03170000
         JDCSUBM TASKMSG                  GO DISPLAY INIT MSG               03180000
         B     INIT6000                AND CONTINUE                         03190000
INIT4000 DS    0H                                                           03200000
         CLI   DSAMWAIT,DSAMYES        WAIT FOR LOCK REQUESTED ?            03210000
         BE    INIT4050                YES..GO SORT IT OUT                  03220000
         XC    WHSLKPRM,WHSLKPRM       NO...RELEASE CONTROL AREA LOCK       03230000
         MVI   WHCNTLSW,MYUNLOCK       CLEAR THE PGM LOCK SWITCH            03240000
         B     INIT9100                AND QUIT NOW                         03250000
INIT4050 DS    0H                                                           03260000
         MVC   SAVLKJOB,WHSLKJOB       INIT OWNER'S PROGRAM NAME            03270000
         MVC   SAVLKTIM,WHSLKTIM       INIT LOCK TIME                       03280000
         MVC   SAVLKSTP,WHSLKSTP       INIT STEP INFO                       03290000
         JDCSUBM WTMSG                 GO SEND WAITING MESSAGE              03300000
         L     R2,WHSLKPND             GET PENDING EXC LOCK COUNT           03310000
         A     R2,ADD2LOCK             INCREMENT - IF NOT ALREDY DONE       03320000
         XC    ADD2LOCK,ADD2LOCK       ENSURE ONLY INCREMENTED ONCE         03330000
         ST    R2,WHSLKPND             STORE NEW PENDING EXC LOCK COUNT     03340000
         OI    SWITCH,LCKPEND          SET LOCK PENDING SET FLAG            03350000
         XC    WHSLKPRM,WHSLKPRM       AND RELEASE CONTROL AREA LOCK        03360000
         MVI   WHCNTLSW,MYUNLOCK       CLEAR THE PGM LOCK SWITCH            03370000
         JDCSETPM ,                    SET TO PRIMARY MODE                  03380000
         STIMER WAIT,DINTVL=LOCKWAIT   WAIT A WHILE                         03390000
         JDCSETAM ,                    SET TO ACCESS REGISTER MODE          03400000
         JDCSUBM LCKCNTL               GO LOCK THE CONTROL AREA             03410000
         JDCSUBM TESTDS                GO VALIDATE WAREHOUSE                03420000
         B     INITZ                   NOT THERE...QUIT                     03430000
         B     INITZ                   NOT INITIALIZED...QUIT               03440000
*                                      IT'S THERE...CONTINUE                03450000
         MVC   WAITSTAT,=C' STILL WAITING FOR ' UPDATE WAIT MSG             03460000
         CLC   LOCKMSGT,=C'EXCL'       EXCL LOCK SET?                       03470000
         BNE   INIT4060                NO.. MUST BE SHARED                  03480000
         CLC   CURRLOCK,WHSLKEXC       SAME LOCK?                           03490000
         BE    INIT4070                YES.. THEN KEEP WAITING              03500000
         MVI   NEWLOCK,C'Y'            NO.. INDICATE CHANGE                 03510000
         B     INIT4080                AND RE-ISSUE MESSAGES                03520000
INIT4060 DS    0H                                                           03530000
         CLC   CURRLOCK,WHSATCNT       SAME LOCK?                           03540000
         BE    INIT4070                YES.. THEN KEEP WAITING              03550000
         MVI   NEWLOCK,C'Y'            NO.. INDICATE CHANGE                 03560000
         B     INIT4080                AND RE-ISSUE MESSAGES                03570000
INIT4070 DS    0H                                                           03580000
         L     R1,WAITCNT              GET WAIT LOOP COUNTER                03590000
         LA    R1,1(R1)                INCREMENT IT                         03600000
         ST    R1,WAITCNT              SAVE NEW LOOP COUNT                  03610000
         C     R1,WAITMAX              WAITED LONG ENOUGH?                  03620000
         BNH   INIT4090                NOT YET                              03630000
INIT4080 DS    0H                                                           03640000
         NI    SWITCH,255-WTMSGSNT     TURN OFF WAIT MSG SENT               03650000
         XC    WAITCNT,WAITCNT         CLEAR LOOP COUNT                     03660000
INIT4090 DS    0H                                                           03670000
         B     INIT3000                AND GO TRY AGAIN                     03680000
INIT5000 DS    0H                                                           03690000
         MVC   CURRLOCK,WHSLKEXC       EXCLUSIVE LOCK ID                    03700000
         OC    WHSLKEXC,WHSLKEXC       IS THERE AN EXCLUSIVE LOCK HELD?     03710000
         BNZ   INIT5100                YES..GO CHECK IF WE NEED TO WAIT     03720000
         OC    WHSLKPND,WHSLKPND       ANY PENDING EXCLUSIVE LOCKS ?        03730000
         BNZ   INIT5100                YES..GO CHECK IF WE NEED TO WAIT     03740000
         L     R1,WHSATCNT             NO..GET ACTIVE TASK COUNT            03750000
         LA    R1,1(R1)                INCREMENT IT                         03760000
         ST    R1,WHSATCNT             SAVE NEW ACTIVE TASK COUNT           03770000
         OI    SWITCH,ACTCNT           SET ACTIVE TASK SWITCH               03780000
         XC    WHSLKPRM,WHSLKPRM       RELEASE CONTROL AREA LOCK            03790000
```

Page 3

ATTY. DOCKET NO.: CRKR-0009 PATENT

```
         MVI   WHCNTLSW,MYUNLOCK       CLEAR THE PGM LOCK SWITCH          03800000
         JDCSUBM TASKMSG                  GO DISPLAY INIT MSG             03810000
         B     INIT6000                AND CONTINUE                       03820000
INIT5100 DS    0H                                                         03830000
         MVC   SAVLKJOB,WHSLKJOB       INIT OWNER'S PROGRAM NAME          03840000
         MVC   SAVLKTIM,WHSLKTIM       INIT LOCK TIME                     03850000
         MVC   SAVLKSTP,WHSLKSTP       INIT STEP INFO                     03860000
         JDCSUBM WTMSG                 GO SEND WAITING MESSAGE            03870000
         XC    WHSLKPRM,WHSLKPRM       AND RELEASE CONTROL AREA LOCK      03880000
         MVI   WHCNTLSW,MYUNLOCK       CLEAR THE PGM LOCK SWITCH          03890000
         JDCSETPM ,                    SET TO PRIMARY MODE                03900000
         STIMER WAIT,DINTVL=LOCKWAIT   WAIT A WHILE                       03910000
         JDCSETAM ,                    SET TO ACCESS REGISTER MODE        03920000
         JDCSUBM LCKCNTL               GO LOCK THE CONTROL AREA           03930000
         JDCSUBM TESTDS                GO VALIDATE WAREHOUSE              03940000
         B     INITZ                   NOT THERE...QUIT                   03950000
         B     INITZ                   NOT INITIALIZED...QUIT             03960000
*                                      IT'S THERE...CONTINUE              03970000
         MVC   WAITSTAT,=C' STILL WAITING FOR ' UPDATE WAIT MSG           03980000
         CLC   CURRLOCK,WHSLKEXC       SAME LOCK?                         03990000
         BE    INIT5200                YES.. THEN KEEP WAITING            04000000
         MVI   NEWLOCK,C'Y'            NO.. INDICATE CHANGE               04010000
         B     INIT5300                AND RE-ISSUE MESSAGES              04020000
INIT5200 DS    0H                                                         04030000
         L     R1,WAITCNT              GET WAIT LOOP COUNTER              04040000
         LA    R1,1(R1)                INCREMENT IT                       04050000
         ST    R1,WAITCNT              SAVE NEW LOOP COUNT                04060000
         C     R1,WAITMAX              WAITED LONG ENOUGH?                04070000
         BNH   INIT5400                NOT YET                            04080000
INIT5300 DS    0H                                                         04090000
         NI    SWITCH,255-WTMSGSNT     TURN OFF WAIT MSG SENT             04100000
         XC    WAITCNT,WAITCNT         CLEAR LOOP COUNT                   04110000
INIT5400 DS    0H                                                         04120000
         B     INIT5000                AND GO TRY AGAIN                   04130000
INIT6000 DS    0H                                                         04140000
         TM    SWITCH,NOLOG            ANY LOGGING TODAY ?                04150000
         BO    INIT6550                NO...SO SKIP GETMAIN               04160000
         ICM   R3,15,DSAMICNT          DID CALLER PASS AN ITEM COUNT ?    04170000
         BNZ   INIT6500                YES..SO GO USE IT                  04180000
         L     R3,DSPDFUPD             NO...SO USE DEFAULT VALUE          04190000
INIT6500 DS    0H                                                         04200000
         XR    R2,R2                   CLEAR WORK REG FOR MULTIPLY        04210000
         M     R2,WHSRECLN             GET SIZE FOR BEFORE IMAGE STACK    04220000
         A     R3,DSPTOTSL             ADD IN AREA FOR TOTALS             04230000
         LA    R3,10(R3)               ADD IN SIZE FOR TOTS EYECATCHER    04240000
         A     R3,DSPRECLN             ADD IN ENOUGH FOR ONE EXTRA REC    04250000
         ST    R3,BISLEN               STORE LENGTH OF BEFORE IMAGE STK   04260000
         JDCSETPM ,                    SET TO PRIMARY MODE                04270000
         GETMAIN RC,LV=(R3),SP=2,LOC=ANY  AND GETMAIN ABOVE THE LINE      04280000
         LTR   R15,R15                 ALL OK ?                           04290000
         BNZ   INIT9200                NO...QUIT                          04300000
         ST    R1,BISADDR              SAVE ADDRESS                       04310000
         ST    R1,BISNEXT              SAVE NEXT REC SLOT                 04320000
         AR    R1,R3                   GET ADDR OF END OF BIS             04330000
         S     R1,DSPRECLN             SUB OUT SIZE OF EXTRA RECORD       04340000
         ST    R1,BISEND               SAVE END OF BIS ADDR               04350000
         L     R2,BISADDR              GET START ADDRESS                  04360000
         LA    R15,0                   SET UP TO CLEAR BIS                04370000
         MVCL  R2,R14                  AND SET BIS TO LOW VALUES          04380000
INIT6550 DS    0H                                                         04390000
         L     R2,DSPFCSIZ             GET SIZE OF FAILED COMMIT LIST     04400000
         SLL   R2,2                    MULTIPLY BY 4 - SIZE OF EACH F/W   04410000
         LA    R2,WHSDSCTL(R2)         ADD IN SIZE OF CONTROL AREA        04420000
         C     R2,DSPRECLN             LARGE ENOUGH FOR DETAIL RECS ?     04430000
         BNL   INIT6600                YES..USE AS IS                     04440000
         L     R2,DSPRECLN             NO...GET DETAIL RECORD LENGTH      04450000
```

DSAM7710 1-10-97 10:21a

```
INIT6600 DS    0H                                                         04460000
         JDCSETPM ,                    SET TO PRIMARY MODE                04470000
         GETMAIN RC,LV=(R2),SP=2,LOC=BELOW  GETMAIN I/O AREA              04480000
         LTR   R15,R15                 ALL OK ?                           04490000
         BNZ   INIT9200                NO...QUIT                          04500000
         ST    R1,IOAREA               YES..SAVE IOAREA ADDR              04510000
         ST    R2,IOAREALN             AND AREA LENGTH                    04520000
INIT7000 DS    0H                                                         04530000
         JDCSETAM ,                    SET TO ACCESS REGISTER MODE        04540000
         OC    TOTSAD,TOTSAD           DOES CALLER WANT TOTALS AREA ?     04550000
         BZ    INIT8100                NO...GET OUT                       04560000
         L     R6,DSPTOTSA             YES..GET THE TOTALS AREA ADDRESS   04570000
         L     R7,WHSTOTSL             GET THE LENGTH OF TOTALS AREA      04580000
         L     R8,TOTSAD               GET THE CALLERS TOTALS AREA        04590000
         LA    R8,10(R8)               POINT PAST CALLERS EYECATCHER      04600000
         LR    R9,R7                   SET THE LENGTH                     04610000
         MVCL  R8,R6                   AND MOVE TO CALLERS AREA           04620000
INIT8100 DS    0H                                                         04630000
         OI    SWITCH,INITDONE         INDICATE INITIALIZE ALL DONE       04640000
         OC    SKLENO(SKLENGTH),SKLENO SUB-KEYS IN USE?            U20027 04642000
         BZ    INITZ                   NO, THATS OK                U20027 04644000
         LA    R0,16                   THERE ARE SUBKEYS           U20027 04646000
         STH   R0,RSVDLTH              USING 16 BYTE RSVD AREA     U20027 04648000
         B     INITZ                   AND RETURN TO CALLER               04650000
INIT9000 DS    0H                                                         04660000
         MVC   REASCODE,RCINVPRM       SET INVALID PARMS                  04670000
         B     INIT9990                AND QUIT                           04680000
INIT9100 DS    0H                                                         04690000
         JDCSETPM ,                    SET PRIMARY MODE                   04700000
         JDCSUBM LKMSG                    GO DISPLAY LOCK IDS             04710000
         JDCSETAM ,                    SET ACCESS REGISTER MODE           04720000
         MVC   REASCODE,RCWHLOCK       SET WAREHOUSE LOCKED - NO WAIT     04730000
         B     INIT9990                AND QUIT                           04740000
INIT9200 DS    0H                                                         04750000
         MVC   REASCODE,RCGMFAIL       SET GETMAIN FAILURE                04760000
         B     INIT9990                AND QUIT                           04770000
INIT9300 DS    0H                                                         04780000
         MVC   REASCODE,RCESTAFL       SET ESTAE FAILURE                  04790000
         B     INIT9990                AND QUIT                           04800000
INIT9400 DS    0H                                                         04810000
         MVC   REASCODE,RCNO7750       SET CONTROL TABLE ERROR            04820000
         MVI   DUBL+4,X'0F'            SET SIGN BYTE X'0F'                04830000
         UNPK  MISCWORK(9),DUBL(5)     UNPACK RETURN CODE                 04840000
         TR    MISCWORK(8),HEXTABLE    CONVERT IT TO DISPLAY HEX          04850000
         MVC   ERR97RC,MISCWORK        MOVE IT TO MESSAGE                 04860000
         B     INIT9990                AND QUIT                           04870000
INIT9990 DS    0H                                                         04880000
         ESTAEX 0                      ERROR...SO CLEAR ESTAE EXIT        04890000
         NI    SWITCH,255-INITDONE     INDICATE INITIALIZE NOT DONE       04900000
         TM    SWITCH,ACTCNT           ACTIVE TASK INCR'D ?        U20024 04900400
         BNO   INITZ                   NO, SKIP DECREMENT          U20024 04900800
         JDCSETAM ,                    SET TO ACCESS REGISTER MD   U20024 04901200
         L     R6,DSPORIGN             GET CONTROL AREA ADDRESS    U20024 04901600
         JDCSUBM LCKCNTL               GO LOCK THE CONTROL AREA    U20024 04902000
         L     R2,WHSATCNT             GET ACTIVE TASK COUNT       U20024 04902400
         BCTR  R2,R0                   DECREMENT IT                U20024 04902800
         ST    R2,WHSATCNT             STORE NEW ACTIVE TSK CNT    U20024 04903200
         NI    SWITCH,255-ACTCNT       TURN OFF ACTIVE TASK FLAG   U20024 04903600
         CLI   LOCKSW,C'Y'             GOT THE EXCLUSIVE LOCK ?    U20024 04904000
         BNE   INIT9995                NO...LEAVE IT ALONE         U20024 04904400
         CLI   LOCKSW2,C'Y'            WAS LOCK ALREADY THERE?     U20024 04904800
         BE    INIT9995                YES..LEAVE IT ALONE         U20024 04905200
         XC    WHSLKEXC,WHSLKEXC       RELEASE EXCLUSIVE LOCK      U20024 04905600
         MVI   UNLOCKSW,C'Y'           INDICATE WE UNLOCKED IT     U20024 04906000
         MVC   WHSLKJOB,SPACES         CLEAR PROGRAM ID            U20024 04906400
         MVC   WHSLKSTP,SPACES         CLEAR STEP INFO             U20024 04906800
```

Page 4

```
         MVC   WHSLKTIM,SPACES          CLEAR TIME LOCKED         U20024 04907200
INIT9995 DS    OH                                                 U20024 04907600
         XC    WHSLKPRM,WHSLKPRM        RELEASE CONTROL AREA LOCK U20024 04908000
         MVI   WHCNTLSW,MYUNLOCK        CLEAR THE PGM LOCK SWITCH U20024 04908400
         B     INITZ                    AND QUIT                         04910000
         EJECT                                                           04920000
READ     JDCRTNM                                                         04930000
         TIME  MIC,STATTIME             GET THE TIME                     04940000
         JDCSETAM ,                     SET ACCESS REGISTER MODE         04950000
         JDCSUBM TESTDS                 GO VALIDATE WAREHOUSE            04960000
         B     READ9900                 NOT THERE...QUIT                 04970000
         B     READ9900                 NOT INITIALIZED YET...ERROR      04980000
         MVC   ERR99RC,ERR99RCD         INIT TO INVALID WAIT SW          05000000
         CLI   DSAMWAIT,DSAMYES         VALID PARM ?                     05010000
         BE    READ1010                 YES..CONTINUE                    05020000
         CLI   DSAMWAIT,DSAMNO          VALID PARM ?                     05030000
         BNE   READ9000                 NO...QUIT                        05040000
READ1010 DS    OH                                                        05050000
         MVC   ERR99RC,ERR99RCG         INIT TO INVALID UPDATE           05060000
         CLI   DSAMUPDT,DSAMNO          VALID PARM ?                     05070000
         BE    READ1020                 YES..CONTINUE                    05080000
         CLI   DSAMUPDT,DSAMYES         VALID PARM ?                     05090000
         BNE   READ9000                 NO...QUIT                        05100000
         MVC   ERR99RC,ERR99RCO         INIT TO INVALID UPDATE           05110000
         CLI   DSAMOPMD,DSAMOPUP        UPDATE REQ...OPENED FOR UPDATE ? 05120000
         BNE   READ9000                 NO...QUIT                        05130000
READ1020 DS    OH                                                        05140000
         MVC   ERR99RC,ERR99RCF         INIT TO INVALID READ MD          05150000
         CLI   DSAMRDMD,DSAMRDIR        VALID PARM ?                     05160000
         BE    READ2000                 YES..CONTINUE                    05170000
         CLI   DSAMRDMD,DSAMSKRD        VALID PARM ?              U20027 05173000
         BE    READ1100                 YES..CONTINUE             U20027 05176000
         CLI   DSAMRDMD,DSAMRSEQ        VALID PARM ?                     05180000
         BNE   READ9000                 NO..QUIT                  U20027 05190000
READ1100 DS    OH                                                        05200000
         OC    DSPSDEL,DSPSDEL          ANY DELAY REQUESTED ?            05210000
         BZ    READ1200                 NO...SKIP STIMER WAIT            05220000
         JDCSETPM ,                     SET PRIMARY MODE                 05230000
         STIMER WAIT,MICVL=DSPSDEL      YES..SO WAIT FOR REQUESTED TIME  05240000
         JDCSETAM ,                     SET ACCESS REGISTER MODE         05250000
READ1200 DS    OH                                                        05260000
         L     R7,DSPRECLN              GET THE RECORD LENGTH     U20027 05270000
         SH    R7,RSVDLTH               DECREMENT FOR EXECUTE     U20027 05280000
         ICM   R6,15,DSAMRCAD           GET THE RECORD ADDRESS           05290000
         BNZ   READ1400                 NOT AT START...GO INCREMENT      05300000
         L     R6,DSPDETA               ELSE GET THE DETAIL DATA ADDRESS 05310000
         B     READ1500                 AND SKIP THE INCREMENT           05320000
READ1400 DS    OH                                                        05330000
         CLI   DSAMRDMD,DSAMSKRD        REQUEST FOR CHAIN RECORD? U20027 05333000
         BE    READ1610                 YES,.CONTINUE             U20027 05336000
         A     R6,DSPRECLN              ELSE POINT TO NEXT RECORD        05340000
READ1500 DS    OH                                                        05350000
         L     R15,WRKSRP               GET STAT COUNT                   05360000
         LA    R15,1(R15)               INCREMENT IT                     05370000
         ST    R15,WRKSRP               AND SAVE NEW COUNT               05380000
         LR    R5,R6                    GET CURRENT POINTER IN WORK      05390000
         L     R6,DSPORIGN              POINT TO CONTROL AREA            05400000
         C     R5,WHSNEXTD              END OF DATA ?                    05410000
         BE    READ9500                 YES...EOF EXIT                   05420000
         LR    R6,R5                    RESTORE CURRENT POINTER FROM WRK 05430000
         CLC   KDELETED,0(R6)           DELETED RECORD ?                 05440000
         BE    READ1400                 YES..GO LOOK FOR NEXT RECORD     05450000
         AH    R6,RSVDLTH               INDEX TO DATA             U20027 05452000
         SLR   R14,R14                  SET COMPARE ADDRESS ZERO  U20027 05454000
         SLR   R15,R15                  AND LTH ZERO              U20027 05456000
         CLCL  R6,R14                   EMPTY RECORD?             U20027 05458000
```

DSAM7710 1-10-97 10:21a

```
         LR    R6,R5                    START OF RECORD           U20027 05460000
         BNE   READ3000                 NOT EMPTY - PROCESS       U20027 05462000
         L     R7,DSPRECLN              RESTORE LENGTH            U20027 05464000
         SH    R7,RSVDLTH               LESS RESERVED             U20027 05466000
         B     READ1400                 EMPTY, TRY NEXT           U20027 05468000
READ1600 DS    OH                                                 U20027 05470000
         CLC   12(1,R6),DSAMSKID+1      THIS A SUBKEY MATCH?      U20027 05472000
         BE    READ3000                 YES, CONTINUE             U20027 05474000
READ1610 DS    OH                                                 U20027 05476000
         ICM   R6,15,4(R6)              NEXT ON CHAIN             U20027 05478000
         BZ    READ9500                 NONE, TREAT LIKE EOF      U20027 05480000
         CLC   KDELETED,0(R6)           DELETED?                  U20027 05482000
         BE    READ1610                 YES, GET NEXT             U20027 05484000
         B     READ1600                                           U20027 05486000
READ2000 DS    OH                                                        05500000
         JDCSETPM ,                     SET PRIMARY MODE                 05510000
         OC    DSPKDEL,DSPKDEL          ANY DELAY REQUESTED ?            05520000
         BZ    READ2200                 NO...SKIP STIMER WAIT            05530000
         STIMER WAIT,MICVL=DSPKDEL      YES..SO WAIT FOR REQUESTED TIME  05540000
READ2200 DS    OH                                                        05550000
         L     R2,CPARM2                GET ADDRESS OF CALLERS RECORD    05560000
         A     R2,DSPKYPOS              ADD OFSET TO KEY                 05570000
         ST    R2,DUBL                  SAVE CALLERS KEY ADDRESS         05580000
         CALL  DSAM7720,((R2),DSPKYLEN,INDEXCNT,RECSLOT),VL              05590000
         JDCSETAM ,                     SET ACCESS REGISTER MODE         05600000
         L     R6,RECSLOT               GET RETURNED RECORD SLOT         05610000
         SLL   R6,2                     MULIPLY BY INDEX SIZE            05620000
         A     R6,DSPNDXA               POINT TO SLOT IN INDEX           05630000
         L     R6,0(,R6)                GET POINTER TO DATA AREA         05640000
READ2500 DS    OH                                                        05650000
         L     R15,WRKKRP               GET STAT COUNT                   05660000
         LA    R15,1(R15)               INCREMENT IT                     05670000
         ST    R15,WRKKRP               AND SAVE NEW COUNT               05680000
         LTR   R6,R6                    GOT A RECORD ADDRESS ?           05690000
         BZ    READ9100                 EMPTY SLOT..TAKE ERROR EXIT      05700000
         CLC   KDELETED,0(R6)           DELETED RECORD ?                 05710000
         BE    READ2550                 YES..THEN KEEP LOOKING           05720000
         A     R6,DSPKYPOS              ADD OFSET TO KEY                 05730000
         L     R2,DSPKYLEN              GET THE KEY LENGTH               05740000
         BCTR  R2,R0                    DECREMENT FOR EXECUTE            05750000
         L     R3,DUBL                  GET CALLERS KEY ADDRESS          05760000
         EX    R2,READ2599              ARE THE KEYS EQUAL ?             05770000
         BNE   READ2540                 NO...KEEP CHECKING               05780000
         S     R6,DSPKYPOS              YES..SUB OFSET OF KEY            05790000
         B     READ2600                 GOT IT..GO CHECK SUB-KEYS U20027 05800000
         SPACE                                                           05810000
READ2540 DS    OH                                                        05820000
         S     R6,DSPKYPOS              SUB OFSET OF KEY                 05830000
READ2550 DS    OH                                                        05840000
         L     R6,4(,R6)                LOAD CHAIN POINTER TO NEXT REC   05850000
         B     READ2500                 AND GO ROUND TILL DONE           05860000
READ2599 CLC   0(0,R3),0(R6)            EXECUTED INSTRUCTION             05870000
         SPACE 3                                                         05880000
READ2600 DS    OH                                                 U20027 05880300
         CLI   RSVDLTH+1,12             SUB-KEYS ALLOWED?         U20027 05880600
         BE    READ3000                 NO, PRIMARY FOUND         U20027 05880900
         CLC   DSAMSKID+1(1),12(R6)     ID'S MATCH?               U20027 05881200
         BNE   READ2550                 NO -CHASE SYNONYM CHAIN   U20027 05881500
*    SAME ID FIELD, NOW IS IT THE SAME KEY?                       U20027 05881800
         SLR   R1,R1                    CLEAR WORK REGISTER       U20027 05882100
         IC    R1,DSAMSKID+1            INDEX IS THE SUB-KEY ID   U20027 05882400
         CLI   DSAMSKID+1,10            VALID ID?                 U20027 05882700
         BH    READ9000                 NO                        U20027 05883000
         BCTR  R1,0                     MAKE RELATIVE             U20027 05883300
         SLL   R1,2                     MAKE INTO INDEX           U20027 05883600
         LH    R0,SKPOSO(R1)            OFFSET TO SUB-KEY         U20027 05883900
```

ATTY. DOCKET No.: CRKR-0009

PATENT

```
         AR    R6,R0                  ADDR. DSPCE SUB-KEY       U20027 05884200
         L     R3,CPARM2              ADDR. CALLER'S RECORD     U20027 05884500
         AR    R3,R0                  ADDR. CALLER'S SUB-KEY    U20027 05884800
         LH    R2,SKLENO(R1)          LENGTH OF SUB-KEY         U20027 05885100
         BCTR  R2,0                   RELATIVE                  U20027 05885400
*  LOW-VALUE SECONDARY KEY MEANS HE WANTS THE FIRST ONE         U20027 05885700
         EX    R2,READ2659            1ST CHECK IF WANTS START  U20027 05886000
         BZ    READ2655               YES                       U20027 05886300
         EX    R2,READ2599            ARE THE EQUAL?            U20027 05886600
         BNE   READ2650               NO, TRY NEXT              U20027 05886900
READ2655 DS    0H                                               U20027 05887200
         SR    R6,R0                  BACK UP TO START OF RECORDU20027 05887500
         B     READ3000               MATCH FOUND               U20027 05887800
READ2659 DC    0(1,R3),0(R3)          TEST FOR LOW-VALUE        U20027 05888100
READ2650 DS    0H                                               U20027 05888400
         SR    R6,R0                  BACK UP TO START OF RECORDU20027 05888700
         B     READ2550               TRY NEXT                  U20027 05889000
*   YES THE RECORD MATCHES BY PRIMARY AND SUB-KEY (ID)          U20027 05889300
READ3000 DS    0H                                                      05890000
         ST    R6,HOLDADDR            SAVE THE RECORD ADDRESS   U20027 05895000
         CLI   DSAMUPDT,DSAMYES       IS THIS A READ FOR UPDATE ?      05900000
         BNE   READ5000               NO...GO GET THE RECORD           05910000
         NI    SWITCH,255-WTMSGSNT    TURN OFF WAIT MSG SENT SWITCH    05920000
         MVC   ADD2LOCK,=F'1'         SET UP TO ADD 1 TO WAITING COUNT 05940000
READ3500 DS    0H                                                      05950000
         LA    R2,0                   SET LOCK COMPARE VALUE           05960000
         L     R3,DSAMLKID            GET CALLERS LOCK ID              05970000
         L     R6,HOLDADDR            LOAD THE RECORD ADDRESS          05980000
         CS    R2,R3,0(R6)            TRY AND LOCK THE RECORD          05990000
         BE    READ3800               GOT THE LOCK...GO COPY TO BIS    06000000
         C     R2,DSAMLKID            IS IT OUR LOCK ?                 06010000
         BE    READ3800               YES..GO COPY TO BIS              06020000
         CLI   DSAMWAIT,DSAMYES       CANT GET LOCK...WAIT REQUESTED ? 06030000
         BNE   READ9200               NO...QUIT NOW                    06040000
         JDCSUBM WTMSG                GO SEND WAITING MESSAGE          06050000
         JDCSUBM LCKCNTL              GO LOCK THE CONTROL AREA         06060000
         L     R2,WHSWTCNT            GET WAITING COUNT                06070000
         A     R2,ADD2LOCK            INCREMENT IT                     06080000
         ST    R2,WHSWTCNT            STORE NEW WAITING COUNT          06090000
         XC    ADD2LOCK,ADD2LOCK      ENSURE WAIT COUNT ADDED ONCE     06100000
         XC    WHSLKPRM,WHSLKPRM      RELEASE CONTROL AREA LOCK        06110000
         MVI   WHCNTLSW,MYUNLOCK      CLEAR THE PGM LOCK SWITCH        06120000
         CLC   WHSWTCNT,WHSATCNT      ACTIVE = WAITING ?               06130000
         BE    READ9300               YES...DEADLOCK...GO FLUSH IT     06140000
         JDCSETPM ,                   SET TO PRIMARY MODE              06150000
         STIMER WAIT,DINTVL=LOCKWAIT  WAIT FOR A WHILE                 06160000
         JDCSETAM ,                   SET TO ACCESS REGISTER MODE      06170000
         JDCSUBM TESTDS               GO VALIDATE WAREHOUSE            06180000
         B     READ9900               NOT THERE...QUIT                 06190000
         B     READ9900               NOT INITIALIZED YET...ERROR      06200000
*                                     IT'S THERE...CONTINUE            06210000
         B     READ3500               AND GO ROUND AGAIN               06220000
READ3800 DS    0H                                                      06230000
         OC    ADD2LOCK,ADD2LOCK      DID WE ADD TO WAITING COUNT ?    06240000
         BNZ   READ4000               NO...SO DONT DECREMENT IT        06250000
         JDCSUBM LCKCNTL              GO LOCK THE CONTROL AREA         06260000
         L     R2,WHSWTCNT            GET WAITING COUNT                06270000
         BCTR  R2,R0                  DECREMENT IT                     06280000
         ST    R2,WHSWTCNT            STORE NEW WAITING COUNT          06290000
         XC    WHSLKPRM,WHSLKPRM      AND RELEASE CONTROL AREA LOCK    06300000
         MVI   WHCNTLSW,MYUNLOCK      CLEAR THE PGM LOCK SWITCH        06310000
READ4000 DS    0H                                                      06330000
         L     R6,HOLDADDR            LOAD THE RECORD ADDRESS   U20027 06335000
         TM    SWITCH,NOLOG           LOGGING THESE UPDATES ?          06340000
         BO    READ5000               NO...SKIP MOVE TO BIS            06350000
         CLC   BISNEXT,BISEND         BIS FULL ?                       06360000
```

DSAM7710 1-10-97 10:21a

```
         BNL   READ9400               YES..QUIT                        06370000
         L     R2,BISNEXT             GET ADDR OF NEXT BIS SLOT        06380000
         L     R3,DSPRECLN            GET THE RECORD LENGTH            06390000
         LR    R7,R3                  SET FOR LONG MOVE         U20027 06400000
         MVCL  R2,R6                  MOVE THE RECORD TO THE BISU20027 06410000
         L     R6,HOLDADDR            RESTORE RECORD ADDR       U20027 06420000
         L     R1,BISNEXT             THIS BIS POINTER          U20027 06430000
         ST    R2,BISNEXT             STORE NEW NEXT SLOT POINTER      06440000
         ST    R6,0(R1)               STORE REC ADDR IN BIS     U20027 06445000
READ5000 DS    0H                                                      06450000
         L     R2,CPARM2              GET ADDRESS OF CALLERS RECORD    06460000
         L     R3,DSPRECLN            GET THE RECORD LENGTH            06470000
         LR    R7,R3                  IN BOTH REGS              U20027 06476000
READ5020 DS    0H                                               U20027 06482000
         MVCL  R2,R6                  MOVE THE RECORD TO CALLER U20027 06488000
         L     R6,HOLDADDR            BACK TO START OF RECORD   U20027 06494000
         ST    R6,DSAMRCAD            STORE THE RECORD ADDR FOR CALLER 06500000
READ5050 DS    0H                                                      06530000
         JDCSUBM TIMER                GO GET TIME DELAY                06540000
         CLI   DSAMRDMD,DSAMRDIR      KEYED READ ?                     06550000
         BE    READ5060               YES..GO ADD TO KEYED TOTALS      06560000
         A     R1,WRKGSRT             ADD IN PREVIOUS                  06570000
         ST    R1,WRKGSRT             AND STORE IT BACK                06580000
         L     R15,WRKGSRC            GET CURRENT COUNT                06590000
         LA    R15,1(R15)             INCREMENT IT                     06600000
         ST    R15,WRKGSRC            AND SAVE IT BACK                 06610000
         B     READZ                  TAKE NO ERROR EXIT               06620000
READ5060 DS    0H                                                      06630000
         A     R1,WRKGKRT             ADD IN PREVIOUS                  06640000
         ST    R1,WRKGKRT             AND STORE IT BACK                06650000
         L     R15,WRKGKRC            GET CURRENT COUNT                06660000
         LA    R15,1(R15)             INCREMENT IT                     06670000
         ST    R15,WRKGKRC            AND SAVE IT BACK                 06680000
         B     READZ                  TAKE NO ERROR EXIT               06690000
READ9000 DS    0H                                                      06700000
         MVC   REASCODE,RCINVPRM      SET INVALID PARMS                06710000
         B     READ9900               TAKE ERROR EXIT                  06720000
READ9100 DS    0H                                                      06730000
         MVC   REASCODE,RCNDTFND      SET RECORD NOT FOUND             06740000
         CPYA  AR5,AR15               RESET DATA SPACE INDEX BASE      06750000
         L     R15,WRKFRC             GET CURRENT COUNT                06760000
         LA    R15,1(R15)             INCREMENT IT                     06770000
         ST    R15,WRKFRC             AND SAVE IT BACK                 06780000
         JDCSUBM TIMER                GO GET TIME DELAY                06790000
         A     R1,WRKFRT              ADD IN PREVIOUS                  06800000
         ST    R1,WRKFRT              AND STORE IT BACK                06810000
         B     READ9900               TAKE ERROR EXIT                  06820000
READ9200 DS    0H                                                      06830000
         MVC   REASCODE,RCRECLOK      SET RECORD LOCKED                06840000
         B     READ9900               TAKE ERROR EXIT                  06850000
READ9300 DS    0H                                                      06860000
         MVC   REASCODE,RCDEDLOK      SET DEADLOCK OCCURRED            06870000
         B     READ9900               TAKE ERROR EXIT                  06880000
READ9400 DS    0H                                                      06890000
         MVC   REASCODE,RCBISFUL      SET BIS FULL                     06900000
         B     READ9900               TAKE ERROR EXIT                  06910000
READ9500 DS    0H                                                      06920000
         MVC   REASCODE,RCEOF         SET EOF                          06930000
         B     READ9900               TAKE ERROR EXIT                  06940000
READ9900 DS    0H                                                      06950000
         B     READZ                  TAKE ERROR EXIT                  06960000
         EJECT                                                         06970000
WRIT     JDCRTNM                                                       06980000
         TIME  MIC,STRTTIME           GET THE TIME                     06990000
         JDCSETAM ,                   SET ACCESS REGISTER MODE         07000000
         JDCSUBM TESTDS               GO VALIDATE WAREHOUSE            07010000
```

Page 6

ATTY. DOCKET NO.: CRKR-0009 PATENT

```
         B     WRIT9900                NOT THERE...QUIT                    07020000
         B     WRIT9900                NOT INITIALIZED YET...ERROR         07030000
         MVC   ERR99RC,ERR99RCG        INIT TO INVALID UPDATE              07050000
         CLI   DSAMUPDT,DSAMYES        VALID PARM ?                        07060000
         BE    WRIT4000                YES..GO SORT IT OUT                 07070000
         CLI   DSAMUPDT,DSAMNO         VALID PARM ?                        07080000
         BNE   WRIT9000                NO...QUIT                           07090000
WRIT1010 DS    0H                                                          07100000
         JDCSETPM ,                    SET PRIMARY MODE                    07110000
         OC    DSPSDEL,DSPSDEL         ANY DELAY REQUESTED ?               07120000
         BZ    WRIT1500                NO...SKIP STIMER WAIT               07130000
         STIMER WAIT,MICVL=DSPSDEL     YES..SO WAIT FOR REQUESTED TIME     07140000
WRIT1500 DS    0H                                                          07150000
         L     R2,CPARM2               GET ADDRESS OF CALLERS RECORD       07160000
         A     R2,DSPKYPOS             ADD OFSET TO KEY                    07170000
         ST    R2,DUBL                 SAVE CALLERS KEY ADDRESS            07180000
         CALL  DSAM7720,((R2),DSPKYLEN,INDEXCNT,RECSLOT),VL                07190000
         JDCSETAM ,                    SET ACCESS REGISTER MODE            07200000
         CPYA  AR5,AR6                 SET DATA SPACE INDEX BASE           07210000
         L     R5,RECSLOT              GET RETURNED RECORD SLOT            07220000
         SLL   R5,2                    MULIPLY BY INDEX SIZE               07230000
         A     R5,DSPNDXA              POINT TO SLOT IN INDEX              07240000
         XC    DELSLOT,DELSLOT         CLEAR DELETED SLOT HOLDER           07250000
         L     R6,DSPORIGN             GET CONTROL AREA ADDRESS            07260000
         L     R3,DSAMLKID             SET INTENDED NEW LOCK VALUE         07270000
WRIT2000 DS    0H                                                          07280000
         LA    R2,0                    SET DESIRED CURRENT LOCK STATE      07290000
         CS    R2,R3,WHSLKADD          TRY TO GET INSERT REC LOCK          07300000
         BE    WRIT2500                GOT IT...CONTINUE                   07310000
         JDCSETPM ,                    SET TO PRIMARY MODE                 07320000
         STIMER WAIT,DINTVL=ONEHUNDR   ELSE WAIT 1/100TH OF A SECOND       07330000
         JDCSETAM ,                    SET TO ACCESS REGISTER MODE         07340000
         B     WRIT2000                AND KEEP TRYING TO GET LOCK         07350000
WRIT2500 DS    0H                                                          07360000
         L     R15,WRKWIP              GET STAT COUNT                      07370000
         LA    R15,1(R15)              INCREMENT IT                        07380000
         ST    R15,WRKWIP              AND SAVE NEW COUNT                  07390000
         L     R14,BISNEXT             GET ADDR OF NEXT BIS SLOT           07400000
         C     R14,BISEND              AT END OF BIS ?                     07410000
         BNL   WRIT9400                YES..CAN'T CONTINUE                 07420000
         L     R6,0(,R5)               GET THE RECORD ADDRESS              07430000
         LTR   R6,R6                   EMPTY SLOT ?                        07440000
         BNZ   WRIT2600                NO...GO FIND END OF CHAIN           07450000
         L     R6,DSPORIGN             GET CONTROL DSECT ADDR              07460000
         CLC   WHSNEXTD,DSPDETND       AT END OF DATA SPACE ?              07470000
         BNL   WRIT9220                YES..FILE FULL EXIT                 07480000
         MVC   0(4,R5),WHSNEXTD        MOVE RECORD ADDRESS TO INDEX        07490000
         L     R2,WHSNEXTD             GET NEXT RECORD ADDRESS             07500000
         LR    R3,R2                   GET IT IN A SECOND REG              07510000
         A     R2,DSPRECLN             POINT TO NEXT RECORD SLOT           07520000
         ST    R2,WHSNEXTD             STORE IT BACK IN CONTROL AREA       07530000
         ST    R2,DSPNEXTD             STORE IT IN WORK AREA               07540000
         LR    R6,R3                   SET UP RECORD ADDR IN WORK REG      07550000
         XC    4(12,R6),4(R6)          CLEAR FORWARD, BACK CHAIN U20027 07560000
         ST    R5,0(,R6)               STORE INDEX SLOT ADDR IN BCK CHN 07570000
         ST    R6,0(R14)               SAVE REC ADDR IN BIS                07580000
         L     R6,DSPORIGN             GET THE CONTROL AREA ADDRESS        07590000
         XC    WHSLKADD,WHSLKADD       CLEAR ADD LOCK                      07600000
         L     R6,0(R14)               RESTORE RECORD POINTER              07610000
         A     R14,DSPRECLN            POINT TO NEXT BIS SLOT              07620000
         ST    R14,BISNEXT             AND SAVE NEW NEXT BIS SLOT PTR      07630000
         B     WRIT5000                AND GO GET THE RECORD               07640000
         SPACE 3                                                           07650000
WRIT2599 CLC   0(0,R3),0(R6)           EXECUTED INSTRUCTION                07660000
WRIT2600 DS    0H                                                          07670000
         CLC   KDELETED,0(R6)          THIS A DELETED RECORD ?             07680000
```

DSAM7710 1-10-97 10:21a

```
         BE    WRIT2700                YES..IGNORE IT AND GET NEXT REC     07690000
         A     R6,DSPKYPOS             ADD OFSET TO KEY                    07700000
         L     R2,DSPKYLEN             GET THE KEY LENGTH                  07710000
         BCTR  R2,R0                   DECREMENT FOR EXECUTE               07720000
         L     R3,DUBL                 GET CALLERS KEY ADDRESS             07730000
         EX    R2,WRIT2599             ARE THE KEYS EQUAL ?                07740000
         BE    WRIT3000                YES..CHECK SUB KEYS          U20027 07750000
         S     R6,DSPKYPOS             POINT TO START OF RECORD            07760000
WRIT2700 DS    0H                                                          07770000
         LR    R1,R6                   SAVE CURRENT RECORD POINTER         07780000
         ICM   R6,15,4(R6)             LOAD FORWARD CHAIN POINTER          07790000
         BNZ   WRIT2600                AND GO ROUND AGAIN                  07800000
         L     R6,DSPORIGN             GET CONTROL DSECT ADDR              07810000
         L     R2,WHSNEXTD             GET NEXT RECORD ADDRESS             07820000
         LR    R3,R2                   GET IT IN A SECOND REG              07830000
         A     R2,DSPRECLN             POINT TO NEXT RECORD SLOT           07840000
         ST    R2,WHSNEXTD             STORE IT BACK IN CONTROL AREA       07850000
         ST    R2,DSPNEXTD             STORE IT IN WORK AREA               07860000
         LR    R6,R1                   GET CURRENT RECORD POINTER          07870000
         ST    R3,4(,R6)               SAVE FORWARD CHAIN POINTER          07880000
         LR    R6,R3                   GET NEW RECORD POINTER              07890000
         ST    R1,8(,R6)               SAVE BACK CHAIN POINTER             07900000
         L     R6,DSPORIGN             GET CONTROL DSECT ADDR              07910000
         XC    WHSLKADD,WHSLKADD       CLEAR ADD LOCK                      07920000
         LR    R6,R3                   SET UP RECORD ADDR IN WORK REG      07930000
         ST    R6,0(R14)               SAVE REC ADDR IN BIS                07940000
         A     R14,DSPRECLN            POINT TO NEXT BIS SLOT              07950000
         ST    R14,BISNEXT             AND SAVE NEW NEXT BIS SLOT PTR      07960000
         B     WRIT5000                AND GO GET THE RECORD               07970000
         SPACE 3                                                           07980000
WRIT3000 DS    0H                                                   U20027 07980300
*  SOFT DUP CHECK - IF SUB KEYS ARE IN EFFECT WE LET THIS RECORD U20027 07980600
*                   BE ADDED IF NO MATCH OCCURS ON THE SUB KEY   U20027 07980900
*                   SPECIFIED. IF PRIMARY THE RECORD IS REJECTED U20027 07981200
*                   AS A TRUE DUPLICATE.                         U20027 07981500
         CLI   RSVDLTH+1,12            ALLOWING SOFT DUPS?          U20027 07981800
         BE    WRIT9100                NO - THIS IS A HARD DUP      U20027 07982100
         OC    DSAMSKID,DSAMSKID       IS THIS A PRIMARY?           U20027 07982400
         BZ    WRIT9100                YES - ANOTHER HARD DUP       U20027 07982700
*  NOW CHECK THE SUB KEY FIELD FOR DUPLICATES                       U20027 07983000
         S     R6,DSPKYPOS             BACK UP TO BEGINNING         U20027 07983300
         CLC   DSAMSKID+1(1),12(R6)    MATCH SUBKEY IDS?            U20027 07983600
         BNE   WRIT2700                NO, CAN'T BE A DUP YET       U20027 07983900
         SLR   R1,R1                   CLEAR INDEX REG              U20027 07984200
         IC    R1,DSAMSKID+1           GET SUBKEY ID (INDEX)        U20027 07984500
         CH    R1,=H'10'               IS IT VALID?                 U20027 07984800
         BH    WRIT9500                INVALID SUBKEY ID            U20027 07985100
         BCTR  R1,0                    MAKE IT RELATIVE             U20027 07985400
         SLL   R1,2                    MULT. BY 4 FOR DEFINITION U20027 07985700
         LH    R0,SKPOS0(R1)           OFFSET OF SUBKEY             U20027 07986000
         S     R3,DSPKYPOS             START OF USER'S RECORD       U20027 07986300
         AR    R6,R0                   ADDRESS RECORD SUBKEY        U20027 07986600
         AR    R3,R0                   ADDRESS USER'S SUBKEY        U20027 07986900
         LH    R2,SKLEN0(R1)           LENGTH OF SUBKEY             U20027 07987200
         BCTR  R2,0                    MINUS 1 FOR EXECUTE          U20027 07987500
         EX    R2,WRIT2599             SAME?                        U20027 07987800
         BE    WRIT9100                YES, IT IS A TRUE DUP        U20027 07988100
         SR    R6,R0                   READJUST POINTERS            U20027 07988400
         L     R3,DUBL                 USERS KEY                    U20027 07988700
         L     R2,DSPKYLEN              AND                         U20027 07989000
         BCTR  R2,0                        LENGTH                   U20027 07989300
         B     WRIT2700                GO AROUND AGAIN              U20027 07989600
WRIT4000 DS    0H                                                          07990000
         OC    DSPKDEL,DSPKDEL         ANY DELAY REQUESTED ?               08000000
         BZ    WRIT4500                NO...SKIP STIMER WAIT               08010000
         JDCSETPM ,                    SET PRIMARY MODE                    08020000
```

Page 7

ATTY. DOCKET No.: CRKR-0009 PATENT

```
         STIMER WAIT,MICVL=DSPKDEL     YES..SO WAIT FOR REQUESTED TIME  08030000
         JDCSETAM ,                    SET ACCESS REGISTER MODE         08040000
WRIT4500 DS    0H                                                       08050000
         MVC   ERR99RC,ERR99RCM        INIT TO INVALID REC ADDR         08060000
         L     R15,WRKWUP              GET STAT COUNT                   08070000
         LA    R15,1(R15)              INCREMENT IT                     08080000
         ST    R15,WRKWUP              AND SAVE NEW COUNT               08090000
         L     R6,DSAMRCAD             GET THE DSP RECORD ADDRESS       08100000
         C     R6,DSPDETA              VALID RECORD ADDRESS ?           08110000
         BL    WRIT9000                NO...INVALID PARM EXIT           08120000
         C     R6,DSPDETND             VALID RECORD ADDRESS ?           08130000
         BH    WRIT9000                NO...INVALID PARM EXIT           08140000
         CLC   DSAMLKID,0(R6)          LOCK SAME AS CALLERS ?           08150000
         BNE   WRIT9300                NO...CAN'T UPDATE RECORD         08160000
         A     R6,DSPKYPOS             ADD OFSET TO KEY                 08170000
         L     R2,DSPKYLEN             GET THE KEY LENGTH               08180000
         BCTR  R2,R0                   DECREMENT FOR EXECUTE            08190000
         L     R3,CPARM2               GET CALLERS REC ADDRESS          08200000
         A     R3,DSPKYPOS             POINT TO CALLERS KEY             08210000
WRIT4800 DS    0H                                                U20027 08215000
         EX    R2,WRIT2599             ARE THE KEYS EQUAL ?             08220000
         BNE   WRIT9300                NO...REC NOT READ FOR UPDATE     08230000
         S     R6,DSPKYPOS             YES..POINT TO START OF RECORD    08240000
WRIT5000 DS    0H                                                       08250000
         L     R2,CPARM2               GET ADDRESS OF CALLERS RECORD    08260000
         L     R3,DSPRECLN             GET THE RECORD LENGTH            08270000
         SH    R3,RSVDLTH              SUB LTH OF LOCK,CHAIN PTRSU20027 08280000
         MVC   0(4,R6),DSAMLKID        MOVE LOCK ID TO REC IN DATA SPC  08310000
         CLI   RSVDLTH+1,12            SUBKEYS?                  U20027 08313000
         BE    WRIT5050                NO, SO DON'T SET IT       U20027 08316000
         MVC   12(1,R6),DSAMSKID+1     MOVE SUB KEY TO RECORD    U20027 08319000
WRIT5050 DS    0H                                                U20027 08322000
         LR    R7,R3                   SET OTHER LTH CODE        U20027 08325000
         AH    R6,RSVDLTH              ADDRESS DATA PORTION      U20027 08328000
         AH    R2,RSVDLTH              FOR BOTH AREAS            U20027 08331000
         MVCL  R6,R2                   UPDATE THE RECORD         U20027 08334000
WRIT5100 DS    0H                                                       08340000
         CPYA  AR5,AR15                RESET DATA SPACE INDEX BASE      08350000
         JDCSUBM TIMER                 GO GET TIME DELAY                08360000
         CLI   DSAMUPDT,DSAMYES        UPDATED RECORD ?                 08370000
         BE    WRIT5200                YES..GO ADD TO UPDATE COUNTS     08380000
         A     R1,WRKGWIT              ADD IN PREVIOUS                  08390000
         ST    R1,WRKGWIT              AND STORE IT BACK                08400000
         L     R15,WRKGWIC             GET CURRENT COUNT                08410000
         LA    R15,1(R15)              INCREMENT IT                     08420000
         ST    R15,WRKGWIC             AND SAVE IT BACK                 08430000
         B     WRITZ                   TAKE NO ERROR EXIT               08440000
WRIT5200 DS    0H                                                       08450000
         A     R1,WRKGWUT              ADD IN PREVIOUS                  08460000
         ST    R1,WRKGWUT              AND STORE IT BACK                08470000
         L     R15,WRKGWUC             GET CURRENT COUNT                08480000
         LA    R15,1(R15)              INCREMENT IT                     08490000
         ST    R15,WRKGWUC             AND SAVE IT BACK                 08500000
         B     WRITZ                   TAKE NO ERROR EXIT               08510000
WRIT9000 DS    0H                                                       08520000
         MVC   REASCODE,RCINVPRM       SET INVALID PARMS                08530000
         B     WRIT9900                TAKE ERROR EXIT                  08540000
WRIT9100 DS    0H                                                       08550000
         L     R6,DSPORIGN             GET CONTROL DSECT ADDR           08560000
         XC    WHSLKADD,WHSLKADD       CLEAR ADD LOCK                   08570000
         MVC   REASCODE,RCDUPKEY       SET RECORD NOT FOUND             08580000
         CPYA  AR5,AR15                RESET DATA SPACE INDEX BASE      08590000
         B     WRIT9900                TAKE ERROR EXIT                  08600000
WRIT9200 DS    0H                                                       08610000
         L     R6,DSPORIGN             GET CONTROL DSECT ADDR           08620000
         XC    WHSLKADD,WHSLKADD       CLEAR ADD LOCK                   08630000
WRIT9220 DS    0H                                                       08640000
         MVC   REASCODE,RCNOSPAC       SET WAREHOUSE FULL               08650000
         CPYA  AR5,AR15                RESET DATA SPACE INDEX BASE      08660000
         B     WRIT9900                TAKE ERROR EXIT                  08670000
WRIT9300 DS    0H                                                       08680000
         MVC   REASCODE,RCINVUPD       SET UPDATE REQUEST W/O READ      08690000
         B     WRIT9900                TAKE ERROR EXIT                  08700000
WRIT9400 DS    0H                                                       08710000
         MVC   REASCODE,RCBISFUL       SET BIS FULL                     08720000
         B     WRIT9900                TAKE ERROR EXIT                  08730000
WRIT9500 DS    0H                                                U20027 08732000
         MVC   REASCODE,RCSKIDER       SET INVALID SUBKEY        U20027 08734000
         B     WRIT9900                                          U20027 08736000
WRIT9900 DS    0H                                                       08740000
         L     R15,WRKFWC              GET CURRENT COUNT                08750000
         LA    R15,1(R15)              INCREMENT IT                     08760000
         ST    R15,WRKFWC              AND SAVE IT BACK                 08770000
         JDCSUBM TIMER                 GO GET TIME DELAY                08780000
         A     R1,WRKFWT               ADD IN PREVIOUS                  08790000
         ST    R1,WRKFWT               AND STORE IT BACK                08800000
         B     WRITZ                   TAKE ERROR EXIT                  08810000
         EJECT                                                          08820000
DEL      JDCRTNM                                                        08830000
         TIME  MIC,STRTTIME            GET THE TIME                     08840000
         OC    DSPKDEL,DSPKDEL         ANY DELAY REQUESTED ?            08850000
         BZ    DEL0500                 NO...SKIP STIMER WAIT            08860000
         STIMER WAIT,MICVL=DSPKDEL     YES..SO WAIT FOR REQUESTED TIME  08870000
DEL0500  DS    0H                                                       08880000
         JDCSETAM ,                    SET ACCESS REGISTER MODE         08890000
         JDCSUBM TESTDS                GO VALIDATE WAREHOUSE            08900000
         B     DEL9900                 NOT THERE...QUIT                 08910000
         B     DEL9900                 NOT INITIALIZED YET...ERROR      08920000
*                                      IT'S THERE...CONTINUE            08930000
         MVC   ERR99RC,ERR99RCM        INIT TO INVALID REC ADDR         08940000
         L     R15,WRKWUP              GET STAT COUNT                   08950000
         LA    R15,1(R15)              INCREMENT IT                     08960000
         ST    R15,WRKWUP              AND SAVE NEW COUNT               08970000
         L     R6,DSAMRCAD             GET THE DSP RECORD ADDRESS       08980000
         C     R6,DSPDETA              VALID RECORD ADDRESS ?           08990000
         BL    DEL9000                 NO...INVALID PARM EXIT           09000000
         C     R6,DSPDETND             VALID RECORD ADDRESS ?           09010000
         BH    DEL9000                 NO...INVALID PARM EXIT           09020000
         CLC   DSAMLKID,0(R6)          LOCK SAME AS CALLERS ?           09030000
         BNE   DEL9100                 NO...CAN'T UPDATE RECORD         09040000
         A     R6,DSPKYPOS             ADD OFSET TO KEY                 09050000
         L     R3,DSPKYLEN             GET THE KEY LENGTH               09060000
         BCTR  R3,R0                   DECREMENT FOR EXECUTE            09070000
         L     R2,CPARM2               GET CALLERS REC ADDRESS          09080000
         A     R2,DSPKYPOS             POINT TO CALLERS KEY             09090000
         EX    R3,DEL1001              ARE THE KEYS EQUAL ?             09100000
         BNE   DEL9100                 NO...REC NOT READ FOR UPDATE     09110000
         S     R6,DSPKYPOS             YES..POINT TO START OF RECORD    09120000
* BEFORE DELETING THIS RECORD MAKE SURE IT IS NOT A SOFT DUP     U20027 09120400
         CLI   RSVDLTH+1,12            SUBKEYS ALLOWED?          U20027 09120800
         BE    DEL0600                 NO...PRIMARY TO DELETE    U20027 09121200
         CLI   12(R6),0                IS THIS THE PRIMARY?      U20027 09121600
         BE    DEL0600                 YES..DELETE IT            U20027 09122000
         CLC   DSAMSKID+1(1),12(R6)    MATCH TO SUBKEY ID?       U20027 09122400
         BNE   DEL9100                 NO..HE GOT'THE WRONG ONE  U20027 09122800
         LH    R1,DSAMSKID             GET INDEX                 U20027 09123200
         CH    R1,=H'10'               IS IT VALID?              U20027 09123600
         BH    DEL9300                 NO..ERROR                 U20027 09124000
         BCTR  R1,0                    MAKE RELATIVE             U20027 09124400
         SLL   R1,2                    MULT. BY 4                U20027 09124800
         AH    R6,SKPDS0(R1)           SUBKEY IN DATA SPACE      U20027 09125200
         S     R2,DSPKYPOS             START OF USER RECORD      U20027 09125600
```

DSAM7710 1-10-97 10:21a

Page 8

ATTY. DOCKET NO.: CRKR-0009

PATENT

```
         AH    R2,SKPOSO(R1)          SUBKEY IN USER RECORD      U20027 09126000
         LH    R3,SKLENO(R1)          LENGTH OF SUBKEY           U20027 09126400
         BCTR  R3,0                   LESS 1 FOR EX              U20027 09126800
         EX    R3,DEL1001             SAME SUBKEY?               U20027 09127200
         BNE   DEL9100                NO, HE DIDN'T READ IT      U20027 09127600
DEL0600  DS    0H                                                U20027 09128000
         MVC   0(L'KDELETED,R6),KDELETED   SET IT AS DELETED            09130000
         L     R15,WRKGWUC            GET CURRENT COUNT                 09140000
         LA    R15,1(R15)             INCREMENT IT                      09150000
         ST    R15,WRKGWUC            AND SAVE IT BACK                  09160000
         JDCSUBM TIMER                GO GET TIME DELAY                 09170000
         A     R1,WRKGWUT             ADD IN PREVIOUS                   09180000
         ST    R1,WRKGWUT             AND STORE IT BACK                 09190000
         B     DELZ                   TAKE NO ERROR EXIT                09200000
DEL1001  CLC   0(0,R2),0(R6)          EXECUTED INSTRUCTION              09220000
DEL9000  DS    0H                                                       09240000
         MVC   REASCODE,RCINVPRM      SET INVALID PARMS                 09250000
         B     DEL9900                TAKE ERROR EXIT                   09260000
DEL9100  DS    0H                                                       09270000
         MVC   REASCODE,RCINVUPD      SET UPDATE REQUEST W/O READ       09280000
         B     DEL9900                TAKE ERROR EXIT                   09290000
DEL9200  DS    0H                                                       09300000
         MVC   REASCODE,RCBISFUL      SET BIS FULL                      09310000
         B     DEL9900                TAKE ERROR EXIT                   09320000
DEL9300  DS    0H                                                U20027 09322000
         MVC   REASCODE,RCSKIDER      INVALID SUBKEY ID          U20027 09324000
         B     DEL9900                                           U20027 09326000
DEL9900  DS    0H                                                       09330000
         L     R15,WRKFWC             GET CURRENT COUNT                 09340000
         LA    R15,1(R15)             INCREMENT IT                      09350000
         ST    R15,WRKFWC             AND SAVE IT BACK                  09360000
         JDCSUBM TIMER                GO GET TIME DELAY                 09370000
         A     R1,WRKFWT              ADD IN PREVIOUS                   09380000
         ST    R1,WRKFWT              AND STORE IT BACK                 09390000
         B     DELZ                   TAKE ERROR EXIT                   09400000
         EJECT                                                          09410000
CLOS     JDCRTNM                                                        09420000
         JDCSETAM ,                   SET ACCESS REGISTER MODE          09430000
         JDCSUBM TESTDS               GO VALIDATE WAREHOUSE             09440000
         B     CLOSZ                  NOT THERE...QUIT                  09450000
         B     CLOSZ                  NOT INITIALIZED YET...ERROR       09460000
*                                     IT'S THERE...CONTINUE             09470000
         MVC   ERR99RC,ERR99RCC       INIT TO INVALID UNLOCK            09480000
         CLI   DSAMUNLK,DSAMYES       VALID PARM ?                      09490000
         BE    CLOS1010               YES..CONTINUE                     09500000
         CLI   DSAMUNLK,DSAMNO        VALID PARM ?                      09510000
         BNE   CLOS9000               NO...QUIT                         09520000
CLOS1010 DS    0H                                                       09530000
         CLC   DSAMLKID,WHSLKADD      GOT THE ADD LOCK ?                09540000
         BNE   CLOS1012               NO...LEAVE IT ALONE               09550000
         XC    WHSLKADD,WHSLKADD      RELEASE ADD LOCK                  09560000
CLOS1012 DS    0H                                                       09570000
         TM    SWITCH,NOLOG+OPENIN    OPENED INPUT ?                    09580000
         BO    CLOS8000               YES..SO GO CLOSE DOWN             09590000
         MVC   ERR99RC,ERR99RCN       INIT TO INVALID TOTALS            09600000
         L     R3,CPARM2              GET ADDRESS OF CALLERS TOTALS     09610000
         CLC   TOTALEYE,0(R3)         VALID TOTALS AREA                 09620000
         BNE   CLOS9000               NO...QUIT                         09630000
         L     R2,DSPTOTSL                                              09640000
         SRL   R2,3                   DIVIDE BY ENTRY LENGTH            09650000
         LA    R3,10(R3)              POINT PAST EYECATCHER             09660000
CLOS1015 DS    0H                                                       09670000
         MVC   ERR99RC,ERR99RCS       INIT TO INVALID TOTALS            09680000
         TRT   0(7,R3),TRTABLE1       ENSURE VALID PACKED FIELD         09690000
         BNZ   CLOS9000               INVALID...QUIT                    09700000
         TRT   7(1,R3),TRTABLE2       ENSURE VALID PACKED FIELD         09710000
```

DSAM7710 1-10-97 10:21a

```
         BNZ   CLOS9000               INVALID...QUIT                    09720000
         LA    R3,8(R3)               POINT TO NEXT ENTRY               09730000
         BCT   R2,CLOS1015            AND GO ROUND TILL DONE            09740000
         TM    SWITCH,NOLOG           GOT A LOG ?                       09750000
         BZ    CLOS1020               YES..SO GO CHECK COMMIT FOR Y/N   09760000
         MVC   ERR99RC,ERR99RCO       INIT TO INVALID COMMIT            09770000
         CLI   DSAMCOMT,DSAMRORG      ELSE COMMIT FLAG MUST BE REORG    09780000
         BNE   CLOS9000               IF ITS NOT, ITS INVALID PARMS     09790000
         B     CLOS1030               ELSE CONTINUE                     09800000
CLOS1020 DS    0H                                                       09810000
         MVC   ERR99RC,ERR99RCE       INIT TO INVALID COMMIT            09820000
         CLI   DSAMCOMT,DSAMNO        VALID PARM ?                      09830000
         BE    CLOS5000               YES..CONTINUE                     09840000
         CLI   DSAMCOMT,DSAMYES       VALID PARM ?                      09850000
         BE    CLOS1030               YES..CONTINUE                     09860000
         CLI   DSAMCOMT,DSAMRORG      VALID PARM ?                      09870000
         BNE   CLOS9000               IF ITS NOT, ERROR                 09880000
         MVC   ERR99RC,ERR99RCP       INIT TO INVALID COMMIT            09890000
         TM    SWITCH,NOLOG           GOT A LOG ?                       09900000
         BZ    CLOS9000               YES, RE-ORG INVALID               09910000
CLOS1030 DS    0H                                                       09920000
         JDCSETPM ,                   SET TO PRIMARY MODE               09930000
         TIME  MIC,STRTTIME           GET THE TIME                      09940000
         JDCSETAM ,                   SET TO ACCESS REGISTER MODE       09950000
         NI    SWITCH,255-WTMSGSNT    TURN OFF WAIT MESSAGE SENT FLAG   09960000
CLOS2000 DS    0H                                                       09970000
         JDCSUBM LCKCNTL              GO LOCK THE CONTROL AREA          09980000
         OC    WHSLKCMT,WHSLKCMT      IS THERE A COMMIT LOCK HELD?      09990000
         BZ    CLOS2200               NO...GO LOCK IT                   10000000
         JDCSUBM WTMSG                GO SEND WAITING MESSAGE           10010000
         XC    WHSLKPRM,WHSLKPRM      RELEASE CONTROL AREA LOCK         10020000
         MVI   WHCNTLSW,MYUNLOCK      CLEAR THE PGM LOCK SWITCH         10030000
         JDCSETPM ,                   SET TO PRIMARY MODE               10040000
         STIMER WAIT,DINTVL=LOCKWAIT  WAIT A WHILE                      10050000
         JDCSETAM ,                   SET TO ACCESS REGISTER MODE       10060000
         JDCSUBM TESTDS               GO VALIDATE WAREHOUSE             10070000
         B     CLOSZ                  NOT THERE...QUIT                  10080000
         B     CLOSZ                  NOT INITIALIZED...QUIT            10090000
*                                     IT'S THERE...CONTINUE             10100000
         B     CLOS2000               AND GO TRY AGAIN                  10110000
CLOS2200 DS    0H                                                       10120000
         L     R2,WHSCCNUM            GET LAST USED COMMIT CNTL NUMBER  10130000
         LA    R2,1(R2)               INCREMENT IT                      10140000
         ST    R2,WHSCCNUM            AND SAVE NEW LAST USED CC NUMBER  10150000
         ST    R2,WHSLKCMT            SET THE COMMIT LOCK               10160000
         ST    R2,CCNUM               SAVE COMMIT CONTROL NUM IN WORK   10170000
         XC    WHSLKPRM,WHSLKPRM      RELEASE CONTROL AREA LOCK         10180000
         MVI   WHCNTLSW,MYUNLOCK      CLEAR THE PGM LOCK SWITCH         10190000
         CLI   DSAMCOMT,DSAMRORG      RE-ORG ?                          10200000
         BE    CLOS6000               YES..GO DEAL WITH IT              10210000
         L     R3,WHSFCSIZ            GET SIZE OF FAILED COMMIT LIST    10220000
         LA    R6,WHSFCLST            GET ADDR OF FAILED COMMIT LIST    10230000
CLOS2300 DS    0H                                                       10240000
         OC    0(4,R6),0(R6)          EMPTY SLOT IN LIST ?              10250000
         BZ    CLOS2400               YES..GO USE IT                    10260000
         LA    R6,4(R6)               NO...POINT TO NEXT SLOT IN LIST   10270000
         BCT   R3,CLOS2300            AND GO ROUND TILL DONE            10280000
         B     CLOS9200               FCL FULL...TAKE ERROR EXIT        10290000
CLOS2400 DS    0H                                                       10300000
         ST    R2,0(,R6)              PUT COMMIT CONTROL NUM IN LIST    10310000
         ST    R6,FCLADDR             SAVE SLOT POINTER                 10320000
         SPACE 3                                                        10330000
         L     R4,BISADDR             GET BIS START ADDR                10340000
         A     R4,BISLEN              ADD IN LENGTH FOR END             10350000
         S     R4,BISNEXT             SUB USED FOR AMOUNT LEFT          10360000
         SH    R4,=Y(L'TOTALEYE)      SUB EYECATCHER SIZE               10370000
```

ATTY. DOCKET No.: CRKR-0009 PATENT

```
         C     R4,DSPTOTSL              COMPARE TO TOTALS AREA SIZE        10380000
         BL    CLOS9600                 TOO SMALL...QUIT                   10390000
         L     R2,BISNEXT               GET MOVE DESTINATION ADDR          10400000
         MVC   0(L'TOTALEYE,R2),TOTALEYE MOVE EYECATCHER TO BIS            10410000
         LA    R2,L'TOTALEYE(R2)        AND BUMP PAST EYECATCHER           10420000
         L     R6,DSPTOTSA              GET TOTALS AREA ADDRESS            10430000
         L     R3,DSPTOTSL              GET LENGTH OF TOTALS               10440000
         LR    R7,R3                    SET MOVE SOURCE LENGTH             10450000
         MVCL  R2,R6                    AND MOVE OLD TOTALS TO BIS         10460000
         ST    R2,BISNEXT               SAVE NEW BIS NEXT SLOT ADDRESS     10470000
         L     R6,DSPORIGN              GET DATA SPACE ORIGIN              10480000
         L     R2,WHSTOTSL              GET SIZE OF TOTALS AREA            10490000
         SRL   R2,3                     DIVIDE BY SIZE FOR COUNT           10500000
         L     R6,WHSTOTSA              GET TOTALS AREA                    10510000
         L     R3,CPARM2                GET ADDRESS OF CALLERS TOTALS      10520000
         LA    R3,L'TOTALEYE(R3)        POINT PAST EYECATCHER              10530000
CLOS2500 DS    0H                                                          10540000
         AP    0(8,R6),0(8,R3)          ADD IN THIS ENTRY                  10550000
         LA    R3,8(,R3)                POINT TO NEXT ENTRY                10560000
         LA    R6,8(,R6)                POINT TO NEXT ENTRY                10570000
         BCT   R2,CLOS2500              AND GO ROUND TILL DONE             10580000
         JDCSETPM ,                     SET TO PRIMARY MODE                10590000
         OPEN  (CNTLFILE,(UPDAT))       OPEN THE CONTROL FILE              10600000
         TM    DCBOFLGS-IHADCB+CNTLFILE,DCBOFOPN  FILE OPEN OK ?           10610000
         BNO   CLOS9400                 NO...QUIT                          10620000
         CLI   DUPLEX,DSAMYES           DUPLEXING CONTROL FILE ?           10630000
         BNE   CLOS2550                 NO...FORGET IT                     10640000
         OPEN  (CNTLFIL2,(UPDAT))       OPEN THE CONTROL FILE              10650000
         TM    DCBOFLGS-IHADCB+CNTLFIL2,DCBOFOPN  FILE OPEN OK ?           10660000
         BNO   CLOS9420                 NO...QUIT                          10670000
CLOS2550 DS    0H                                                          10680000
         JDCSUBM WCNTL                  GO WRITE THE CONTROL AREA          10690000
         SPACE 3                                                           10700000
         CLI   DSAMCONT,DSAMRORG        RE-ORG REQUEST ?                   10710000
         BE    CLOS6000                 YES..GO RE-ORG IT                  10720000
         SPACE 3                                                           10730000
         JDCSETPM ,                     SET TO PRIMARY MODE                10740000
         JDCALLOM FUNC=UNALL,DDNAME=LOGDDN,WORK=MISCWORK FLUSH OLD DD      10750000
         JDCALLOM DDNAME=LOGDDN,STATUS=SHR,DSN=LOGDSN,CLOSE=FREE,         X10760000
               WORK=MISCWORK,ERROR=DUBL                                    10770000
         BNZ   CLOS9300                                                    10780000
         MVC   DCBDDNAM-IHADCB+LOGFILE,LOGDDN  SET DDNAME IN DCB           10790000
         XC    LOGRECNT,LOGRECNT        SET LOG REC COUNT TO ZERO          10800000
         OPEN  (LOGFILE,(EXTEND))       OPEN THE LOG FILE MOD              10810000
         TM    DCBOFLGS-IHADCB+LOGFILE,DCBOFOPN  FILE OPEN OK ?            10820000
         BNO   CLOS9500                 NO...QUIT                          10830000
         JDCSETAM ,                     SET TO ACCESS REGISTER MODE        10840000
         SPACE                                                             10850000
         JDCSUBM LOGTOT                 GO LOG THE UPDATED TOTALS          10860000
         SPACE                                                             10870000
         L     R2,BISADDR               GET ADDRESS OF BEFORE IMAGE STK    10880000
         L     R4,IOAREA                GET I/O BLOCK ADDRESS       U20027 10890000
         L     R5,DSPRECLN              GET RECORD LENGTH           U20027 10900000
CLOS3000 DS    0H                                                          10920000
         JDCSETAM ,                     SET TO ACCESS REGISTER MODE        10930000
         C     R2,BISNEXT               AT END OF STACK ?                  10940000
         BE    CLOS3100                 YES..ALL DONE...GO CLEAN UP        10950000
         CLC   TOTALEYE,0(R2)           IS THIS A TOTALS AREA ?            10960000
         BNE   CLOS3030                 NO...GO SORT IT OUT                10970000
         LA    R2,L'TOTALEYE(R2)        POINT PAST EYE CATCHER             10980000
         A     R2,DSPTOTSL              POINT PAST TOTALS                  10990000
         B     CLOS3000                 AND GO FIND NEXT RECORD            11000000
CLOS3030 DS    0H                                                          11010000
         L     R6,0(R2)                 GET RECORD ADDRESS FROM BIS        11020000
         LR    R7,R5                    OTHER LTH CODE              U20027 11024000
         MVCL  R4,R6                    MOVE REC TO IOAREA          U20027 11028000
```

DSAM7710 1-10-97 10:21a

```
         L     R5,DSPRECLN              RESTORE RECORD LENGTH       U20027 11032000
         L     R6,0(R2)                 BEGINNING OF DSP REC        U20027 11036000
         L     R4,IOAREA                BEGINNING OF LOG REC        U20027 11040000
         CLC   KDELETED,0(R4)           DELETED RECORD ?            U20027 11044000
         BNE   CLOS3040                 NO...GO CLEAR THE LOCK             11050000
         MVC   4(4,R4),KDELETED         YES..PUT DEL FLAG IN LOG    U20027 11060000
         B     CLOS3050                 AND SKIP THE LOCK CLEAR            11070000
CLOS3040 DS    0H                                                          11080000
         XC    0(4,R6),0(R6)            CLEAR THE RECORD LOCK              11090000
CLOS3050 DS    0H                                                          11100000
         JDCSUBM WLOG                   GO WRITE THE LOG RECORD            11110000
         A     R2,DSPRECLN              POINT TO NEXT RECORD               11120000
         B     CLOS3000                 AND GO ROUND AGAIN                 11130000
CLOS3100 DS    0H                                                          11150000
         JDCSETPM ,                     SET TO PRIMARY MODE                11160000
         CLOSE LOGFILE                  AND CLOSE THE FILE                 11170000
         FREEPOOL LOGFILE               AND FREE THE BUFFERS               11180000
         JDCALLOM FUNC=UNALL,DDNAME=LOGDDN,WORK=MISCWORK FLUSH OLD DD      11190000
         JDCSETAM ,                     SET TO ACCESS REGISTER MODE        11200000
         L     R6,DSPORIGN              POINT TO CONTROL AREA              11210000
         L     R1,LOGRECNT              GET CURRENT LOG RECORD COUNT       11220000
         A     R1,WHSLRCNT              ADD IN PREVIOUS LOG REC COUNT      11230000
         ST    R1,WHSLRCNT              AND SAVE NEW LOG REC COUNT         11240000
         L     R6,FCLADDR               GET ADDR OF CCN IN FCL             11250000
         XC    0(4,R6),0(R6)            CLEAR IT OUT                       11260000
         JDCSUBM WCNTL                  GO REWRITE THE CONTROL RECORD      11270000
         JDCSETPM ,                     SET TO PRIMARY MODE                11280000
         CLOSE CNTLFILE                 AND CLOSE THE FILE                 11290000
         CLI   DUPLEX,DSAMYES           DUPLEXING CONTROL FILE ?           11300000
         BNE   CLOS3200                 NO...FORGET IT                     11310000
         CLOSE CNTLFIL2                 YES..CLOSE THE FILE                11320000
CLOS3200 DS    0H                                                          11330000
         JDCSETAM ,                     SET TO ACCESS REGISTER MODE        11340000
         L     R6,DSPORIGN              POINT TO CONTROL AREA              11350000
         XC    WHSLKCMT,WHSLKCMT        CLEAR COMMIT LOCK                  11360000
         XC    CCNUM,CCNUM              CLEAR COMMIT CONTROL NUMBER        11370000
         L     R15,WRKCMTC              GET CURRENT COUNT                  11380000
         LA    R15,1(R15)               INCREMENT IT                       11390000
         ST    R15,WRKCMTC              AND SAVE IT BACK                   11400000
         JDCSUBM TIMER                  GO GET TIME DELAY                  11410000
         A     R1,WRKCMTT               ADD IN PREVIOUS                    11420000
         ST    R1,WRKCMTT               AND STORE IT BACK                  11430000
         B     CLOS8000                 AND GO FINISH UP                   11440000
CLOS5000 DS    0H                                                          11450000
         MVC   ERR99RC,ERR99RCQ         INIT TO INVALID COMMIT             11460000
         TM    SWITCH,NOLOG             LOGGING TURNED OFF ?               11470000
         BO    CLOS9000                 YES..CAN'T BACK OUT...INV PARM     11480000
         JDCSUBM BKOUT                  GO BACKOUT THE UPDATES             11490000
         B     CLOS8000                 AND GO FINISH UP                   11500000
         SPACE 3                                                           11510000
CLOS6000 DS    0H                                                          11520000
         L     R6,DSPORIGN              GET CONTROL AREA ADDRESS           11530000
         L     R2,WHSTOTSL              GET SIZE OF TOTALS AREA            11540000
         SRL   R2,3                     DIVIDE BY SIZE FOR COUNT           11550000
         L     R6,WHSTOTSA              GET TOTALS AREA                    11560000
         L     R3,CPARM2                GET ADDRESS OF CALLERS TOTALS      11570000
         LA    R3,L'TOTALEYE(R3)        POINT PAST EYECATCHER              11580000
CLOS6030 DS    0H                                                          11590000
         AP    0(8,R6),0(8,R3)          ADD IN THIS ENTRY                  11600000
         LA    R3,8(,R3)                POINT TO NEXT ENTRY                11610000
         LA    R6,8(,R6)                POINT TO NEXT ENTRY                11620000
         BCT   R2,CLOS6030              AND GO ROUND TILL DONE             11630000
         MVC   CCNUM,=F'1'              SET NEW COMMIT CONTROL NUMBER      11640000
         L     R6,DSPORIGN              GET CONTROL AREA ADDRESS           11650000
         LA    R2,WHSFCLST              GET ADDR OF FAILED COMMIT LIST     11660000
         ST    R2,FCLADDR               STORE POINTER IN WORK              11670000
```

Page 10

ATTY. DOCKET NO.: CRKR-0009

PATENT

```
         CPYA  R4,R6                  LOAD DATA SPACE ALET INTO AR4        11680000
         MVC   OLDEND,WHSNEXTD        SAVE CURRENT END OF DATA ADDR        11690000
         L     R6,DSPDETA             POINT TO START OF DATA               11700000
         MVC   NEWEND,DSPDETA         SET NEW END OF DATA ADDRESS          11710000
         L     R3,DSPRECLN            GET THE RECORD LENGTH                11720000
CLOS6050 DS    0H                                                          11740000
         C     R6,OLDEND              AT END OF DATA ?                     11750000
         BNL   CLOS6080               YES..GO COMPRESS IT                  11760000
         CLC   KDELETED,0(R6)         DELETED RECORD ?                     11770000
         BE    CLOS6060               YES..SKIP IT                         11780000
         XC    0(12,R6),0(R6)         NO...CLEAR LOCK AND CHAIN PTRS       11790000
CLOS6060 DS    0H                                                          11800000
         A     R6,DSPRECLN            POINT TO THE NEXT RECORD             11810000
         B     CLOS6050               AND GO ROUND TILL DONE               11820000
CLOS6080 DS    0H                                                          11830000
         L     R6,DSPDETA             GET START OF DETAIL DATA ADDR        11840000
CLOS6100 DS    0H                                                          11850000
         C     R6,OLDEND              AT END OF DATA ?                     11860000
         BNL   CLOS7000               YES..GO REBUILD INDEX                11870000
         ST    R6,HOLDADDR            SAVE RECORD ADDRESS           U20027 11873000
         LR    R7,R3                  RECORD LENGTH                 U20027 11876000
         SLR   R14,R14                COMPARAND ADDR                U20027 11879000
         SLR   R15,R15                LTH AND PAD                   U20027 11882000
         CLCL  R6,R14                 EMPTY RECORD ?                U20027 11885000
         L     R6,HOLDADDR            RESTORE REC PTR               U20027 11888000
         BE    CLOS6200               YES..FOUND START FOR MOVE     U20027 11891000
         CLC   KDELETED,0(R6)         DELETED RECORD ?                     11900000
         BE    CLOS6200               YES..FOUND START FOR MOVE            11910000
         A     R6,DSPRECLN            NO...POINT TO NEXT RECORD            11920000
         ST    R6,NEWEND              STORE LATEST END OF DATA ADDRESS     11930000
         B     CLOS6100               AND GO ROUND AGAIN                   11940000
         SPACE 2                                                           11950000
CLOS6200 DS    0H                                                          11960000
         LR    R4,R6                  SAVE MOVE DESTINATION                11970000
CLOS6250 DS    0H                                                          11980000
         C     R6,OLDEND              AT END OF DATA ?                     11990000
         BNL   CLOS7000               YES..GO REBUILD INDEX                12000000
         ST    R6,HOLDADDR            SAVE REC PTR                  U20027 12005000
         CLC   KDELETED,0(R6)         DELETED RECORD ?                     12010000
         BE    CLOS6300               YES..KEEP LOOKING FOR ACTIVE REC     12020000
         LR    R7,R3                  REC LTH                       U20027 12024000
         SLR   R14,R14                NULL RECORD                   U20027 12028000
         SLR   R15,R15                PAD BYTE                      U20027 12032000
         CLCL  R6,R14                 EMPTY RECORD ?                U20027 12036000
         L     R6,HOLDADDR            RESTORE REC PTR               U20027 12040000
         BNE   CLOS6400               NO...FOUND MOVE SOURCE        U20027 12044000
CLOS6300 DS    0H                                                          12050000
         A     R6,DSPRECLN            POINT TO NEXT RECORD                 12060000
         B     CLOS6250               AND GO ROUND AGAIN                   12070000
         SPACE 2                                                           12080000
CLOS6400 DS    0H                                                          12090000
         LR    R2,R6                  SAVE MOVE SOURCE                     12100000
CLOS6450 DS    0H                                                          12110000
         C     R6,OLDEND              AT END OF DATA ?                     12120000
         BNL   CLOS6500               YES..GO MOVE BLOCK OF DATA           12130000
         ST    R6,HOLDADDR            SAVE RECORD PTR               U20027 12133000
         LR    R7,R3                  RECORD LTH                    U20027 12136000
         SLR   R14,R14                DUMMY RECORD                  U20027 12139000
         SLR   R15,R15                PAD IS ZERO                   U20027 12142000
         CLCL  R6,R14                 EMPTY RECORD ?                U20027 12145000
         L     R6,HOLDADDR            RESTORE REC PTR               U20027 12148000
         BE    CLOS6500               YES..FOUND END FOR MOVE       U20027 12151000
         CLC   KDELETED,0(R6)         DELETED RECORD ?                     12160000
         BE    CLOS6500               YES..FOUND END FOR MOVE              12170000
         A     R6,DSPRECLN            NO...POINT TO NEXT RECORD            12180000
         B     CLOS6450               AND GO ROUND AGAIN                   12190000
```

DSAM7710 1-10-97 10:21a

```
         SPACE 2                                                           12200000
CLOS6500 DS    0H                                                          12210000
         LR    R7,R6                  GET CURRENT POINTER                  12220000
         SR    R7,R2                  GET LENGTH TO MOVE                   12230000
         LR    R6,R2                  SET MOVE SOURCE                      12240000
         LR    R5,R7                  SET MOVE DEST LENGTH                 12250000
         MVCL  R4,R6                  AND SHIFT DATA FORWARDS IN DSP       12260000
         ST    R4,NEWEND              STORE NEW END OF DATA                12270000
         B     CLOS6250               AND GO ROUND TILL DONE               12280000
         SPACE 3                                                           12300000
CLOS7000 DS    0H                                                          12310000
         L     R6,DSPNDXA             GET INDEX ADDRESS                    12320000
         L     R7,INDEXCNT            GET THE RECORD COUNT                 12330000
         SLL   R7,2                   SET TO LENGTH OF INDEX AREA          12340000
         LA    R15,0                  SET SOURCE LEN AND PADDING BYTE      12350000
         MVCL  R6,R14                 AND CLEAR OUT THE INDEX              12360000
         L     R6,DSPORIGN            GET CONTROL AREA ADDRESS             12370000
         MVC   WHSNEXTD,NEWEND        SAVE NEW END OF DATA ADDR            12380000
         MVC   DSPNEXTD,NEWEND        STORE IT IN WORK AREA                12390000
         L     R6,DSPDETA             GET START OF DETAIL DATA ADDR        12400000
         B     CLOS7100               SKIP EXECUTED INSTRUCTION            12410000
CLOS7099 MVC   MISCWORK(0),0(R6)      EXECUTED INSTRUCTION                 12420000
CLOS7100 DS    0H                                                          12430000
         C     R6,NEWEND              AT END OF DATA ?                     12440000
         BNL   CLOS7500               YES..GO CREATE NEW LOG FILE          12450000
         L     R3,DSPKYLEN            GET THE KEY LENGTH                   12460000
         BCTR  R3,R0                  DECREMENT FOR EXECUTE                12470000
         A     R6,DSPKYPOS            POINT TO THE KEY IN THE RECORD       12480000
         EX    R3,CLOS7099            MOVE KEY TO WORK AREA                12490000
         JDCSETPM ,                   SET PRIMARY MODE                     12500000
         CALL  DSAM7720,(MISCWORK,DSPKYLEN,INDEXCNT,RECSLOT),VL            12510000
         JDCSETAM ,                   SET ACCESS REGISTER MODE             12520000
         S     R6,DSPKYPOS            POINT TO THE START OF THE RECORD     12530000
         CPYA  AR5,AR6                SET DATA SPACE INDEX BASE            12540000
         L     R5,RECSLOT             GET RETURNED RECORD SLOT             12550000
         SLL   R5,2                   MULTIPLY BY INDEX SIZE               12560000
         A     R5,DSPNDXA             POINT TO SLOT IN INDEX               12570000
         OC    0(4,R5),0(R5)          EMPTY RECORD SLOT ?                  12580000
         BNZ   CLOS7200               NO...GO FIND END OF CHAIN            12590000
         ST    R6,0(,R5)              YES..SAVE REC ADDRESS IN INDEX       12600000
         A     R6,DSPRECLN            POINT TO NEXT DATA SPACE RECORD      12610000
         B     CLOS7100               AND GO ROUND TILL DONE               12620000
         SPACE                                                             12630000
CLOS7200 DS    0H                                                          12640000
         LR    R3,R6                  SAVE CURRENT RECORD POINTER          12650000
         L     R6,0(,R5)              GET SYNONYM RECORD POINTER           12660000
CLOS7300 DS    0H                                                          12670000
         LTR   R6,R6                  AT END OF CHAIN ?                    12680000
         BZ    CLOS7400               YES..GO ADD REC TO CHAIN             12690000
         LR    R2,R6                  NO...SAVE CURRENT RECORD POINTER     12700000
         L     R6,4(,R6)              POINT TO NEXT REC IN CHAIN           12710000
         B     CLOS7300               AND GO ROUND TILL DONE               12720000
CLOS7400 DS    0H                                                          12730000
         LR    R6,R2                  POINT TO LAST REC IN CHAIN           12740000
         ST    R3,4(,R6)              SAVE NEW REC PTR IN FWD CHAIN        12750000
         LR    R1,R6                  GET OLD END OF CHAIN REC PTR         12760000
         LR    R6,R3                  GET NEW END OF CHAIN REC PTR         12770000
         ST    R1,8(,R6)              STORE BACK CHAIN PTR                 12780000
         A     R6,DSPRECLN            POINT TO NEXT DATA SPACE RECORD      12790000
         B     CLOS7100               AND GO ROUND TILL DONE               12800000
         SPACE 3                                                           12810000
CLOS7500 DS    0H                                                          12820000
         CPYA  R4,R15                 LOAD ADDRESS SPACE ALET INTO AR4     12830000
         CPYA  R5,R15                 LOAD ADDRESS SPACE ALET INTO AR5     12840000
         JDCSETPM ,                   SET TO PRIMARY MODE                  12850000
         JDCALLOM FUNC=UNALL,DDNAME=LOGDDN,WORK=MISCWORK FLUSH OLD DD      12860000
```

Page 11

```
         LA    R1,LOGDSN              POINT TO LOG DSN
         LA    R15,44                 SET MAX DSN LENGTH
CLOS7520 DS    0H
         CLI   0(R1),C' '             FOUND END OF DSN ?
         BE    CLOS7530               YES..GO CLEAR OUT GOOVOO
         LA    R1,1(R1)               NO...POINT TO NEXT BYTE
         BCT   R15,CLOS7520           AND GO ROUND TILL DONE
CLOS7530 DS    0H
         SH    R1,=H'7'               POINT TO START OF GENERATION
         PACK  DUBL,0(4,R1)           GET GENERATION NUMBER
         AP    DUBL,=P'1'             INCREMENT IT
         OI    DUBL+7,X'0F'           ENSURE VALID SIGN
         UNPK  0(4,R1),DUBL           AND STORE THE NEW GENERATION
         JDCALLOM WORK=MISCWORK,
               DDNAME=LOGDDN,
               DSN=LOGDSN,
               STATUS=NEW,
               NORMDSP=CATLG,
               CONDDSP=CATLG,
               SPACE=TRK,
               PRMSPAC=LPRMSPC,
               SECSPAC=LSECSPC,
               VOLSER=LVOLSER,
               UNIT=LUNIT,
               DCBREF=LMODLDCB,
               CLOSE=FREE,
               ERROR=DUBL
         BNZ   CLOS9300
         MVC   DCBDDNAM-IHADCB+LOGFILE,LOGDDN  SET DDNAME IN DCB
         XC    LOGRECNT,LOGRECNT      SET LOG REC COUNT TO ZERO
         OPEN  (LOGFILE,(OUTPUT))     OPEN THE LOG FILE OUTPUT
         TM    DCBOFLGS-IHADCB+LOGFILE,DCBOFOPN  FILE OPEN OK ?
         BNO   CLOS9500               NO...QUIT
         JDCSETAM ,                   SET TO ACCESS REGISTER MODE
         SPACE
         JDCSUBM LOGTOT               GO LOG THE UPDATED TOTALS
         SPACE
         L     R6,DSPDETA             GET ADDRESS OF DATA
         JDCSETAM ,                   SET TO ACCESS REGISTER MODE
CLOS7600 DS    0H
         L     R2,IOAREA              GET I/O BLOCK ADDRESS     U20027
         L     R3,DSPRECLN            GET RECORD LENGTH         U20027
         C     R6,NEWEND              AT END OF DATA ?
         BNL   CLOS7900               YES..GO CLOSE UP
         XC    0(4,R6),0(R6)          CLEAR THE RECORD LOCK
         LR    R7,R3                  FROM REC LTH              U20027
         MVCL  R2,R6                  MOVE RECORD TO IOAREA     U20027
         JDCSUBM WLOG                 GO WRITE THE LOG RECORD
         B     CLOS7600               AND GO ROUND AGAIN
CLOS7900 DS    0H
         JDCSETPM ,                   SET TO PRIMARY MODE
         CLOSE LOGFILE                AND CLOSE THE FILE
         FREEPOOL LOGFILE             AND FREE THE BUFFERS
         JDCALLOM FUNC=UNALL,DDNAME=LOGDDN,WORK=MISCWORK FLUSH OLD DD
         OPEN  (CNTLFILE,(UPDAT))     OPEN THE CONTROL FILE
         TM    DCBOFLGS-IHADCB+CNTLFILE,DCBOFOPN  FILE OPEN OK ?
         BNO   CLOS9400               NO...QUIT
         CLI   DUPLEX,DSAMYES         DUPLEXING CONTROL FILE ?
         BNE   CLOS7920               NO...FORGET IT
         OPEN  (CNTLFIL2,(UPDAT))     OPEN THE CONTROL FILE
         TM    DCBOFLGS-IHADCB+CNTLFIL2,DCBOFOPN  FILE OPEN OK ?
         BNO   CLOS9420               NO...QUIT
CLOS7920 DS    0H
         JDCSETAM ,                   SET TO ACCESS REGISTER MODE
         L     R6,DSPORIGN            POINT TO CONTROL AREA
         MVC   WHSLRCNT,LOGRECNT      SET NEW LOG RECORD COUNT
```

```
         L     R7,DSPFCSIZ            GET SIZE OF FCL
         SLL   R7,2                   MULTIPLY BY 4 FOR LENGTH
         LA    R6,WHSFCLST            POINT TO FAILED COMMIT LIST
         LA    R3,0                   SET SOURCE LEN AND PADDING BYTE
         MVCL  R6,R2                  AND CLEAR THE FAILED COMMIT LIST
         JDCSUBM WCNTL                GO REWRITE THE CONTROL RECORD
         JDCSETPM ,                   SET TO PRIMARY MODE
         CLOSE CNTLFILE               AND CLOSE THE FILE
         CLI   DUPLEX,DSAMYES         DUPLEXING CONTROL FILE ?
         BNE   CLOS7950               NO...FORGET IT
         CLOSE CNTLFIL2               YES..CLOSE THE FILE
CLOS7950 DS    0H
         JDCSETAM ,                   SET TO ACCESS REGISTER MODE
         L     R6,DSPORIGN            POINT TO CONTROL AREA
         MVC   WHSLDSN,LOGDSN         STORE NEW LOG FILE DSN
         XC    WHSLKCMT,WHSLKCMT      CLEAR COMMIT LOCK
         XC    CCNUM,CCNUM            CLEAR COMMIT CONTROL NUMBER
         CPYA  R4,R15                 LOAD ADDRESS SPACE ALET INTO AR4
         CPYA  R5,R15                 LOAD ADDRESS SPACE ALET INTO AR5
         SPACE 3
CLOS8000 DS    0H
         JDCSETPM ,                   SET TO PRIMARY MODE
         L     R2,BISADDR             GET ADDR OF BIS
         L     R3,BISLEN              GET LENGTH OF BIS
         LTR   R2,R2                  GOT ANYTHING ?
         BZ    CLOS8020               NO...SKIP FREEMAIN
         FREEMAIN RU,A=(R2),LV=(R3),SP=2 AND FREE IT
         XC    BISADDR,BISADDR        CLEAR THE SAVE ADDRESS
CLOS8020 DS    0H
         L     R2,IOAREA              GET ADDR OF I/O AREA
         L     R3,IOAREALN            GET LENGTH OF I/O AREA
         LTR   R2,R2                  GOT ANYTHING ?
         BZ    CLOS8040               NO...SKIP FREEMAIN
         FREEMAIN RU,A=(R2),LV=(R3),SP=2 AND FREE IT
CLOS8040 DS    0H
         JDCSETAM ,                   SET TO ACCESS REGISTER MODE
         JDCSUBM LCKCNTL              GO LOCK THE CONTROL AREA
         CLI   DSAMUNLK,DSAMYES       UNLOCK REQUESTED ?
         BNE   CLOS8100               NO...LEAVE IT LOCKED
         CLC   DSAMLKID,WHSLKEXC      GOT THE EXCLUSIVE LOCK ?
         BNE   CLOS8100               NO...LEAVE IT ALONE
         XC    WHSLKEXC,WHSLKEXC      RELEASE EXCLUSIVE LOCK
         MVI   UNLOCKSW,C'Y'          INDICATE WE UNLOCKED IT
         MVC   WHSLKJOB,SPACES        CLEAR PROGRAM ID
         MVC   WHSLKSTP,SPACES        CLEAR STEP INFO
         MVC   WHSLKTIM,SPACES        CLEAR TIME LOCKED
CLOS8100 DS    0H
         L     R2,WHSATCNT            GET ACTIVE TASK COUNT
         BCTR  R2,R0                  DECREMENT IT
         ST    R2,WHSATCNT            STORE NEW ACTIVE TASK COUNT
         NI    SWITCH,255-ACTCNT      TURN OFF ACTIVE TASK FLAG
         JDCSUBM TASKMSG                 GO DISPLAY CLOS MSG
         L     R6,DSPSTATA            GET WAREHOUSE STATS ADDRESS
         LA    R3,WRKGSRC             GET WORK STATS ADDRESS
         L     R9,DSPSTATL            GET STATS LENGTH
         SRL   R9,2                   GET COUNT OF FULLWORDS
CLOS8200 DS    0H
         L     R1,0(,R6)              GET COUNT FROM WAREHOUSE
         A     R1,0(R3)               ADD IN WORK AREA
         ST    R1,0(,R6)              STORE NEW VALUE
         LA    R6,4(R6)               POINT TO NEXT FIELD
         LA    R3,4(R3)               POINT TO NEXT FIELD
         BCT   R9,CLOS8200            AND GO ROUND TILL DONE
         L     R6,DSPORIGN            POINT TO CONTROL AREA
         XC    WHSLKPRM,WHSLKPRM      RELEASE CONTROL AREA LOCK
         MVI   WHCNTLSW,MYUNLOCK      CLEAR THE PGM LOCK SWITCH
```

```
         ESTAEX 0                     ALL DONE...SO CLEAR ESTAE EXIT
         NI    SWITCH,255-INITDONE    INDICATE NO LONGER INITIALIZED
         B     CLOSZ                  TAKE NO ERROR EXIT
CLOS9000 DS    0H
         MVC   REASCODE,RCINVPRM      SET INVALID PARMS
         B     CLOS9950               TAKE ERROR EXIT
CLOS9200 DS    0H
         MVC   REASCODE,RCFCLFUL      SET FAILED COMMIT LIST FULL
         B     CLOS9950               TAKE ERROR EXIT
CLOS9300 DS    0H
         MVC   REASCODE,RCDYNERR      SET DYNAMIC ALLOCATION ERROR
         MVI   DUBL+4,X'0F'           SET SIGN BYTE X'0F'
         UNPK  MISCWORK(9),DUBL(5)    UNPACK RETURN CODE
         TR    MISCWORK(8),HEXTABLE   CONVERT IT TO DISPLAY HEX
         MVC   ERR1BRC,MISCWORK       MOVE IT TO MESSAGE
         B     CLOS9950               TAKE ERROR EXIT
CLOS9400 DS    0H
         MVC   REASCODE,RCCFLERR      SET CONTROL FILE OPEN ERROR
         B     CLOS9950               TAKE ERROR EXIT
CLOS9420 DS    0H
         MVC   REASCODE,RCCFLER2      SET DUPE CTF FIL OPEN ERR
         B     CLOS9950               TAKE ERROR EXIT
CLOS9500 DS    0H
         MVC   REASCODE,RCLFLERR      SET LOG FILE OPEN ERROR
         B     CLOS9950               TAKE ERROR EXIT
CLOS9600 DS    0H
         MVC   REASCODE,RCBISFUL      SET BEFORE IMAGE STACK FULL
         B     CLOS9950               TAKE ERROR EXIT
CLOS9700 DS    0H
         MVC   REASCODE,RCNOSPAC      SET FILE FULL
         B     CLOS9950               TAKE ERROR EXIT
CLOS9950 DS    0H
         CPYA  R4,R15                 LOAD ADDRESS SPACE ALET INTO AR4
         CPYA  R5,R15                 LOAD ADDRESS SPACE ALET INTO AR5
         JDCSETPM ,                   SET TO PRIMARY MODE
         JDCAM24M ,                   SET TO AMODE 24
         TM    DCBOFLGS-IHADCB+CNTLFILE,DCBOFOPN  FILE OPEN ?
         BNO   CLOS9952               NO...TRY NEXT
         CLOSE CNTLFILE               YES..SO CLOSE IT
CLOS9952 DS    0H
         TM    DCBOFLGS-IHADCB+CNTLFIL2,DCBOFOPN  FILE OPEN ?
         BNO   CLOS9954               NO...TRY NEXT
         CLOSE CNTLFIL2               YES..SO CLOSE IT
CLOS9954 DS    0H
         TM    DCBOFLGS-IHADCB+LOGFILE,DCBOFOPN  FILE OPEN ?
         BNO   CLOS9956               NO...TRY NEXT
         CLOSE LOGFILE                YES..SO CLOSE IT
         FREEPOOL LOGFILE             AND FREE THE BUFFERS
CLOS9956 DS    0H
         JDCALLOM FUNC=UNALL,DDNAME=LOGDDN,WORK=MISCWORK FLUSH OLD DD
         JDCSETAM ,                   SET TO ACCESS REGISTER MODE
         JDCAM31M ,                   SET TO AMODE 31
         TM    SWITCH,NOLOG+OPENIN    OPEN INPUT AND NOT LOG ?
         BNM   CLOS9980               EITHER BOTH OR NEITHER...SKIP
* ELSE WAREHOUSE CORRUPT...CLOSE IT DOWN
         L     R6,DSPORIGN            GET CONTROL AREA ADDRESS
         MVC   WHSEYE,DSPDOWN         SET DATA SPACE CORRUPT
CLOS9980 DS    0H
         JDCSUBM BKOUT                BACKOUT ALL UPDATES
         L     R6,DSPORIGN            GET CONTROL AREA ADDRESS
         TM    SWITCH,ACTCNT          ACTIVE TASK INCR'D ?
         BNO   CLOS9985               NO, SKIP DECREMENT
         L     R2,WHSATCNT            GET ACTIVE TASK COUNT
         BCTR  R2,R0                  DECREMENT IT
         ST    R2,WHSATCNT            STORE NEW ACTIVE TSK CNT
         NI    SWITCH,255-ACTCNT      TURN OFF ACTIVE TASK FLAG
         JDCSUBM TASKMSG                GO DISPLAY CLOS MSG
CLOS9985 DS    0H
         OC    CCNUM,CCNUM            DID WE SET THE COMMIT LOCK ?
         BZ    CLOS9990               NO...QUIT
         CLC   WHSLKCMT,CCNUM         ENSURE THIS IS OUR COMMIT LOCK
         BNE   CLOS9990               IT'S NOT...QUIT
         XC    WHSLKCMT,WHSLKCMT      ELSE CLEAR THE LOCK
         XC    CCNUM,CCNUM            CLEAR LOCK HOLD AREA
         CLC   DSAMLKID,WHSLKEXC      GOT THE EXCLUSIVE LOCK ?
         BNE   CLOS9990               NO...LEAVE IT ALONE
         XC    WHSLKEXC,WHSLKEXC      RELEASE EXCLUSIVE LOCK
         MVI   UNLOCKSW,C'Y'          INDICATE WE UNLOCKED IT
         MVC   WHSLKJOB,SPACES        CLEAR PROGRAM ID
         MVC   WHSLKSTP,SPACES        CLEAR STEP INFO
         MVC   WHSLKTIM,SPACES        CLEAR TIME LOCKED
CLOS9990 DS    0H
         B     CLOSZ                  RETURN TO CALLER
         EJECT
LOGTOT   JDCRTNM
         L     R1,DSPRECLN            GET LENGTH OF DETAIL RECS
         SH    R1,=H'16'              SUBTRACT TOTALS REC HDR LEN
         SRL   R1,3                   GET NUMBER OF 8 BYTE SLOTS
         SLL   R1,3                   GET LENGTH OF TOTALS SLOTS
         L     R2,IOAREA              GET ADDR OF IOAREA
         MVC   4(4,R2),=C'TOTS'       INDICATE TOTALS RECORD
         ST    R1,12(,R2)             STORE LENGTH OF TOTS RECS
         L     R6,DSPORIGN            GET DATA SPACE ORIGIN
         L     R6,DSPTOTSA            GET TOTALS AREA
         L     R4,DSPTOTSL            GET TOTALS LENGTH
LOGTOT10 DS    0H
         SR    R4,R1                  SUBTRACT OUT LENGTH OF 1 REC
         BM    LOGTOT50               IF NEGATIVE, GO MOVE LAST REC
         LR    R3,R1                  LENGTH TO MOVE            U20027
         LR    R7,R1                  BOTH OPERANDS             U20027
         LA    R2,16(,R2)             OVER THE HEADER           U20027
         MVCL  R2,R6                  MOVE TOTALS TO IOAREA     U20027
         SR    R6,R1                  START OF RECORD           U20027
         L     R2,IOAREA              SET BACK TO IO AREA       U20027
         LR    R14,R6                 GET CURRENT POSITION IN WORK
         S     R14,DSPTOTSA           SUB START FOR OFFSET
         ST    R14,8(,R2)             STORE OFFSET OF TOTS RECS
         AR    R6,R1                  INCREMENT TOTALS AREA POINTER
         JDCSUBM WLOG                 GO WRITE THE RECORD
         B     LOGTOT10               AND GO ROUND TILL DONE
LOGTOT50 DS    0H
         AR    R4,R1                  ADD LAST REC BACK IN
         BZ    LOGTOT80               NONE LEFT...QUIT NOW
         LR    R7,R4                  LENGTH OF LAST REC        U20027
         LR    R3,R4                  SAME LENGTH               U20027
         LA    R2,16(,R2)                                       U20027
         MVCL  R2,R6                  MOVE TOTALS TO IOAREA     U20027
         L     R2,IOAREA              RESTORE POINTER           U20027
         SR    R6,R4                  SET BACK TO DSP ADDRESS   U20027
         LR    R14,R6                 GET CURRENT POSITION IN WORK
         S     R14,DSPTOTSA           SUB START FOR OFFSET
         ST    R14,8(,R2)             STORE OFFSET OF TOTS RECS
         ST    R4,12(,R2)             STORE LENGTH OF TOTS RECS
         JDCSUBM WLOG                 GO WRITE THE RECORD
LOGTOT80 DS    0H
         B     LOGTOTZ                AND RETURN TO CALLER
         EJECT
STAT     JDCRTNM
         MVC   DSAM7750,=CL8'DSAM7750' IF MORE THAN 1           U20027
         JDCALLOM FUNC=INFO,DDNAME=DSAM7750,WORK=MISCWORK,             X
               RETMBR=RETMBRNM,ERROR=DUBL
         BNZ   STAT9000               IF ERROR...CAN'T CONTINUE
```

ATTY. DOCKET NO.: CRKR-0009 PATENT

```
         LOAD  EPLOC=DSAM7750        GET NAMES OF EVERYTHING          15470000
         LR    R1,R0                 GET THE ADDRESS                  15480000
         MVC   DSPNAME(LEN7750),0(R1) MOVE TO FIELDS IN THIS PGM      15490000
         DELETE EPLOC=DSAM7750       AND GET RID OF IT                15500000
         LOAD  EPLOC=ANKNAME,ERRET=STAT1000   SEE IF ANCHOR PRESENT   15510000
         ST    R0,ANKEP              SAVE THE ANCHOR PROGRAM ADDRESS  15520000
         LR    R1,R0                 GET ADDR OF ANCHOR PROGRAM       15530000
         CLC   0(L'ANKEYE,R1),ANKEYE VALID EYE CATCHER ?              15540000
         BE    STAT1500              YES..CONTINUE                    15550000
STAT1000 DS    0H                                                     15560000
         MVC   REASCODE,RCNOTAVL     NO...ANCHOR NOT THERE...EXIT     15570000
         B     STATZ                 AND RETURN TO CALLER             15580000
STAT1500 DS    0H                                                     15590000
         MVC   DSPALET,L'ANKEYE(R1)  ELSE GET THE ALET                15600000
         MVC   DSPORIGN,L'ANKEYE+L'DSPALET(R1)  AND THE ORIGIN        15610000
         JDCSETAM ,                  SET ACCESS REGISTER MODE         15620000
         MVC   DUBL(1),SWITCH        SAVE STATUS SWITCH               15630000
         OI    SWITCH,INITDONE       INDICATE INIT DONE - TEMPORARILY 15640000
         JDCSUBM TESTDS              GO VALIDATE WAREHOUSE            15650000
         B     STAT1800              NOT THERE...QUIT                 15660000
         B     STAT2000              NOT INITIALIZED...CONTINUE       15670000
         B     STAT2000              IT'S THERE...CONTINUE            15680000
STAT1800 DS    0H                                                     15690000
         MVC   SWITCH,DUBL           RESTORE STATUS SWITCH            15700000
         B     STATZ                 AND RETURN TO CALLER             15710000
STAT2000 DS    0H                                                     15720000
         MVC   SWITCH,DUBL           RESTORE STATUS SWITCH            15730000
         MVC   REASCODE,RCOK         SET REASON CODE TO NO ERROR      15740000
         L     R2,CPARM2             GET SECOND PARM                  15750000
         L     R3,WHSSTATL           GET LENGTH OF STATS AREA         15760000
         L     R6,WHSSTATA           GET STATS AREA ADDRESS           15770000
         LR    R7,R3                 LENGTH TO MOVE            U20027 15780000
         MVCL  R2,R6                 MOVE STATS TO CALLERS AREAU20027 15790000
         B     STATZ                 AND RETURN TO CALLER             15800000
*                                                                     15820000
STAT9000 DS    0H                                                     15830000
         MVC   REASCODE,RCNO7750     SET CONTROL TABLE ERROR          15840000
         MVI   DUBL+4,X'0F'          SET SIGN BYTE X'0F'              15850000
         UNPK  MISCWORK(9),DUBL(5)   UNPACK RETURN CODE               15860000
         TR    MISCWORK(8),HEXTABLE  CONVERT IT TO DISPLAY HEX        15870000
         MVC   ERR97RC,MISCWORK      MOVE IT TO MESSAGE               15880000
         B     STATZ                 AND RETURN TO CALLER             15890000
         EJECT                                                        15900000
INITAR   JDCRTNM                                                      15910000
         LAE   R15,0                 SET R15 AND AR15 TO 0            15920000
         CPYA  AR0,AR15              INIT ALL ACCESS REGISTERS        15930000
         CPYA  AR1,AR15              *                                15940000
         CPYA  AR2,AR15              *                                15950000
         CPYA  AR3,AR15              *                                15960000
         CPYA  AR4,AR15              *                                15970000
         CPYA  AR5,AR15              *                                15980000
         CPYA  AR6,AR15              *                                15990000
         CPYA  AR7,AR15              *                                16000000
         CPYA  AR8,AR15              *                                16010000
         CPYA  AR9,AR15              *                                16020000
         CPYA  AR10,AR15             *                                16030000
         CPYA  AR11,AR15             *                                16040000
         CPYA  AR12,AR15             *                                16050000
         CPYA  AR13,AR15             *                                16060000
         CPYA  AR14,AR15             *                                16070000
         LAM   AR6,AR6,DSPALET       LOAD THE ALET INTO REGISTER      16080000
         B     INITARZ               AND RETURN TO CALLER             16090000
         EJECT                                                        16100000
TIMER    JDCRTNM                                                      16110000
         MVO   DUBL(9),STRTTIME(7)   GET START MICROSECONDS           16120000
         LM    R14,R15,DUBL          LOAD INTO WORK REGS              16130000
```

DSAM7710 1-10-97 10:21a

```
         D     R14,=F'100'           GET IT IN HUNDREDS OF MICROSECS  16140000
         ST    R15,STRTTIME          AND SAVE IT                      16150000
         JDCSETPM ,                  SET PRIMARY MODE                 16160000
         TIME  MIC,DUBL              GET THE TIME NOW                 16170000
         JDCSETAM ,                  SET ACCESS REGISTER MODE         16180000
         MVO   MISCWORK(9),DUBL(7)   GET MICROSECONDS                 16190000
         LM    R14,R15,MISCWORK      LOAD INTO WORK REGS              16200000
         D     R14,=F'100'           GET IT IN HUNDREDS OF MICROSECS  16210000
         LR    R1,R15                GET IT IN WORK REG               16220000
         S     R1,STRTTIME           SUB THE START TIME               16230000
         BNM   TIMERZ                IF ITS POSITIVE...RETURN         16240000
         A     R1,=A(24*60*60*10000) ELSE ADD IN ONE DAY              16250000
         B     TIMERZ                AND RETURN TO CALLER             16260000
         EJECT                                                        16270000
BKOUT    JDCRTNM                                                      16280000
         ICM   R2,15,BISADDR         GET BEFORE IMAGE STACK ADDRESS   16290000
         BZ    BKOUTZ                NO BIS...QUIT                    16300000
         L     R3,DSPRECLN           GET LENGTH OF DETAIL RECORDS     16310000
         SH    R3,=Y(12)             DECREMENT FOR CHAINS      U20027 16320000
         LR    R7,R3                                           U20027 16323000
         LR    R1,R3                 SAVE LENGTH               U20027 16326000
BKOUT100 DS    0H                                                     16330000
         C     R2,BISNEXT            AT END OF STACK ?                16340000
         BE    BKOUT800              YES..ALL DONE                    16350000
         L     R6,0(,R2)             GET DATA SPACE ADDRESS           16360000
         CLC   TOTALEYE,0(R2)        TOTALS AREA ?                    16370000
         BE    BKOUT500              YES..GO BACK IT OUT              16380000
         LA    R2,12(R2)             INDEX TO START OF DATA    U20027 16390000
         XC    0(4,R6),0(R6)         CLEAR RECORD LOCK IN DATA SPACE  16400000
         LA    R6,12(R6)             INDEX TO START OF DATA    U20027 16404000
         MVCL  R6,R2                 MOVE BIS IMAGE TO DATA SPCU20027 16408000
         LR    R7,R1                 GET LTH IN DATA SPACE     U20027 16412000
         LR    R3,R1                 GET LTH IN BIS            U20027 16416000
         B     BKOUT100              AND GO ROUND TILL DONE           16420000
BKOUT500 DS    0H                                                     16430000
         LA    R2,L'TOTALEYE(R2)     POINT PAST EYE CATCHER           16440000
         L     R3,DSPTOTSL           GET LENGTH OF TOTALS AREA        16450000
         L     R6,DSPTOTSA           GET TOTALS AREA ADDR IN DSP      16460000
         LR    R7,R3                 GET LENGTH IN DEST LENGTH REG    16470000
         MVCL  R6,R2                 AND BACK OUT THESE TOTALS        16480000
         L     R3,DSPRECLN           GET LENGTH OF DETAIL RECORDS     16490000
         SH    R3,=Y(12)             DECREMENT FOR CHAINS      U20027 16500000
         B     BKOUT100              AND GO ROUND TILL DONE           16510000
BKOUT800 DS    0H                                                     16530000
         B     BKOUTZ                RETURN TO CALLER                 16540000
         EJECT                                                        16550000
TESTDS   JDCRTNM                                                      16560000
         LAM   AR6,AR6,DSPALET       LOAD THE ALET INTO REGISTER      16570000
         L     R6,DSPORIGN           GET START ADDR OF DATA SPACE     16580000
         TM    SWITCH,INITDONE       INITIALIZE DONE                  16590000
         BO    TESTDS03              YES..CONTINUE                    16600000
         MVC   REASCODE,RCNOTINI     INDICATE NOT YET INITIALIZED     16610000
         B     TESTDSY               NO...FORGET IT AND RETURN        16620000
TESTDS03 DS    0H                                                     16630000
         L     R9,ANKEP              LOAD THE ANCHOR PROGRAM ADDRESS  16640000
         CLC   0(L'ANKEYE,R9),ANKEYE VALID EYE CATCHER ?              16650000
         BNE   TESTDS04              NO...TAKE ERROR EXIT             16660000
         CLC   WHSEYE,DSPEYE         VALID EYE CATCHER ?              16670000
         BE    TESTDSX               YES..ALL OK...RETURN             16680000
         CLC   WHSEYE,DSPDOWN        CORRUPT EYE CATCHER ?            16690000
         BE    TESTDS05              YES..INICATE CORRUPT             16700000
TESTDS04 DS    0H                                                     16710000
         MVC   REASCODE,RCNOTAVL     INDICATE DATA SPACE NOT AVAIL    16720000
         NI    SWITCH,255-INITDONE   INDICATE INITIALIZE NOT DONE     16730000
         B     TESTDSZ               ERROR EXIT                       16740000
TESTDS05 DS    0H                                                     16750000
```

ATTY. DOCKET NO.: CRKR-0009 PATENT

```
         MVC   REASCODE,RCORRUPT        INDICATE DATA SPACE BAD INTEGRTY 16760000
         NI    SWITCH,255-INITDONE      INDICATE INITIALIZE NOT DONE     16770000
         B     TESTDSZ                  ERROR EXIT                       16780000
         EJECT                                                           16790000
WTMSG    JDCRTNM                                                         16800000
         TM    SWITCH,WTMSGSNT          WAIT MESSAGE ALREADY SENT ?      16810000
         BO    WTMSGZ                   YES..RETURN TO CALLER NOW        16820000
         OI    SWITCH,WTMSGSNT          INDICATE WAIT MESSAGE SENT       16830000
         JDCSETPM ,                     SET PRIMARY MODE                 16840000
         STM   R4,R7,HOLDREGS           SAVE CALLERS REGISTERS           16850000
         OC    APTCBAD,APTCBAD          DO WE HAVE AN APTCB ?            16860000
         BZ    WTMSG100                 NO...SO DONT TRY TO SET TASK ID  16870000
         AIF   ('&CPCS' EQ 'NO').WTCPCS1                          U20027 16875000
         L     R4,APTCBAD               YES..GET APTCB ADDRESS           16880000
         L     R4,TCBPCB-APTCB(R4)      GET APCB ADDRESS                 16890000
         MVC   WAITPGM,APCBNAME+3-DKNAPCB(R4)  GET TASK ID               16900000
.WTCPCS1 ANOP                                                     U20027 16905000
WTMSG100 DS    0H                                                        16910000
         CLI   DSAMFUNC,DSAMFNRD        IS THIS A READ REQUEST ?         16920000
         BE    WTMSG200                 YES..GO SET IT UP                16930000
         CLI   DSAMFUNC,DSAMFNCL        IS THIS A CLOSE REQUEST ?        16940000
         BE    WTMSG250                 YES..GO SET IT UP                16950000
         MVC   WAITWHAT,=CL10'DATA SPACE'   SET AS WAITING FOR DSP       16960000
         MVC   WAITTYPE,=C'EXCLUSIVE'   SET WAIT TYPE AS EXCLUSIVE       16970000
         CLI   DSAMLOCK,DSAMYES         EXCLUSIVE LOCK ?                 16980000
         BE    WTMSG300                 YES..LEAVE AS IS                 16990000
         MVC   WAITTYPE,=CL9'SHARED'    SET WAIT TYPE AS SHARED          17000000
         B     WTMSG300                 AND GO SEND MESSAGE              17010000
WTMSG200 DS    0H                                                        17020000
         MVC   WAITTYPE,=C'EXCLUSIVE'   SET WAIT TYPE AS EXCLUSIVE       17030000
         MVC   WAITWHAT,=CL10'RECORD'   SET AS WAITING FOR RECORD        17040000
         B     WTMSG300                 AND GO SEND MESSAGE              17050000
WTMSG250 DS    0H                                                        17060000
         MVC   WAITTYPE,=C'EXCLUSIVE'   SET WAIT TYPE AS EXCLUSIVE       17070000
         MVC   WAITWHAT,=CL10'COMMIT'   SET AS WAITING FOR COMMIT        17080000
         B     WTMSG300                 AND GO SEND MESSAGE              17090000
WTMSG300 DS    0H                                                        17100000
         MVC   WTMSG500,WAITMSG         MOVE MESSAGE TO WTO              17110000
         SPACE 3                                                         17120000
WTMSG400 WTO   '                                                        X17130000
               '                                                         17140000
         ORG   WTMSG400+8                                                17150000
WTMSG500 DS    CL60                                                      17160000
         ORG                                                             17170000
         SPACE 3                                                         17180000
WTMSG600 DS    0H                                                        17190000
         CLC   WAITWHAT,=CL10'DATA SPACE' WAITING FOR DSP?               17200000
         BNE   WTMSG700                   NO.. FORGET LOCK MSG           17210000
         CLI   NEWLOCK,C'Y'               SAME LOCK ?                    17220000
         BE    WTMSG650                   NO..  REISSUE MSG'S            17230000
         CLC   WAITSTAT,=C' STILL WAITING FOR ' SUBSEQ WAIT MSG?         17240000
         BE    WTMSG700                   YES.. FORGET LOCK MSG          17250000
WTMSG650 DS    0H                                                        17260000
         MVI   NEWLOCK,C'N'               RESET THE SWITCH               17270000
         JDCSUBM LKMSG                    GO DISPLAY LOCK IDS            17280000
WTMSG700 DS    0H                                                        17290000
         OC    APTCBAD,APTCBAD          DO WE HAVE AN APTCB ?            17300000
         BZ    WTMSG800                 NO...SO FORGET SUPV / SCROLL MSG 17310000
         AIF   ('&CPCS' EQ 'NO').WTCPCS2                          U20027 17315000
         MVC   MSGAREA,WAITMSG          MOVE MSG TO HOLD AREA            17320000
         JDCSUBM CPCSMSG                GO WRITE TO CPCS SCROLL          17330000
.WTCPCS2 ANOP                                                     U20027 17335000
WTMSG800 DS    0H                                                        17340000
         MVC   WAITTYPE,=C'EXCLUSIVE'   RESET WAIT TYPE                  17350000
         LM    R4,R7,HOLDREGS           RESTORE CALLERS REGISTERS        17360000
         JDCSETAM ,                     SET ACCESS REGISTER MODE         17370000
```

DSAM7710 1-10-97 10:21a

```
         B     WTMSGZ                   RETURN TO CALLER                 17380000
         EJECT                                                           17390000
*****                                   LOCK MSG ROUTINE                 17400000
LKMSG    JDCRTNM                                                         17410000
         ICM   R1,B'1111',CURRLOCK      GET CURRENT LOCK                 17420000
         MVC   LOCKSET1,=C' LOCK SET:'  INIT LITERAL                     17430000
         CLC   LOCKMSGT,=C'EXCL'        EXCLUSIVE LOCK ?                 17440000
         BE    LKMSG010                 YES, CONTINUE                    17450000
         MVC   LOCKATCT,=C' TASK CNT:'  ACTIVE TASK LITERAL              17460000
LKMSG010 DS    0H                                                        17470000
         CVD   R1,DUBL2                 CONVERT TO DECIMAL               17480000
         OI    DUBL2+L'DUBL2-1,X'0F'    ENSURE SIGN                      17490000
         UNPK  LOCKMSG1,DUBL2           CONVERT TO DISPLAY               17500000
         ICM   R1,B'1111',DSAMLKID      GET DESIRED LOCK                 17510000
         CVD   R1,DUBL2                 CONVERT TO DECIMAL               17520000
         OI    DUBL2+L'DUBL2-1,X'0F'    ENSURE SIGN                      17530000
         UNPK  LOCKMSG2,DUBL2           CONVERT TO DISPLAY               17540000
         MVC   LKMSG150,LOCKMSG         MOVE MESSAGE TO WTO              17550000
         CLI   LOCKSW,C'Y'              DID WE SET EXCL LOCK?            17560000
         BE    LKMSG100                 YES..THEN SEND MSG               17570000
         OC    CURRLOCK,CURRLOCK        HAS LOCK BEEN CLEARED?           17580000
         BZ    LKMSG900                 YES..SKIP MSG                    17590000
         SPACE 3                                                         17600000
LKMSG100 WTO   '                                                        X17610000
               '                                                         17620000
         ORG   LKMSG100+8                                                17630000
LKMSG150 DS    CL60                                                      17640000
         ORG                                                             17650000
         SPACE 3                                                         17660000
LKMSG200 DS    0H                                                        17670000
         OC    APTCBAD,APTCBAD          DO WE HAVE AN APTCB ?            17680000
         BZ    LKMSG250                 NO...SO FORGET CPCS SCRL         17690000
         AIF   ('&CPCS' EQ 'NO').LKCPCS1                          U20027 17695000
         MVC   MSGAREA,LOCKMSG          MOVE MSG TO HOLD AREA            17700000
         JDCSUBM CPCSMSG                GO WRITE TO CPCS SCROLL          17710000
.LKCPCS1 ANOP                                                     U20027 17715000
LKMSG250 DS    0H                                                        17720000
         CLI   LOCKSW,C'Y'              DID WE SET EXCL LOCK?            17730000
         BE    LKMSG900                 YES..THEN EXIT NOW               17740000
         CLC   LOCKMSGT,=C'EXCL'        WAITING ON EXCL LOCK?            17750000
         BNE   LKMSG900                 NO...THEN EXIT NOW               17760000
         MVC   LKINFONM,SAVLKJOB        MOVE OWNER'S JOB NAME            17770000
         MVC   LKINFOTM,SAVLKTIM        MOVE LOCK TIME                   17780000
         MVC   LKINFOS1,SAVLKJS         MOVE STEP INFO                   17790000
         MVC   LKINFOS3,SAVLKPJS        MOVE STEP INFO                   17800000
         MVI   LKINFOS2,C' '                                             17810000
         CLC   LKINFOS3,SPACES          WAS THERE A PROC STEP?           17820000
         BNH   LKMSG300                 NO...THEN MSG OK                 17830000
         MVC   LKINFOS3,SAVLKPS         MOVE PROC STEP                   17840000
         MVC   LKINFOS1,SAVLKPJS        MOVE JOB STEP                    17850000
         MVI   LKINFOS2,C'.'                                             17860000
LKMSG300 DS    0H                                                        17870000
         MVC   LKMSG450,LOCKINFO        MOVE MESSAGE TO WTO              17880000
         SPACE 3                                                         17890000
LKMSG400 WTO   '                                                        X17900000
               '                                                         17910000
         ORG   LKMSG400+8                                                17920000
LKMSG450 DS    CL60                                                      17930000
         ORG                                                             17940000
         SPACE 3                                                         17950000
LKMSG500 DS    0H                                                        17960000
         OC    APTCBAD,APTCBAD          DO WE HAVE AN APTCB ?            17970000
         BZ    LKMSG550                 NO...SO FORGET CPCS SCRL         17980000
         AIF   ('&CPCS' EQ 'NO').LKCPCS2                          U20027 17985000
         MVC   MSGAREA,LOCKINFO         MOVE MSG TO HOLD AREA            17990000
         JDCSUBM CPCSMSG                GO WRITE TO CPCS SCROLL          18000000
```

Page 15

ATTY. DOCKET No.: CRKR-0009 PATENT

```
.LKCPCS2 ANOP                                          U20027
LKMSG550 DS    0H
LKMSG900 DS    0H
         B     LKMSGZ                RETURN TO CALLER
         EJECT
*****                                LOCK DATA ROUTINE
LKDATA   JDCRTNM
         JDCSETPM ,                  SET PRIMARY MODE
         STM   R4,R7,HOLDREG2        SAVE CALLERS REGISTERS
         TIME  DEC                   GET TIME
         O     R0,FOXWORD            SET FOX SIGN ON
         ST    R0,FWORD              SAVE TIME IN FULL WORD
         MVC   WKTIME,TIMEMASK       MOVE IN EDIT MASK
         ED    WKTIME,FWORD          EDIT TIME INTO WKAREA
         OI    WKTIME+1,X'F0'        FORCE FOX SIGN
         MVC   SAVLKTIM,WKTIME+1     MOVE LOCK TIME
         USING TIOTDSCT,R1           ESTABLISH ADDRESSABILITY
         JDCAM24M ,                  SET TO AMODE 24
         EXTRACT DUBL2,'S',FIELDS=TIOT GET TIOT
         L     R1,DUBL2              TIOT ADDRESS
         MVC   SAVLKJOB,TIOCNJOB     MOVE JOB NAME
         MVC   SAVLKSTP,TIOCSTEP     MOVE STEP INFORMATION
         JDCAM31M ,                  SET TO AMODE 31
         OC    APTCBAD,APTCBAD       DO WE HAVE AN APTCB ?
         BZ    LKDAT100              NO...THEN WE'RE DONE
         AIF   ('&CPCS' EQ 'NO').LKCPCS3                U20027
         L     R4,APTCBAD            YES..GET APTCB ADDRESS
         L     R4,TCBPCB-APTCB(R4)   GET APCB ADDRESS
         MVC   SAVLKJS,SPACES        CLEAR FIELD
         MVC   SAVLKCPC,APCBNAME+3-DKNAPCB(R4)  GET TASK ID
         MVC   SAVLKPJS,=C'CPCSTASK'  FLAG AS CPCS TASK
.LKCPCS3 ANOP                                          U20027
LKDAT100 DS    0H
         LM    R4,R7,HOLDREG2        RESTORE CALLERS REGISTERS
         JDCSETAM ,                  SET ACCESS REGISTER MODE
         MVC   WHSLKJOB,SAVLKJOB     MOVE JOB NAME
         MVC   WHSLKSTP,SAVLKSTP     MOVE STEP INFORMATION
         MVC   WHSLKTIM,SAVLKTIM     MOVE LOCK TIME
LKDAT900 DS    0H
         B     LKDATAZ               RETURN TO CALLER
         DROP  R1                    DROP USING
         EJECT
*****                                TASK INIT/CLOS ROUTINE
TASKMSG  JDCRTNM
         JDCSETPM ,                  SET PRIMARY MODE
         STM   R4,R9,HOLDREG2        SAVE CALLERS REGISTERS
         CLI   DSAMFUNC,C'I'         INITIALIZE REQUEST ?
         BNE   TSMSG010              NO...MUST BE CLOSE
         TIME  DEC                   GET TIME
         ST    R0,DUBL2              SAVE TIME IN FULL WORD
         OI    DUBL2+4,X'0F'         FORCE FOX SIGN
         MVC   WKTIME,TIMEMSK2       MOVE IN EDIT MASK
         ED    WKTIME,DUBL2          EDIT TIME INTO WKAREA
         MVC   TSINFOTM,WKTIME+1     MOVE INIT TIME
         OC    APTCBAD,APTCBAD       DO WE HAVE AN APTCB ?
         BZ    TSMSG020              NO...THEN WE'RE DONE
         AIF   ('&CPCS' EQ 'NO').TSCPCS1                U20027
         L     R4,APTCBAD            YES..GET APTCB ADDRESS
         L     R5,TCBPCB-APTCB(R4)   GET APCB ADDRESS
         MVC   TSINFOA1,APCBNAME+3-DKNAPCB(R5)  GET TASK ID
         MVC   TSINFOA2,=C'APTCB: '  MOVE APTCB LITERAL
         ST    R4,DUBL2              SAVE APTCB ADDRESS
         MVI   DUBL2+4,X'0F'         SET SIGN BYTE X'0F'
         UNPK  MISCWORK(7),DUBL2+1(4)  UNPACK ADDRESS
         TR    MISCWORK(6),HEXTABLE  CONVERT IT TO DISPLAY HEX
         MVC   TSINFOA3,MISCWORK     MOVE IT TO MESSAGE
```

DSAM7710 1-10-97 10:21a

```
         B     TSMSG020              AND CONTINUE
.TSCPCS1 ANOP                                          U20027
TSMSG010 DS    0H
         MVC   TSINFOTP,=C'CLOSED OK FOR  '  MOVE CLOSE MESSAGE
TSMSG020 DS    0H
         MVC   TSMSG150,TASKINFO     MOVE MESSAGE TO WTO
         SPACE 3
TSMSG100 WTO   '                                              X
               '
         ORG   TSMSG100+8
TSMSG150 DS    CL60
         ORG
         SPACE 3
TSMSG200 DS    0H
         OC    APTCBAD,APTCBAD       DO WE HAVE AN APTCB ?
         BZ    TSMSG900              NO...SO FORGET CPCS SCRL
         AIF   ('&CPCS' EQ 'NO').TSCPCS2                U20027
         MVC   MSGAREA,TASKINFO      MOVE MSG TO HOLD AREA
         JDCSUBM CPCSMSG             GO WRITE TO CPCS SCROLL
.TSCPCS2 ANOP                                          U20027
TSMSG900 DS    0H
         LM    R4,R9,HOLDREG2        RESTORE CALLERS REGISTERS
         JDCSETAM ,                  SET ACCESS REGISTER MODE
         B     TASKMSGZ              RETURN TO CALLER
         EJECT
*****                                UNLK MSG ROUTINE
UNLKMSG  JDCRTNM
         CLI   UNLOCKSW,C'Y'         DID WE FREE EXCL LOCK?
         BE    ULKMSG10              YES..ISSUE MESSAGE
         SPACE 3
         WTO   'DSAM7710-96: EXCL LOCK NOT RELEASED'
         SPACE 3
         B     ULKMSG90              AND EXIT
ULKMSG10 DS    0H
         SPACE 3
         WTO   'DSAM7710-96: EXCL LOCK RELEASED SUCCESSFULLY'
         SPACE 3
ULKMSG90 DS    0H
         B     UNLKMSGZ              RETURN TO CALLER
         EJECT
*****                                CPCS MSG ROUTINE
CPCSMSG  JDCRTNM
         AIF   ('&CPCS' EQ 'NO').CPCPCS1                U20027
CPCS010  DS    0H
         XC    MISCWORK(40),MISCWORK  CLEAR WORK AREA
         LA    R1,MISCWORK           GET ADDRESS
         ST    R1,MISCWORK+8         AND STORE IN PARM LIST
         L     R9,APTCBAD            GET APTCB ADDRESS
         USING APTCB,R9              ESTABLISH ADDRESSABILITY
         L     R9,TCBPARM            GET PARMLST ADDRESS
         DROP  R9
         USING PARMLST,R9            ESTABLISH ADDRESSABILITY
         ST    R9,MISCWORK+12        ST IN PARM LIST FOR BFMGR
         LA    R1,MISCWORK+8         POINT TO PARM LIST
         L     R15,ABUFMGR           GET BUFFER MANAGER ADDR
         JDCAM24M                    CHANGE TO 24-BIT MODE
         BALR  R14,R15               AND GO TO IT
         JDCAM31M                    CHANGE TO 31-BIT MODE
         L     R14,MISCWORK          GET ADDR OF STATUS BYTE
         CLI   0(R14),8              DID WE GET A BUFFER ?
         BNE   CPCS010               NO...GO TRY AGAIN
         L     R1,MISCWORK+4         YES..GET BUFFER ADDRESS
         XC    0(4,R1),0(R1)         CLEAR FIRST FOUR BYTES
         MVC   4(60,R1),MSGAREA      SET UP CALLERS MESSAGE
         MVI   0(R14),X'05'          SET DEST CODE - SYST SUPV
         L     R1,GRAPHECB           LOAD ECB ADDR
```

Page 16

ATTY. DOCKET NO.: CRKR-0009 PATENT

```
         DROP  R9                                                19250000
         POST  (R1)                   SEND MESSAGE               19260000
.CPCPCS1 ANOP                                            U20027 19265000
         B     CPCSMSGZ               RETURN TO CALLER           19270000
         EJECT                                                   19280000
LCKCNTL  JDCRTNM                                                 19290000
*                                 *** KEEP TRACK OF THIS TASK'S  19300000
*                                 *** CONTROL AREA LOCK          19310000
         MVI   WHCNTLSW,MYLOCK        THIS TASK HAS THE LOCK     19320000
*                                                                19330000
*        **** IMPORTANT NOTE: ALL INSTRUCTIONS THAT CLEAR THE    19340000
*             CONTROL AREA LOCK MUST ALSO CLEAR THIS SWITCH.     19350000
*                                                                19360000
LCKCNTL5 DS    0H                                                19370000
         LA    R2,0                   SET COMPARE VALUE          19380000
         L     R3,KLOCKED             SET LOCK VALUE             19390000
         L     R6,DSPORIGN            GET CONTROL AREA ADDRESS   19400000
         CS    R2,R3,WHSLKPRM         TRY TO GET LOCK ON CONTROL AREA 19410000
         BE    LCKCNTLZ               GOT IT...RETURN TO CALLER  19420000
*                                 *** ALREADY LOCKED.            19430000
         CLI   WHCNTLSW,MYLOCK        DID THIS TASK LOCK IT?     19440000
         BE    LCKCNTLZ               YES, THEN CONTINUE         19450000
         JDCSETPM ,                   SET TO PRIMARY MODE        19460000
         STIMER WAIT,DINTVL=ONETENTH  ELSE WAIT 1/10TH OF A SECOND 19470000
         JDCSETAM ,                   SET TO ACCESS REGISTER MODE 19480000
         B     LCKCNTL5               AND KEEP TRYING TO GET LOCK 19490000
         EJECT                                                   19500000
         PUSH  USING                                             19510000
ESTAEXIT DS    0H                                                19520000
         LR    R10,R15                GET ENTRY ADDRESS IN BASE REG 19530000
         USING ESTAEXIT,R10           ESTABLISH ADDRESSABILITY   19540000
         LM    R11,R12,AREGSAVE       GET WORK AREA BASE REGS    19550000
         LA    R13,ESTAREGS           POINT TO ESTAE REG SAVE AREA 19560000
         ST    R14,ESTAERET           SAVE ESTAE EXIT RETURN ADDRESS 19570000
         JDCSETPM                                                19580000
         WTO   'DSAM7710-995:  TERMINATING ABNORMALLY'           19590000
         JDCSETAM                                                19600000
         JDCSUBM INITAR               GO INITIALIZE AR REGISTERS 19610000
         L     R6,DSPORIGN            GET CONTROL AREA ADDRESS   19620000
         L     R2,=A(SVWHSCTL)        GET ADDRESS OF SAVE AREA   19630000
         MVC   0(WHSDSCTL,R2),WHSDSCT SAVE THE CONTROL AREA      19640000
         TM    SWITCH,NOLOG+OPENIN    DID WE BUILD A BIS ?       19650000
         BO    ESTAE925               NO...OPENED INPUT...OK     19660000
         BZ    ESTAE100               YES..GO BACK IT OUT        19670000
         L     R6,DSPORIGN            NO...DATA SPACE CORRUPT    19680000
         MVC   WHSEYE,DSPDOWN         CHANGE THE EYECATCHER      19690000
         B     ESTAE925               AND GET OUT                19700000
ESTAE100 DS    0H                                                19710000
         JDCSUBM BKOUT                BACKOUT ALL UPDATES MADE   19720000
         JDCSETPM ,                   SET TO PRIMARY MODE        19730000
         JDCAM24M ,                   SET TO AMODE 24            19740000
         TM    DCBOFLGS-IHADCB+CNTLFILE,DCBOFOPN  FILE OPEN ?    19750000
         BNO   ESTAE900               NO...TRY NEXT              19760000
         CLOSE CNTLFILE               YES..SO CLOSE IT           19770000
ESTAE900 DS    0H                                                19780000
         TM    DCBOFLGS-IHADCB+CNTLFIL2,DCBOFOPN  FILE OPEN ?    19790000
         BNO   ESTAE910               NO...TRY NEXT              19800000
         CLOSE CNTLFIL2               YES..SO CLOSE IT           19810000
ESTAE910 DS    0H                                                19820000
         TM    DCBOFLGS-IHADCB+LOGFILE,DCBOFOPN  FILE OPEN ?     19830000
         BNO   ESTAE920               NO...TRY NEXT              19840000
         CLOSE LOGFILE                YES..SO CLOSE IT           19850000
         FREEPOOL LOGFILE             AND FREE THE BUFFERS       19860000
ESTAE920 DS    0H                                                19870000
         JDCALLOM FUNC=UNALL,DDNAME=LOGDDN,WORK=MISCWORK FLUSH OLD DD 19880000
         JDCSETAM ,                   SET TO ACCESS REGISTER MODE 19890000
```

```
         JDCAM31M ,                   SET TO AMODE 31            19900000
ESTAE925 DS    0H                                                19910000
         L     R6,DSPORIGN            GET CONTROL AREA ADDRESS   19920000
         JDCSUBM LCKCNTL              GO LOCK THE CONTROL AREA   19930000
         CLC   DSAMLKID,WHSLKEXC      GOT THE EXCLUSIVE LOCK ?   19940000
         BNE   ESTAE930               NO...LEAVE IT ALONE        19950000
         CLI   LOCKSW2,C'Y'           WAS LOCK ALREADY THERE?  U20024 19953000
         BE    ESTAE930               YES..LEAVE IT ALONE      U20024 19956000
         XC    WHSLKEXC,WHSLKEXC      RELEASE EXCLUSIVE LOCK     19960000
         MVI   UNLOCKSW,C'Y'          INDICATE WE UNLOCKED IT    19970000
         MVC   WHSLKJOB,SPACES        CLEAR PROGRAM ID           19980000
         MVC   WHSLKSTP,SPACES        CLEAR STEP INFO            19990000
         MVC   WHSLKTIM,SPACES        CLEAR TIME LOCKED          20000000
ESTAE930 DS    0H                                                20010000
         CLC   DSAMLKID,WHSLKADD      GOT THE ADD LOCK ?         20020000
         BNE   ESTAE940               NO...LEAVE IT ALONE        20030000
         XC    WHSLKADD,WHSLKADD      RELEASE ADD LOCK           20040000
ESTAE940 DS    0H                                                20050000
         OC    CCNUM,CCNUM            DID WE SET THE COMMIT LOCK ? 20060000
         BZ    ESTAE950               NO...QUIT                  20070000
         CLC   WHSLKCMT,CCNUM         ENSURE THIS IS OUR COMMIT LOCK 20080000
         BNE   ESTAE950               IT'S NOT...QUIT            20090000
         XC    WHSLKCMT,WHSLKCMT      ELSE CLEAR THE LOCK        20100000
         XC    CCNUM,CCNUM            CLEAR LOCK HOLD AREA       20110000
ESTAE950 DS    0H                                                20120000
         TM    SWITCH,ACTCNT          ACTIVE TASK INCR'D ?       20130000
         BNO   ESTAE960               NO, SKIP DECREMENT         20140000
         L     R2,WHSATCNT            GET ACTIVE TASK COUNT      20150000
         BCTR  R2,R0                  DECREMENT IT               20160000
         ST    R2,WHSATCNT            STORE NEW ACTIVE TASK COUNT 20170000
         NI    SWITCH,255-ACTCNT      TURN OFF ACTIVE TASK FLAG  20180000
         MVC   SAVEFUNC,DSAMFUNC      SAVE CURRENT FUNC CODE     20190000
         MVI   DSAMFUNC,C'C'          INDICATE CLOSE             20200000
         JDCSUBM TASKMSG                 GO DISPLAY CLOS MSG     20210000
         MVC   DSAMFUNC,SAVEFUNC      RESTORE FUNC CODE          20220000
ESTAE960 DS    0H                                                20230000
         TM    SWITCH,LCKPEND         WHS LOCK PENDING SET ?     20240000
         BNO   ESTAE970               NO, SKIP DECREMENT         20250000
         L     R2,WHSLKPND            GET PENDING LOCK COUNT     20260000
         BCTR  R2,R0                  DECREMENT IT               20270000
         ST    R2,WHSLKPND            STORE NEW PENDING LCK CNT  20280000
         NI    SWITCH,255-LCKPEND     TURN OFF PENDING LCK FLAG  20290000
ESTAE970 DS    0H                                                20300000
         XC    WHSLKPRM,WHSLKPRM      RELEASE CONTROL AREA LOCK  20310000
         MVI   WHCNTLSW,MYUNLOCK      CLEAR THE PGM LOCK SWITCH  20320000
         JDCSETPM                                                20330000
         CLI   LOCKSW,C'Y'            DID WE PLACE EXCL LOCK?    20340000
         BNE   ESTAE980               NO...CONTINUE              20350000
         JDCSUBM UNLKMSG              YES..ISSUE UNLOCK MSG      20360000
ESTAE980 DS    0H                                                20370000
         WTO   'DSAM7710-996:  CLEAN UP COMPLETED NORMALLY'      20380000
         JDCSETAM                                                20390000
         L     R14,ESTAERET           SET RETURN ADDRESS         20400000
         LA    R15,0                  SET UP TO PERCOLATE        20410000
         BR    R14                    AND EXIT                   20420000
         SPACE 3                                                 20430000
AREGSAVE DC    A(SAVEAREA,SAVEAREA+4096)                         20440000
         POP   USING                                             20450000
         EJECT                                                   20460000
WCNTL    JDCRTNM                                                 20470000
         JDCSETAM ,                   SET TO ACCESS REGISTER MODE 20480000
         XC    DUBL,DUBL              SET RECORD NUMBER TO ZERO  20490000
         L     R6,DSPORIGN            GET START ADDR OF CONTROL AREA 20500000
         L     R7,DSPFCSIZ            GET SIZE OF FAILED COMMIT LIST 20510000
         SLL   R7,2                   MULTIPLY BY 4 - SIZE OF EACH F/W 20520000
         LA    R7,WHSDSCTL(R7)        ADD IN SIZE OF CONTROL AREA 20530000
```

ATTY. DOCKET NO.: CRKR-0009 PATENT

```
         L     R2,IOAREA              GET ADDR OF I/O AREA            20540000
         LR    R3,R7                  GET LENGTH TO MOVE              20550000
         MVCL  R2,R6                  AND MOVE CONTROL AREA TO WORK   20560000
         L     R9,IOAREA              GET ADDR OF I/O AREA            20570000
         JDCAM24M ,                   SET TO AMODE 24                 20580000
         JDCSETPM ,                   SET TO AR MODE PRIMARY          20590000
         WRITE WORKDECB,DI,CNTLFILE,(R9),'S',O,DUBL,,MF=E             20600000
         CLI   DUPLEX,DSAMYES         DUPLEXING CONTROL FILE ?        20610000
         BNE   WCNTL3                 NO...FORGET IT                  20620000
         WRITE WORKDEC2,DI,CNTLFIL2,(R9),'S',O,DUBL,,MF=E             20630000
WCNTL3   DS    OH                                                     20640000
         CHECK WORKDECB                                               20650000
         CLI   DUPLEX,DSAMYES         DUPLEXING CONTROL FILE ?        20660000
         BNE   WCNTL6                 NO...FORGET IT                  20670000
         CHECK WORKDEC2                                               20680000
WCNTL6   DS    OH                                                     20690000
         JDCSETAM ,                   SET TO ACCESS REGISTER MODE     20700000
         JDCAM31M ,                   SET TO AMODE 31                 20710000
         B     WCNTLZ                 RETURN TO CALLER                20720000
         EJECT                                                        20730000
WLOG     JDCRTNM                                                      20740000
         STM   R1,R2,DUBL             SAVE WORK REGS                  20750000
         L     R2,IOAREA              GET ADDR OF I/O AREA            20760000
         MVC   O(4,R2),CCNUM          PUT COMMIT CNTL NUM IN REC      20770000
         JDCAM24M ,                   SET TO AMODE 24                 20780000
         JDCSETPM ,                   SET TO AR MODE PRIMARY          20790000
         PUT   LOGFILE,(R2)           WRITE THE LOG RECORD            20800000
         JDCSETAM ,                   SET TO ACCESS REGISTER MODE     20810000
         JDCAM31M ,                   SET TO AMODE 31                 20820000
         L     R1,LOGRECNT            GET CURRENT LOG REC COUNT       20830000
         LA    R1,1(R1)               INCREMENT IT                    20840000
         ST    R1,LOGRECNT            STORE NEW LOG REC COUNT         20850000
         LM    R1,R2,DUBL             RESTORE WORK REGS               20860000
         B     WLOGZ                  RETURN TO CALLER                20870000
         EJECT                                                        20880000
EXIT     JDCRTNM                                                      20890000
         OC    DSPRECLN,DSPRECLN      DID WE SUCCESSFULLY INIT ?      20900000
         BZ    EXITO500               NO...SO SKIP IT                 20910000
         MVC   DSAMRCNT,DSPRECNT      MOVE TOTAL REC COUNT TO PARMS   20920000
         L     R3,DSPNEXTD            GET NEXT AVAILABLE REC ADDR     20930000
         S     R3,DSPDETA             SUB DETAIL START ADDRESS        20940000
         XR    R2,R2                  CLEAR WORK REG FOR DIVIDE       20950000
         D     R2,DSPRECLN            AND GET COUNT OF USED RECORDS   20960000
         L     R2,DSPRECNT            GET TOTAL RECORD COUNT          20970000
         SR    R2,R3                  SUB USED FROM TOTAL FOR AVAIL   20980000
         ST    R2,DSAMFCNT            AND STORE THE FREE REC COUNT    20990000
EXITO500 DS    OH                                                     21000000
         L     R3,REASCODE            GET POINTER TO RET / REAS CODE  21010000
         MVC   DSAMREAS,O(R3)         SET THE REASON CODE             21020000
         MVC   DSAMRETC,4(R3)         SET THE RETURN CODE             21030000
         MVC   DSAMMSG,8(R3)          SET THE DESCRIPTIVE MESSAGE     21040000
         L     R2,CPARM1              GET ADDR OF FIRST PARM          21050000
         MVC   O(DSAMDSCL,R2),DSAMFUNC RESTORE CALLERS PARM LSIT      21060000
         JDCSETPM ,                   SET PRIMARY MODE                21070000
         B     EXITZ                  NORMAL EXIT                     21080000
         EJECT                                                        21090000
SAVEAREA DS    9D                     PROGRAM SAVE AREA               21100000
ESTAREGS DS    9D                     ESTAE REGISTER SAVE AREA        21110000
HOLDREGS DS    3D                     TEMP REGISTER SAVE AREA         21120000
HOLDREG2 DS    3D                     TEMP REGISTER SAVE AREA         21130000
DUBL2    DS    D                      MISC WORK AREA                  21140000
DUBL     DS    D                      MISC WORK AREA                  21150000
MISCWORK DS    CL400                  MISC WORK - MUST FOLLOW DUBL    21160000
CPARMS   DS    OCL12                  CALLERS PARM LIST               21170000
CPARM1   DS    F                      ADDR OF FIRST PARM              21180000
CPARM2   DS    F                      ADDR OF SECOND PARM             21190000
```

DSAM7710 1-10-97 10:21a

```
CPARM3   DS    F                      ADDR OF THIRD PARM              21200000
ESTAERET DS    F                      ESTAE EXIT RETURN ADDRESS       21210000
APTCBAD  DS    F                      ADDR OF CALLERS APTCB           21220000
TOTSAD   DS    F                      ADDR OF CALLERS TOTALS AREA     21230000
ANKEP    DS    F                      ADDR OF ANCHOR PROGRAM          21240000
RECSLOT  DS    F                      SLOT RETURNED FROM HASH ROUTINE 21250000
DELSLOT  DS    F                      DELETED SLOT FOUND DURING WRITE 21260000
OLDEND   DS    F                      HOLD AREA FOR DSP END OF DATA   21270000
NEWEND   DS    F                      HOLD AREA FOR DSP END OF DATA   21280000
HOLDADDR DS    F                      HOLD AREA FOR DSP RECORD ADDRESS 21290000
FCLADDR  DS    F                      FCL SLOT POINTER                21300000
CCNUM    DS    F                      COMIIT CONTROL NUMBER           21310000
RETCODE  DS    F                      PROGRAM RETURN CODE             21320000
REASCODE DS    F                      MACRO FAILURE REASON CODE       21330000
DSPORIGN DS    F                      START ADDRESS OF DATA SPACE     21340000
DSPALET  DS    F                      ALET FOR CREATED DATA SPACE     21350000
DSPMSYNS DS    F                      MAXIMUM SYNONYMS                21360000
DSPDFUPD DS    F                      DEFUALT MAX UPDATES PER RUN     21370000
DSPNDXA  DS    A                      ADDRESS OF INDEX AREA           21380000
DSPNDXL  DS    F                      LENGTH OF INDEX AREA            21390000
DSPDETA  DS    A                      ADDRESS OF DETAIL AREA          21400000
DSPDETND DS    A                      ADDRESS OF END OF DETAIL AREA   21410000
DSPRECNT DS    F                      MAXIMUM DETAIL RECORDS          21420000
DSPRECLN DS    F                      LENGTH OF DETAIL RECORDS        21430000
DSPKYPOS DS    F                      OFFSET OF KEY WITHIN RECORD     21440000
DSPKYLEN DS    F                      LENGTH OF KEY WITHIN RECORD     21450000
DSPSTATA DS    A                      ADDRESS OF STATS AREA           21460000
DSPSTATL DS    F                      LENGTH OF STATS AREA            21470000
DSPTOTSA DS    A                      ADDRESS OF TOTALS AREA          21480000
DSPNEXTD DS    A                      WORK AREA FOR NEXT AVAIL SLOT   21490000
DSPSDEL  DS    D                      WORK AREA FOR SEQ ACCESS DELAY  21500000
DSPKDEL  DS    D                      WORK AREA FOR KEY ACCESS DELAY  21510000
DSPTOTSL DS    F                      LENGTH OF TOTALS AREA           21520000
DSPLDSN  DS    CL44                   LOG FILE DATA SET NAME          21530000
RETMBRNM DS    OCL14                  TEXT UNIT WORK AREA             21540000
         DS    CL6                    TEXT UNIT KEY ETC.              21550000
DSAM7750 DC    CL8'DSAM7750'          CONTROL TABLE NAME              21560000
DSPFCSIZ DS    F                      NUM F/W FOR FAILED COMMIT LIST  21570000
INDEXCNT DS    F                      INDEX RECORD COUNT              21580000
ABD2LOCK DS    F                      WORK FIELD FOR PENDING LOCK CNT 21590000
LOGRECNT DS    F                      WORK FIELD FOR LOG REC COUNT    21600000
STRTTIME DS    D                      PROCESS START TIME              21610000
*********************************************************************** 21620000
* THE FOLLOWING FIELDS CORRELATE TO THE EQUIVALENT IN THE WAREHOUSE   21630000
* STATS AREA (COPYBOOK DSAM400L) AND MUST BE KEPT IN THE SAME ORDER   21640000
*                                                                     21650000
WRKGSRC  DS    F                      COUNT OF SUCCESSFUL READS       21660000
WRKGSRT  DS    F                      TOTAL TIME OF SUCCESSFUL READS  21670000
WRKGKRC  DS    F                      COUNT OF SUCCESSFUL READS       21680000
WRKGKRT  DS    F                      TOTAL TIME OF SUCCESSFUL READS  21690000
WRKFRC   DS    F                      COUNT OF FAILED READS           21700000
WRKFRT   DS    F                      TOTAL TIME OF ALL FAILED READS  21710000
WRKGWIC  DS    F                      COUNT OF SUCCESSFUL WRITES      21720000
WRKGWIT  DS    F                      TOTAL TIME OF SUCCESSFUL WRITES 21730000
WRKGWUC  DS    F                      COUNT OF SUCCESSFUL WRITES      21740000
WRKGWUT  DS    F                      TOTAL TIME OF SUCCESSFUL WRITES 21750000
WRKFWC   DS    F                      COUNT OF FAILED WRITES          21760000
WRKFWT   DS    F                      TOTAL TIME OF ALL FAILED WRITES 21770000
WRKKRP   DS    F                      TOTAL DIRECT READ PROBES        21780000
WRKSRP   DS    F                      TOTAL SEQUENTIAL READ PROBES    21790000
WRKWUP   DS    F                      TOTAL WRITE UPDATE PROBES       21800000
WRKWIP   DS    F                      TOTAL WRITE INSERT PROBES       21810000
WRKCMTC  DS    F                      COMMIT COUNT                    21820000
WRKCMTT  DS    F                      TOTAL TIME OF COMMITS           21830000
WRKLEN   EQU   *-WRKGSRC              LENGTH OF STATS WORK AREA       21840000
*                                                                     21850000
```

Page 18

```
* END OF STATS WORK AREA                                                  21860000
************************************************************************* 21870000
BISADDR  DS    A                        ADDRESS OF BEFORE IMAGE STACK     21880000
BISLEN   DS    F                        LENGTH OF BEFORE IMAGE STACK      21890000
BISEND   DS    A                        ADDRESS OF END OF BIS             21900000
BISNEXT  DS    A                        ADDRESS OF NEXT SLOT IN BIS       21910000
IOAREA   DS    A                        ADDRESS OF I/O AREA               21920000
IOAREALN DS    F                        LENGTH OF I/O AREA                21930000
KLOCKED  DC    F'-1'                    LOCK VALUE                        21940000
KDELETED DC    C'DELE'      THIS CONSTANT MUST BE F/W ALIGNED             21950000
ONETENTH DC    C'00000010'              STIMER 1/10TH OF A SECOND VALUE   21960000
ONEHUNDR DC    C'00000001'              STIMER 1/100TH OF A SECOND VALUE  21970000
LOCKWAIT DC    C'00000200'              LOCK WAIT LOOP TIME - 10 SECS     21980000
NEWLOCK  DC    C'N'                     CURRENT LOCK CHANGE SWTCH         21990000
LOCKSW   DC    C'N'                     THIS TASK PLACED EXCL LCK         22000000
LOCKSW2  DC    C'N'                     WHSE WAS ALREADY LOCKED   U20024  22005000
UNLOCKSW DC    C'N'                     THIS TASK CLEARED EXC LCK         22010000
TIMEMASK DC    XL09'4021207A20207A2020' TIME EDIT MASK HH:MM:SS           22020000
TIMEMSK2 DC    XL09'402120202020202020' TIME EDIT MASK HHMMSSTT           22030000
SAVEFUNC DC    C' '                     SAVE AREA FOR FUNC CODE           22040000
WKTIME   DC    CL09' '                  WORKAREA FOR TIME                 22050000
FWORD    DS    F                        WORKAREA FOR TIME                 22060000
FOXWORD  DS    0F                       WORKAREA FOR TIME                 22070000
         DC    X'0000000F'              WORKAREA FOR TIME                 22080000
WAITCNT  DC    F'0'                     WAIT CONTROL COUNTER              22090000
WAITMAX  DC    F'150'                   WAIT TIME BETWEEN MSGS            22100000
*                                       '30' IS APPROX. 1 MINUTE          22110000
CURRLOCK DC    F'0'                     SAVE AREA FOR LOCKS               22120000
SAVLKJOB DC    CL8'JOBNAME'             SAVE AREA FOR LOCK INFO           22130000
SAVLKSTP DS    0CL16                    SAVE AREA FOR LOCK INFO           22140000
SAVLKCPC DS    0CL4                     SAVE AREA FOR CPCSTASK NM         22150000
SAVLKJS  DS    0CL8                     SAVE AREA FOR JOB STEP            22160000
SAVLKPS  DC    CL8'PROCSTEP'            SAVE AREA FOR PROC STEP           22170000
SAVLKPJS DC    CL8'JOBSTEP '            SAVE AREA FOR PROC/JOB            22180000
SAVLKTIM DC    CL8'HH:MM:SS'            SAVE AREA FOR LOCK INFO           22190000
MAJNAME  DC    CL8'DSAM7710'            ENQ MAJOR NAME                    22200000
MINNAME  DC    CL8'GETLCKID'            ENQ MINOR NAME                    22210000
RSVDLTH  DC    H'12'                    DEFAULT RSVD AREA LENGTH  U20027  22215000
SPACES   DC    CL60' '                                                    22220000
WHCNTLSW DC    X'00'                    W.H. CNTL AREA LOCK SW            22230000
MYLOCK   EQU   X'FF'                    W.H. CNTL AREA LOCKED             22240000
MYUNLOCK EQU   X'00'                    W.H. CNTL AREA UNLOCKED           22250000
SWITCH   DC    X'00'                    STATUS FLAGS                      22260000
INITDONE EQU   X'80'                    INITIALIZATION PERFORMED          22270000
NOLOG    EQU   X'40'                    NO LOGGING REQUIRED               22280000
WTMSGSNT EQU   X'20'                    SET IF WAIT MESSAGE ALREADY SENT  22290000
OPENIN   EQU   X'10'                    WAREHOUSE OPENED FOR INPUT        22300000
ACTCNT   EQU   X'08'                    ACTIVE TASK COUNT INCR'D          22310000
LCKPEND  EQU   X'04'                    PENDING EXCL LOCK SET             22320000
         SPACE 3                                                          22350000
RCOK     DC    A(ERROR00)               NO ERROR                          22360000
RCNOTFND DC    A(ERROR01)               KEY NOT FOUND                     22370000
RCEOF    DC    A(ERROR02)               SEQUENTIAL END OF FILE            22380000
RCNOSPAC DC    A(ERROR03)               NO SPACE AVAILABLE                22390000
RCRECLOK DC    A(ERROR04)               RECORD LOCKED                     22400000
RCDUPKEY DC    A(ERROR05)               DUPLICATE KEY                     22410000
RCINVUPD DC    A(ERROR06)               UPDATE REQ WITHOUT READ FOR UPD   22420000
RCDEDLOK DC    A(ERROR07)               DEADLOCK ON READ FOR UPDATE       22430000
RCNOTAVL DC    A(ERROR10)               WAREHOUSE NOT AVAILABLE           22440000
RCGMFAIL DC    A(ERROR11)               GETMAIN FAILURE                   22450000
RCORRUPT DC    A(ERROR12)               WH CORRUPT - STOP AND RESTART     22460000
RCESTAFL DC    A(ERROR13)               ESTAE FAILURE                     22470000
RCBISFUL DC    A(ERROR16)               BEFORE IMAGE STACK FULL           22480000
RCFCLFUL DC    A(ERROR17)               FAILED COMMIT LIST FULL           22490000
RCDYNERR DC    A(ERROR18)               DYNAMIC ALLOCATION ERROR          22500000
RCLFLERR DC    A(ERROR19)               LOG FILE OPEN ERROR               22510000
```

```
RCCFLERR DC    A(ERROR20)               CONTROL FILE OPEN ERROR           22520000
RCCFLER2 DC    A(ERROR22)               DUPE CTL FILE OPEN ERROR          22530000
RCSKIDER DC    A(ERROR25)               INVALID SUBKEY ID FIELD   U20027  22535000
RCWHLOCK DC    A(ERROR40)               WAREHOUSE LOCKED                  22540000
RCLOCKID DC    A(ERROR41)               INVALID LOCK ID                   22550000
RCUNLOCK DC    A(ERROR42)               UNLOCK FAILED - WH NOT LOCKED     22560000
RCNO7750 DC    A(ERROR97)               CONTROL TABLE LOCATE ERR          22570000
RCNOTINI DC    A(ERROR98)               NOT INITIALIZED                   22580000
RCINVPRM DC    A(ERROR99)               INVALID PARMS                     22590000
         SPACE 3                                                          22600000
***                        * ERROR MESSAGES STANDARDIZED                  22610000
ERROR00  DC  F'00',F'00',CL40'DSAM7710 SUCCESSFUL COMPLETION            ' 22620000
ERROR01  DC  F'01',F'04',CL40'KEY NOT FOUND                             ' 22630000
ERROR02  DC  F'02',F'04',CL40'SEQUENTIAL END OF FILE                    ' 22640000
ERROR03  DC  F'03',F'04',CL40'NO SPACE AVAILABLE - DATA SPACE FULL      ' 22650000
ERROR04  DC  F'04',F'04',CL40'RECORD LOCKED - WAIT NOT SPECIFIED        ' 22660000
ERROR05  DC  F'05',F'04',CL40'INSERT REQUESTED - DUPLICATE KEY FOUND    ' 22670000
ERROR06  DC  F'06',F'04',CL40'UPDATE REQUESTED WITHOUT READ FOR UPDATE' 22680000
ERROR07  DC  F'07',F'08',CL40'DEADLOCK OCCURRED. UNABLE TO CONTINUE     ' 22690000
ERROR10  DC  F'10',F'12',CL40'WAREHOUSE NOT AVAILABLE- CHECK JOB CLASS' 22700000
ERROR11  DC  F'11',F'16',CL40'GETMAIN FAILURE                           ' 22710000
ERROR12  DC  F'12',F'12',CL40'WAREHOUSE CORRUPT - STOP AND RESTART      ' 22720000
ERROR13  DC  F'13',F'16',CL40'ESTAE FAILURE                             ' 22730000
ERROR16  DC  F'16',F'12',CL40'BEFORE IMAGE STACK FULL                   ' 22740000
ERROR17  DC  F'17',F'12',CL40'FAILED COMMIT LIST FULL                   ' 22750000
ERROR18  DC  F'18',F'16',CL40'DYNAMIC ALLOCATION ERROR. RC=XXXXXXXX     ' 22760000
         ORG *-11                                                         22770000
ERR18RC  DC  CL8' '                                                       22780000
         ORG                                                              22790000
ERROR19  DC  F'19',F'16',CL40'LOG FILE OPEN ERROR                       ' 22800000
ERROR20  DC  F'20',F'16',CL40'CONTROL FILE OPEN ERROR                   ' 22810000
ERROR22  DC  F'22',F'16',CL40'DUPLEX CONTROL FILE OPEN ERROR            ' 22820000
ERROR25  DC  F'25',F'16',CL40'INVALID SUBKEY ID '                 U20027 22825000
ERROR40  DC  F'40',F'04',CL40'WAREHOUSE LOCKED - WAIT NOT SPECIFIED     ' 22830000
ERROR41  DC  F'41',F'04',CL40'INVALID LOCK ID                           ' 22840000
ERROR42  DC  F'42',F'04',CL40'UNLOCK FAILED - WAREHOUSE NOT LOCKED      ' 22850000
ERROR97  DC  F'97',F'16',CL40'DSAM7750 ALLOCATION ERROR. RC=XXXXXXXX    ' 22860000
         ORG *-10                                                         22870000
ERR97RC  DC  CL8' '                                                       22880000
         ORG                                                              22890000
ERROR98  DC  F'98',F'08',CL40'ACCESS PROGRAM NOT INITIALIZED            ' 22900000
ERROR99  DC  F'99',F'08',CL40'INVALID PARMS - XXXXXXXXXXXXXXXXXXXXXXXX' 22910000
         ORG *-24                                                         22920000
ERR99RC  DC  CL24'FUNC CODE NOT I/R/U/D/S '                               22930000
         ORG                                                              22940000
ERR99RCA DC  CL24'OPEN MODE NOT I/U       '                               22950000
ERR99RCB DC  CL24'LOCK SWITCH NOT Y/N     '                               22960000
ERR99RCC DC  CL24'UNLOCK SWITCH NOT Y/N   '                               22970000
ERR99RCD DC  CL24'LOCK WAIT NOT Y/N       '                               22980000
ERR99RCE DC  CL24'COMMIT SWITCH NOT Y/N/R '                               22990000
ERR99RCF DC  CL24'READ MODE NOT D/S       '                               23000000
ERR99RCG DC  CL24'UPDATE SWITCH NOT Y/N   '                               23010000
ERR99RCH DC  CL24'INIT CALL ALREADY DONE  '                               23020000
ERR99RCM DC  CL24'INVALID RECORD ADDRESS  '                               23030000
ERR99RCN DC  CL24'TOTALS AREA EYE-CATCHER '                               23040000
ERR99RCO DC  CL24'UPDATE=Y/OPEN MODE NOT=U'                               23050000
ERR99RCP DC  CL24'COMMIT=R/ITEM CNT NOT -1'                               23060000
ERR99RCQ DC  CL24'ITEM CNT=-1/COMMIT NOT=R'                               23070000
ERR99RCR DC  CL24'ITEM CNT=-1/LOCK NOT=Y  '                               23080000
ERR99RCS DC  CL24'TOTALS NOT PACKD DECIMAL'                               23090000
MSGAREA  DC  CL60' '                                                      23100000
WAITMSG  DC  CL60' '                                                      23110000
         ORG WAITMSG                                                      23120000
         DC  CL12'DSAM7710-99:'                                           23130000
WAITPGM  DC  C'TASK'                                                      23140000
WAITSTAT DC  C' ENTERING WAIT FOR '                                       23150000
```

ATTY. DOCKET NO.: CRKR-0009 PATENT

```
WAITTYPE DC  CL9' '                                                    23160000
         DC  C' '                                                      23170000
WAITWHAT DC  CL10' '                                                   23180000
         DC  C' LOCK'                                                  23190000
LOCKMSG  DC  CL60' '                                                   23210000
         ORG LOCKMSG                                                   23220000
         DC  CL13'DSAM7710-98; '                                       23230000
LOCKMSGT DC  CL04'EXCL'                                                23240000
LOCKSET1 DS  OCL10 ' LOCK SET;'                                        23250000
LOCKATCT DC  CL10' LOCK SET;'                                          23260000
LOCKMSG1 DC  CL10'0000000000'                                          23270000
         DC  CL10' LOCK REQ;'                                          23280000
LOCKMSG2 DC  CL10'0000000000'                                          23290000
         ORG                                                           23300000
LOCKINFO DC  CL60' '                                                   23310000
         ORG LOCKINFO                                                  23320000
         DC  CL17'DSAM7710-97;  AT '                                   23330000
LKINFOTM DC  CL08'HH:MM:SS'                                            23340000
         DC  CL04' BY '                                                23350000
LKINFOTP DC  CL04'JOB '                                                23360000
LKINFONM DC  CL08'        '                                            23370000
         DC  CL01' '                                                   23380000
LKINFOS1 DC  CL08'        '                                            23390000
LKINFOS2 DC  CL01';'                                                   23400000
LKINFOS3 DS  OCL08                                                     23410000
LKINFOS4 DC  CL04'    '                                                23420000
LKINFOS5 DC  CL04'    '                                                23430000
         ORG                                                           23440000
TASKINFO DC  CL60' '                                                   23450000
         ORG TASKINFO                                                  23460000
         DC  CL13'DSAM7710-91; '                                       23470000
TSINFOTP DC  CL15'INITIALIZED AT ' OR 'CLOSED OK FOR  '                23480000
TSINFOTM DC  CL08'HHMMSSTT'                                            23490000
         DC  CL01' '                                                   23500000
TSINFOA1 DC  CL04' ' 'TASK'      CPCS ONLY                             23510000
         DC  CL01' '                                                   23520000
TSINFOA2 DC  CL07' ' 'APTCB: '   CPCS ONLY                             23530000
TSINFOA3 DC  CL06' ' 'XXXXXX'    CPCS ONLY                             23540000
         ORG                                                           23550000
         EJECT                                                         23560000
         COPY  DSAM500L                                                23570000
         EJECT                                                         23580000
         COPY  DSAM101L                                                23590000
         EJECT                                                         23600000
TRTABLE1 DC    256X'FF'                                                23610000
         ORG   TRTABLE1                                                23620000
         DC    10X'00'                                                 23630000
         ORG   TRTABLE1+X'10'                                          23640000
         DC    10X'00'                                                 23650000
         ORG   TRTABLE1+X'20'                                          23660000
         DC    10X'00'                                                 23670000
         ORG   TRTABLE1+X'30'                                          23680000
         DC    10X'00'                                                 23690000
         ORG   TRTABLE1+X'40'                                          23700000
         DC    10X'00'                                                 23710000
         ORG   TRTABLE1+X'50'                                          23720000
         DC    10X'00'                                                 23730000
         ORG   TRTABLE1+X'60'                                          23740000
         DC    10X'00'                                                 23750000
         ORG   TRTABLE1+X'70'                                          23760000
         DC    10X'00'                                                 23770000
         ORG   TRTABLE1+X'80'                                          23780000
         DC    10X'00'                                                 23790000
         ORG   TRTABLE1+X'90'                                          23800000
         DC    10X'00'                                                 23810000
         ORG                                                           23820000
```

```
         SPACE 3                                                       23830000
TRTABLE2 DC    256X'FF'                                                23840000
         ORG   TRTABLE2+X'0C'                                          23850000
         DC    X'0000FF00'                                             23860000
         ORG   TRTABLE2+X'1C'                                          23870000
         DC    X'0000FF00'                                             23880000
         ORG   TRTABLE2+X'2C'                                          23890000
         DC    X'0000FF00'                                             23900000
         ORG   TRTABLE2+X'3C'                                          23910000
         DC    X'0000FF00'                                             23920000
         ORG   TRTABLE2+X'4C'                                          23930000
         DC    X'0000FF00'                                             23940000
         ORG   TRTABLE2+X'5C'                                          23950000
         DC    X'0000FF00'                                             23960000
         ORG   TRTABLE2+X'6C'                                          23970000
         DC    X'0000FF00'                                             23980000
         ORG   TRTABLE2+X'7C'                                          23990000
         DC    X'0000FF00'                                             24000000
         ORG   TRTABLE2+X'8C'                                          24010000
         DC    X'0000FF00'                                             24020000
         ORG   TRTABLE2+X'9C'                                          24030000
         DC    X'0000FF00'                                             24040000
         ORG                                                           24050000
         SPACE 3                                                       24060000
HEXTABLE EQU   *-X'F0'                                                 24070000
         DC    C'0123456789ABCDEF'                                     24080000
         SPACE 3                                                       24090000
         JDCSAVM                                                       24100000
*                *** SAVE THE WAREHOUSE CONTROL AREA IN STORAGE        24110000
*                    SINCE DATA SPACE DOES NOT APPEAR IN DUMPS         24120000
         DS    0D                                                      24130000
         DC    CL32'******* DATA SPACE CONTROL AREA:'                  24140000
SVWHSCTL DS    CL(WHSDSCTL)              LENGTH OF CTL AREA            24150000
         EJECT                                                         24160000
         DS    0H                        ENSURE FIELDS H/W ALIGNED     24170000
LOGDDN   DC    CL8'DSALOG'                                             24180000
RETDSN   DS    0CL50                                                   24190000
         DS    CL6                                                     24200000
LOGDSN   DC    CL44' '                                                 24210000
LOGFILE  DCB   DSORG=PS,                                              X24220000
               DDNAME=DSALOG,                                         X24230000
               RECFM=FB,                                              X24240000
               MACRF=PM                                                24250000
         EJECT                                                         24260000
CNTLFILE DCB   DSORG=DA,                                              X24270000
               DDNAME=DSACNTL,                                        X24280000
               RECFM=F,                                               X24290000
               MACRF=(RIC,WIC),                                       X24300000
               OPTCD=R                                                 24310000
         EJECT                                                         24320000
CNTLFIL2 DCB   DSORG=DA,                                              X24330000
               DDNAME=DSACNTLD,                                       X24340000
               RECFM=F,                                               X24350000
               MACRF=(RIC,WIC),                                       X24360000
               OPTCD=R                                                 24370000
         EJECT                                                         24380000
         WRITE WORKDECB,DI,0,0,'S',0,0,,MF=L                           24390000
         EJECT                                                         24400000
         WRITE WORKDEC2,DI,0,0,'S',0,0,,MF=L                           24410000
         EJECT                                                         24420000
         LTORG                                                         24430000
         EJECT                                                         24440000
         COPY  DSAM300L                                                24450000
         EJECT                                                         24460000
         COPY  DSAM400L                                                24470000
         EJECT                                                         24480000
```

DSAM7710 1-10-97 10:21a

Page 20

ATTY. DOCKET NO.: CRKR-0009 PATENT

```
         AIF   ('&CPCS' EQ 'NO').COCPCS1                        U20027 24490000
         DSAMCOPY                                               U20027 24500000
.COCPCS1 ANOP                                                   U20027 24510000
TIOTDSCT DSECT                          TIOT AREA DSECT                24550000
         IEFTIOT1                       TIOT MACRO                     24560000
         EJECT                                                         24570000
         DCBD  DSORG=PS                                                24580000
         EJECT                                                         24590000
         IHASDWA                                                       24600000
         EJECT                                                         24610000
TOTSLEN  EQU   8                                                       24620000
R0       EQU   0                                                       24630000
R1       EQU   1                                                       24640000
R2       EQU   2                                                       24650000
R3       EQU   3                                                       24660000
R4       EQU   4                                                       24670000
R5       EQU   5                                                       24680000
R6       EQU   6                                                       24690000
R7       EQU   7                                                       24700000
R8       EQU   8                                                       24710000
R9       EQU   9                                                       24720000
R10      EQU   10                                                      24730000
R11      EQU   11                                                      24740000
R12      EQU   12                                                      24750000
R13      EQU   13                                                      24760000
R14      EQU   14                                                      24770000
R15      EQU   15                                                      24780000
AR0      EQU   0                                                       24790000
AR1      EQU   1                                                       24800000
AR2      EQU   2                                                       24810000
AR3      EQU   3                                                       24820000
AR4      EQU   4                                                       24830000
AR5      EQU   5                                                       24840000
AR6      EQU   6                                                       24850000
AR7      EQU   7                                                       24860000
AR8      EQU   8                                                       24870000
AR9      EQU   9                                                       24880000
AR10     EQU   10                                                      24890000
AR11     EQU   11                                                      24900000
AR12     EQU   12                                                      24910000
AR13     EQU   13                                                      24920000
AR14     EQU   14                                                      24930000
AR15     EQU   15                                                      24940000
         END                                                           24950000
```

```
DSAM7720 START                                                       00010000
************* START OF SPECIFICATIONS ******************************* 00020000
*                                                                  * 00030000
*                                                                  * 00040000
* MODULE NAME - DSAM7720  ILR RANDOMIZING PROGRAM                  * 00050000
*                                                                  * 00060000
*                                                                  * 00070000
*                                                                  * 00080000
*                                                                  * 00090000
*                                                                  * 00100000
*                                                                  * 00110000
*                                                                  * 00120000
*          THIS PROGRAM CONTAINS PROPRIETARY AND TRADE SECRET      * 00130000
*          INFORMATION BELONGING TO J.D. CARREKER AND ASSOCIATES   * 00140000
*          INCORPORATED (JDCA).  THE PROGRAM IS FURNISHED ONLY FOR * 00150000
*          USE BY LICENSEES OF JDCA SOFTWARE PRODUCTS AND THEIR    * 00160000
*          DESIGNATED AGENTS OR EMPLOYEES RESPONSIBLE FOR INSTALLATION * 00170000
*          OR OPERATION OF THE PRODUCTS.  ANY OTHER USE, DUPLICATION, * 00180000
*          OR DISSEMINATION WITHOUT THE WRITTEN CONSENT OF JDCA IS * 00190000
*          NOT AUTHORIZED.                                         * 00200000
*                                                                  * 00210000
*                                                                  * 00220000
*                                                                  * 00230000
* FUNCTION -                                                       * 00240000
*                                                                  * 00250000
* THIS CODE IS BASED ON THE IBM IMS HDAM RANDOMIZATION MODULE CALLED * 00260000
* DFSHDC40 WITH CHANGES FOR THE ILR SYSTEM. IT PROVIDES A RANDOM   * 00270000
* RECORD DISTRIBUTION ACCROSS THE ENTIRE DATA SPACE WITHOUT ANY    * 00280000
* REQUIREMENT FOR KEY ANALYSIS.                                    * 00290000
*                                                                  * 00300000
*                                                                  * 00310000
*        REGISTER USAGE -                                          * 00320000
*                                                                  * 00330000
*               R0  - LINKAGE, WORK                                * 00340000
*               R1  - LINKAGE, WORK                                * 00350000
*               R2  - WORK                                         * 00360000
*               R3  - WORK                                         * 00370000
*               R4  - WORK                                         * 00380000
*               R5  - WORK                                         * 00390000
*               R6  - WORK                                         * 00400000
*               R7  - WORK                                         * 00410000
*               R8  - WORK                                         * 00420000
*               R9  - WORK                                         * 00430000
*               R10 - WORK                                         * 00440000
*               R11 - WORK                                         * 00450000
*               R12 - NOT USED                                     * 00460000
*               R13 - SAVE AREA ADDRESS, WORK AREA BASE REGISTER   * 00470000
*               R14 - LINKAGE, WORK                                * 00480000
*               R15 - LINKAGE, CODE BASE REGISTER                  * 00490000
*                                                                  * 00500000
*                                                                  * 00510000
* MODULE TYPE - CSECT                                              * 00520000
*                                                                  * 00530000
*        PROCESSOR - ASSEMBLER H                                   * 00540000
*                                                                  * 00550000
*                                                                  * 00560000
* EXTERNAL REFERENCES -                                            * 00570000
*                                                                  * 00580000
*        NONE                                                      * 00590000
*                                                                  * 00600000
*                                                                  * 00610000
*                                                                  * 00620000
* MAINTENANCE LOG:                                                 * 00630000
*                                                                  * 00640000
*   PTF #   DATE    DESCRIPTION                                    * 00650000
*   ------  ------  ---------------------------------------------  * 00660000
```

DSAM7720 1-10-97 10:22a

```
*                                                                  * 00670000
*                                                                  * 00680000
*                                                                  * 00690000
*                                                                  * 00700000
*                                                                  * 00710000
*                                                                  * 00720000
*                                                                  * 00730000
*                                                                  * 00740000
*                                                                  * 00750000
*                                                                  * 00760000
*                                                                  * 00770000
*                                                                  * 00780000
*                                                                  * 00790000
*                                                                  * 00800000
*                                                                  * 00810000
******************************************************************** 00820000
                                                                     00830000
         USING DSAM7720,R15          ESTABLISH BASE REG              00840000
         USING PARMS,R1              ESTABLISH BASE REG FOR PARMS    00850000
******************************************************************** 00860000
* INITIALIZE FOR WHOLE KEY                                         * 00870000
******************************************************************** 00880000
START    DS    0H                                                    00890000
         SR    R5,R5                 ACCUM REG FOR KEY PROCESSING    00900000
         SR    R8,R8                 KEY LEN REG                     00910000
         L     R9,PRECKEY            LOAD START OF KEY               00920000
         L     R8,PKEYLEN            LOAD ADDR OF KEY LEN            00930000
         L     R8,0(R8)              LOAD KEY LEN                    00940000
         SH    R8,=H'1'              MAKE KEY LEN 1 LESS             00950000
         LA    R11,0(R9,R8)          ADDR LAST BYTE OF KEY           00960000
         SR    R10,R10               RIGHT HAND BYTES WORK REG       00970000
         SR    R6,R6                 ACCUM REG FOR RIGHT HAND BYTES  00980000
         LA    R7,WORKAREA           LOAD ADDR OF WORK AREA          00990000
         XC    0(12,R7),0(R7)        CLEAR WORK AREA                 01000000
******************************************************************** 01010000
* IF KEY ONLY 1 OR 2 BYTES THEN SPECIAL ACTION                     * 01020000
******************************************************************** 01030000
         SH    R8,=H'L'              IS KEY LEN GT 1?                01040000
         BP    CONV                  YES..GO TO CONVERSION ROUTINE   01050000
******************************************************************** 01060000
* CODE FOR KEYS OF 1 OR 2 BYTES                                    * 01070000
******************************************************************** 01080000
         LA    R8,1(R8)              RESTORE KEY LEN OF 1            01090000
         EX    R8,EXMOVE             MOVE KEY INTO WORK AREA         01100000
         MVC   6(2,R7),2(R7)         MOVE 2 BYTES OF KEY             01110000
         LA    R8,1                  INCREMENT KEY LEN               01120000
         B     C2                    BRANCH TO SPECIAL CONV ROUTINE  01130000
EXMOVE   MVC   2(1,R7),0(R9)         EXECUTED INSTRUCTION            01140000
         EJECT                                                       01150000
******************************************************************** 01160000
* LOOP TO CONVERT EACH POSITION                                    * 01170000
******************************************************************** 01180000
CONV     DS    0H                                                    01190000
         MVC   2(2,R7),1(R9)         MOVE FIRST 2 BYTES OF KEY       01200000
         XC    6(3,R7),0(R9)         START CONVERSION                01210000
         LA    R9,1(R9)              INCREMENT TO NEXT KEY BYTE      01220000
         BCTR  R11,0                 DECREMENT LAST KEY VALUE ADDR   01230000
C2       DS    0H                                                    01240000
         IC    R10,0(R11)            INSERT KEY BYTE                 01250000
         AR    R6,R10                STORE RIGHT HAND BYTE           01260000
         LA    R4,TRANTAB(R6)        STORE TABLE INCREMENT ADDRESS   01270000
         TR    2(2,R7),0(R4)         TRANSLATE KEY BYTES             01280000
         LA    R4,TRANTAB(R10)       UPDATE TABLE ENTRY              01290000
         TR    6(3,R7),0(R4)         TRANSLATE AGAIN                 01300000
         L     R3,0(R7)              LOAD CONVERSION BYTES           01310000
         M     R2,4(R7)              CONTINUE CONVERSION             01320000
```

Page 1

ATTY. DOCKET No.: CRKR-0009 PATENT

```
         ALR   R5,R3                    STORE CONVERSION KEY BYTES
         BCT   R8,CONV                  CONTINUE CONV OF REMAINING KEY
***********************************************************************
* DEVELOP RECORD NUMBER USING RANGE RATIO METHOD                      *
***********************************************************************
         ST    R5,0(R7)                 STORE CONV BYTES INTO WORK AREA
         N     R6,LOWBYTE               CLEAR ALL EXCEPT LOW ORDER BYTE
         LA    R4,TRANTAB(R6)           LOAD ADDR OF BEG TR BYTE
         TR    0(4,R7),0(R4)            TRANSLATE BYTES
         IC    R6,8(R7)                 STORE CONVERTED BYTE
         LA    R4,TRANTAB(R6)           STORE NEW TR BYTE ADDR
         TR    0(4,R7),0(R4)            TRANSLATE
         NI    0(R7),X'7F'              FORCE TOP BIT ZERO
         L     R5,0(R7)                 LOAD FIRST FOUR BYTES
         L     R2,PMAXRCS               LOAD ADDR OF MAX NUMBER OF RECS
         L     R2,0(R2)                 LOAD MAX NUMBER OF RECORDS
         MR    R4,R2                    R5 HAS RATIO BETWEEN 0-1
         SRDL  R4,31                    SHIFT TO GET WHOLE NUMBER IN R5
         L     R2,PRECNUM               GET ADDR OF PARM RECORD NUMBER
         ST    R5,0(R2)                 STORE IN PARM RECORD NUMBER
         RETURN (14,12),,RC=0
         EJECT
         DS    0F
TRANTAB  DC    X'5134DB02B01376F51CB2BB2317A5CBC6'
         DC    X'3155E426A0190D3264B457771DBCB9C9'
         DC    X'44A4DAE2CB395C4DB5D7B9D2FB0B6BA7'
         DC    X'CE930965D9A2923E73240B4B299B21BA'
         DC    X'B74EC2B359CA974AFEFAF0CD159A2740'
         DC    X'A33C1AB64B2BDFA8611B2000B5FD0FC5'
         DC    X'49EE99D4BB947C07359E9CDD529525FF'
         DC    X'71EAB71453507211AEAFB17B3BB0EF98'
         DC    X'567F5F0CE6F70ED570AAE5F4605443A6'
         DC    X'EC91EBAC74E32F6266BAB4CF90C12CC3'
         DC    X'F1C0EBE72D6379B65B06D67E45FBBC9D'
         DC    X'3B6DC76EBB4FE06B044C10305AD3AB7A'
         DC    X'0ACC1E3ABF16A133BFE93F961BB2F63D'
         DC    X'47ADF2BD42D17B372B9FB1E15DDE75F9'
         DC    X'7D6FBD5BBE2ED0B3BEF36A120341366C'
         DC    X'5E05A94667BB22FC6901DCDB2AC41FED'
         DC    X'5134DB02B01376F51CB2BB2317A5CBC6'
         DC    X'3155E426A0190D3264B457771DBCB9C9'
         DC    X'44A4DAE2CB395C4DB5D7B9D2FB0B6BA7'
         DC    X'CE930965D9A2923E73240B4B299B21BA'
         DC    X'B74EC2B359CA974AFEFAF0CD159A2740'
         DC    X'A33C1AB64B2BDFA8611B2000B5FD0FC5'
         DC    X'49EE99D4BB947C07359E9CDD529525FF'
         DC    X'71EAB71453507211AEAFB17B3BB0EF98'
         DC    X'567F5F0CE6F70ED570AAE5F4605443A6'
         DC    X'EC91EBAC74E32F6266BAB4CF90C12CC3'
         DC    X'F1C0EBE72D6379B65B06D67E45FBBC9D'
         DC    X'3B6DC76EBB4FE06B044C10305AD3AB7A'
         DC    X'0ACC1E3ABF16A133BFE93F961BB2F63D'
         DC    X'47ADF2BD42D17B372B9FB1E15DDE75F9'
         DC    X'7D6FBD5BBE2ED0B3BEF36A120341366C'
         DC    X'5E05A94667BB22FC6901DCDB2AC41FED'
*                                                                     *
LOWBYTE  DC    X'000000FF'
*                                                                     *
WORKAREA DC    3F'0'
         EJECT
         LTORG
         EJECT
PARMS    DSECT ,                        PARMS PASSED TO PROGRAM IN R1
PRECKEY  DS    F                        ADDR OF RECORD KEY
PKEYLEN  DS    F                        ADDR OF KEY LENGTH
PMAXRCS  DS    F                        ADDR OF MAXIMUM RECORD SLOTS
PRECNUM  DS    F                        ADDR OF RETURNED RECORD NUMBER
         EJECT
R0       EQU   0
R1       EQU   1
R2       EQU   2
R3       EQU   3
R4       EQU   4
R5       EQU   5
R6       EQU   6
R7       EQU   7
R8       EQU   8
R9       EQU   9
R10      EQU   10
R11      EQU   11
R12      EQU   12
R13      EQU   13
R14      EQU   14
R15      EQU   15
         END
```

ATTY. DOCKET NO.: CRKR-0009

PATENT

```
 ID DIVISION.
 PROGRAM-ID.   DSAM7740.
******************************************************************
*                                                                *
*                                                                *
*                                                                *
*                                                                *
*                                                                *
*                                                                *
*   THIS PROGRAM CONTAINS PROPRIETARY AND TRADE SECRET           *
*   INFORMATION BELONGING TO J.D. CARREKER AND ASSOCIATES        *
*   INCORPORATED (JDCA).  THE PROGRAM IS FURNISHED ONLY FOR      *
*   USE BY LICENSEES OF JDCA SOFTWARE PRODUCTS AND THEIR         *
*   DESIGNATED AGENTS OR EMPLOYEES RESPONSIBLE FOR INSTALLATION *
*   OR OPERATION OF THE PRODUCTS.  ANY OTHER USE, DUPLICATION,  *
*   OR DISSEMINATION WITHOUT THE WRITTEN CONSENT OF JDCA IS      *
*   NOT AUTHORIZED.                                              *
*                                                                *
******************************************************************
*
*    DSAM7740 - WAREHOUSE STATISTICS REPORT
*
*    PURPOSE:
*
*      -TO PRINT THE DSAM STATISTICS REPORT
*
*    PROCESSING:
*
*      -RETRIVE THE STATISTICS FROM THE WAREHOUSE VIA DSAM7710
*      -PRINT THE REPORT
*
*    INPUT
*
*    1.  STATISTICS AREA FROM WAREHOUSE
*
*
*    OUTPUT FILES:
*
*    1. STATISTICS REPORT
*
*
*    I/O FILES:
*
*       NONE
*
*    SUBPROGRAMS CALLED:
*
*       WAREHOUSE INTERFACE    -DSAM7710
*
*
*    MAINTENANCE LOG:
*
*    PTF #   DATE    DESCRIPTION
*    ------  ------  ----------------------------------------
*
*
*
*
*
******************************************************************
     EJECT
 ENVIRONMENT DIVISION.
 DATA DIVISION.
******************************************************************
*
*              W O R K I N G   S T O R A G E
*
******************************************************************
 WORKING-STORAGE SECTION.

******************************************************************
* INPUT AREA
******************************************************************
*
***  WAREHOUSE STATS AREA
*
 01  DSAM-STATS.
     05  STAT-GOOD-SEQ-READ-CNT         PIC S9(9) COMP.
     05  STAT-GOOD-SEQ-READ-TIME        PIC S9(8)V9 COMP.
     05  STAT-GOOD-KEY-READ-CNT         PIC S9(9) COMP.
     05  STAT-GOOD-KEY-READ-TIME        PIC S9(8)V9 COMP.
     05  STAT-FAILED-READ-CNT           PIC S9(9) COMP.
     05  STAT-FAILED-READ-TIME          PIC S9(8)V9 COMP.
     05  STAT-GOOD-WRITE-INS-CNT        PIC S9(9) COMP.
     05  STAT-GOOD-WRITE-INS-TIME       PIC S9(8)V9 COMP.
     05  STAT-GOOD-WRITE-UPD-CNT        PIC S9(9) COMP.
     05  STAT-GOOD-WRITE-UPD-TIME       PIC S9(8)V9 COMP.
     05  STAT-FAILED-WRITE-CNT          PIC S9(9) COMP.
     05  STAT-FAILED-WRITE-TIME         PIC S9(8)V9 COMP.
     05  STAT-KEY-READ-PROBES           PIC S9(9) COMP.
     05  STAT-SEQ-READ-PROBES           PIC S9(9) COMP.
     05  STAT-WRITE-UPD-PROBES          PIC S9(9) COMP.
     05  STAT-WRITE-INS-PROBES          PIC S9(9) COMP.
     05  STAT-COMMIT-CNT                PIC S9(9) COMP.
     05  STAT-COMMIT-TIME               PIC S9(5)V9999 COMP.

******************************************************************
* WORK AREAS
******************************************************************
 01  WORK-TOTALS.
     05  TOTAL-READ-CNT                 PIC S9(9) COMP.
     05  TOTAL-READ-TIME                PIC S9(8)V9 COMP.
     05  TOTAL-WRITE-CNT                PIC S9(9) COMP.
     05  TOTAL-WRITE-TIME               PIC S9(8)V9 COMP.

******************************************************************
* PRINT LINES
******************************************************************
 01  PRT-ASTERISKS.
     05  FILLER PIC X(41) VALUE
         '*****************************************'.
     05  FILLER PIC X(40) VALUE
         '****************************************'.

 01  PRT-FILLER.
     05  FILLER PIC X(1) VALUE '*'.
     05  FILLER PIC X(39) VALUE SPACES.
     05  FILLER PIC X(1) VALUE '*'.
     05  FILLER PIC X(39) VALUE SPACES.
     05  FILLER PIC X(1) VALUE '*'.

 01  PRT-LINE-1.
     05  FILLER PIC X(1) VALUE '*'.
     05  FILLER PIC X(22) VALUE SPACES.
     05  FILLER PIC X(35) VALUE
         'DATA SPACE ACCESS MODULE STATISTICS'.
     05  FILLER PIC X(22) VALUE SPACES.
     05  FILLER PIC X(1) VALUE '*'.

 01  PRT-LINE-2.
     05  FILLER PIC X(41) VALUE
         '*           READ PERFORMANCE            *'.
```

DSAM7740 1-10-97 10:22a

Page 1

08807090.022297

```
           05  FILLER PIC X(40) VALUE
               '          WRITE PERFORMANCE            *'.

       01  PRT-LINE-3.
           05  FILLER PIC X(41) VALUE
               '*         DATA SPACE PROBES             *'.
           05  FILLER PIC X(40) VALUE
               '          COMMIT PERFORMANCE           *'.

       01  PRT-DESCRIPTIONS.
           05  FILLER PIC X(4) VALUE '*   '.
           05  PRT-DESC-1  PIC X(36) VALUE SPACES.
           05  FILLER PIC X(4) VALUE '*   '.
           05  PRT-DESC-2  PIC X(36) VALUE SPACES.
           05  FILLER PIC X(1) VALUE '*'.

       01  PRT-COUNTS.
           05  FILLER PIC X(8) VALUE '*       '.
           05  FILLER PIC X(16) VALUE 'COUNT:          '.
           05  PRT-CNT-1  PIC ZZZ,ZZZ,ZZ9.
           05  FILLER PIC X(13) VALUE '     *       '.
           05  FILLER PIC X(16) VALUE 'COUNT:          '.
           05  PRT-CNT-2  PIC ZZZ,ZZZ,ZZ9.
           05  FILLER PIC X(6) VALUE '     *'.

       01  PRT-PERSEC.
           05  FILLER PIC X(8) VALUE '*       '.
           05  FILLER PIC X(16) VALUE 'ITEMS / SECOND: '.
           05  PRT-PER-1  PIC ZZZ,ZZZ,ZZ9.
           05  FILLER PIC X(13) VALUE '     *       '.
           05  FILLER PIC X(16) VALUE 'ITEMS / SECOND: '.
           05  PRT-PER-2  PIC ZZZ,ZZZ,ZZ9.
           05  FILLER PIC X(6) VALUE '     *'.

       01  PRT-TIMES.
           05  FILLER PIC X(8) VALUE '*       '.
           05  FILLER PIC X(22) VALUE 'AVERAGE TIME:         '.
           05  PRT-TIME-1  PIC ZZ9.9.
           05  FILLER PIC X(13) VALUE 'MS   *       '.
           05  FILLER PIC X(22) VALUE 'AVERAGE TIME:         '.
           05  PRT-TIME-2  PIC ZZ9.9.
           05  FILLER PIC X(6) VALUE 'MS   *'.

       01  PRT-PROBE-1.
           05  FILLER PIC X(8) VALUE '*       '.
           05  FILLER PIC X(17) VALUE 'KEYED READ:      '.
           05  PRT-PRB-1   PIC ZZZ,ZZ9.99.
           05  FILLER PIC X(13) VALUE '     *       '.
           05  FILLER PIC X(20) VALUE 'COUNT:              '.
           05  PRT-CNT-P1  PIC ZZZ,ZZ9.
           05  FILLER PIC X(6) VALUE '     *'.

       01  PRT-PROBE-2.
           05  FILLER PIC X(8) VALUE '*       '.
           05  FILLER PIC X(17) VALUE 'SEQUENTIAL READ: '.
           05  PRT-PRB-2   PIC ZZZ,ZZ9.99.
           05  FILLER PIC X(13) VALUE '     *       '.
           05  FILLER PIC X(22) VALUE 'AVERAGE TIME:         '.
           05  PRT-TIME-P2  PIC Z9.99.
           05  FILLER PIC X(6) VALUE ' SECS*'.

       01  PRT-PROBE-3.
           05  FILLER PIC X(8) VALUE '*       '.
           05  FILLER PIC X(17) VALUE 'WRITE INSERT:    '.
           05  PRT-PRB-3   PIC ZZZ,ZZ9.99.
           05  FILLER PIC X(5) VALUE '    '.
```

```
           05  FILLER PIC X(1) VALUE '*'.
           05  FILLER PIC X(39) VALUE SPACES.
           05  FILLER PIC X(1) VALUE '*'.

      ****************************************************************
      * COPYBOOKS
      ****************************************************************
      *
      ***  LINKAGE AREA FOR THE ILR WAREHOUSE INTERFACE (DSAM7710)
      *
        01  FILLER                          PIC X(8)  VALUE 'DSAM100L'.
           COPY DSAM100L.


      ****************************************************************
      *
      *             P R O C E D U R E   D I V I S I O N
      *
      ****************************************************************
        PROCEDURE DIVISION.

      *
      ***  OBTAIN THE WAREHOUSE STATISTICS
      *
           MOVE 'S' TO M100L-FUNCTION-CODE.
           CALL 'DSAM7710' USING M100L-CONTROL-AREA DSAM-STATS.

           IF M100L-RETURN-CODE > 0
               DISPLAY M100L-RETURN-MESSAGE
               GOBACK.

      *
      ***  PRINT THE REPORT
      *
           DISPLAY PRT-ASTERISKS.
           DISPLAY PRT-LINE-1.
           DISPLAY PRT-ASTERISKS.
           DISPLAY PRT-LINE-2.
           DISPLAY PRT-ASTERISKS.
           DISPLAY PRT-FILLER.

           MOVE 'SUCCESSFUL SEQUENTIAL' TO PRT-DESC-1.
           MOVE 'SUCCESSFUL INSERTS' TO PRT-DESC-2.
           DISPLAY PRT-DESCRIPTIONS.

           MOVE STAT-GOOD-SEQ-READ-CNT TO PRT-CNT-1.
           MOVE STAT-GOOD-WRITE-INS-CNT TO PRT-CNT-2.
           DISPLAY PRT-COUNTS.

           IF STAT-GOOD-SEQ-READ-CNT > 0
               DIVIDE STAT-GOOD-SEQ-READ-TIME BY
                  STAT-GOOD-SEQ-READ-CNT GIVING
                  PRT-TIME-1
           ELSE
               MOVE 0 TO PRT-TIME-1.

           IF STAT-GOOD-WRITE-INS-CNT > 0
               DIVIDE STAT-GOOD-WRITE-INS-TIME BY
                  STAT-GOOD-WRITE-INS-CNT GIVING
                  PRT-TIME-2
           ELSE
               MOVE 0 TO PRT-TIME-2.

           DISPLAY PRT-TIMES.

           IF STAT-GOOD-SEQ-READ-TIME > 0
```

ATTY. DOCKET NO.: CRKR-0009 PATENT

```
    COMPUTE PRT-PER-1 ROUNDED =
        (STAT-GOOD-SEQ-READ-CNT * 1000) /
        STAT-GOOD-SEQ-READ-TIME
ELSE
    MOVE 0 TO PRT-PER-1.

IF STAT-GOOD-WRITE-INS-TIME > 0
    COMPUTE PRT-PER-2 ROUNDED =
        (STAT-GOOD-WRITE-INS-CNT * 1000) /
        STAT-GOOD-WRITE-INS-TIME
ELSE
    MOVE 0 TO PRT-PER-2.

DISPLAY PRT-PERSEC.

DISPLAY PRT-FILLER.


MOVE 'SUCCESSFUL KEYED' TO PRT-DESC-1.
MOVE 'SUCCESSFUL UPDATES' TO PRT-DESC-2.
DISPLAY PRT-DESCRIPTIONS.

MOVE STAT-GOOD-KEY-READ-CNT TO PRT-CNT-1.
MOVE STAT-GOOD-WRITE-UPD-CNT TO PRT-CNT-2.
DISPLAY PRT-COUNTS.

IF STAT-GOOD-KEY-READ-CNT > 0
    DIVIDE STAT-GOOD-KEY-READ-TIME BY
        STAT-GOOD-KEY-READ-CNT GIVING
        PRT-TIME-1
ELSE
    MOVE 0 TO PRT-TIME-1.

IF STAT-GOOD-WRITE-UPD-CNT > 0
    DIVIDE STAT-GOOD-WRITE-UPD-TIME BY
        STAT-GOOD-WRITE-UPD-CNT GIVING
        PRT-TIME-2
ELSE
    MOVE 0 TO PRT-TIME-2.

DISPLAY PRT-TIMES.

IF STAT-GOOD-KEY-READ-TIME > 0
    COMPUTE PRT-PER-1 ROUNDED =
        (STAT-GOOD-KEY-READ-CNT * 1000) /
        STAT-GOOD-KEY-READ-TIME
ELSE
    MOVE 0 TO PRT-PER-1.

IF STAT-GOOD-WRITE-UPD-TIME > 0
    COMPUTE PRT-PER-2 ROUNDED =
        (STAT-GOOD-WRITE-UPD-CNT * 1000) /
        STAT-GOOD-WRITE-UPD-TIME
ELSE
    MOVE 0 TO PRT-PER-2.

DISPLAY PRT-PERSEC.

DISPLAY PRT-FILLER.


MOVE 'FAILED KEYED' TO PRT-DESC-1.
MOVE 'FAILED' TO PRT-DESC-2.
DISPLAY PRT-DESCRIPTIONS.

MOVE STAT-FAILED-READ-CNT TO PRT-CNT-1.
```

DSAM7740 1-10-97 10:22a

```
MOVE STAT-FAILED-WRITE-CNT TO PRT-CNT-2.
DISPLAY PRT-COUNTS.

IF STAT-FAILED-READ-CNT > 0
    DIVIDE STAT-FAILED-READ-TIME BY
        STAT-FAILED-READ-CNT GIVING
        PRT-TIME-1
ELSE
    MOVE 0 TO PRT-TIME-1.

IF STAT-FAILED-WRITE-CNT > 0
    DIVIDE STAT-FAILED-WRITE-TIME BY
        STAT-FAILED-WRITE-CNT GIVING
        PRT-TIME-2
ELSE
    MOVE 0 TO PRT-TIME-2.

DISPLAY PRT-TIMES.

IF STAT-FAILED-READ-TIME > 0
    COMPUTE PRT-PER-1 ROUNDED =
        (STAT-FAILED-READ-CNT * 1000) /
        STAT-FAILED-READ-TIME
ELSE
    MOVE 0 TO PRT-PER-1.

IF STAT-FAILED-WRITE-TIME > 0
    COMPUTE PRT-PER-2 ROUNDED =
        (STAT-FAILED-WRITE-CNT * 1000) /
        STAT-FAILED-WRITE-TIME
ELSE
    MOVE 0 TO PRT-PER-2.

DISPLAY PRT-PERSEC.

DISPLAY PRT-FILLER.


COMPUTE TOTAL-READ-CNT ROUNDED =
    STAT-GOOD-KEY-READ-CNT +
    STAT-GOOD-SEQ-READ-CNT +
    STAT-FAILED-READ-CNT.

COMPUTE TOTAL-READ-TIME ROUNDED =
    STAT-GOOD-KEY-READ-TIME +
    STAT-GOOD-SEQ-READ-TIME +
    STAT-FAILED-READ-TIME.

COMPUTE TOTAL-WRITE-CNT ROUNDED =
    STAT-GOOD-WRITE-INS-CNT +
    STAT-GOOD-WRITE-UPD-CNT +
    STAT-FAILED-WRITE-CNT.

COMPUTE TOTAL-WRITE-TIME ROUNDED =
    STAT-GOOD-WRITE-INS-TIME +
    STAT-GOOD-WRITE-UPD-TIME +
    STAT-FAILED-WRITE-TIME.

MOVE 'OVERALL' TO PRT-DESC-1.
MOVE 'OVERALL' TO PRT-DESC-2.
DISPLAY PRT-DESCRIPTIONS.

MOVE TOTAL-READ-CNT TO PRT-CNT-1.
MOVE TOTAL-WRITE-CNT TO PRT-CNT-2.
DISPLAY PRT-COUNTS.
```

Page 3

ATTY. DOCKET NO.: CRKR-0009 PATENT

```
IF TOTAL-READ-CNT > 0
    DIVIDE TOTAL-READ-TIME BY
        TOTAL-READ-CNT GIVING
        PRT-TIME-1
ELSE
    MOVE 0 TO PRT-TIME-1.

IF TOTAL-WRITE-CNT > 0
    DIVIDE TOTAL-WRITE-TIME BY
        TOTAL-WRITE-CNT GIVING
        PRT-TIME-2
ELSE
    MOVE 0 TO PRT-TIME-2.

DISPLAY PRT-TIMES.

IF TOTAL-READ-TIME > 0
    COMPUTE PRT-PER-1 ROUNDED =
        (TOTAL-READ-CNT * 1000) /
        TOTAL-READ-TIME
ELSE
    MOVE 0 TO PRT-PER-1.

IF TOTAL-WRITE-TIME > 0
    COMPUTE PRT-PER-2 ROUNDED =
        (TOTAL-WRITE-CNT * 1000) /
        TOTAL-WRITE-TIME
ELSE
    MOVE 0 TO PRT-PER-2.

DISPLAY PRT-PERSEC.

DISPLAY PRT-FILLER.


DISPLAY PRT-ASTERISKS.
DISPLAY PRT-LINE-3.
DISPLAY PRT-ASTERISKS.
DISPLAY PRT-FILLER.


MOVE 'AVERAGES' TO PRT-DESC-1.
MOVE SPACES     TO PRT-DESC-2.
DISPLAY PRT-DESCRIPTIONS.

ADD STAT-FAILED-READ-CNT TO STAT-GOOD-KEY-READ-CNT.
IF STAT-GOOD-KEY-READ-CNT > 0
    DIVIDE STAT-KEY-READ-PROBES BY
        STAT-GOOD-KEY-READ-CNT GIVING
        PRT-PRB-1
ELSE
    MOVE 0 TO PRT-PRB-1.

MOVE STAT-COMMIT-CNT TO PRT-CNT-P1.

DISPLAY PRT-PROBE-1.


IF STAT-GOOD-SEQ-READ-CNT > 0
    DIVIDE STAT-SEQ-READ-PROBES BY
        STAT-GOOD-SEQ-READ-CNT GIVING
        PRT-PRB-2
ELSE
    MOVE 0 TO PRT-PRB-2.

IF STAT-COMMIT-CNT > 0
    DIVIDE STAT-COMMIT-TIME BY
        STAT-COMMIT-CNT GIVING
        PRT-TIME-P2
ELSE
    MOVE 0 TO PRT-TIME-P2.

DISPLAY PRT-PROBE-2.


IF STAT-GOOD-WRITE-INS-CNT > 0
    DIVIDE STAT-WRITE-INS-PROBES BY
        STAT-GOOD-WRITE-INS-CNT GIVING
        PRT-PRB-3
ELSE
    MOVE 0 TO PRT-PRB-3.

DISPLAY PRT-PROBE-3.

DISPLAY PRT-FILLER.
DISPLAY PRT-ASTERISKS.


GOBACK.

******************************************************************
******************  END OF PROGRAM DSAM7740  ******************
******************************************************************
```

DSAM7740 1-10-97 10:22a

Page 4

ATTY. DOCKET No.: CRKR-0009 PATENT

```
************** START OF SPECIFICATIONS ******************************* 00010000
*                                                                     * 00020000
*                                                                     * 00030000
* MODULE NAME - DSAM7750  DATA SPACE ACCESS CONTROL TABLE             * 00040000
*                                                                     * 00050000
*                                                                     * 00060000
*                                                                     * 00070000
*                                                                     * 00080000
*                                                                     * 00090000
*                                                                     * 00100000
*                                                                     * 00110000
*          THIS PROGRAM CONTAINS PROPRIETARY AND TRADE SECRET         * 00120000
*          INFORMATION BELONGING TO J.D. CARREKER AND ASSOCIATES      * 00130000
*          INCORPORATED (JDCA).  THE PROGRAM IS FURNISHED ONLY FOR    * 00140000
*          USE BY LICENSEES OF JDCA SOFTWARE PRODUCTS AND THEIR       * 00150000
*          DESIGNATED AGENTS OR EMPLOYEES RESPONSIBLE FOR INSTALLATION * 00160000
*          OR OPERATION OF THE PRODUCTS.  ANY OTHER USE, DUPLICATION, * 00170000
*          OR DISSEMINATION WITHOUT THE WRITTEN CONSENT OF JDCA IS    * 00180000
*          NOT AUTHORIZED.                                            * 00190000
*                                                                     * 00200000
*                                                                     * 00210000
*                                                                     * 00220000
* FUNCTION -                                                          * 00230000
*                                                                     * 00240000
* THIS MODULE WILL GENERATE A LOAD MODULE TABLE THAT IS LOADED BY     * 00250000
* DSAM7700 AND DSAM7710 TO OBTAIN PROCESSING PARAMETERS FOR THE       * 00260000
* DATA SPACE ACCESS.                                                  * 00270000
*                                                                     * 00280000
*                                                                     * 00290000
*                                                                     * 00300000
* MODULE TYPE - CSECT                                                 * 00310000
*                                                                     * 00320000
*        PROCESSOR - ASSEMBLER H                                      * 00330000
*                                                                     * 00340000
*        NON-EXECUTABLE TABLE                                         * 00350000
*                                                                     * 00360000
* EXTERNAL REFERENCES -                                               * 00370000
*                                                                     * 00380000
*        NONE                                                         * 00390000
*                                                                     * 00400000
*                                                                     * 00410000
*                                                                     * 00420000
* MAINTENANCE LOG:                                                    * 00430000
*                                                                     * 00440000
*   PTF #   DATE    DESCRIPTION                                       * 00450000
*   ------  ------  ------------------------------------------        * 00460000
*                                                                     * 00470000
*                                                                     * 00480000
*                                                                     * 00490000
*                                                                     * 00500000
*                                                                     * 00510000
*                                                                     * 00520000
*                                                                     * 00530000
*                                                                     * 00540000
*                                                                     * 00550000
*                                                                     * 00560000
*                                                                     * 00570000
*                                                                     * 00580000
*                                                                     * 00590000
*                                                                     * 00600000
*                                                                     * 00610000
*********************************************************************** 00620000
         DSAMGEN MAXRECS=180000,      MAXIMUM DETAIL RECORDS          X00630000
               FCLSIZE=300,           ENTRIES IN FAILED COMMIT LIST   X00640000
               RECLEN=128,            SIZE OF DETAIL RECORDS          X00650000
               KEYLEN=25,             LENGTH OF KEY IN RECORDS        X00660000
```

DSAM7750 1-10-97 10:23a

```
               KEYPOS=12,             OFFSET OF KEY WITHIN RECORDS    X00670000
               SDELAY=0000,           MICROSECOND DELAY ON SEQ ACCESS X00680000
               KDELAY=0000,           MICROSECOND DELAY ON KEY ACCESS X00690000
               IDRATIO=3,             INDEX TO DATA RECORD RATIO      X00700000
               NUMTOTS=200,           NUMBER OF TOTALS ACCUMULATORS   X00710000
               DFLTUPD=50000,         DEFAULT FOR MAX UPDATES IN RUN  X00720000
               DSPNAME='ILRTDSAM',    NAME OF DATA SPACE              X00730000
               DSPDOWN='**ILRT CORRUPT**', DATA SPACE EYE CATCHER     X00740000
               DSPEYE='**ILRT CONTROL**',  DATA SPACE EYE CATCHER     X00750000
               ANKNAME='DSAMILRT',    ANCHOR CONTROL BLOCK NAME       X00760000
               ANKEYE='@@ILRT@@',     EYCATCHER IN ANCHOR MODULE      X00770000
               TOTALEYE='TOTALSAREA', EYCATCHER IN TOTALS AREA        X00780000
               DUPLEX=Y,              DUPLEX CONTROL FILE - Y/N       X00790000
               LPRMSPC=200,           PRIMARY TRKS FOR NEW LOG FILES  X00800000
               LSECSPC=200,           SECONDARY TRKS FOR NEW LOG FILE X00810000
               LMODLDCB='USERNODE.CKKCPCS.SITE.LOGMODL',   MOD LOG DSN X00820000
               LVOLSER=,              VOLSER FOR NEW LOG FILES        X00830000
               LUNIT=SYSDA            UNIT TYPE FOR NEW LOG FILES      00840000
```

Page 1

ATTY. DOCKET NO.: CRKR-0009 PATENT

APPENDIX B

ATTY. DOCKET NO.: CRKR-0009 PATENT

```
****************************************************************       00010000
* THIS COPYBOOK IS THE ASSEMBLER EQUIVALENT OF THE COBOL               00020000
* COPYBOOK DSAML100                                                    00030000
* ANY CHANGES TO THIS COPYBOOK MUST ALSO BE MADE TO ITS                00040000
* COBOL EQUIVALENT DSAML100.                                           00050000
****************************************************************       00060000
DSAMFUNC DS    C                                                       00070000
DSAMFNIN EQU   C'I'                 INITIALIZE REQUEST                 00080000
DSAMFNRD EQU   C'R'                 READ REQUEST                       00090000
DSAMFNWR EQU   C'W'                 WRITE REQUEST                      00100000
DSAMFNDE EQU   C'D'                 DELETE REQUEST                     00110000
DSAMFNCL EQU   C'C'                 CLOSE REQUEST                      00120000
DSAMOPMD DS    C                                                       00130000
DSAMOPIN EQU   C'I'                 OPEN FOR INPUT                     00140000
DSAMOPUP EQU   C'U'                 OPEN FOR UPDATE                    00150000
DSAMLOCK DS    C                                                       00160000
DSAMYES  EQU   C'Y'                 LOCK REQUIRED                      00170000
DSAMNO   EQU   C'N'                 LOCK NOT REQUIRED                  00180000
DSAMUNLK DS    C                                                       00190000
*DSAMYES EQU   C'Y'                 UNLOCK REQUIRED                    00200000
*DSAMNO  EQU   C'N'                 UNLOCK NOT REQUIRED                00210000
DSAMWAIT DS    C                                                       00220000
*DSAMYES EQU   C'Y'                 WAIT FOR LOCK                      00230000
*DSAMNO  EQU   C'N'                 NO WAIT FOR LOCK                   00240000
DSAMCOMT DS    C                                                       00250000
*DSAMYES EQU   C'Y'                 COMMIT UPDATES                     00260000
*DSAMNO  EQU   C'N'                 BACK OUT UPDATES                   00270000
DSAMRORG EQU   C'R'                 RE-ORG WAREHOUSE                   00280000
DSAMRDMD DS    C                                                       00290000
DSAMRDIR EQU   C'D'                 READ DIRECT                        00300000
DSAMRSEQ EQU   C'S'                 READ SEQUENTIAL                    00310000
DSAMSKRD EQU   C'B'                 READ SUBKEY REQUEST         U20027 00311000
DSAMUPDT DS    C                                                       00320000
*DSAMYES EQU   C'Y'                 UPDATE RECORD                      00330000
*DSAMNO  EQU   C'N'                 DO NOT UPDATE RECORD               00340000
DSAMICNT DS    F                    EXPECTED UPDATE COUNT              00350000
*SAMICUK EQU   F'0'                 UPDATE COUNT NOT KNOWN             00360000
*SAMNLOG EQU   F'-1'                DONT LOG UPDATES                   00370000
DSAMLKID DS    F                    LOCK ID                            00380000
DSAMRCAD DS    F                    RECORD ADDRESS                     00390000
DSAMRCNT DS    F                    WAREHOUSE RECORD COUNT GEN SIZE    00400000
DSAMFCNT DS    F                    WAREHOUSE FREE RECORDS             00410000
DSAMRETC DS    F                    RETURN CODE                        00420000
DSAMREAS DS    F                    REASON CODE                        00430000
DSAMMSG  DS    CL40                 MESSAGE AREA                       00440000
DSAMSKID DS    H                    SUBKEY ID (1-10)            U20027 00441000
DSAMCHAN DS    C                    CHAIN RRECORD EXISTS        U20027 00442000
         DS    CL37                 FILLER - FOR FUTURE USE     U20027 00450000
DSAMDSCL EQU   *-DSAMFUNC           LENGTH OF DSECT                    00460000
```

DSAM101L 1-10-97 10:12a

Page 1

ATTY. DOCKET No.: CRKR-0009 PATENT

```
************************************************************************
*
* DSAM200L - DSAM LINKAGE TOTALS AREA
*
************************************************************************
 01  M200L-TOTALS-AREA.
     05  M200L-TOTALS-CONSTANT PIC X(10) VALUE 'TOTALSAREA'.
     05  M200L-TOTALS-FIELDS PIC S9(13)V9(2) COMP-3
                             OCCURS 200 TIMES.
     EJECT
```

DSAM200L 1-10-97 10:12a Page 1

ATTY. DOCKET NO.: CRKR-0009

PATENT

```
*********************************************************************** 00010000
* THIS DSECT MAPS THE CONTROL AREA AT THE START OF THE WAREHOUSE        00020000
* DATA SPACE.  THIS AREA IS BACKED TO A BDAM CONTROL FILE.              00030000
*********************************************************************** 00040000
WHSDSCT  DSECT                                                          00050000
WHSEYE   DS    CL16               EYE CATCHER - **DSAM CONTROL**        00060000
WHSLKJOB DS    CL8                JOBNAME THAT OWNS EXCL LK             00070000
WHSLKSTP DS    CL16               JOB & PROC STEPS                      00080000
WHSLKTIM DS    CL8                TIME LOCK WAS PLACED                  00090000
WHSLKPRM DS    F                  PRIMARY LOCK FIELD                    00100000
WHSLKCMT DS    F                  COMMIT LOCK                           00110000
WHSLKEXC DS    F                  WAREHOUSE EXCLUSIVE LOCK              00120000
WHSLKPND DS    F                  PENDING EXCLUSIVE LOCK                00130000
WHSLKADD DS    F                  INSERT RECORD LOCK                    00140000
WHSATCNT DS    F                  ACTIVE TASK COUNT                     00150000
WHSWTCNT DS    F                  WAITING TASK COUNT                    00160000
WHSCCNUM DS    F                  LAST USED COMMIT CONTROL NUM          00170000
WHSMSYNS DS    F                  MAXIMUM SYNONYMS                      00180000
WHSDFUPD DS    F                  DEFAULT MAX UPDATES PER RUN           00190000
WHSNDXA  DS    A                  ADDRESS OF INDEX AREA                 00200000
WHSNDXL  DS    A                  LENGTH OF INDEX AREA                  00210000
WHSDETA  DS    A                  ADDRESS OF DETAIL AREA                00220000
WHSNEXTD DS    A                  ADDRESS OF NEXT AVAIL DETAIL SLOT     00230000
WHSRECNT DS    F                  MAXIMUM DETAIL RECORDS                00240000
WHSRECLN DS    F                  LENGTH OF DETAIL RECORDS              00250000
WHSLRCNT DS    F                  LOG FILE RECORD COUNT                 00260000
WHSKYPOS DS    F                  OFFSET OF KEY WITHIN RECORD           00270000
WHSKYLEN DS    F                  LENGTH OF KEY WITHIN RECORD           00280000
WHSALET  DS    F                  DATA SPACE ALET                       00290000
WHSLDSN  DS    CL44               LOG FILE DATA SET NAME                00300000
WHSSTATA DS    A                  ADDRESS OF STATS AREA                 00310000
WHSSTATL DS    F                  LENGTH OF STATS AREA                  00320000
WHSTOTSA DS    A                  ADDRESS OF TOTALS AREA                00330000
WHSTOTSL DS    F                  LENGTH OF TOTALS AREA                 00340000
WHSSDEL  DS    F                  FORCED DELAY ON SEQ ACCESS            00350000
WHSKDEL  DS    F                  FORCED DELAY ON KEYED ACCESS          00360000
WHSFCSIZ DS    F                  NUM F/W FOR FAILED COMMIT LIST        00370000
WHSFCLST DS    0F                 FAILED COMMIT LIST                    00380000
WHSDSCTL EQU   *-WHSDSCT          LENGTH OF CONTROL AREA                00390000
```

DSAM300L 1-10-97 10:13a

Page 1

ATTY. DOCKET No.: CRKR-0009 PATENT

```
STATDSCT DSECT                                                   00010000
STATGSRC DS    F        GOOD SEQUENTIAL READ COUNT               00020000
STATGSRT DS    F        GOOD SEQUENTIAL READ TIME                00030000
STATGKRC DS    F        GOOD KEYED READ COUNT                    00040000
STATGKRT DS    F        GOOD KEYED READ TIME                     00050000
STATFRC  DS    F        COUNT OF FAILED READS                    00060000
STATFRT  DS    F        TOTAL TIME OF ALL FAILED READS           00070000
STATGWIC DS    F        COUNT OF SUCCESSFUL INSERT WRITES        00080000
STATGWIT DS    F        TOTAL TIME OF ALL SUCCESSFUL INSERT WRITES 00090000
STATGWUC DS    F        COUNT OF SUCCESSFUL UPDATE WRITES        00100000
STATGWUT DS    F        TOTAL TIME OF ALL SUCCESSFUL UPDATE WRITES 00110000
STATFWC  DS    F        COUNT OF FAILED WRITES                   00120000
STATFWT  DS    F        TOTAL TIME OF ALL FAILED WRITES          00130000
STATKRP  DS    F        TOTAL DIRECT READ PROBES                 00140000
STATSRP  DS    F        TOTAL SEQUENTIAL READ PROBES             00150000
STATWUP  DS    F        TOTAL WRITE UPDATE PROBES                00160000
STATWIP  DS    F        TOTAL WRITE INSERT PROBES                00170000
STATCMTC DS    F        COMMIT COUNT                             00180000
STATCMTT DS    F        TOTAL TIME OF COMMITS                    00190000
STATDSCL EQU   *-STATDSCT                                        00200000
```

DSAM400L 1-10-97 10:13a Page 1

08820960 .022297

ATTY. DOCKET No.: CRKR-0009 PATENT

```
         DS    0D                                          00010000
DSPNAME  DS    CL8              NAME OF DATA SPACE         00020000
DSPEYE   DS    CL16             DATA SPACE EYE CATCHER     00030000
DSPDOWN  DS    CL16             DATA SPACE EYE CATCHER     00040000
ANKNAME  DS    CL8              ANCHOR CONTROL BLOCK NAME  00050000
ANKEYE   DS    CL8              EYCATCHER IN ANCHOR MODULE 00060000
TOTALEYE DS    CL10             EYCATCHER IN TOTALS AREA   00070000
DUPLEX   DS    C                DUPLEX CONTROL FILE - Y/N  00080000
LPRMSPC  DS    AL3              PRIMARY SPACE FOR NEW LOG FILES 00090000
LSECSPC  DS    AL3              SECONDARY SPACE FOR NEW LOG FILE 00100000
LMODLDCB DS    CL44             MODEL DCB DATA SET NAME FOR LOG 00110000
LVOLSER  DS    CL6              VOLSER FOR NEW LOG FILES   00120000
LUNIT    DS    CL8              UNIT TYPE FOR NEW LOG FILES 00130000
MAXRECS  DS    F                MAXIMUM RECS ON WAREHOUSE  00140000
FCLSIZE  DS    F                SIZE OF FAILED COMMIT LIST 00150000
RECLEN   DS    F                DETAIL RECORD SIZE         00160000
KEYLEN   DS    F                LENGTH OF KEY              00170000
KEYPOS   DS    F                OFFSET OF KEY WITHIN RECORD 00180000
SDELAY   DS    F                MICROSECOND DELAY ON SEQ ACCESS 00190000
KDELAY   DS    F                MICROSECOND DELAY ON KEY ACCESS 00200000
IDRATIO  DS    F                INDEX TO DATA RECORDS RATIO 00210000
NUMTOTS  DS    F                NUMBER OF TOTALS FIELDS    00220000
DFLTUPD  DS    F                DEFAULT MAX UPDATES PER RUN 00230000
SKLEN0   DS    H                SUB-KEY 0 LENGTH    U20027 00231000
SKPOS0   DS    H                SUB-KEY 0 OFFSET    U20027 00232000
SKLEN1   DS    H                SUB-KEY 1 LENGTH    U20027 00233000
SKPOS1   DS    H                SUB-KEY 1 OFFSET    U20027 00234000
SKLEN2   DS    H                SUB-KEY 2 LENGTH    U20027 00235000
SKPOS2   DS    H                SUB-KEY 2 OFFSET    U20027 00236000
SKLEN3   DS    H                SUB-KEY 3 LENGTH    U20027 00237000
SKPOS3   DS    H                SUB-KEY 3 OFFSET    U20027 00238000
SKLEN4   DS    H                SUB-KEY 4 LENGTH    U20027 00239000
SKPOS4   DS    H                SUB-KEY 4 OFFSET    U20027 00239100
SKLEN5   DS    H                SUB-KEY 5 LENGTH    U20027 00239200
SKPOS5   DS    H                SUB-KEY 5 OFFSET    U20027 00239300
SKLEN6   DS    H                SUB-KEY 6 LENGTH    U20027 00239400
SKPOS6   DS    H                SUB-KEY 6 OFFSET    U20027 00239500
SKLEN7   DS    H                SUB-KEY 7 LENGTH    U20027 00239600
SKPOS7   DS    H                SUB-KEY 7 OFFSET    U20027 00239700
SKLEN8   DS    H                SUB-KEY 8 LENGTH    U20027 00239800
SKPOS8   DS    H                SUB-KEY 8 OFFSET    U20027 00239900
SKLEN9   DS    H                SUB-KEY 9 LENGTH    U20027 00239920
SKPOS9   DS    H                SUB-KEY 9 OFFSET    U20027 00239940
SKLENGTH EQU   *-SKLEN0         LENGTH OF SUB-KEY AREAS U20027 00239960
LEN7750  EQU   *-DSPNAME                                   00240000
```

DSAM500L 1-10-97 10:13a

Page 1

ATTY. DOCKET No.: CRKR-0009 PATENT

DSAMCOPY 1-10-97 10:13a Page 1

```
MACRO
DSAMCOPY
COPY DKNAPTCB
EJECT
COPY DKNAPCB1
EJECT
COPY DKNPARM
EJECT
MEND
```

ATTY. DOCKET No.: CRKR-0009

PATENT

```
         MACRO                                                          00010000
         DSAMGEN &MAXRECS=,                                             X00020000
               &FCLSIZE=,                                               X00030000
               &RECLEN=,                                                X00040000
               &KEYLEN=,                                                X00050000
               &KEYPOS=,                                                X00060000
               &SDELAY=,                                                X00070000
               &KDELAY=,                                                X00080000
               &IDRATIO=,                                               X00090000
               &NUMTOTS=,                                               X00100000
               &DFLTUPD=,                                               X00110000
               &DSPNAME=,                                               X00120000
               &DSPEYE=,                                                X00130000
               &DSPDOWN=,                                               X00140000
               &ANKNAME=,                                               X00150000
               &ANKEYE=,                                                X00160000
               &TOTALEYE=,                                              X00170000
               &DUPLEX=,                                                X00180000
               &LPRMSPC=,                                               X00190000
               &LSECSPC=,                                               X00200000
               &LMODLDCB=,                                              X00210000
               &LVOLSER=,                                               X00220000
               &LUNIT=,                                           U20027X00230000
               &SKPOS=,                                           U20027X00233000
               &SKLEN=                                            U20027 00236000
         LCLA  &WORK1,&WORK2,&WORK3                                     00240000
         LCLB  &ERR                                                     00250000
         AIF   ('&MAXRECS' NE '').NEXT010                               00260000
         MNOTE 12,'*** MAXRECS IS REQUIRED BUT WAS NOT ENTERED'         00270000
&ERR     SETB  1                                                        00280000
         AGO   .NEXT050                                                 00290000
.NEXT010 ANOP                                                           00300000
         AIF   (T'&MAXRECS EQ 'N').NEXT020                              00310000
         MNOTE 12,'*** MAXRECS MUST BE NUMERIC'                         00320000
&ERR     SETB  1                                                        00330000
         AGO   .NEXT050                                                 00340000
.NEXT020 ANOP                                                           00350000
         AIF   ('&MAXRECS' GT '100').NEXT050                            00360000
         MNOTE 12,'*** MAXRECS MUST BE GREATER THAN 100'                00370000
&ERR     SETB  1                                                        00380000
.NEXT050 ANOP                                                           00390000
         AIF   ('&FCLSIZE' NE '').NEXT100                               00400000
         MNOTE 12,'*** FCLSIZE IS REQUIRED BUT WAS NOT ENTERED'         00410000
&ERR     SETB  1                                                        00420000
         AGO   .NEXT150                                                 00430000
.NEXT100 ANOP                                                           00440000
         AIF   (T'&FCLSIZE EQ 'N').NEXT120                              00450000
         MNOTE 12,'*** FCLSIZE MUST BE NUMERIC'                         00460000
&ERR     SETB  1                                                        00470000
         AGO   .NEXT150                                                 00480000
.NEXT120 ANOP                                                           00490000
         AIF   ('&FCLSIZE' GT '10').NEXT150                             00500000
         MNOTE 12,'*** FCLSIZE MUST BE GREATER THAN 10'                 00510000
&ERR     SETB  1                                                        00520000
.NEXT150 ANOP                                                           00530000
         AIF   ('&RECLEN' NE '').NEXT200                                00540000
         MNOTE 12,'*** RECLEN IS REQUIRED BUT WAS NOT ENTERED'          00550000
&ERR     SETB  1                                                        00560000
         AGO   .NEXT250                                                 00570000
.NEXT200 ANOP                                                           00580000
         AIF   (T'&RECLEN EQ 'N').NEXT220                               00590000
         MNOTE 12,'*** RECLEN MUST BE NUMERIC'                          00600000
&ERR     SETB  1                                                        00610000
         AGO   .NEXT250                                                 00620000
.NEXT220 ANOP                                                           00630000
         AIF   ('&RECLEN' GE '24').NEXT250                              00640000
         MNOTE 12,'*** RECLEN MUST BE EQUAL TO OR GREATER THAN 24'      00650000
&ERR     SETB  1                                                        00660000
.NEXT250 ANOP                                                           00670000
         AIF   ('&RECLEN' LE '4096').NEXT260                      U20027 00680000
         MNOTE 12,'*** RECLEN MUST BE EQUAL TO OR LESS THAN 4096'U20027 00690000
&ERR     SETB  1                                                        00700000
.NEXT260 ANOP                                                           00710000
         AIF   ('&KEYLEN' NE '').NEXT300                                00720000
         MNOTE 12,'*** KEYLEN IS REQUIRED BUT WAS NOT ENTERED'          00730000
&ERR     SETB  1                                                        00740000
         AGO   .NEXT350                                                 00750000
.NEXT300 ANOP                                                           00760000
         AIF   (T'&KEYLEN EQ 'N').NEXT320                               00770000
         MNOTE 12,'*** KEYLEN MUST BE NUMERIC'                          00780000
&ERR     SETB  1                                                        00790000
         AGO   .NEXT350                                                 00800000
.NEXT320 ANOP                                                           00810000
         AIF   (('&KEYLEN' GT '0') AND                            U20027X00820000
               ('&KEYLEN' LT '257')).NEXT350                      U20027 00826000
         MNOTE 12,'*** KEYLEN MUST BE GREATER 0, LESS THAN 257'   U20027 00832000
&ERR     SETB  1                                                        00840000
.NEXT350 ANOP                                                           00850000
         AIF   ('&KEYPOS' NE '').NEXT400                                00860000
         MNOTE 12,'*** KEYPOS IS REQUIRED BUT WAS NOT ENTERED'          00870000
&ERR     SETB  1                                                        00880000
         AGO   .NEXT450                                                 00890000
.NEXT400 ANOP                                                           00900000
         AIF   (T'&KEYPOS EQ 'N').NEXT420                               00910000
         MNOTE 12,'*** KEYPOS MUST BE NUMERIC'                          00920000
&ERR     SETB  1                                                        00930000
.NEXT420 ANOP                                                           00940000
         AIF   (('&KEYPOS' GE '12') AND (N'&SKPOS EQ 0)).NEXT450 U20027 00950000
         AIF   (('&KEYPOS' GE '16') AND (N'&SKPOS NE 0)).NEXT450 U20027 00953000
         AIF   (N'&SKPOS NE 0).NEXT430                            U20027 00956000
         MNOTE 12,'*** KEY CAN NOT START IN FIRST 12 BYTES OF RECORD'   00960000
&ERR     SETB  1                                                  U20027 00962000
         AGO   .NEXT450                                           U20027 00964000
.NEXT430 ANOP                                                     U20027 00966000
         MNOTE 12,'*** KEY CAN NOT START IN FIRST 16 BYTES'       U20027 00968000
&ERR     SETB  1                                                        00970000
.NEXT450 ANOP                                                           00980000
         AIF   ('&NUMTOTS' NE '').NEXT500                               00990000
         MNOTE 12,'*** NUMTOTS IS REQUIRED BUT WAS NOT ENTERED'         01000000
&ERR     SETB  1                                                        01010000
         AGO   .NEXT550                                                 01020000
.NEXT500 ANOP                                                           01030000
         AIF   (T'&NUMTOTS EQ 'N').NEXT520                              01040000
         MNOTE 12,'*** NUMTOTS MUST BE NUMERIC'                         01050000
&ERR     SETB  1                                                        01060000
         AGO   .NEXT550                                                 01070000
.NEXT520 ANOP                                                           01080000
         AIF   ('&NUMTOTS' GT '0').NEXT550                              01090000
         MNOTE 12,'*** NUMTOTS MUST BE GREATER THAN 0'                  01100000
&ERR     SETB  1                                                        01110000
.NEXT550 ANOP                                                           01120000
         AIF   ('&SDELAY' NE '').NEXT570                                01130000
         MNOTE 12,'*** SDELAY IS REQUIRED BUT WAS NOT ENTERED'          01140000
&ERR     SETB  1                                                        01150000
         AGO   .NEXT580                                                 01160000
.NEXT570 ANOP                                                           01170000
         AIF   (T'&SDELAY EQ 'N').NEXT590                               01180000
         MNOTE 12,'*** SDELAY MUST BE NUMERIC'                          01190000
&ERR     SETB  1                                                        01200000
         AGO   .NEXT580                                                 01210000
.NEXT580 ANOP                                                           01220000
         AIF   ('&KDELAY' NE '').NEXT585                                01230000
```

DSAMGEN 1-10-97 10:13a

Page 1

ATTY. DOCKET No.: CRKR-0009 PATENT

```
         MNOTE 12,'*** KDELAY IS REQUIRED BUT WAS NOT ENTERED'
&ERR     SETB  1
         AGO   .NEXT590
.NEXT585 ANOP
         AIF   (T'&KDELAY EQ 'N').NEXT590
         MNOTE 12,'*** KDELAY MUST BE NUMERIC'
&ERR     SETB  1
         AGO   .NEXT590
.NEXT590 ANOP
         AIF   ('&DFLTUPD' NE '').NEXT600
         MNOTE 12,'*** DFLTUPD IS REQUIRED BUT WAS NOT ENTERED'
&ERR     SETB  1
         AGO   .NEXT650
.NEXT600 ANOP
         AIF   (T'&DFLTUPD EQ 'N').NEXT620
         MNOTE 12,'*** DFLTUPD MUST BE NUMERIC'
&ERR     SETB  1
         AGO   .NEXT650
.NEXT620 ANOP
         AIF   ('&DFLTUPD' GT '10').NEXT650
         MNOTE 12,'*** DFLTUPD MUST BE GREATER THAN 10'
&ERR     SETB  1
.NEXT650 ANOP
&WORK1   SETA  &RECLEN/4
&WORK2   SETA  &WORK1*4
         AIF   ('&WORK2' EQ '&RECLEN').NEXT660
         MNOTE 12,'*** RECLEN MUST BE A MULTIPLE OF 4'
&ERR     SETB  1
.NEXT660 ANOP
         AIF   ('&SKPOS&SKLEN' EQ '').NEXT664                       U20027
&WORK1   SETA  &KEYLEN+16                                           U20027
         AIF   ('&RECLEN' GT '&WORK1').NEXT670                      U20027
         MNOTE 12,'*** RECLEN MUST BE GREATER THAN KEYLEN +16'      U20027
&ERR     SETB  1                                                    U20027
         AGO   .NEXT670                                             U20027
.NEXT664 ANOP                                                       U20027
&WORK1   SETA  &KEYLEN+12
         AIF   ('&RECLEN' GT '&WORK1').NEXT670
         MNOTE 12,'*** RECLEN MUST BE GREATER THAN KEYLEN PLUS 12'
&ERR     SETB  1
.NEXT670 ANOP
         AIF   ('&TOTALEYE' NE '').NEXT700
         MNOTE 12,'*** DSPNAME IS REQUIRED BUT WAS NOT ENTERED'
&ERR     SETB  1
.NEXT700 ANOP
         AIF   ('&DSPNAME' NE '').NEXT710
         MNOTE 12,'*** DSPNAME IS REQUIRED BUT WAS NOT ENTERED'
&ERR     SETB  1
.NEXT710 ANOP
         AIF   ('&DSPEYE' NE '').NEXT720
         MNOTE 12,'*** DSPEYE IS REQUIRED BUT WAS NOT ENTERED'
&ERR     SETB  1
.NEXT720 ANOP
         AIF   ('&DSPDOWN' NE '').NEXT730
         MNOTE 12,'*** DSPDOWN IS REQUIRED BUT WAS NOT ENTERED'
&ERR     SETB  1
.NEXT730 ANOP
         AIF   ('&ANKNAME' NE '').NEXT740
         MNOTE 12,'*** ANKNAME IS REQUIRED BUT WAS NOT ENTERED'
&ERR     SETB  1
.NEXT740 ANOP
         AIF   ('&ANKEYE' NE '').NEXT750
         MNOTE 12,'*** ANKEYE IS REQUIRED BUT WAS NOT ENTERED'
&ERR     SETB  1
.NEXT750 ANOP
         AIF   ('&DUPLEX' EQ 'Y').NEXT760
         AIF   ('&DUPLEX' EQ 'N').NEXT760
         MNOTE 12,'*** DUPLEX MUST BE SPECIFIED AS Y OR N'
&ERR     SETB  1
.NEXT760 ANOP
         AIF   ('&LMODLDCB' NE '').NEXT770
         MNOTE 12,'*** LMODLDCB IS REQUIRED BUT WAS NOT ENTERED'
&ERR     SETB  1
.NEXT770 ANOP
         AIF   ('&LPRMSPC' NE '').NEXT800
         MNOTE 12,'*** LPRMSPC IS REQUIRED BUT WAS NOT ENTERED'
&ERR     SETB  1
         AGO   .NEXT802
.NEXT800 ANOP
         AIF   (T'&LPRMSPC EQ 'N').NEXT801
         MNOTE 12,'*** LPRMSPC MUST BE NUMERIC'
&ERR     SETB  1
         AGO   .NEXT802
.NEXT801 ANOP
         AIF   ('&LPRMSPC' GT '0').NEXT802
         MNOTE 12,'*** LPRMSPC MUST BE GREATER THAN 0'
&ERR     SETB  1
.NEXT802 ANOP
         AIF   ('&LSECSPC' NE '').NEXT810
         MNOTE 12,'*** LSECSPC IS REQUIRED BUT WAS NOT ENTERED'
&ERR     SETB  1
         AGO   .NEXT812
.NEXT810 ANOP
         AIF   (T'&LSECSPC EQ 'N').NEXT811
         MNOTE 12,'*** LSECSPC MUST BE NUMERIC'
&ERR     SETB  1
         AGO   .NEXT812
.NEXT811 ANOP
         AIF   ('&LSECSPC' GT '0').NEXT812
         MNOTE 12,'*** LSECSPC MUST BE GREATER THAN 0'
&ERR     SETB  1
.NEXT812 ANOP
         AIF   ('&IDRATIO' NE '').NEXT820
         MNOTE 12,'*** IDRATIO IS REQUIRED BUT WAS NOT ENTERED'
&ERR     SETB  1
         AGO   .NEXT822
.NEXT820 ANOP
         AIF   (T'&IDRATIO EQ 'N').NEXT821
         MNOTE 12,'*** IDRATIO MUST BE NUMERIC'
&ERR     SETB  1
         AGO   .NEXT822
.NEXT821 ANOP
         AIF   ('&IDRATIO' GT '0').NEXT822
         MNOTE 12,'*** IDRATIO MUST BE 1 OR HIGHER'
&ERR     SETB  1
.NEXT822 ANOP
         AIF   ('&LVOLSER' NE '').NEXT850
         AIF   ('&LUNIT' NE '').NEXT850
         MNOTE 12,'*** LUNIT OR LVOLSER OR BOTH MUST BE ENTERED'
&ERR     SETB  1
.NEXT850 ANOP
&WORK1   SETA  0                                                    U20027
&WORK2   SETA  0                                                    U20027
&WORK3   SETA  0                                                    U20027
         AIF   (N'&SKPOS EQ 0).NEXT899                              U20027
         AIF   (N'&SKPOS LT 11).NEXT860                             U20027
         MNOTE 12,'*** MORE THAN 10 SUB-KEYS SPECIFIED'             U20027
&ERR     SETB  1                                                    U20027
.NEXT860 ANOP                                                       U20027
         AIF   (N'&SKLEN EQ N'&SKPOS).NEXT863                       U20027
         MNOTE 12,'*** UNEQUAL NUMBER OF SUB-KEY OPERANDS'          U20027
&ERR     SETB  1                                                    U20027
```

ATTY. DOCKET No.: CRKR-0009 PATENT

```
.NEXTB63 ANOP                                                 U20027 02372400
&WORK1   SETA  &WORK1+1                                       U20027 02372600
         AIF   (&WORK1 GT 10).NEXTB99                         U20027 02372800
         AIF   ('&SKPOS(&WORK1)&SKLEN(&WORK1)' EQ '').NEXTB63 U20027 02373000
         AIF   (T'&SKPOS(&WORK1) EQ 'N').NEXTB68              U20027 02373200
         MNOTE 12,'*** SUB-KEY &WORK1 POSITION MUST BE NUMERIC' U20027 02373400
&ERR     SETB  1                                              U20027 02373600
.NEXTB68 ANOP                                                 U20027 02373800
         AIF   (T'&SKLEN(&WORK1) EQ 'N').NEXTB70              U20027 02374000
         MNOTE 12,'*** SUB-KEY &WORK1 LENGTH MUST BE NUMERIC'   U20027 02374200
&ERR     SETB  1                                              U20027 02374400
.NEXTB70 ANOP                                                 U20027 02374600
         AIF   ('&SKLEN(&WORK1)' GT '0').NEXTB73              U20027 02374800
         MNOTE 12,'*** SUB-KEY &WORK1 LENGTH MUST BE GT ZERO'   U20027 02375000
&ERR     SETB  1                                              U20027 02375200
.NEXTB73 ANOP                                                 U20027 02375400
         AIF   ('&SKLEN(&WORK1)' LT '257').NEXTB75            U20027 02375600
         MNOTE 12,'*** SUB-KEY &WORK1 LENGTH MUST BE LT 257'    U20027 02375800
&ERR     SETB  1                                              U20027 02376000
.NEXTB75 ANOP                                                 U20027 02376200
         AIF   ('&SKPOS(&WORK1)' GT '16').NEXTB76             U20027 02376400
         MNOTE 12,'*** SUB-KEY &WORK1 POSITION MUST BE GT 16'   U20027 02376600
&ERR     SETB  1                                              U20027 02376800
.NEXTB76 ANOP                                                 U20027 02377000
&WORK2   SETA  &RECLEN+16                                     U20027 02377200
&WORK3   SETA  &SKLEN(&WORK1)+&SKPOS(&WORK1)+16               U20027 02377400
         AIF   (&WORK3 LE &WORK2).NEXTB63                     U20027 02377600
         MNOTE 12,'*** SUB-KEY &WORK1 TOO LONG'                 U20027 02377800
&ERR     SETB  1                                              U20027 02378000
         AGO   .NEXTB63                                       U20027 02378200
.NEXTB99 ANOP                                                 U20027 02378400
         AIF   (NOT &ERR).START                                      02380000
         MEXIT                                                       02390000
.START   ANOP                                                        02400000
DSAM7750 START                                                       02410000
DSAM7750 AMODE 24                                                    02420000
DSAM7750 RMODE 24                                                    02430000
************* START OF SPECIFICATIONS **************************** 02440000
*                                                                  * 02450000
*                                                                  * 02460000
* MODULE NAME - DSAM7750  DATA SPACE ACCESS CONTROL TABLE          * 02470000
*                                                                  * 02480000
*                                                                  * 02490000
*                                                                  * 02500000
*                                                                  * 02510000
*                                                                  * 02520000
*                                                                  * 02530000
*                                                                  * 02540000
*         THIS PROGRAM CONTAINS PROPRIETARY AND TRADE SECRET       * 02550000
*         INFORMATION BELONGING TO J.D. CARREKER AND ASSOCIATES    * 02560000
*         INCORPORATED (JDCA).  THE PROGRAM IS FURNISHED ONLY FOR  * 02570000
*         USE BY LICENSEES OF JDCA SOFTWARE PRODUCTS AND THEIR     * 02580000
*         DESIGNATED AGENTS OR EMPLOYEES RESPONSIBLE FOR INSTALLATION * 02590000
*         OR OPERATION OF THE PRODUCTS.  ANY OTHER USE, DUPLICATION, * 02600000
*         OR DISSEMINATION WITHOUT THE WRITTEN CONSENT OF JDCA IS  * 02610000
*         NOT AUTHORIZED.                                          * 02620000
*                                                                  * 02630000
*                                                                  * 02640000
*                                                                  * 02650000
* FUNCTION -                                                       * 02660000
*                                                                  * 02670000
* THIS MACRO  WILL GENERATE A LOAD MODULE TABLE THAT IS LOADED BY  * 02680000
* DSAM7700 AND DSAM7710 TO OBTAIN PROCESSING PARAMETERS FOR THE    * 02690000
* DATA SPACE ACCESS.                                               * 02700000
*                                                                  * 02710000
*                                                                  * 02720000
```

DSAMGEN 1-10-97 10:13a

```
*                                                                  * 02730000
* MODULE TYPE - MACRO                                              * 02740000
*                                                                  * 02750000
*        PROCESSOR - ASSEMBLER H                                   * 02760000
*                                                                  * 02770000
* EXTERNAL REFERENCES -                                            * 02780000
*                                                                  * 02790000
*        NONE                                                      * 02800000
*                                                                  * 02810000
*                                                                  * 02820000
*                                                                  * 02830000
* MAINTENANCE LOG:                                                 * 02840000
*                                                                  * 02850000
*   PTF #   DATE    DESCRIPTION                                    * 02860000
*   ------  ------  ---------------------------------------------  * 02870000
*                                                                  * 02880000
*                                                                  * 02890000
*                                                                  * 02900000
*                                                                  * 02910000
*                                                                  * 02920000
*                                                                  * 02930000
*                                                                  * 02940000
*                                                                  * 02950000
*                                                                  * 02960000
*                                                                  * 02970000
*                                                                  * 02980000
*                                                                  * 02990000
*                                                                  * 03000000
*                                                                  * 03010000
*                                                                  * 03020000
******************************************************************** 03030000
DSPNAME  DC    CL8&DSPNAME             NAME OF DATA SPACE            03040000
DSPEYE   DC    CL16&DSPEYE             DATA SPACE EYE CATCHER        03050000
DSPDOWN  DC    CL16&DSPDOWN            DATA SPACE EYE CATCHER        03060000
ANKNAME  DC    CL8&ANKNAME             ANCHOR CONTROL BLOCK NAME     03070000
ANKEYE   DC    CL8&ANKEYE              EYCATCHER IN ANCHOR MODULE    03080000
TOTALEYE DC    CL10&TOTALEYE           EYCATCHER IN TOTALS AREA      03090000
DUPLEX   DC    C'&DUPLEX'              DUPLEX CONTROL FILE - Y/N     03100000
LPRMSPC  DC    AL3(&LPRMSPC)           PRIMARY SPACE FOR NEW LOG FILES 03110000
LSECSPC  DC    AL3(&LSECSPC)           SECONDARY SPACE FOR NEW LOG FILE 03120000
LMODLDCB DC    CL44&LMODLDCB           MODEL DCB DATA SET NAME FOR LOG 03130000
         AIF   ('&LVOLSER' EQ '').NEXT900                            03140000
LVOLSER  DC    CL6'&LVOLSER'           VOLSER FOR NEW LOG FILES      03150000
         AGO   .NEXT910                                              03160000
.NEXT900 ANOP                                                        03170000
LVOLSER  DC    CL6' '                  VOLSER FOR NEW LOG FILES      03180000
.NEXT910 ANOP                                                        03190000
         AIF   ('&LUNIT' EQ '').NEXT920                              03200000
LUNIT    DC    CL8'&LUNIT'             UNIT TYPE FOR NEW LOG FILES   03210000
         AGO   .NEXT930                                              03220000
.NEXT920 ANOP                                                        03230000
LUNIT    DC    CL8' '                  UNIT TYPE FOR NEW LOG FILES   03240000
.NEXT930 ANOP                                                        03250000
MAXRECS  DC    F'&MAXRECS'             MAXIMUM RECS ON WAREHOUSE     03260000
FCLSIZE  DC    F'&FCLSIZE'             SIZE OF FAILED COMMIT LIST    03270000
RECLEN   DC    F'&RECLEN'              DETAIL RECORD SIZE            03280000
KEYLEN   DC    F'&KEYLEN'              LENGTH OF KEY                 03290000
KEYPOS   DC    F'&KEYPOS'              OFFSET OF KEY WITHIN RECORD   03300000
SDELAY   DC    F'&SDELAY'              MICROSECOND DELAY ON SEQ ACCESS 03310000
KDELAY   DC    F'&KDELAY'              MICROSECOND DELAY ON KEY ACCESS 03320000
IDRATIO  DC    F'&IDRATIO'             INDEX TO DATA RECORD RATIO    03330000
NUMTOTS  DC    F'&NUMTOTS'             NUMBER OF TOTALS FIELDS       03340000
DFLTUPD  DC    F'&DFLTUPD'             DEFAULT MAX UPDATES PER RUN   03350000
&WORK1   SETA  1                                              U20027 03350600
.GENSK   ANOP                                                 U20027 03351200
         AIF   (&WORK1 GE 11).NOMORE                          U20027 03351800
```

Page 3

```
         AIF   ('&SKPOS(&WORK1)&SKLEN(&WORK1)' NE '').NZERO      U20027 03352400
SKLEN&WORK1 DC    H'0'                                          U20027 03353000
SKPOS&WORK1 DC    H'0'                                          U20027 03353600
&WORK1   SETA  &WORK1+1                                         U20027 03354200
         AGO   ,GENSK                                           U20027 03354800
.NZERO   ANOP                                                   U20027 03355400
SKLEN&WORK1 DC    H'&SKLEN(&WORK1)'                             U20027 03356000
SKPOS&WORK1 DC    H'&SKPOS(&WORK1)'                             U20027 03356600
&WORK1   SETA  &WORK1+1                                         U20027 03357200
         AGO   .GENSK                                           U20027 03357800
.NOMORE  ANOP                                                   U20027 03358400
LEN7750  EQU   *-DSPNAME                                               03360000
         MEND                                                          03380000
```

ATTY. DOCKET NO.: CRKR-0009 PATENT

```
         MACRO                                                          00010000
&LABEL   JDCALLOM &FUNC=,                                               X00020000
               &DDNAME=,                                                X00030000
               &DSN=,                                                   X00040000
               &MEMBER=,                                                X00050000
               &STATUS=,                                                X00060000
               &NORMDSP=,                                               X00070000
               &CONDDSP=,                                               X00080000
               &SPACE=,                                                 X00090000
               &PRMSPAC=,                                               X00100000
               &SECSPAC=,                                               X00110000
               &DIRSPAC=,                                               X00120000
               &RLSE=,                                                  X00130000
               &ROUND=,                                                 X00140000
               &VOLSER=,                                                X00150000
               &VLSRLST=,                                               X00160000
               &VOLCNT=,                                                X00170000
               &UNIT=,                                                  X00180000
               &UNITCNT=,                                               X00190000
               &SYSOUT=,                                                X00200000
               &SYSPGNM=,                                               X00210000
               &DEST=,                                                  X00220000
               &CLOSE=,                                                 X00230000
               &EXPDT=,                                                 X00240000
               &RETPD=,                                                 X00250000
               &DUMMY=,                                                 X00260000
               &BLKSIZE=,                                               X00270000
               &DEN=,                                                   X00280000
               &DSORG=,                                                 X00290000
               &KEYLEN=,                                                X00300000
               &DCBREF=,                                                X00310000
               &LIMCT=,                                                 X00320000
               &LRECL=,                                                 X00330000
               &OPTCD=,                                                 X00340000
               &RECFM=,                                                 X00350000
               &PASSWRD=,                                               X00360000
               &OVSYSOT=,                                               X00370000
               &RETDDN=,                                                X00380000
               &RETDSN=,                                                X00390000
               &RETMBR=,                                                X00400000
               &RETSTAT=,                                               X00410000
               &RETNDSP=,                                               X00420000
               &RETCDSP=,                                               X00430000
               &RETDSOR=,                                               X00440000
               &RETVSER=,                                               X00450000
               &ERROR=,                                                 X00460000
               &WORK=                                                    00470000
.* COPYRIGHT                    1984                                     00480000
         LCLA  &PRMCNT,&TUNUM                                            00490000
&PRMCNT  SETA  0                                                         00500000
&TUNUM   SETA  3                                                         00510000
         AIF   ('&DSN' EQ '').NEXT00                                     00520000
&TUNUM   SETA  &TUNUM+1                                                  00530000
.NEXT00  ANOP                                                            00540000
         AIF   ('&MEMBER' EQ '').NEXT01                                  00550000
&TUNUM   SETA  &TUNUM+1                                                  00560000
.NEXT01  ANOP                                                            00570000
         AIF   ('&STATUS' EQ '').NEXT02                                  00580000
&TUNUM   SETA  &TUNUM+1                                                  00590000
.NEXT02  ANOP                                                            00600000
         AIF   ('&NORMDSP' EQ '').NEXT03                                 00610000
&TUNUM   SETA  &TUNUM+1                                                  00620000
.NEXT03  ANOP                                                            00630000
         AIF   ('&CONDDSP' EQ '').NEXT04                                 00640000
&TUNUM   SETA  &TUNUM+1                                                  00650000
.NEXT04  ANOP                                                            00660000
         AIF   ('&SPACE' EQ '').NEXT05                                   00670000
&TUNUM   SETA  &TUNUM+1                                                  00680000
.NEXT05  ANOP                                                            00690000
         AIF   ('&PRMSPAC' EQ '').NEXT06                                 00700000
&TUNUM   SETA  &TUNUM+1                                                  00710000
.NEXT06  ANOP                                                            00720000
         AIF   ('&SECSPAC' EQ '').NEXT07                                 00730000
&TUNUM   SETA  &TUNUM+1                                                  00740000
.NEXT07  ANOP                                                            00750000
         AIF   ('&DIRSPAC' EQ '').NEXT08                                 00760000
&TUNUM   SETA  &TUNUM+1                                                  00770000
.NEXT08  ANOP                                                            00780000
         AIF   ('&RLSE' EQ '').NEXT09                                    00790000
&TUNUM   SETA  &TUNUM+1                                                  00800000
.NEXT09  ANOP                                                            00810000
         AIF   ('&ROUND' EQ '').NEXT10                                   00820000
&TUNUM   SETA  &TUNUM+1                                                  00830000
.NEXT10  ANOP                                                            00840000
         AIF   ('&VOLSER' EQ '').NEXT11                                  00850000
&TUNUM   SETA  &TUNUM+1                                                  00860000
.NEXT11  ANOP                                                            00870000
         AIF   ('&VLSRLST' EQ '').NEXT11A                                00880000
&TUNUM   SETA  &TUNUM+1                                                  00890000
.NEXT11A ANOP                                                            00900000
         AIF   ('&VOLCNT' EQ '').NEXT12                                  00910000
&TUNUM   SETA  &TUNUM+1                                                  00920000
.NEXT12  ANOP                                                            00930000
         AIF   ('&UNIT' EQ '').NEXT13                                    00940000
&TUNUM   SETA  &TUNUM+1                                                  00950000
.NEXT13  ANOP                                                            00960000
         AIF   ('&UNITCNT' EQ '').NEXT14                                 00970000
&TUNUM   SETA  &TUNUM+1                                                  00980000
.NEXT14  ANOP                                                            00990000
         AIF   ('&SYSOUT' EQ '').NEXT15                                  01000000
&TUNUM   SETA  &TUNUM+1                                                  01010000
.NEXT15  ANOP                                                            01020000
         AIF   ('&DEST' EQ '').NEXT16                                    01030000
&TUNUM   SETA  &TUNUM+1                                                  01040000
.NEXT16  ANOP                                                            01050000
         AIF   ('&CLOSE' EQ '').NEXT17                                   01060000
&TUNUM   SETA  &TUNUM+1                                                  01070000
.NEXT17  ANOP                                                            01080000
         AIF   ('&EXPDT' EQ '').NEXT18                                   01090000
&TUNUM   SETA  &TUNUM+1                                                  01100000
.NEXT18  ANOP                                                            01110000
         AIF   ('&RETPD' EQ '').NEXT19                                   01120000
&TUNUM   SETA  &TUNUM+1                                                  01130000
.NEXT19  ANOP                                                            01140000
         AIF   ('&DUMMY' EQ '').NEXT20                                   01150000
&TUNUM   SETA  &TUNUM+1                                                  01160000
.NEXT20  ANOP                                                            01170000
         AIF   ('&BLKSIZE' EQ '').NEXT21                                 01180000
&TUNUM   SETA  &TUNUM+1                                                  01190000
.NEXT21  ANOP                                                            01200000
         AIF   ('&DEN' EQ '').NEXT22                                     01210000
&TUNUM   SETA  &TUNUM+1                                                  01220000
.NEXT22  ANOP                                                            01230000
         AIF   ('&DSORG' EQ '').NEXT23                                   01240000
&TUNUM   SETA  &TUNUM+1                                                  01250000
.NEXT23  ANOP                                                            01260000
         AIF   ('&KEYLEN' EQ '').NEXT24                                  01270000
&TUNUM   SETA  &TUNUM+1                                                  01280000
.NEXT24  ANOP                                                            01290000
         AIF   ('&LIMCT' EQ '').NEXT25                                   01300000
&TUNUM   SETA  &TUNUM+1                                                  01310000
.NEXT25  ANOP                                                            01320000
```

JDCALLOM 1-10-97 10:16a

ATTY. DOCKET No.: CRKR-0009

PATENT

```
         AIF   ('&LRECL' EQ '').NEXT26
&TUNUM   SETA  &TUNUM+1
.NEXT26  ANOP
         AIF   ('&OPTCD' EQ '').NEXT27
&TUNUM   SETA  &TUNUM+1
.NEXT27  ANOP
         AIF   ('&RECFM' EQ '').NEXT28
&TUNUM   SETA  &TUNUM+1
.NEXT28  ANOP
         AIF   ('&PASSWRD' EQ '').NEXT29
&TUNUM   SETA  &TUNUM+1
.NEXT29  ANOP
         AIF   ('&OVSYSOT' EQ '').NEXT30
&TUNUM   SETA  &TUNUM+1
.NEXT30  ANOP
         AIF   ('&RETODN' EQ '').NEXT31
&TUNUM   SETA  &TUNUM+1
.NEXT31  ANOP
         AIF   ('&RETDSN' EQ '').NEXT32
&TUNUM   SETA  &TUNUM+1
.NEXT32  ANOP
         AIF   ('&RETMBR' EQ '').NEXT33
&TUNUM   SETA  &TUNUM+1
.NEXT33  ANOP
         AIF   ('&RETSTAT' EQ '').NEXT34
&TUNUM   SETA  &TUNUM+1
.NEXT34  ANOP
         AIF   ('&RETNDSP' EQ '').NEXT35
&TUNUM   SETA  &TUNUM+1
.NEXT35  ANOP
         AIF   ('&RETCDSP' EQ '').NEXT36
&TUNUM   SETA  &TUNUM+1
.NEXT36  ANOP
         AIF   ('&RETDSOR' EQ '').NEXT37
&TUNUM   SETA  &TUNUM+1
.NEXT37  ANOP
         AIF   ('&RETVSER' EQ '').NEXT38
&TUNUM   SETA  &TUNUM+1
.NEXT38  ANOP
         AIF   ('&DCBREF' EQ '').NEXT39
&TUNUM   SETA  &TUNUM+1
.NEXT39  ANOP
         AIF   ('&SYSPGNM' EQ '').NEXT40
&TUNUM   SETA  &TUNUM+1
.NEXT40  ANOP
         AIF   ('&WORK' EQ '').ERROR99
         PUSH  PRINT
         PRINT NOGEN
&LABEL   LA    R1,&WORK              POINT TO WORK AREA
         LA    R2,4(R1)              POINT ONE FULLWORD INTO GM AREA
         ST    R2,0(R1)              STORE ADDRESS
         MVI   0(R1),128             SET HIGH ORDER BIT
         MVI   4(R1),20              SET REQUEST BLOCK LENGTH
         AIF   ('&FUNC' EQ '').ALLOC
         AIF   ('&FUNC' EQ 'ALLOC').ALLOC
         AIF   ('&FUNC' EQ 'UNALL').UNALL
         AIF   ('&FUNC' EQ 'INFO').INFORET
         AGO   .ERROR1
.ALLOC   ANOP
         MVI   5(R1),1               SET VERB CODE = ALLOCATE
         AGO   .ENDRQBK              AND GO CONTINUE REQUEST BLK
.INFORET ANOP
         MVI   5(R1),7               SET VERB CODE = INFO RETRIEVAL
         AGO   .ENDRQBK              AND GO CONTINUE REQUEST BLK
.UNALL   ANOP
         MVI   5(R1),2               SET VERB CODE = UN-ALLOCATE
         XC    6(18,R1),6(R1)        CLEAR OUT REST OF REQ BLK
         LA    R2,24(R1)             POINT TO TEXT UNIT POINTERS
         ST    R2,12(R1)             AND STORE IN REQ BLK
         LA    R1,&TUNUM*4(R2)       POINT PAST TUP'S TO TEXT UNITS
         XC    0(4,R1),0(R1)         CLEAR OUT TEXT UNIT
         MVI   1(R1),7               SET TEXT UNIT KEY
         ST    R1,0(R2)              STORE TEXT UNIT ADDR IN TUP LIST
         LA    R1,4(R1)              BUMP UP TEXT UNIT BASE
         LA    R2,4(R2)              BUMP UP TEXT UNIT POINTER BASE
         AGO   .CHKDDNM              AND GO CHECK DD NAME
.ENDRQBK ANOP
         XC    6(18,R1),6(R1)        CLEAR OUT REST OF REQ BLK
         LA    R2,24(R1)             POINT TO TEXT UNIT POINTERS
         ST    R2,12(R1)             AND STORE IN REQ BLK
         LA    R1,&TUNUM*4(R2)       POINT PAST TUP'S TO TEXT UNITS
.CHKDDNM ANOP
         AIF   ('&DDNAME' EQ '').CHKDSN
&PRMCNT  SETA  &PRMCNT+1
         XC    0(6,R1),0(R1)         CLEAR OUT TEXT UNIT
         MVI   1(R1),1               SET TEXT UNIT KEY
         MVI   3(R1),1               SET TEXT UNIT COUNT
         MVI   5(R1),8               SET LENGTH
         MVC   6(8,R1),&DDNAME       MOVE IN FIELD
         ST    R1,0(R2)              STORE TEXT UNIT ADDR IN TUP LIST
         LA    R1,14(R1)             BUMP UP TEXT UNIT BASE
         LA    R2,4(R2)              BUMP UP TEXT UNIT POINTER BASE
.CHKDSN  ANOP
         AIF   ('&DSN' EQ ''),CHKMBR
&PRMCNT  SETA  &PRMCNT+1
         XC    0(6,R1),0(R1)         CLEAR OUT TEXT UNIT
         MVI   1(R1),2               SET TEXT UNIT KEY
         MVI   3(R1),1               SET TEXT UNIT COUNT
         MVI   5(R1),44              SET LENGTH
         MVC   6(44,R1),&DSN         MOVE IN FIELD
         ST    R1,0(R2)              STORE TEXT UNIT ADDR IN TUP LIST
         LA    R1,50(R1)             BUMP UP TEXT UNIT BASE
         LA    R2,4(R2)              BUMP UP TEXT UNIT POINTER BASE
.CHKMBR  ANOP
         AIF   ('&MEMBER' EQ '').CHKSTAT
&PRMCNT  SETA  &PRMCNT+1
         CLC   SPACES(8),&MEMBER     ANYTHING THERE ?
         BE    *+40                  NO...SO SKIP TEXT UNIT SET UP
         XC    0(6,R1),0(R1)         CLEAR OUT TEXT UNIT
         MVI   1(R1),3               SET TEXT UNIT KEY
         MVI   3(R1),1               SET TEXT UNIT COUNT
         MVI   5(R1),8               SET LENGTH
         MVC   6(8,R1),&MEMBER       MOVE IN FIELD
         ST    R1,0(R2)              STORE TEXT UNIT ADDR IN TUP LIST
         LA    R1,14(R1)             BUMP UP TEXT UNIT BASE
         LA    R2,4(R2)              BUMP UP TEXT UNIT POINTER BASE
.CHKSTAT ANOP
         AIF   ('&STATUS' EQ '').CHKNDSP
&PRMCNT  SETA  &PRMCNT+1
         AIF   ('&STATUS' EQ 'SHR').STATSHR
         AIF   ('&STATUS' EQ 'NEW').STATNEW
         AIF   ('&STATUS' EQ 'OLD').STATOLD
         AIF   ('&STATUS' EQ 'MOD').STATMOD
         AGO   .ERROR1
.STATSHR ANOP
         XC    0(8,R1),0(R1)         CLEAR OUT TEXT UNIT
         MVI   1(R1),4               SET TEXT UNIT KEY
         MVI   3(R1),1               SET TEXT UNIT COUNT
         MVI   5(R1),1               SET LENGTH
         MVI   6(R1),8               SET DS STATUS
         AGO   .ENDSTAT              AND GO FINNISH UP REGS
.STATNEW ANOP
```

JDCALLOM 1-10-97 10:16a

Page 2

09080902 " 022297

ATTY. DOCKET NO.: CRKR-0009 PATENT

```
         XC    0(8,R1),0(R1)          CLEAR OUT TEXT UNIT
         MVI   1(R1),4                SET TEXT UNIT KEY
         MVI   3(R1),1                SET TEXT UNIT COUNT
         MVI   5(R1),1                SET LENGTH
         MVI   6(R1),4                SET DS STATUS
         AGO   .ENDSTAT               AND GO FINNISH UP REGS
.STATMOD ANOP
         XC    0(8,R1),0(R1)          CLEAR OUT TEXT UNIT
         MVI   1(R1),4                SET TEXT UNIT KEY
         MVI   3(R1),1                SET TEXT UNIT COUNT
         MVI   5(R1),1                SET LENGTH
         MVI   6(R1),2                SET DS STATUS
         AGO   .ENDSTAT               AND GO FINNISH UP REGS
.STATOLD ANOP
         XC    0(8,R1),0(R1)          CLEAR OUT TEXT UNIT
         MVI   1(R1),4                SET TEXT UNIT KEY
         MVI   3(R1),1                SET TEXT UNIT COUNT
         MVI   5(R1),1                SET LENGTH
         MVI   6(R1),1                SET DS STATUS
.ENDSTAT ANOP
         ST    R1,0(R2)               STORE TEXT UNIT ADDR IN TUP LIST
         LA    R1,8(R1)               BUMP UP TEXT UNIT BASE
         LA    R2,4(R2)               BUMP UP TEXT UNIT POINTER BASE
.CHKNDSP ANOP
         AIF   ('&NORMDSP' EQ '').CHKCDSP
&PRMCNT  SETA  &PRMCNT+1
         AIF   ('&NORMDSP' EQ 'CATLG').NDSPCAT
         AIF   ('&NORMDSP' EQ 'UNCATLG').NDSPUCT
         AIF   ('&NORMDSP' EQ 'DELETE').NDSPDEL
         AIF   ('&NORMDSP' EQ 'KEEP').NDSPKEP
         AGO   .ERROR3
.NDSPCAT ANOP
         XC    0(8,R1),0(R1)          CLEAR OUT TEXT UNIT
         MVI   1(R1),5                SET TEXT UNIT KEY
         MVI   3(R1),1                SET TEXT UNIT COUNT
         MVI   5(R1),1                SET LENGTH
         MVI   6(R1),2                SET DS DISP
         AGO   .ENDNDSP               AND GO FINNISH UP REGS
.NDSPUCT ANOP
         XC    0(8,R1),0(R1)          CLEAR OUT TEXT UNIT
         MVI   1(R1),5                SET TEXT UNIT KEY
         MVI   3(R1),1                SET TEXT UNIT COUNT
         MVI   5(R1),1                SET LENGTH
         MVI   6(R1),1                SET DS DISP
         AGO   .ENDNDSP               AND GO FINNISH UP REGS
.NDSPDEL ANOP
         XC    0(8,R1),0(R1)          CLEAR OUT TEXT UNIT
         MVI   1(R1),5                SET TEXT UNIT KEY
         MVI   3(R1),1                SET TEXT UNIT COUNT
         MVI   5(R1),1                SET LENGTH
         MVI   6(R1),4                SET DS DISP
         AGO   .ENDNDSP               AND GO FINNISH UP REGS
.NDSPKEP ANOP
         XC    0(8,R1),0(R1)          CLEAR OUT TEXT UNIT
         MVI   1(R1),5                SET TEXT UNIT KEY
         MVI   3(R1),1                SET TEXT UNIT COUNT
         MVI   5(R1),1                SET LENGTH
         MVI   6(R1),8                SET DS DISP
.ENDNDSP ANOP
         ST    R1,0(R2)               STORE TEXT UNIT ADDR IN TUP LIST
         LA    R1,8(R1)               BUMP UP TEXT UNIT BASE
         LA    R2,4(R2)               BUMP UP TEXT UNIT POINTER BASE
.CHKCDSP ANOP
         AIF   ('&CONDDSP' EQ '').CHKSPAC
&PRMCNT  SETA  &PRMCNT+1
         AIF   ('&CONDDSP' EQ 'CATLG').CDSPCAT
```

JDCALLOM 1-10-97 10:16a

```
         AIF   ('&CONDDSP' EQ 'UNCATLG').CDSPUCT
         AIF   ('&CONDDSP' EQ 'DELETE').CDSPDEL
         AIF   ('&CONDDSP' EQ 'KEEP').CDSPKEP
         AGO   .ERROR4
.CDSPCAT ANOP
         XC    0(8,R1),0(R1)          CLEAR OUT TEXT UNIT
         MVI   1(R1),6                SET TEXT UNIT KEY
         MVI   3(R1),1                SET TEXT UNIT COUNT
         MVI   5(R1),1                SET LENGTH
         MVI   6(R1),2                SET DS DISP
         AGO   .ENDCDSP               AND GO FINNISH UP REGS
.CDSPUCT ANOP
         XC    0(8,R1),0(R1)          CLEAR OUT TEXT UNIT
         MVI   1(R1),6                SET TEXT UNIT KEY
         MVI   3(R1),1                SET TEXT UNIT COUNT
         MVI   5(R1),1                SET LENGTH
         MVI   6(R1),1                SET DS DISP
         AGO   .ENDCDSP               AND GO FINNISH UP REGS
.CDSPDEL ANOP
         XC    0(8,R1),0(R1)          CLEAR OUT TEXT UNIT
         MVI   1(R1),6                SET TEXT UNIT KEY
         MVI   3(R1),1                SET TEXT UNIT COUNT
         MVI   5(R1),1                SET LENGTH
         MVI   6(R1),4                SET DS DISP
         AGO   .ENDCDSP               AND GO FINNISH UP REGS
.CDSPKEP ANOP
         XC    0(8,R1),0(R1)          CLEAR OUT TEXT UNIT
         MVI   1(R1),6                SET TEXT UNIT KEY
         MVI   3(R1),1                SET TEXT UNIT COUNT
         MVI   5(R1),1                SET LENGTH
         MVI   6(R1),8                SET DS DISP
.ENDCDSP ANOP
         ST    R1,0(R2)               STORE TEXT UNIT ADDR IN TUP LIST
         LA    R1,8(R1)               BUMP UP TEXT UNIT BASE
         LA    R2,4(R2)               BUMP UP TEXT UNIT POINTER BASE
.CHKSPAC ANOP
         AIF   ('&SPACE' EQ '').CHKPRSP
&PRMCNT  SETA  &PRMCNT+1
         AIF   ('&SPACE' EQ 'TRK').TRK
         AIF   ('&SPACE' EQ 'CYL').CYL
         AIF   ('&SPACE' EQ 'BLK').BLK
         AGO   .ERROR5
.TRK     ANOP
         XC    0(4,R1),0(R1)          CLEAR OUT TEXT UNIT
         MVI   1(R1),7                SET TEXT UNIT KEY
         ST    R1,0(R2)               STORE TEXT UNIT ADDR IN TUP LIST
         LA    R1,4(R1)               BUMP UP TEXT UNIT BASE
         LA    R2,4(R2)               BUMP UP TEXT UNIT POINTER BASE
         AGO   .CHKPRSP
.CYL     ANOP
         XC    0(4,R1),0(R1)          CLEAR OUT TEXT UNIT
         MVI   1(R1),8                SET TEXT UNIT KEY
         ST    R1,0(R2)               STORE TEXT UNIT ADDR IN TUP LIST
         LA    R1,4(R1)               BUMP UP TEXT UNIT BASE
         LA    R2,4(R2)               BUMP UP TEXT UNIT POINTER BASE
         AGO   .CHKPRSP
.BLK     ANOP
         XC    0(7,R1),0(R1)          CLEAR OUT TEXT UNIT
         MVI   1(R1),9                SET TEXT UNIT KEY
         MVI   3(R1),1                SET TEXT UNIT COUNT
         MVI   5(R1),3                SET LENGTH
         MVC   7(2,R1),&BLKSIZE       MOVE IN FIELD
         ST    R1,0(R2)               STORE TEXT UNIT ADDR IN TUP LIST
         LA    R1,10(R1)              BUMP UP TEXT UNIT BASE
         LA    R2,4(R2)               BUMP UP TEXT UNIT POINTER BASE
.CHKPRSP ANOP
```

Page 3

1C/14PRINT

ATTY. DOCKET NO.: CRKR-0009 PATENT

```
         AIF   ('&PRMSPAC' EQ '').CHKSCSP
         AIF   ('&SPACE' EQ '').ERROR5
&PRMCNT  SETA  &PRMCNT+1
         XC    0(6,R1),0(R1)        CLEAR OUT TEXT UNIT
         MVI   1(R1),X'0A'          SET TEXT UNIT KEY
         MVI   3(R1),1              SET TEXT UNIT COUNT
         MVI   5(R1),3              SET LENGTH
         MVC   6(3,R1),&PRMSPAC     MOVE IN FIELD
         ST    R1,0(R2)             STORE TEXT UNIT ADDR IN TUP LIST
         LA    R1,10(R1)            BUMP UP TEXT UNIT BASE
         LA    R2,4(R2)             BUMP UP TEXT UNIT POINTER BASE
.CHKSCSP ANOP
         AIF   ('&SECSPAC' EQ '').CHKDRSP
         AIF   ('&SPACE' EQ '').ERROR5
&PRMCNT  SETA  &PRMCNT+1
         XC    0(6,R1),0(R1)        CLEAR OUT TEXT UNIT
         MVI   1(R1),X'0B'          SET TEXT UNIT KEY
         MVI   3(R1),1              SET TEXT UNIT COUNT
         MVI   5(R1),3              SET LENGTH
         MVC   6(3,R1),&SECSPAC     MOVE IN FIELD
         ST    R1,0(R2)             STORE TEXT UNIT ADDR IN TUP LIST
         LA    R1,10(R1)            BUMP UP TEXT UNIT BASE
         LA    R2,4(R2)             BUMP UP TEXT UNIT POINTER BASE
.CHKDRSP ANOP
         AIF   ('&DIRSPAC' EQ '').CHKRLSE
&PRMCNT  SETA  &PRMCNT+1
         XC    0(6,R1),0(R1)        CLEAR OUT TEXT UNIT
         MVI   1(R1),X'0C'          SET TEXT UNIT KEY
         MVI   3(R1),1              SET TEXT UNIT COUNT
         MVI   5(R1),3              SET LENGTH
         MVC   6(3,R1),&DIRSPAC     MOVE IN FIELD
         ST    R1,0(R2)             STORE TEXT UNIT ADDR IN TUP LIST
         LA    R1,10(R1)            BUMP UP TEXT UNIT BASE
         LA    R2,4(R2)             BUMP UP TEXT UNIT POINTER BASE
.CHKRLSE ANOP
         AIF   ('&RLSE' EQ '').CHKROUN
&PRMCNT  SETA  &PRMCNT+1
         XC    0(4,R1),0(R1)        CLEAR OUT TEXT UNIT
         MVI   1(R1),X'0D'          SET TEXT UNIT KEY
         ST    R1,0(R2)             STORE TEXT UNIT ADDR IN TUP LIST
         LA    R1,4(R1)             BUMP UP TEXT UNIT BASE
         LA    R2,4(R2)             BUMP UP TEXT UNIT POINTER BASE
.CHKROUN ANOP
         AIF   ('&ROUND' EQ '').CHKVSER
&PRMCNT  SETA  &PRMCNT+1
         XC    0(4,R1),0(R1)        CLEAR OUT TEXT UNIT
         MVI   1(R1),X'0F'          SET TEXT UNIT KEY
         ST    R1,0(R2)             STORE TEXT UNIT ADDR IN TUP LIST
         LA    R1,4(R1)             BUMP UP TEXT UNIT BASE
         LA    R2,4(R2)             BUMP UP TEXT UNIT POINTER BASE
.CHKVSER ANOP
         AIF   ('&VOLSER' EQ '').CHKVLST
&PRMCNT  SETA  &PRMCNT+1
         CLC   SPACES(6),&VOLSER    ANYTHING THERE ?
         BE    *+40                 NO...SO SKIP TEXT UNIT SET UP
         XC    0(6,R1),0(R1)        CLEAR OUT TEXT UNIT
         MVI   1(R1),X'10'          SET TEXT UNIT KEY
         MVI   3(R1),1              SET TEXT UNIT COUNT
         MVI   5(R1),6              SET LENGTH
         MVC   6(6,R1),&VOLSER      MOVE IN FIELD
         ST    R1,0(R2)             STORE TEXT UNIT ADDR IN TUP LIST
         LA    R1,12(R1)            BUMP UP TEXT UNIT BASE
         LA    R2,4(R2)             BUMP UP TEXT UNIT POINTER BASE
.CHKVLST ANOP
         AIF   ('&VLSRLST' EQ '').CHKVCNT
&PRMCNT  SETA  &PRMCNT+1
```

JDCALLOW 1-10-97 10:16a

```
         ST    R1,4(R2)             SAVE TEXT UNIT WORK AREA ADDR
         LA    R1,&VLSRLST          GET FIELD ADDRESS
         MVI   0(R1),0              SET FIRST BYTE OF TU KEY
         MVI   1(R1),X'10'          SET TEXT UNIT KEY
         ST    R1,0(R2)             STORE TEXT UNIT ADDR IN TUP LIST
         L     R1,4(R2)             RESTORE TU WORK AREA ADDR
         LA    R2,4(R2)             BUMP UP TEXT UNIT POINTER BASE
.CHKVCNT ANOP
         AIF   ('&VOLCNT' EQ '').CHKUNIT
&PRMCNT  SETA  &PRMCNT+1
         XC    0(6,R1),0(R1)        CLEAR OUT TEXT UNIT
         MVI   1(R1),X'13'          SET TEXT UNIT KEY
         MVI   3(R1),1              SET TEXT UNIT COUNT
         MVI   5(R1),1              SET LENGTH
         MVC   6(1,R1),&VOLCNT      MOVE IN FIELD
         ST    R1,0(R2)             STORE TEXT UNIT ADDR IN TUP LIST
         LA    R1,8(R1)             BUMP UP TEXT UNIT BASE
         LA    R2,4(R2)             BUMP UP TEXT UNIT POINTER BASE
.CHKUNIT ANOP
         AIF   ('&UNIT' EQ '').CHKUCNT
&PRMCNT  SETA  &PRMCNT+1
         CLC   SPACES(6),&UNIT      ANYTHING THERE ?
         BE    *+40                 NO...SO SKIP TEXT UNIT SET UP
         XC    0(6,R1),0(R1)        CLEAR OUT TEXT UNIT
         MVI   1(R1),X'15'          SET TEXT UNIT KEY
         MVI   3(R1),1              SET TEXT UNIT COUNT
         MVI   5(R1),8              SET LENGTH
         MVC   6(8,R1),&UNIT        MOVE IN FIELD
         ST    R1,0(R2)             STORE TEXT UNIT ADDR IN TUP LIST
         LA    R1,14(R1)            BUMP UP TEXT UNIT BASE
         LA    R2,4(R2)             BUMP UP TEXT UNIT POINTER BASE
.CHKUCNT ANOP
         AIF   ('&UNITCNT' EQ '').CHKSYST
&PRMCNT  SETA  &PRMCNT+1
         XC    0(6,R1),0(R1)        CLEAR OUT TEXT UNIT
         MVI   1(R1),X'16'          SET TEXT UNIT KEY
         MVI   3(R1),1              SET TEXT UNIT COUNT
         MVI   5(R1),1              SET LENGTH
         MVC   6(1,R1),&UNITCNT     MOVE IN FIELD
         ST    R1,0(R2)             STORE TEXT UNIT ADDR IN TUP LIST
         LA    R1,8(R1)             BUMP UP TEXT UNIT BASE
         LA    R2,4(R2)             BUMP UP TEXT UNIT POINTER BASE
.CHKSYST ANOP
         AIF   ('&SYSOUT' EQ '').CHKSPGN
&PRMCNT  SETA  &PRMCNT+1
         AIF   ('&STATUS' NE '').ERROR6
         AIF   ('&NORMDSP' NE '').ERROR6
         AIF   ('&CONDDSP' NE '').ERROR6
         XC    0(6,R1),0(R1)        CLEAR OUT TEXT UNIT
         MVI   1(R1),X'18'          SET TEXT UNIT KEY
         MVI   3(R1),1              SET TEXT UNIT COUNT
         MVI   5(R1),1              SET LENGTH
         MVC   6(1,R1),&SYSOUT      MOVE CLASS FROM ADDR SPECIFIED
         ST    R1,0(R2)             STORE TEXT UNIT ADDR IN TUP LIST
         LA    R1,8(R1)             BUMP UP TEXT UNIT BASE
         LA    R2,4(R2)             BUMP UP TEXT UNIT POINTER BASE
.CHKSPGN ANOP
         AIF   ('&SYSPGNM' EQ '').CHKDEST
&PRMCNT  SETA  &PRMCNT+1
         AIF   ('&SYSOUT' EQ '').ERROR6
         XC    0(6,R1),0(R1)        CLEAR OUT TEXT UNIT
         MVI   1(R1),X'19'          SET TEXT UNIT KEY
         MVI   3(R1),1              SET TEXT UNIT COUNT
         MVI   5(R1),8              SET LENGTH
         MVC   6(8,R1),&SYSPGNM     MOVE SYSOUT PROGRAM NAME
         ST    R1,0(R2)             STORE TEXT UNIT ADDR IN TUP LIST
```

Page 4

ATTY. DOCKET NO.: CRKR-0009 PATENT

```
         LA    R1,14(R1)           BUMP UP TEXT UNIT BASE          05290000
         LA    R2,4(R2)            BUMP UP TEXT UNIT POINTER BASE  05300000
.CHKDEST ANOP                                                      05310000
         AIF   ('&DEST' EQ '').CHKCLOS                             05320000
&PRMCNT  SETA  &PRMCNT+1                                           05330000
         AIF   ('&SYSOUT' EQ '').CHKCLOS                           05340000
         AIF   ('&STATUS' NE '').ERROR6                            05350000
         AIF   ('&NORMDSP' NE '').ERROR6                           05360000
         AIF   ('&CONDDSP' NE '').ERROR6                           05370000
         XC    0(6,R1),0(R1)       CLEAR OUT TEXT UNIT             05380000
         MVI   1(R1),X'58'         SET TEXT UNIT KEY               05390000
         MVI   3(R1),1             SET TEXT UNIT COUNT             05400000
         MVI   5(R1),8             SET LENGTH                      05410000
         MVC   6(8,R1),&DEST       MOVE CLASS FROM ADDR SPECIFIED  05420000
         ST    R1,0(R2)            STORE TEXT UNIT ADDR IN TUP LIST 05430000
         LA    R1,14(R1)           BUMP UP TEXT UNIT BASE          05440000
         LA    R2,4(R2)            BUMP UP TEXT UNIT POINTER BASE  05450000
.CHKCLOS ANOP                                                      05460000
         AIF   ('&CLOSE' NE 'FREE').CHKEXPD                        05470000
&PRMCNT  SETA  &PRMCNT+1                                           05480000
         XC    0(4,R1),0(R1)       CLEAR OUT TEXT UNIT             05490000
         MVI   1(R1),X'1C'         SET TEXT UNIT KEY               05500000
         ST    R1,0(R2)            STORE TEXT UNIT ADDR IN TUP LIST 05510000
         LA    R1,4(R1)            BUMP UP TEXT UNIT BASE          05520000
         LA    R2,4(R2)            BUMP UP TEXT UNIT POINTER BASE  05530000
.CHKEXPD ANOP                                                      05540000
         AIF   ('&EXPDT' EQ '').CHKRETP                            05550000
&PRMCNT  SETA  &PRMCNT+1                                           05560000
         XC    0(6,R1),0(R1)       CLEAR OUT TEXT UNIT             05570000
         MVI   1(R1),X'22'         SET TEXT UNIT KEY               05580000
         MVI   3(R1),1             SET TEXT UNIT COUNT             05590000
         MVI   5(R1),5             SET LENGTH                      05600000
         MVC   6(5,R1),&EXPDT      MOVE IN FIELD                   05610000
         ST    R1,0(R2)            STORE TEXT UNIT ADDR IN TUP LIST 05620000
         LA    R1,12(R1)           BUMP UP TEXT UNIT BASE          05630000
         LA    R2,4(R2)            BUMP UP TEXT UNIT POINTER BASE  05640000
.CHKRETP ANOP                                                      05650000
         AIF   ('&RETPD' EQ '').CHKDUMM                            05660000
&PRMCNT  SETA  &PRMCNT+1                                           05670000
         XC    0(6,R1),0(R1)       CLEAR OUT TEXT UNIT             05680000
         MVI   1(R1),X'23'         SET TEXT UNIT KEY               05690000
         MVI   3(R1),1             SET TEXT UNIT COUNT             05700000
         MVI   5(R1),2             SET LENGTH                      05710000
         MVC   6(2,R1),&RETPD      MOVE IN FIELD                   05720000
         ST    R1,0(R2)            STORE TEXT UNIT ADDR IN TUP LIST 05730000
         LA    R1,8(R1)            BUMP UP TEXT UNIT BASE          05740000
         LA    R2,4(R2)            BUMP UP TEXT UNIT POINTER BASE  05750000
.CHKDUMM ANOP                                                      05760000
         AIF   ('&DUMMY' EQ '').CHKBKSZ                            05770000
&PRMCNT  SETA  &PRMCNT+1                                           05780000
         XC    0(6,R1),0(R1)       CLEAR OUT TEXT UNIT             05790000
         MVI   1(R1),X'24'         SET TEXT UNIT KEY               05800000
         MVI   3(R1),0             SET TEXT UNIT COUNT             05810000
         ST    R1,0(R2)            STORE TEXT UNIT ADDR IN TUP LIST 05820000
         LA    R1,4(R1)            BUMP UP TEXT UNIT BASE          05830000
         LA    R2,4(R2)            BUMP UP TEXT UNIT POINTER BASE  05840000
.CHKBKSZ ANOP                                                      05850000
         AIF   ('&BLKSIZE' EQ '').CHKDEN                           05860000
&PRMCNT  SETA  &PRMCNT+1                                           05870000
         XC    0(6,R1),0(R1)       CLEAR OUT TEXT UNIT             05880000
         MVI   1(R1),X'30'         SET TEXT UNIT KEY               05890000
         MVI   3(R1),1             SET TEXT UNIT COUNT             05900000
         MVI   5(R1),2             SET LENGTH                      05910000
         MVC   6(2,R1),&BLKSIZE    MOVE IN FIELD                   05920000
         ST    R1,0(R2)            STORE TEXT UNIT ADDR IN TUP LIST 05930000
         LA    R1,8(R1)            BUMP UP TEXT UNIT BASE          05940000
```

JDCALLOM 1-10-97 10:16a

```
         LA    R2,4(R2)            BUMP UP TEXT UNIT POINTER BASE  05950000
.CHKDEN  ANOP                                                      05960000
         AIF   ('&DEN' EQ '').CHKDSOR                              05970000
&PRMCNT  SETA  &PRMCNT+1                                           05980000
         XC    0(8,R1),0(R1)       CLEAR OUT TEXT UNIT             05990000
         MVI   1(R1),X'3B'         SET TEXT UNIT KEY               06000000
         MVI   3(R1),1             SET TEXT UNIT COUNT             06010000
         MVI   5(R1),1             SET LENGTH                      06020000
         AIF   ('&DEN' EQ '0').DEN0                                06030000
         AIF   ('&DEN' EQ '1').DEN1                                06040000
         AIF   ('&DEN' EQ '2').DEN2                                06050000
         AIF   ('&DEN' EQ '3').DEN3                                06060000
         AIF   ('&DEN' EQ '4').DEN4                                06070000
         AGO   .ERROR7                                             06080000
.DEN0    ANOP                                                      06090000
         MVI   6(R1),X'03'                                         06100000
         AGO   .ENDDEN                                             06110000
.DEN1    ANOP                                                      06120000
         MVI   6(R1),X'43'                                         06130000
         AGO   .ENDDEN                                             06140000
.DEN2    ANOP                                                      06150000
         MVI   6(R1),X'83'                                         06160000
         AGO   .ENDDEN                                             06170000
.DEN3    ANOP                                                      06180000
         MVI   6(R1),X'C3'                                         06190000
         AGO   .ENDDEN                                             06200000
.DEN4    ANOP                                                      06210000
         MVI   6(R1),X'D3'                                         06220000
.ENDDEN  ANOP                                                      06230000
         ST    R1,0(R2)            STORE TEXT UNIT ADDR IN TUP LIST 06240000
         LA    R1,8(R1)            BUMP UP TEXT UNIT BASE          06250000
         LA    R2,4(R2)            BUMP UP TEXT UNIT POINTER BASE  06260000
.CHKDSOR ANOP                                                      06270000
         AIF   ('&DSORG' EQ '').CHKEYLN                            06280000
&PRMCNT  SETA  &PRMCNT+1                                           06290000
         XC    0(8,R1),0(R1)       CLEAR OUT TEXT UNIT             06300000
         MVI   1(R1),X'3C'         SET TEXT UNIT KEY               06310000
         MVI   3(R1),1             SET TEXT UNIT COUNT             06320000
         MVI   5(R1),2             SET LENGTH                      06330000
         AIF   ('&DSORG' EQ 'PS').DSORG1                           06340000
         AIF   ('&DSORG' EQ 'PO').DSORG2                           06350000
         AIF   ('&DSORG' EQ 'DA').DSORG3                           06360000
         AGO   .ERROR8                                             06370000
.DSORG1  ANOP                                                      06380000
         MVI   6(R1),X'40'                                         06390000
         AGO   .ENDSORG                                            06400000
.DSORG2  ANOP                                                      06410000
         MVI   6(R1),2                                             06420000
         AGO   .ENDSORG                                            06430000
.DSORG3  ANOP                                                      06440000
         MVI   6(R1),X'20'                                         06450000
.ENDSORG ANOP                                                      06460000
         ST    R1,0(R2)            STORE TEXT UNIT ADDR IN TUP LIST 06470000
         LA    R1,8(R1)            BUMP UP TEXT UNIT BASE          06480000
         LA    R2,4(R2)            BUMP UP TEXT UNIT POINTER BASE  06490000
.CHKEYLN ANOP                                                      06500000
         AIF   ('&KEYLEN' EQ '').CHKDCBR                           06510000
&PRMCNT  SETA  &PRMCNT+1                                           06520000
         XC    0(8,R1),0(R1)       CLEAR OUT TEXT UNIT             06530000
         MVI   1(R1),X'40'         SET TEXT UNIT KEY               06540000
         MVI   3(R1),1             SET TEXT UNIT COUNT             06550000
         MVI   5(R1),1             SET LENGTH                      06560000
         MVI   6(R1),&KEYLEN       MOVE IN FIELD                   06570000
         ST    R1,0(R2)            STORE TEXT UNIT ADDR IN TUP LIST 06580000
         LA    R1,8(R1)            BUMP UP TEXT UNIT BASE          06590000
         LA    R2,4(R2)            BUMP UP TEXT UNIT POINTER BASE  06600000
```

Page 5

ATTY. DOCKET No.: CRKR-0009 PATENT

```
.CHKDCBR ANOP
         AIF   ('&DCBREF' EQ '').CHKLIMC
&PRMCNT  SETA  &PRMCNT+1
         XC    0(6,R1),0(R1)        CLEAR OUT TEXT UNIT
         MVI   1(R1),X'2C'          SET TEXT UNIT KEY
         MVI   3(R1),1              SET TEXT UNIT COUNT
         MVI   5(R1),44             SET LENGTH
         MVC   6(44,R1),&DCBREF     MOVE IN FIELD
         ST    R1,0(R2)             STORE TEXT UNIT ADDR IN TUP LIST
         LA    R1,50(R1)            BUMP UP TEXT UNIT BASE
         LA    R2,4(R2)             BUMP UP TEXT UNIT POINTER BASE
.CHKLIMC ANOP
         AIF   ('&LIMCT' EQ '').CHKRECL
&PRMCNT  SETA  &PRMCNT+1
         XC    0(8,R1),0(R1)        CLEAR OUT TEXT UNIT
         MVI   1(R1),X'41'          SET TEXT UNIT KEY
         MVI   3(R1),1              SET TEXT UNIT COUNT
         MVI   5(R1),3              SET LENGTH
         MVI   8(R1),AL1(&LIMCT)    MOVE IN FIELD
         ST    R1,0(R2)             STORE TEXT UNIT ADDR IN TUP LIST
         LA    R1,10(R1)            BUMP UP TEXT UNIT BASE
         LA    R2,4(R2)             BUMP UP TEXT UNIT POINTER BASE
.CHKRECL ANOP
         AIF   ('&LRECL' EQ '').CHKOPTC
&PRMCNT  SETA  &PRMCNT+1
         XC    0(8,R1),0(R1)        CLEAR OUT TEXT UNIT
         MVI   1(R1),X'42'          SET TEXT UNIT KEY
         MVI   3(R1),1              SET TEXT UNIT COUNT
         MVI   5(R1),2              SET LENGTH
         MVC   6(2,R1),&LRECL       MOVE IN FIELD
         ST    R1,0(R2)             STORE TEXT UNIT ADDR IN TUP LIST
         LA    R1,8(R1)             BUMP UP TEXT UNIT BASE
         LA    R2,4(R2)             BUMP UP TEXT UNIT POINTER BASE
.CHKOPTC ANOP
         AIF   ('&OPTCD' EQ '').CHKRCFM
&PRMCNT  SETA  &PRMCNT+1
         XC    0(8,R1),0(R1)        CLEAR OUT TEXT UNIT
         MVI   1(R1),X'45'          SET TEXT UNIT KEY
         MVI   3(R1),1              SET TEXT UNIT COUNT
         MVI   5(R1),2              SET LENGTH
         AIF   ('&OPTCD' EQ 'E').OPTCD1
         AIF   ('&OPTCD' EQ 'R').OPTCD2
         AGO   .ERROR9
.OPTCD1  ANOP
         MVI   6(R1),X'20'
         AGO   .ENDOPTC
.OPTCD2  ANOP
         MVI   6(R1),X'01'
.ENDOPTC ANOP
         ST    R1,0(R2)             STORE TEXT UNIT ADDR IN TUP LIST
         LA    R1,8(R1)             BUMP UP TEXT UNIT BASE
         LA    R2,4(R2)             BUMP UP TEXT UNIT POINTER BASE
.CHKRCFM ANOP
         AIF   ('&RECFM' EQ '').CHKOVSY
&PRMCNT  SETA  &PRMCNT+1
         XC    0(8,R1),0(R1)        CLEAR OUT TEXT UNIT
         MVI   1(R1),X'49'          SET TEXT UNIT KEY
         MVI   3(R1),1              SET TEXT UNIT COUNT
         MVI   5(R1),1              SET LENGTH
         AIF   ('&RECFM' EQ 'F').RECFM1
         AIF   ('&RECFM' EQ 'FA').RECFM2
         AIF   ('&RECFM' EQ 'FM').RECFM3
         AIF   ('&RECFM' EQ 'FB').RECFM4
         AIF   ('&RECFM' EQ 'FBA').RECFM5
         AIF   ('&RECFM' EQ 'FBM').RECFM6
         AIF   ('&RECFM' EQ 'V').RECFM7
         AIF   ('&RECFM' EQ 'VA').RECFM8
         AIF   ('&RECFM' EQ 'VM').RECFM9
         AIF   ('&RECFM' EQ 'VB').RECFM10
         AIF   ('&RECFM' EQ 'VBA').RECFM11
         AIF   ('&RECFM' EQ 'VBM').RECFM12
         AGO   .ERROR10
.RECFM1  ANOP
         MVI   6(R1),X'80'
         AGO   .ENDRCFM
.RECFM2  ANOP
         MVI   6(R1),X'84'
         AGO   .ENDRCFM
.RECFM3  ANOP
         MVI   6(R1),X'82'
         AGO   .ENDRCFM
.RECFM4  ANOP
         MVI   6(R1),X'90'
         AGO   .ENDRCFM
.RECFM5  ANOP
         MVI   6(R1),X'94'
         AGO   .ENDRCFM
.RECFM6  ANOP
         MVI   6(R1),X'92'
         AGO   .ENDRCFM
.RECFM7  ANOP
         MVI   6(R1),X'40'
         AGO   .ENDRCFM
.RECFM8  ANOP
         MVI   6(R1),X'44'
         AGO   .ENDRCFM
.RECFM9  ANOP
         MVI   6(R1),X'42'
         AGO   .ENDRCFM
.RECFM10 ANOP
         MVI   6(R1),X'50'
         AGO   .ENDRCFM
.RECFM11 ANOP
         MVI   6(R1),X'54'
         AGO   .ENDRCFM
.RECFM12 ANOP
         MVI   6(R1),X'52'
.ENDRCFM ANOP
         ST    R1,0(R2)             STORE TEXT UNIT ADDR IN TUP LIST
         LA    R1,8(R1)             BUMP UP TEXT UNIT BASE
         LA    R2,4(R2)             BUMP UP TEXT UNIT POINTER BASE
.CHKPSWD ANOP
         AIF   ('&PASSWRD' EQ '').CHKOVSY
&PRMCNT  SETA  &PRMCNT+1
         CLC   SPACES(8),&LASTPSWD  ANYTHING THERE ?
         BE    *+40                 NO...SO SKIP TEXT UNIT SET UP
         XC    0(6,R1),0(R1)        CLEAR OUT TEXT UNIT
         MVI   1(R1),X'50'          SET TEXT UNIT KEY
         MVI   3(R1),1              SET TEXT UNIT COUNT
         MVI   5(R1),8              SET LENGTH
         MVC   6(8,R1),&LASTPSWD    MOVE IN FIELD
         ST    R1,0(R2)             STORE TEXT UNIT ADDR IN TUP LIST
         LA    R1,14(R1)            BUMP UP TEXT UNIT BASE
         LA    R2,4(R2)             BUMP UP TEXT UNIT POINTER BASE
.CHKOVSY ANOP
         AIF   ('&OVSYSOT' EQ '').CHKRDDN
         AIF   ('&FUNC' NE 'UNALL').ERROR11
&PRMCNT  SETA  &PRMCNT+1
         XC    0(8,R1),0(R1)        CLEAR OUT TEXT UNIT
         MVI   1(R1),X'18'          SET TEXT UNIT KEY
         MVI   3(R1),1              SET TEXT UNIT COUNT
         MVI   5(R1),1              SET LENGTH
```

ATTY. DOCKET No.: CRKR-0009

PATENT

```
         MVC   6(1,R1),&OVSYSOT        SET PARM                          07930000
         ST    R1,0(R2)                STORE TEXT UNIT ADDR IN TUP LIST  07940000
         LA    R1,8(R1)                BUMP UP TEXT UNIT BASE            07950000
         LA    R2,4(R2)                BUMP UP TEXT UNIT POINTER BASE    07960000
.CHKRDDN ANOP                                                            07970000
         AIF   ('&RETDDN' EQ '').CHKRDSN                                 07980000
         AIF   ('&FUNC' EQ 'INFO').RTDDNO                                07990000
         AIF   ('&FUNC' EQ 'ALLOC').RTDDN1                               08000000
         AGO   .ERROR13                                                  08010000
.RTDDNO  ANOP                                                            08020000
         AIF   ('&RETDSN' NE '').ERROR13                                 08030000
&PRMCNT  SETA  &PRMCNT+1                                                 08040000
         ST    R1,4(R2)                SAVE TEXT UNIT ADDR IN TUP LIST   08050000
         LA    R1,&RETDDN              POINT TO USERS AREA               08060000
         XC    0(6,R1),0(R1)           CLEAR OUT TEXT UNIT               08070000
         MVI   1(R1),4                 SET TEXT UNIT KEY                 08080000
         MVI   3(R1),1                 SET TEXT UNIT COUNT               08090000
         MVI   5(R1),8                 SET LENGTH                        08100000
         ST    R1,0(R2)                STORE USERS AREA ADDR IN TUP LIST 08110000
         L     R1,4(R2)                RESTORE WORKAREA POINTER          08120000
         LA    R2,4(R2)                BUMP UP TEXT UNIT POINTER BASE    08130000
         AGO   .CHKRDSN                                                  08140000
.RTDDN1  ANOP                                                            08150000
         AIF   ('&DDNAME' NE '').ERROR13                                 08160000
&PRMCNT  SETA  &PRMCNT+1                                                 08170000
         ST    R1,4(R2)                SAVE TEXT UNIT ADDR IN TUP LIST   08180000
         LA    R1,&RETDDN              POINT TO USERS AREA               08190000
         XC    0(6,R1),0(R1)           CLEAR OUT TEXT UNIT               08200000
         MVI   1(R1),X'55'             SET TEXT UNIT KEY                 08210000
         MVI   3(R1),1                 SET TEXT UNIT COUNT               08220000
         MVI   5(R1),8                 SET LENGTH                        08230000
         ST    R1,0(R2)                STORE USERS AREA ADDR IN TUP LIST 08240000
         L     R1,4(R2)                RESTORE WORKAREA POINTER          08250000
         LA    R2,4(R2)                BUMP UP TEXT UNIT POINTER BASE    08260000
.CHKRDSN ANOP                                                            08270000
         AIF   ('&RETDSN' EQ '').CHKRMBR                                 08280000
         AIF   ('&FUNC' EQ 'INFO').RTDSNO                                08290000
         AIF   ('&FUNC' EQ 'ALLOC').RTDSN1                               08300000
         AGO   .ERROR14                                                  08310000
.RTDSNO  ANOP                                                            08320000
         AIF   ('&RETDDN' NE '').ERROR14                                 08330000
&PRMCNT  SETA  &PRMCNT+1                                                 08340000
         ST    R1,4(R2)                SAVE TEXT UNIT ADDR IN TUP LIST   08350000
         LA    R1,&RETDSN              POINT TO USERS AREA               08360000
         XC    0(6,R1),0(R1)           CLEAR OUT TEXT UNIT               08370000
         MVI   1(R1),5                 SET TEXT UNIT KEY                 08380000
         MVI   3(R1),1                 SET TEXT UNIT COUNT               08390000
         MVI   5(R1),44                SET LENGTH                        08400000
         ST    R1,0(R2)                STORE USERS AREA ADDR IN TUP LIST 08410000
         L     R1,4(R2)                RESTORE WORKAREA POINTER          08420000
         LA    R2,4(R2)                BUMP UP TEXT UNIT POINTER BASE    08430000
         AGO   .CHKRMBR                                                  08440000
.RTDSN1  ANOP                                                            08450000
         AIF   ('&DSN' NE '').ERROR14                                    08460000
&PRMCNT  SETA  &PRMCNT+1                                                 08470000
         ST    R1,4(R2)                SAVE TEXT UNIT ADDR IN TUP LIST   08480000
         LA    R1,&RETDSN              POINT TO USERS AREA               08490000
         XC    0(6,R1),0(R1)           CLEAR OUT TEXT UNIT               08500000
         MVI   1(R1),X'56'             SET TEXT UNIT KEY                 08510000
         MVI   3(R1),1                 SET TEXT UNIT COUNT               08520000
         MVI   5(R1),44                SET LENGTH                        08530000
         ST    R1,0(R2)                STORE USERS AREA ADDR IN TUP LIST 08540000
         L     R1,4(R2)                RESTORE WORKAREA POINTER          08550000
         LA    R2,4(R2)                BUMP UP TEXT UNIT POINTER BASE    08560000
.CHKRMBR ANOP                                                            08570000
         AIF   ('&RETMBR' EQ '').CHKRSTA                                 08580000
```

JDCALLOM 1-10-97 10:16a

```
         AIF   ('&FUNC' NE 'INFO').ERROR15                               08590000
&PRMCNT  SETA  &PRMCNT+1                                                 08600000
         ST    R1,4(R2)                SAVE TEXT UNIT ADDR IN TUP LIST   08610000
         LA    R1,&RETMBR              POINT TO USERS AREA               08620000
         XC    0(6,R1),0(R1)           CLEAR OUT TEXT UNIT               08630000
         MVI   1(R1),6                 SET TEXT UNIT KEY                 08640000
         MVI   3(R1),1                 SET TEXT UNIT COUNT               08650000
         MVI   5(R1),8                 SET LENGTH                        08660000
         ST    R1,0(R2)                STORE USERS AREA ADDR IN TUP LIST 08670000
         L     R1,4(R2)                RESTORE WORKAREA POINTER          08680000
         LA    R2,4(R2)                BUMP UP TEXT UNIT POINTER BASE    08690000
.CHKRSTA ANOP                                                            08700000
         AIF   ('&RETSTAT' EQ '').CHKRNDP                                08710000
         AIF   ('&FUNC' NE 'INFO').ERROR16                               08720000
&PRMCNT  SETA  &PRMCNT+1                                                 08730000
         ST    R1,4(R2)                SAVE TEXT UNIT ADDR IN TUP LIST   08740000
         LA    R1,&RETSTAT             POINT TO USERS AREA               08750000
         XC    0(6,R1),0(R1)           CLEAR OUT TEXT UNIT               08760000
         MVI   1(R1),7                 SET TEXT UNIT KEY                 08770000
         MVI   3(R1),1                 SET TEXT UNIT COUNT               08780000
         MVI   5(R1),1                 SET LENGTH                        08790000
         ST    R1,0(R2)                STORE USERS AREA ADDR IN TUP LIST 08800000
         L     R1,4(R2)                RESTORE WORKAREA POINTER          08810000
         LA    R2,4(R2)                BUMP UP TEXT UNIT POINTER BASE    08820000
.CHKRNDP ANOP                                                            08830000
         AIF   ('&RETNDSP' EQ '').CHKRCDP                                08840000
         AIF   ('&FUNC' NE 'INFO').ERROR17                               08850000
&PRMCNT  SETA  &PRMCNT+1                                                 08860000
         ST    R1,4(R2)                SAVE TEXT UNIT ADDR IN TUP LIST   08870000
         LA    R1,&RETNDSP             POINT TO USERS AREA               08880000
         XC    0(6,R1),0(R1)           CLEAR OUT TEXT UNIT               08890000
         MVI   1(R1),8                 SET TEXT UNIT KEY                 08900000
         MVI   3(R1),1                 SET TEXT UNIT COUNT               08910000
         MVI   5(R1),1                 SET LENGTH                        08920000
         ST    R1,0(R2)                STORE USERS AREA ADDR IN TUP LIST 08930000
         L     R1,4(R2)                RESTORE WORKAREA POINTER          08940000
         LA    R2,4(R2)                BUMP UP TEXT UNIT POINTER BASE    08950000
.CHKRCDP ANOP                                                            08960000
         AIF   ('&RETCDSP' EQ '').CHKRORG                                08970000
         AIF   ('&FUNC' NE 'INFO').ERROR18                               08980000
&PRMCNT  SETA  &PRMCNT+1                                                 08990000
         ST    R1,4(R2)                SAVE TEXT UNIT ADDR IN TUP LIST   09000000
         LA    R1,&RETCDSP             POINT TO USERS AREA               09010000
         XC    0(6,R1),0(R1)           CLEAR OUT TEXT UNIT               09020000
         MVI   1(R1),9                 SET TEXT UNIT KEY                 09030000
         MVI   3(R1),1                 SET TEXT UNIT COUNT               09040000
         MVI   5(R1),1                 SET LENGTH                        09050000
         ST    R1,0(R2)                STORE USERS AREA ADDR IN TUP LIST 09060000
         L     R1,4(R2)                RESTORE WORKAREA POINTER          09070000
         LA    R2,4(R2)                BUMP UP TEXT UNIT POINTER BASE    09080000
.CHKRORG ANOP                                                            09090000
         AIF   ('&RETDSOR' EQ '').CHKRVSR                                09100000
         AIF   ('&FUNC' EQ 'INFO').RTORGO                                09110000
         AIF   ('&FUNC' EQ 'ALLOC').RTORGO                               09120000
         AGO   .ERROR19                                                  09130000
.RTORGO  ANOP                                                            09140000
&PRMCNT  SETA  &PRMCNT+1                                                 09150000
         ST    R1,4(R2)                SAVE TEXT UNIT ADDR IN TUP LIST   09160000
         LA    R1,&RETDSOR             POINT TO USERS AREA               09170000
         XC    0(6,R1),0(R1)           CLEAR OUT TEXT UNIT               09180000
         AIF   ('&FUNC' EQ 'ALLOC').RTORG1                               09190000
         MVI   1(R1),10                SET TEXT UNIT KEY                 09200000
         AGO   .RTORG2                                                   09210000
.RTORG1  ANOP                                                            09220000
         MVI   1(R1),X'57'             SET TEXT UNIT KEY                 09230000
.RTORG2  ANOP                                                            09240000
```

Page 7

ATTY. DOCKET No.: CRKR-0009 PATENT

```
         MVI   3(R1),1                SET TEXT UNIT COUNT
         MVI   5(R1),2                SET LENGTH
         ST    R1,0(R2)               STORE USERS AREA ADDR IN TUP LIST
         L     R1,4(R2)               RESTORE WORKAREA POINTER
         LA    R2,4(R2)               BUMP UP TEXT UNIT POINTER BASE
.CHKRVSR ANOP
         AIF   ('&RETVSER' EQ '').SETPSVC
         AIF   ('&FUNC' NE 'ALLOC').ERROR20
&PRMCNT  SETA  &PRMCNT+1
         ST    R1,4(R2)               SAVE TEXT UNIT ADDR IN TUP LIST
         LA    R1,&RETVSER            POINT TO USERS AREA
         XC    0(6,R1),0(R1)          CLEAR OUT TEXT UNIT
         MVI   1(R1),X'5D'            SET TEXT UNIT KEY
         MVI   3(R1),1                SET TEXT UNIT COUNT
         MVI   5(R1),6                SET LENGTH
         ST    R1,0(R2)               STORE USERS AREA ADDR IN TUP LIST
         L     R1,4(R2)               RESTORE WORKAREA POINTER
         LA    R2,4(R2)               BUMP UP TEXT UNIT POINTER BASE
.SETPSVC ANOP
         AIF   (&PRMCNT EQ 0).ERROR12
         LR    R1,R2                  LOAD ADDR OF NEXT TU POINTER
         BCTR  R1,R0                  SUB ONE
         BCTR  R1,R0                  AND ANOTHER
         BCTR  R1,R0                  AND ANOTHER
         BCTR  R1,R0                  AND ANOTHER
         MVI   0(R1),128              TURN ON H/O BIT IN LAST TUP
         LA    R1,&WORK               POINT TO ADDR OF REQ BLK
         SVC   99                     ISSUE DYNAMIC ALLOCATION SVC
         AIF   ('&ERROR' EQ '').ENDALC
         LA    R1,&WORK               POINT TO ADDR OF REQ BLK
         LA    R1,8(R1)               POINT TO RETURN CODES
         MVC   &ERROR.(4),0(R1)       MOVE RETURN CODES TO USERS AREA
.ENDALC  ANOP
         LTR   R15,R15                ALL OK ?
         AGO   .ALCEXIT
.ERROR1  ANOP
         MNOTE 12,'INVALID FUNCTION PARAMETER'
         AGO   .ALCEXIT
.ERROR2  ANOP
         MNOTE 12,'INVALID STATUS PARAMETER'
         AGO   .ALCEXIT
.ERROR3  ANOP
         MNOTE 12,'INVALID NORMAL DISPOSITION PARAMETER'
         AGO   .ALCEXIT
.ERROR4  ANOP
         MNOTE 12,'INVALID CONDITIONAL DISPOSITION PARAMETER'
         AGO   .ALCEXIT
.ERROR5  ANOP
         MNOTE 12,'INVALID SPACE PARAMETER'
         AGO   .ALCEXIT
.ERROR6  ANOP
         MNOTE 12,'SYSOUT AND DISP ARE MUTUALLY EXCLUSIVE'
         AGO   .ALCEXIT
.ERROR7  ANOP
         MNOTE 12,'INVALID DEN PARAMETER'
         AGO   .ALCEXIT
.ERROR8  ANOP
         MNOTE 12,'INVALID DSORG PARAMETER'
         AGO   .ALCEXIT
.ERROR9  ANOP
         MNOTE 12,'INVALID OPTCD PARAMETER'
         AGO   .ALCEXIT
.ERROR10 ANOP
         MNOTE 12,'INVALID RECFM PARAMETER'
         AGO   .ALCEXIT
.ERROR11 ANOP
```

```
         MNOTE 12,'INVALID OVERRIDE SYSOUT'
         AGO   .ALCEXIT
.ERROR12 ANOP
         MNOTE 12,'INVALID PARAMETER LIST'
         AGO   .ALCEXIT
.ERROR13 ANOP
         MNOTE 12,'INVALID RETURN DDNAME SPECIFICATION'
         AGO   .ALCEXIT
.ERROR14 ANOP
         MNOTE 12,'INVALID RETURN DSN SPECIFICATION'
         AGO   .ALCEXIT
.ERROR15 ANOP
         MNOTE 12,'INVALID RETURN MEMBER SPECIFICATION'
         AGO   .ALCEXIT
.ERROR16 ANOP
         MNOTE 12,'INVALID RETURN STATUS SPECIFICATION'
         AGO   .ALCEXIT
.ERROR17 ANOP
         MNOTE 12,'INVALID RETURN NORMAL DISPOSITION SPECIFICATION'
         AGO   .ALCEXIT
.ERROR18 ANOP
         MNOTE 12,'INVALID RETURN COND DISPOSITION SPECIFICATION'
         AGO   .ALCEXIT
.ERROR19 ANOP
         MNOTE 12,'INVALID RETURN DSORG SPECIFICATION'
         AGO   .ALCEXIT
.ERROR20 ANOP
         MNOTE 12,'INVALID RETURN VOLSER SPECIFICATION'
         AGO   .ALCEXIT
.ERROR99 ANOP
         MNOTE 12,'NO WORK AREA SPECIFIED - UNABLE TO PROCEED'
.ALCEXIT ANOP
         POP   PRINT
         MEND
```

ATTY. DOCKET NO.: CRKR-0009 PATENT

```
         MACRO                                               00010000
&NAME    JDCAM24M                                            00020000
         LA    14,*+6            POINT TO TARGET INSTRUCTION 00030000
         BSM   0,14              SET 24 BIT MODE             00040000
         MEND                                                00050000
```

JDCAM24M 1-10-97 10:16a

Page 1

ATTY. DOCKET NO.: CRKR-0009 PATENT

```
         MACRO
&NAME    JDCAM31M
         L     14,Z&SYSNDX-4        POINT TO TARGET INSTRUCTION
         BSM   0,14                 SET 31 BIT MODE
         DC    A(*+4+X'80000000')
Z&SYSNDX DS    0H
         MEND
```

JDCAM31M 1-10-97 10:16a

Page 1

ATTY. DOCKET NO.: CRKR-0009 PATENT

Page 1

```
         MACRO
&LABEL   JDCSETAM
&LABEL   SAC   512                    SET ACCESS REGISTER MODE
*        SYSSTATE ASCENV=AR           SET MACRO GENERATION GLOBAL
         SYSSTATE ASCENV=AR           SET MACRO GENERATION GLOBAL
         MEND
```

JDCSETAM 1-10-97 10:16a

```
         MACRO                                                  00010000
&LABEL   JDCSETPM                                               00020000
&LABEL   SAC   0                    SET PRIMARY MODE            00030000
*        SYSSTATE ASCENV=P          SET MACRO GENERATION GLOBAL 00040000
         SYSSTATE ASCENV=P          SET MACRO GENERATION GLOBAL 00050000
         MEND                                                   00060000
```

09/020,497

ATTY. DOCKET NO.: CRKR-0009 PATENT

```
         MACRO
&LABEL   JDCSUBM &RTN,&REG,&BRG
.* *********************************************************************
.* COPYRIGHT 1995 J.D. CARREKER AND ASSOCIATES INCORPORATED
.* *********************************************************************
         GBLA  &RCNT,&CALLCNT
         GBLC  &TBL(999)
         LCLA  &WORK
         LCLC  &GPR,&BASE
&GPR     SETC  '&REG'
&BASE    SETC  '&BRG'
         AIF   (K'&LABEL GT 8).INVLBL
         AIF   (K'&RTN GT 8).INVRTN
         AIF   ('&REG' NE '').ITSET
&GPR     SETC  'R9'
.ITSET   ANOP
         AIF   ('&BRG' NE '').ITSET1
&BASE    SETC  'R10'
.ITSET1  ANOP
&CALLCNT SETA  &CALLCNT+1
&WORK    SETA  1
.LOOP    ANOP
         AIF   (&WORK GT 995).NEWLBL
         AIF   ('&RTN' EQ '&TBL(&WORK)').GOTIT
&WORK    SETA  &WORK+2
         AGO   .LOOP
.NEWLBL  ANOP
&RCNT    SETA  &RCNT+1
&TBL(&RCNT) SETC '&RTN'
&WORK    SETA  &RCNT
&RCNT    SETA  &RCNT+1
.GOTIT   ANOP
         AIF   (&CALLCNT EQ 1).FIRSTIM
         PUSH  PRINT
         PRINT OFF
         AGO   .GENCODE
.FIRSTIM ANOP
***********************************************************************
*
* THE CALLSUB MACRO, WORKING IN CONJUNCTION WITH THE SUBRTN AND SUBSAVE
* MACROS, PROVIDES A MEANS OF WRITING LARGE STRUCTURED PROGRAMS WITHOUT
* CONCERN FOR CODE BASE REGISTERS OR SUBROUTINE LINKAGE REGISTERS.
*
* THE FORMAT OF THE CALLSUB MACRO IS AS FOLLOWS;
*
*        CALLSUB ROUTINE,LINKAGE_REG,CODE_BASE_REG
*
*        WHERE;
*              ROUTINE IS THE LABEL AT THE START OF THE SUBROUTINE
*              (THIS OPERAND IS REQUIRED);
*
*              LINKAGE_REG IS THE REGISTER TO BE USED IN THE BRANCH
*              AND LINK INSTRUCTION AND MUST BE THE SAME AS THE
*              REGISTER SPECIFIED (OR DEFAULTED TO) IN THE CORRESPONDING
*              SUBRTN MACRO. THE DEFAULT LINKAGE_REG IS R9;
*
*              CODE_BASE_REG IS THE CODE BASE REGISTER CURRENTLY IN USE
*              AND TO BE USED AS A BASE REGISTER IN THE SUBROUTINE. IT
*              MUST BE THE SAME AS THE CODE BASE REGISTER SPECIFIED (OR
*              DEFAULTED TO) IN THE CORRESPONDING SUBRTN MACRO. THE
*              DEFAULT CODE_BASE_REG IS R10.
*
* WHEN USING THESE MACROS, BRANCHING BETWEEN SUBROUTINES IS NOT
* PERMITTED, AS NO VALID BASE REGISTER WILL EXIST.
*
* SUBROUTINES MAY RETURN TO THE CALLING ROUTINE AT EITHER +0, +4 OR +8
* AFTER THE GENERATED BRANCH AND LINK INSTRUCTION, THUS PROVIDING A
* SIMPLE MEANS OF ERROR EXITING FROM SUBROUTINES.
*
* IF A BRANCH TABLE IS NOT CODED AFTER THE SUBRTN MACRO, AND THE
* SUBROUTINE RETURNS AT EITHER +4 OR +8, UNPREDICTABLE RESULTS WILL
* OCCUR.
*
* SEE THE DESCRIPTION OF SUBRTN IN THE FIRST SUBRTN MACRO EXPANSION.
*
***********************************************************************
.GENCODE ANOP
&LABEL   ST    &BASE,SUBSV&WORK     SAVE CURRENT BASE REG
         L     &BASE,=A(&RTN)       GET ROUTINE ADDRESS
         BALR  &GPR,&BASE           GO TO IT
         AIF   (&CALLCNT EQ 1).FIRSTM2
         POP   PRINT
.FIRSTM2 ANOP
         MEXIT
.INVLBL  ANOP
         MNOTE 12,'LABEL TOO LONG'
         MEXIT
.INVRTN  ANOP
         MNOTE 12,'SUBROUTINE LABEL TOO LONG'
         MEND
```

JDCSUBM 1-10-97 10:16a

Page 1

What is claimed is:

1. A subsystem, employed within an electronic check presentment (ECP) system and executable on a computer system having volatile and nonvolatile memory and a processor coupled thereto, that establishes and maintains at least a partial copy of a datastore for processing items within said ECP system, said subsystem comprising:

a data space anchor module, executable in said processor, that causes said processor to allocate a portion of said volatile memory to contain said at least said partial copy of said datastore; and a data space access module, associated with said data space anchor module and executable in said processor, that (a) causes said processor to use at least a portion of said nonvolatile memory to contain said datastore, (b) serves as a central point for applying transactions received from ECP application programs to said at least said partial copy of said datastore and modifying items in said datastore as a function of said transactions, (c) checkpoints said at least said partial copy of said datastore and (d) maintains a control file and a log within said datastore as a function of said transactions.

2. The subsystem as set forth in claim 1 wherein said log tracks transactions performed on said at least said partial copy of said datastore.

3. The subsystem as set forth in claim 2 wherein said data space access module causes said processor to log ones of said transactions in said log while applying said received transactions to said at least said partial copy of said datastore.

4. The subsystem as recited in claim 1 wherein said transactions relate to a reconciliation of ones of said items.

5. The subsystem as recited in claim 1 wherein said at least partial copy is sequentially accessible, said data space anchor module creating a linked list of items within said data space.

6. The subsystem as recited in claim 1 wherein said items are selected from the group consisting of checks and deposits.

7. The subsystem as recited in claim 1 wherein said data space access module locks portions of said at least said partial copy as a function of targets of said transactions.

8. The subsystem as recited in claim 1 wherein said data space anchor module can reconstruct said at least said partial copy from said datastore.

9. The subsystem as recited in claim 1 wherein one of said application programs performs item-level reconciliation with respect to said items in said at least said partial copy.

10. The subsystem as recited in claim 1 wherein said at least partial copy includes a statistics area containing data pertaining to parameters of said at least said partial copy.

11. A method of operation, employed within an electronic check presentment (ECP) system and executable on a computer system having volatile and nonvolatile memory and a processor coupled thereto, for establishing and maintaining at least a partial copy of a datastore for processing items within said ECP system, said method comprising the steps of:

causing said processor to allocate at least a portion of said volatile memory to contain said at least said partial copy of said datastore and to use at least a portion of said nonvolatile memory to maintain said datastore;

creating a log to track transactions performed on said at least partial copy of said datastore, said log associated with said datastore;

applying transactions received from ECP application programs to said at least said partial copy of said datastore and modifying items in said datastore as a function of said transactions;

checkpointing said at least said partial copy of said datastore; and maintaining a control file as a function of said transactions, associated with said datastore.

12. The method as set forth in claim 11 wherein said data space access module causes said processor to log ones of said transactions in said log while applying said received transactions to said at least said partial copy of said datastore.

13. The method as recited in claim 11 wherein said transactions relate to a reconciliation of ones of said items.

14. The method as recited in claim 11 wherein said method of operation further comprises the step of sequentially accessing said at least said partial copy of said datastore.

15. The method as recited in claim 11 wherein said items are selected from the group consisting of checks and deposits.

16. The method as recited in claim 11 further comprising the step of locking portions of said at least said partial copy of said datastore as a function of targets of said transactions.

17. The method as recited in claim 11 further comprising the step of reconstructing said at least said partial copy of said datastore from said datastore and said log.

18. The method as recited in claim 11 wherein one of said application programs performs item-level reconciliation with respect to said items in said at least said partial copy of said datastore.

19. The method as recited in claim 11 wherein said datastore includes a statistics area containing data pertaining to parameters of said at least said partial copy of said datastore.

20. An electronic check presentment (ECP) system, comprising:

a computer system having volatile and nonvolatile memory and a processor coupled thereto;

an operating system, executable in said processor, that controls operation of said computer system; and a subsystem that establishes and maintains at least a partial copy of a datastore for processing items within said ECP system, including:

a data space anchor module, executable in said processor, that causes said processor to allocate a portion of said volatile memory to contain said at least said partial copy of said datastore; and a data space access module, associated with said data space anchor module and executable in said processor, that (a) causes said processor to use at least a portion of said nonvolatile memory to contain said datastore, (b) serves as a central point for applying transactions received from ECP application programs to said at least said partial copy of said datastore and modifying items in said datastore as a function of said transactions, (c) checkpoints said at least said partial copy of said datastore and (d) maintains a control file and a log file as a function of said transactions.

21. The ECP system as set forth in claim 20 wherein said log tracks transactions performed on said at least said partial copy of said datastore.

22. The ECP system as set forth in claim 21 wherein said data space access module causes said processor to log ones of said transactions in said log while applying said received transactions to said at least said partial copy of said datastore.

23. The ECP system as recited in claim 20 wherein said at least said partial copy of said datastore is sequentially accessible, said data space anchor module creating a linked list of items within said data space.

24. The ECP system as recited in claim 20 wherein said items are selected from the group consisting of checks and deposits.

25. The ECP system as recited in claim 20 wherein said data space access module locks portions of said at least said partial copy of said datastore as a function of targets of said item-level reconciliation transactions.

26. The ECP system as recited in claim 20 wherein said data space anchor module can reconstruct said at least said partial copy of said datastore from said datastore.

27. The ECP system as recited in claim 20 wherein said at least said partial copy of said datastore includes a statistics area containing data pertaining to parameters of said at least said partial copy of said datastore.

* * * * *

UNITED STATES PATENT AND TRADEMARK OFFICE
CERTIFICATE OF CORRECTION

PATENT NO. : 6,301,379 B1
DATED : October 9, 2001
INVENTOR(S) : Thompson et al.

It is certified that error appears in the above-identified patent and that said Letters Patent is hereby corrected as shown below:

Column 3,
Line 22, "5,687,579" should be -- 5,689,579 --.
Line 23, "Preforming" should be -- Performing --.
Line 30, "instrument's" should be -- instruments --.

Signed and Sealed this

Nineteenth Day of March, 2002

Attest:

JAMES E. ROGAN
*Director of the United States Patent and Trademark Office*

*Attesting Officer*